(12) United States Patent
Cullen, III et al.

(10) Patent No.: US 9,020,884 B2
(45) Date of Patent: Apr. 28, 2015

(54) METHOD OF AND SYSTEM FOR CONSULTANT RE-SELLER BUSINESS INFORMATION TRANSFER

(75) Inventors: Andrew A. Cullen, III, Succasunna, NJ (US); Steven A. Shaw, New York, NY (US); Leonid Zilberman, Brooklyn, NY (US)

(73) Assignee: IQNavigator, Inc., Centennial, CO (US)

( * ) Notice: Subject to any disclaimer, the term of this patent is extended or adjusted under 35 U.S.C. 154(b) by 1360 days.

(21) Appl. No.: 11/071,831

(22) Filed: Mar. 2, 2005

(65) Prior Publication Data

US 2005/0262008 A1 Nov. 24, 2005

Related U.S. Application Data

(60) Provisional application No. 60/549,137, filed on Mar. 2, 2004, provisional application No. 60/598,822, filed on Aug. 4, 2004, provisional application No. 60/652,270, filed on Feb. 11, 2005.

(51) Int. Cl.
G06F 17/30 (2006.01)
G06Q 30/08 (2012.01)
G06Q 10/10 (2012.01)
G06Q 40/04 (2012.01)

(52) U.S. Cl.
CPC .......... *G06Q 30/08* (2013.01); *G06Q 10/10* (2013.01); *G06Q 40/04* (2013.01)

(58) Field of Classification Search
CPC ....... G06F 17/30557; G06F 8/24; G06F 8/35; G06F 9/46; G06Q 10/10; Y10S 707/99945

USPC .......... 705/37, 7, 8, 9, 7.12; 707/10, 999.104, 707/608; 717/102, 104

See application file for complete search history.

(56) References Cited

U.S. PATENT DOCUMENTS

| | | |
|---|---|---|
| 4,646,250 A | 2/1987 | Childress |
| 4,799,156 A | 1/1989 | Shavit et al. |

(Continued)

FOREIGN PATENT DOCUMENTS

| | | |
|---|---|---|
| EP | 1195676 A2 | 4/2002 |
| JP | H08-153121 A | 6/1996 |

(Continued)

OTHER PUBLICATIONS

Screenshots of Volt Information Sciences, www.volt.com, Feb. 21, 1999, pp. 1-24, retrieved from: Google.com and archive.org.

(Continued)

*Primary Examiner* — Dennis Truong
(74) *Attorney, Agent, or Firm* — Perkins Coie LLP

(57) ABSTRACT

A computer system for storing of business information to be transferred from a consultant to a buyer includes a database system for maintaining configurable business information organized into a plurality of information components and a server connected to the database system and connectable to the buyer and the consultant. The server is operable to receive a selection of an information component and configure the information component in accordance with consultant instructions. The configuration includes establishing a data value library and creating an information setting the server is operable to integrate the information setting into at least one work flow entity and integrate the at least one work flow entity into a process design.

36 Claims, 57 Drawing Sheets

(56) References Cited

U.S. PATENT DOCUMENTS

| | | |
|---|---|---|
| 4,937,743 A | 6/1990 | Rassman et al. |
| 4,992,940 A | 2/1991 | Dworkin |
| 5,117,353 A | 5/1992 | Stipanovich et al. |
| 5,164,897 A | 11/1992 | Clark et al. |
| 5,291,397 A | 3/1994 | Powell |
| 5,381,332 A | 1/1995 | Wood |
| 5,416,694 A | 5/1995 | Parrish et al. |
| 5,493,490 A | 2/1996 | Johnson |
| 5,592,375 A | 1/1997 | Salmon et al. |
| 5,600,554 A | 2/1997 | Williams |
| 5,664,115 A | 9/1997 | Fraser |
| 5,715,402 A | 2/1998 | Popolo |
| 5,740,421 A | 4/1998 | Palmon |
| 5,758,328 A | 5/1998 | Giovannoli |
| 5,794,212 A | 8/1998 | Mistr, Jr. |
| 5,802,493 A | 9/1998 | Sheflott et al. |
| 5,842,178 A | 11/1998 | Giovannoli |
| 5,862,223 A | 1/1999 | Walker et al. |
| 5,907,490 A | 5/1999 | Oliver |
| 5,913,202 A | 6/1999 | Motoyama |
| 5,915,086 A * | 6/1999 | Buzsaki et al. ............ 726/28 |
| 5,960,407 A | 9/1999 | Vivona |
| 5,970,475 A | 10/1999 | Barnes et al. |
| 5,978,768 A | 11/1999 | McGovern et al. |
| 5,987,464 A | 11/1999 | Schneider |
| 5,991,735 A | 11/1999 | Gerace |
| 5,995,951 A | 11/1999 | Ferguson |
| 6,014,644 A | 1/2000 | Erickson |
| 6,038,547 A | 3/2000 | Casto |
| 6,041,303 A | 3/2000 | Mathews |
| 6,049,776 A | 4/2000 | Donnelly et al. |
| 6,058,373 A | 5/2000 | Blinn et al. |
| 6,058,379 A | 5/2000 | Odom et al. |
| 6,070,143 A | 5/2000 | Barney et al. |
| 6,088,678 A | 7/2000 | Shannon |
| 6,092,050 A | 7/2000 | Lungren et al. |
| 6,092,060 A | 7/2000 | Guinta et al. |
| 6,092,197 A | 7/2000 | Coueignoux |
| 6,112,189 A | 8/2000 | Rickard et al. |
| 6,115,642 A | 9/2000 | Brown et al. |
| 6,131,087 A | 10/2000 | Luke et al. |
| 6,141,653 A | 10/2000 | Conklin et al. |
| 6,157,808 A | 12/2000 | Hollingsworth |
| 6,158,044 A | 12/2000 | Tibbetts |
| 6,161,099 A | 12/2000 | Harrington et al. |
| 6,167,385 A | 12/2000 | Hartley-Urquhart |
| 6,189,003 B1 | 2/2001 | Leal |
| 6,199,050 B1 | 3/2001 | Alaia et al. |
| 6,213,780 B1 | 4/2001 | Ho et al. |
| 6,266,659 B1 | 7/2001 | Nadkarni |
| 6,272,467 B1 | 8/2001 | Durand et al. |
| 6,275,812 B1 | 8/2001 | Haq et al. |
| 6,289,340 B1 | 9/2001 | Puram et al. |
| 6,302,695 B1 | 10/2001 | Rtischev et al. |
| 6,324,522 B2 | 11/2001 | Peterson et al. |
| 6,349,238 B1 | 2/2002 | Gabbita et al. |
| 6,356,909 B1 | 3/2002 | Spencer |
| 6,370,510 B1 | 4/2002 | McGovern et al. |
| 6,385,620 B1 | 5/2002 | Kurzius et al. |
| 6,408,337 B1 | 6/2002 | Dietz et al. |
| 6,442,528 B1 * | 8/2002 | Notani et al. ............ 705/9 |
| 6,480,857 B1 | 11/2002 | Chandler |
| 6,529,909 B1 * | 3/2003 | Bowman-Amuah ............ 707/10 |
| 6,556,976 B1 | 4/2003 | Callen |
| 6,601,233 B1 | 7/2003 | Underwood |
| 6,647,300 B1 | 11/2003 | Balasubramanian et al. |
| 6,658,400 B2 | 12/2003 | Perell et al. |
| 6,662,194 B1 | 12/2003 | Joao |
| 6,922,676 B2 | 7/2005 | Alnwick |
| 6,957,186 B1 * | 10/2005 | Guheen et al. ............ 705/323 |
| 6,980,962 B1 | 12/2005 | Arganbright et al. |
| 7,054,821 B1 | 5/2006 | Rosenthal et al. |
| 7,089,203 B1 | 8/2006 | Crookshanks |
| 7,103,567 B2 | 9/2006 | Smukowski |
| 7,107,268 B1 | 9/2006 | Zawadzki et al. |
| 7,275,039 B2 * | 9/2007 | Setteducati ............ 705/8 |
| 7,302,431 B1 * | 11/2007 | Apollonsky et al. ............ 1/1 |
| 7,305,392 B1 | 12/2007 | Abrams et al. |
| 7,349,868 B2 | 3/2008 | Tenorio |
| 7,386,475 B2 | 6/2008 | Parasnis et al. |
| 7,430,523 B1 | 9/2008 | Khalidi |
| 7,437,304 B2 | 10/2008 | Barnard et al. |
| 7,451,106 B1 | 11/2008 | Gindlesperger |
| 7,457,764 B1 | 11/2008 | Bullock et al. |
| 7,523,045 B1 | 4/2009 | Walker et al. |
| 7,533,033 B1 | 5/2009 | Unite et al. |
| 7,653,583 B1 | 1/2010 | Leeb et al. |
| 7,805,382 B2 | 9/2010 | Rosen et al. |
| 2001/0044768 A1 * | 11/2001 | Wares ............ 705/37 |
| 2001/0047311 A1 | 11/2001 | Singh |
| 2001/0051913 A1 | 12/2001 | Vashistha et al. |
| 2002/0002479 A1 | 1/2002 | Almog et al. |
| 2002/0042752 A1 | 4/2002 | Chaves |
| 2002/0046147 A1 | 4/2002 | Livesay et al. |
| 2002/0055870 A1 | 5/2002 | Thomas |
| 2002/0072946 A1 | 6/2002 | Richardson |
| 2002/0073082 A1 | 6/2002 | Duvillier et al. |
| 2002/0087382 A1 | 7/2002 | Tiburcio |
| 2002/0103687 A1 | 8/2002 | Kipling |
| 2002/0152133 A1 | 10/2002 | King et al. |
| 2002/0156668 A1 * | 10/2002 | Morrow et al. ............ 705/8 |
| 2002/0161619 A1 | 10/2002 | Ham et al. |
| 2002/0198766 A1 | 12/2002 | Magrino et al. |
| 2002/0198818 A1 | 12/2002 | Scott et al. |
| 2003/0004850 A1 | 1/2003 | Li et al. |
| 2003/0018481 A1 | 1/2003 | Zhou et al. |
| 2003/0037032 A1 | 2/2003 | Neece et al. |
| 2003/0055694 A1 | 3/2003 | Menninger |
| 2003/0055754 A1 | 3/2003 | Sullivan |
| 2003/0083910 A1 * | 5/2003 | Sayal et al. ............ 705/7 |
| 2003/0101114 A1 | 5/2003 | Delapass et al. |
| 2003/0101127 A1 | 5/2003 | Cornelius |
| 2003/0135401 A1 | 7/2003 | Parr |
| 2003/0145006 A1 | 7/2003 | Dalfsen et al. |
| 2003/0177051 A1 | 9/2003 | Driscoll et al. |
| 2003/0200150 A1 | 10/2003 | Westcott et al. |
| 2003/0200168 A1 | 10/2003 | Cullen, III et al. |
| 2003/0204439 A1 | 10/2003 | Cullen, III |
| 2003/0208434 A1 | 11/2003 | Posner |
| 2003/0212604 A1 | 11/2003 | Cullen, III |
| 2003/0216986 A1 * | 11/2003 | Hassan ............ 705/35 |
| 2004/0030566 A1 | 2/2004 | Brooks Rix |
| 2004/0030590 A1 | 2/2004 | Swan et al. |
| 2004/0039681 A1 | 2/2004 | Cullen, III et al. |
| 2004/0068728 A1 * | 4/2004 | Blevins ............ 718/100 |
| 2004/0093583 A1 | 5/2004 | McAnaney et al. |
| 2004/0107125 A1 * | 6/2004 | Guheen et al. ............ 705/7 |
| 2004/0107405 A1 | 6/2004 | Schein |
| 2004/0158513 A1 | 8/2004 | Musacchio |
| 2004/0186852 A1 | 9/2004 | Rosen |
| 2004/0205519 A1 | 10/2004 | Chapel et al. |
| 2004/0210490 A1 | 10/2004 | Almstead et al. |
| 2004/0210510 A1 | 10/2004 | Cullen, III et al. |
| 2004/0215467 A1 | 10/2004 | Coffman et al. |
| 2004/0236598 A1 | 11/2004 | Thomsen |
| 2004/0249655 A1 | 12/2004 | Doeberl et al. |
| 2004/0260601 A1 | 12/2004 | Brief |
| 2004/0267606 A1 | 12/2004 | Brishke et al. |
| 2005/0114829 A1 | 5/2005 | Robin |
| 2005/0120039 A1 | 6/2005 | Amys et al. |
| 2005/0144129 A1 | 6/2005 | Coolman et al. |
| 2005/0288993 A1 | 12/2005 | Weng et al. |
| 2006/0173775 A1 | 8/2006 | Cullen et al. |
| 2006/0259476 A1 | 11/2006 | Kadayam et al. |
| 2007/0124196 A1 | 5/2007 | Brief et al. |
| 2007/0198968 A1 * | 8/2007 | Shenfield et al. ............ 717/104 |
| 2008/0004890 A1 | 1/2008 | Hargroder |
| 2009/0248482 A1 | 10/2009 | Knyphausen et al. |
| 2010/0241482 A1 | 9/2010 | Knyphausen et al. |

FOREIGN PATENT DOCUMENTS

| | | |
|---|---|---|
| JP | 09-223008 A | 8/1997 |
| JP | 11-345259 A | 12/1999 |

(56) References Cited

FOREIGN PATENT DOCUMENTS

| | | |
|---|---|---|
| JP | 2001-325299 A | 11/2001 |
| JP | 2002-041835 A | 2/2002 |
| JP | 2002-149959 A | 5/2002 |
| JP | 2002-531890 A | 9/2002 |
| JP | 2002-366763 A | 12/2002 |
| JP | 2003-058030 A | 2/2003 |
| JP | 2003-067188 A | 3/2003 |
| JP | 2003-532201 A | 10/2003 |
| JP | 2004-086757 A | 3/2004 |
| JP | 2004-234548 A | 8/2004 |
| JP | 2004-252951 A | 9/2004 |
| JP | 2004-264880 A | 9/2004 |
| JP | 2004-527805 A | 9/2004 |
| JP | 2005-018327 A | 1/2005 |
| JP | 2005-044259 A | 2/2005 |
| RU | 2165679 C1 | 4/2001 |
| WO | WO-00/33187 A1 | 6/2000 |
| WO | WO-/00/50970 | 8/2000 |
| WO | WO-0108067 A1 | 2/2001 |
| WO | WO-01/14962 A1 | 3/2001 |
| WO | WO-01/48656 | 7/2001 |
| WO | WO-02/08868 | 1/2002 |
| WO | WO-02/25544 | 3/2002 |
| WO | WO-02/41270 A1 | 5/2002 |
| WO | WO-2005/010789 A1 | 2/2005 |

OTHER PUBLICATIONS

Torres, Giselle; "High-Voltage Staffing Service Arrives in Puerto Rico"; Caribbean Business; Oct. 23, 1997, p. 1 (retrived from: Dialog, file 16).

"Volt Information Sciences—Facilities & Equipment", Annual Report, 1989, p. 1 (retrieved from : Dialog, file 160.

"Volt Information Sciences to Purchase Portions of Two Lucent Technologies Subsidiaries", PR Newswire, Nov. 17, 1999, pp. 1-3, (retrieved from: Dialog, file 16).

U.S. Appl. No. 11/351,835, Culen et al.

U.S. Appl. No. 11/354,367, Cullen, III et al.

Consol (www, procurestaff.com via http://web.archive.org, copyright 2003) pp. (1-31).

marketing.ebreviate.com; "Overview"; Company Information of eBreviate; Feb. 11, 2002; pp. 1-16.

www.chimes.net; "Chimes Streamlines & Digitizes RFP Administration and Project Management with Launch of Chimes PM"; Press Release from Chimes, Inc.; Feb. 25, 2002; pp. 1-4.

www.chimes.net; "Chimes, Inc. Extends Human Capital Management Solution Beyond Contingent Workforce with Launch of Centralized Applicant Management—CAM—Program"; News Room from Chimes, Inc.; Jun. 28, 2001; pp. 1-2.

www.emptoris.com; "Overview"; Company Overview of Emptoris; Apr. 15, 2002; pp. 1-18.

Cullen, Andrew A. III, "Declaration of Andrew A. Cullen III", 41 pages, Jun. 18, 2008.

Dysart, J., "The Data Exchange," DG Review, vol. 11, No. 9, p. 37, Mar. 11, 1991.

Anon., "Primavera Systems; Primavera, PurchasePro.Com Create E-Commerce Marketplace for Construction Industry," M2 Presswire, Sep. 22, 1999.

Rawdon, S., "Online Bidding Options May Be Web's Best Secret," Business First-Columbus, vol. 18, No. 33, p. B11, Apr. 5, 2002.

"nextSource Announces Launch of its Multiple Listing Staffing Association." Business Wire, p. 2196, Apr. 16, 2002.

Definition of prose from Dictionary.com, retrieved from [http://dictionary.reference.com/browse/prose] on Aug. 7, 2008 (5 pages).

Herman, Susan J. Hiring Right: A Practical Guide. SAGE. 1994. pp. 23-25.

U.S. Appl. No. 11/885,090, Cullen et al.

U.S. Appl. No. 12/342,116, Cullen.

Leipold et al., "The World Bank e-Procurement for the Selection of Consultants: Challenges and Lessons Learned" Journal of Public Procurement, 2004, vol. 4, Issue 3, pp. 319-339.

Cullen, A., Suppliers of Technical Nonpayroll Workers, (2 pages), Dec. 31, 1997.

Cullen, A., Skills Questionnaire, (5 pages), May 21, 1998.

Cullen, A., Skills Environment, (1 page), Jul. 2, 1998.

Cullen, A., Jobs Listing, (31 pages), Feb. 24, 1999.

Brief, V., Overview of Volt's HRP Application, (3 pages), Feb. 1999.

U.S. Appl. No. 12/492,438, Cullen.

U.S. Appl. No. 12/773,130, Cullen.

U.S. Appl. No. 12/855,532, Wasicek.

U.S. Appl. No. 12/871,725, Shaw.

Copenheaver, Blaine R., "International Search Report" for PCT/US2010/045349 as mailed Oct. 6, 2010 (4 pages).

Young, Lee W., "International Search Report" for PCT/US10/47176 as mailed Oct. 14, 2010, 3 pages.

Cullen, III, et al., U.S. Appl. No. 13/017,760, filed Jan. 31, 2011.

Web Archive of "nextSource" web page, "People Blue Book™, Introducing the nextSource People Blue Book" retrieved from [URL: http://web.archive.org/web/20020206061453/http://nextsource.com/services/people_blue . . . ], archived on Feb. 6, 2002, 1 page.

U.S. Bureau of Labor Statistics, "2000 Standard Occupational Classification (SOC) User Guide", retrieved from [URL: http://data.bls.gov/cgi-bin/print.pl/soc/socguide.htm] on Dec. 27, 2011, 5 pages.

Tate, L., "Preparing RFPs, RFQs and Negotiating Contracts Requires Meticulous Attention to Many Details", Communications News, vol. 24, No. 12, p. 46, Dec. 1987.

Hirning, J., "Standing up to the Standards Strain", Quality, vol. 34, No. 2, p. 96, Feb. 1995.

Feder, B.J., "True Grit in the Gritty Inner City; Some Dreams Come True, but Company Fights for Life", New York Times, Late Edition-Final Edition, Jul. 10, 1998, p. 1, col. 2.

Anon, "Cephren Launches MarketNet Bidding Service, Providing the Construction Industry With an Efficient Way to Procure Goods and Services Online", Business Wire, May 30, 2000, 3 pages.

Brief, Victor, U.S. Appl. No. 13/460,979, filed May 1, 2012.

U.S. Appl. No. 13/953,978, Cullen.

Bajari et el. (Bajari), "Incentives versus transaction cost: a theory of procurement contracts", RAND Journal of Economics, vol. 32, No. 3, Autumn 2001, pp. 387-407.

U.S. Appl. No. 12/692,937, Cullen.

* cited by examiner

METHOD OF AND SYSTEM FOR CONSULTANT RE-SELLER BUSINESS INFORMATION TRANSFER

CROSS-REFERENCE TO RELATED APPLICATIONS

This patent application claims priority from and incorporates by reference the entire disclosure of U.S. Provisional Patent Application No. 60/549,137, which was filed on Mar. 2, 2004. This patent application claims priority from U.S. Provisional Patent Application No. 60/598,822, filed on Aug. 4, 2004 and from U.S. Provisional Patent Application No. 60/652,270 filed on Feb. 11, 2005. This patent application incorporates by reference the following U.S. patent applications: U.S. Provisional Patent Application No. 60/371,488, filed on Apr. 10, 2002; U.S. patent application Ser. No. 10/262,487, filed on Sep. 30, 2002; U.S. patent application Ser. No. 10/412,096, filed on Apr. 10, 2003; U.S. patent application Ser. No. 10/797,556, filed on Mar. 10, 2004; U.S. patent application Ser. No. 10/141,801, filed on May 9, 2002; U.S. patent application Ser. No. 10/128,751, filed on Apr. 24, 2002; and U.S. Provisional Patent Application No. 60/598,822, filed on Aug. 4, 2004.

BACKGROUND

1. Technical Field

The present invention relates generally to a system and method for electronically facilitating consultant re-seller (CRS) business information transfer to a vendor or buyer entity

2. History of Related Art

It is oftentimes the experience among buyers of project work related services or goods to encounter business challenges that are not within the buyer's core competencies. As a result, buyers often resort to outsourcing the project work to external services or goods providers. Although the outsourcing may permit the buyer to acquire the necessary services or goods, the outsourcing does not guarantee that the buyer's business environment has been optimized to adequately manage the specific project work at hand.

Even if it is assumed that a business environment management tool exists that can support nuances of project work commodity management, the buyer may not have the requisite subject matter expertise or business information available to manage a broad scope of challenges often encountered. Typical areas of business concern revolve around, but are not limited to, the following: master data management, collateral data management, supply chain management, human capital management, commodity management, financial/spend management, process engineering, and work flow management.

While there are often numerous consultants that specialize in particular areas and have significant and useful stores of subject matter expertise related to, for example, specific industries, processes, and geographic business requirements that could be used by a buyer community to optimize their project work commodity management endeavors, the buyer and the consultants usually interact on a hit or miss basis. Due to the proprietary nature of most complex business software systems, the transfer of business information from the consultant to the buyer is often an expensive and time-consuming endeavor that may be limited by numerous system constraints. There is therefore a need for a business solution via which a consultant can establish project-work-commodity business information in a tangible standardized format that can subsequently be transferred and integrated into a buyer's project work commodity management system without the need for expensive, complex, and time-consuming manual configurations or customizations.

SUMMARY OF THE INVENTION

A computer system for storing of business information to be transferred from a consultant to a buyer includes a database system for maintaining configurable business information organized into a plurality of information components and a server connected to the database system and connectable to the buyer and the consultant. The server is operable to receive a selection of an information component and configure the information component in accordance with consultant instructions. The configuration includes establishing a data value library and creating an information setting the server is operable to integrate the information setting into at least one work flow entity and integrate the at least one work flow entity into a process design.

A method of storing of business information to be transferred from a consultant to a buyer includes receiving a selection of an information component and configuring the information component in accordance with consultant instructions. The step of configuring includes establishing a data value library and creating an information setting. The method includes integrating the information setting into at least one work flow entity and integrating the at least one work flow entity into a process design.

A computer system for facilitating transfer of business information in the form of configuration settings from a consultant to a buyer includes a database system for storing the business information to be transferred and a server connected to the database system and connectable to the buyer and the consultant. The server is operable to receive a buyer request for transfer of previously-defined consultant configuration settings, perform a component-framework comparison between a buyer environment and a consultant environment, and, responsive to a determination that the buyer environment supports the configuration settings, transfer at least one of configuration-setting object and a configuration-setting value to the buyer environment.

A method for facilitating transfer of business information in the form of configuration settings from a consultant to a buyer includes receiving a buyer request for transfer of previously-defined consultant configuration settings, performing a component-framework comparison between a buyer environment and a consultant environment, and, responsive to a determination that the buyer environment supports the configuration settings, transferring at least one of configuration-setting object and a configuration-setting value to the buyer environment.

A computer system for facilitating transfer of business information from a consultant to a buyer includes a computer readable medium having computer-executable instructions stored therein and a processor connected to the computer readable storage medium to execute the instructions to implement at least one of the following in accordance with services to be provided by the consultant to the buyer: master data configurations, commodity configurations, supplier chain configurations, human capital management configurations, collateral data configurations, work flow entity configurations, RFx configurations, purchase order/requisition configurations, voucher process configurations, financial processing configurations, and information system configurations.

A method of enabling transfer of business information from a consultant to a buyer includes permitting access by a consultant to a transfer environment, receiving business qualification information inputs from the consultant, performing a consultant business qualification assessment, executing a consultant agreement process, and granting, to the consultant, of selective access to transfer-environment applications.

A computer system for enabling transfer of business information from a consultant to a buyer includes a database system and a server connected to the database system and connectable to the buyer and the consultant. The server is operable to permit access by a consultant to a transfer environment, receive business qualification information inputs from the consultant, perform a consultant business qualification assessment, execute a consultant agreement process, and grant, to the consultant, of selective access to transfer-environment applications.

A computer system for creating a consultant profile to be used in connection with business information transfer from a consultant to a buyer includes a computer readable medium having computer-executable instructions stored therein and a processor connected to the computer readable storage medium to execute the instructions to receive general data regarding consultant employees, create a skill profile regarding consultant employees, create a commodity profile regarding consultant employees, create a geographic sales profile regarding consultant employees, receive a request for professional services designation/qualification regarding consultant employees, perform consultant professional services certification, and facilitate establishment of consultant professional services pricing.

A method of creating a consultant profile to be used in connection with business information transfer from a consultant to a buyer includes receiving general data regarding consultant employees, creating a skill profile regarding consultant employees, creating a commodity profile regarding consultant employees, creating a geographic sales profile regarding consultant employees, receiving a request for professional services designation/qualification regarding consultant employees, performing consultant professional services certification, and facilitating establishment of consultant professional services pricing.

A computer system for facilitating transfer of business information from a consultant to a buyer includes a computer readable medium having computer-executable instructions stored therein and a processor connected to the computer readable storage medium to execute the instructions to permit the consultant to build configuration settings within an environment of the buyer, permit the consultant to build configuration settings within an environment independent of the buyer environment, and permit the consultant to build configuration elements.

A method for facilitating transfer of business information from a consultant to a buyer includes permitting the consultant to build configuration settings within an environment of the buyer, permitting the consultant to build configuration settings within an environment independent of the buyer environment, and permitting the consultant to build configuration elements.

BRIEF DESCRIPTION OF DRAWINGS AND TABLES

A more complete understanding of the present invention may be obtained by reference to the following Detailed Description of Exemplary Embodiments of the Invention, when taken in conjunction with the accompanying Drawings and Tables, wherein:

FIGURES

Figure 9:
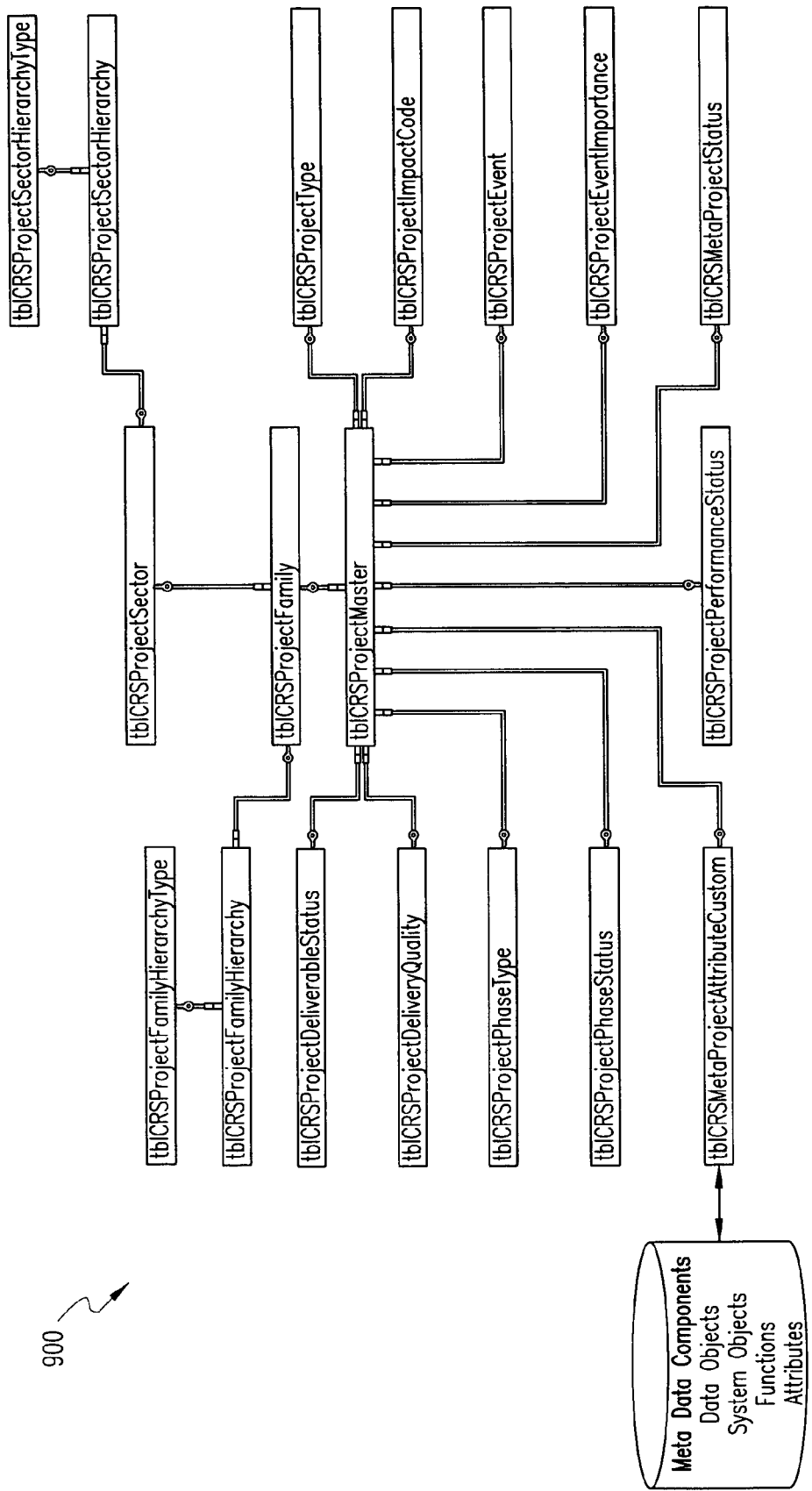
Figure 10:
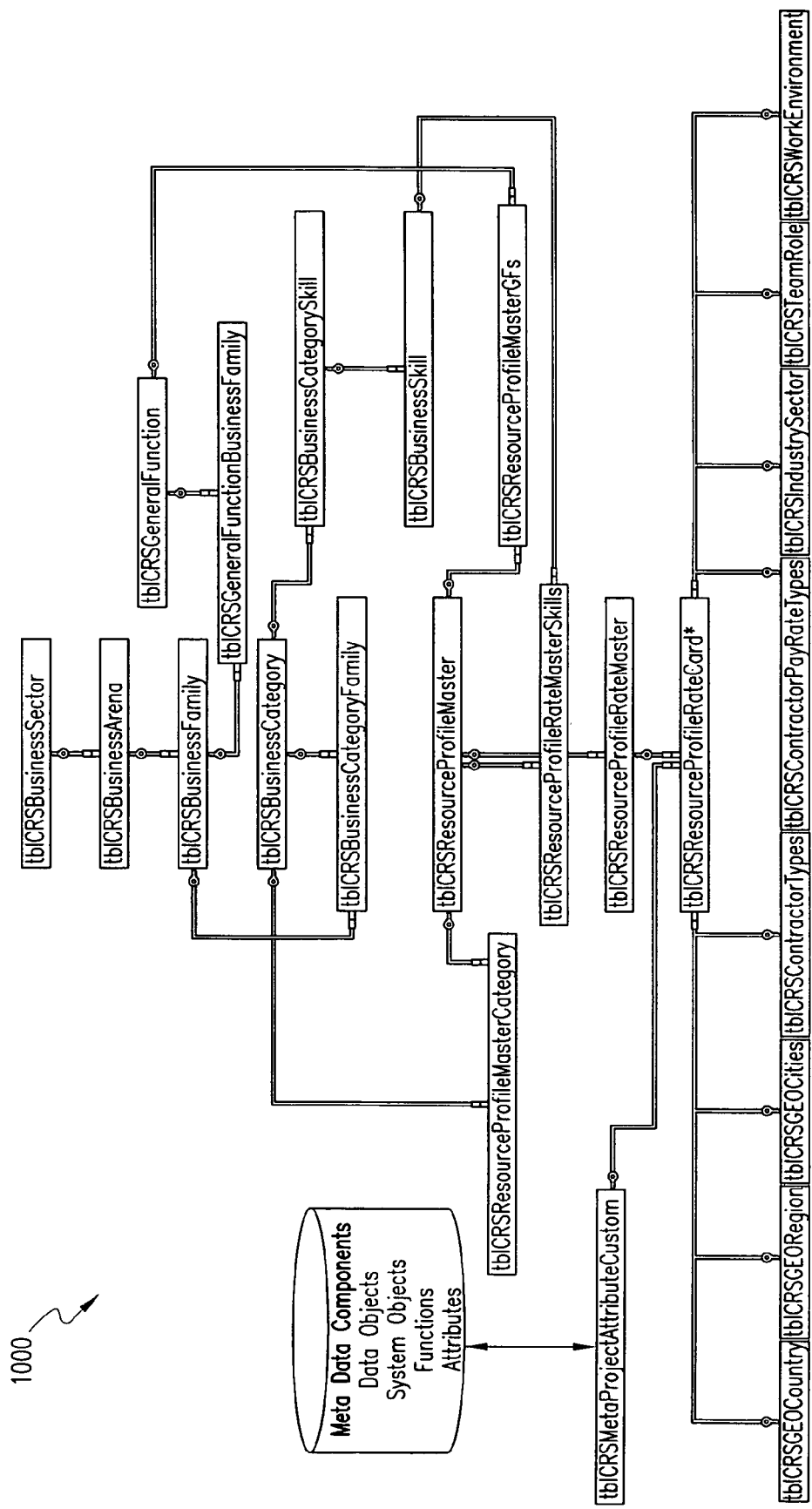
Figure 11:
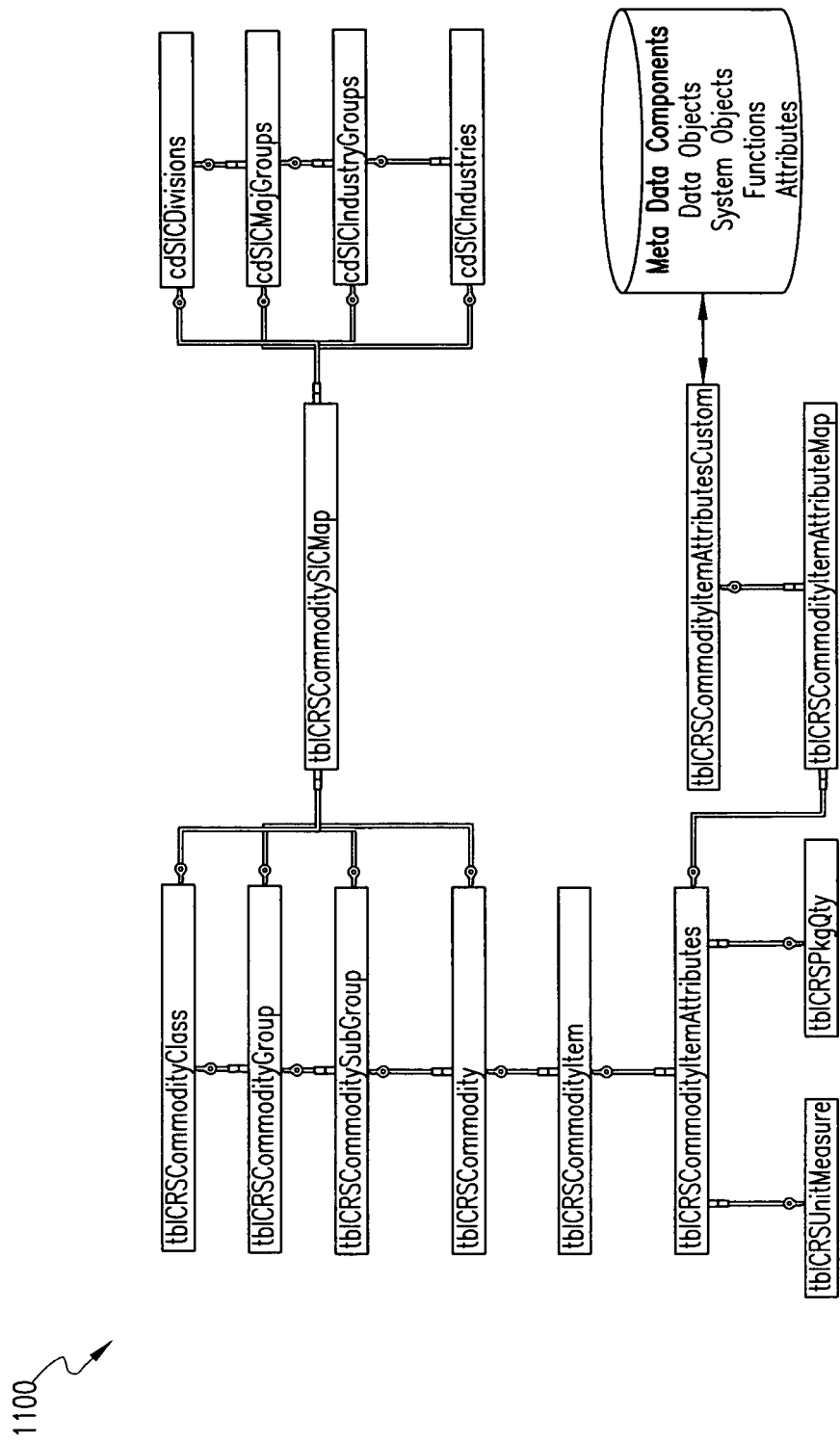
Figure 12:
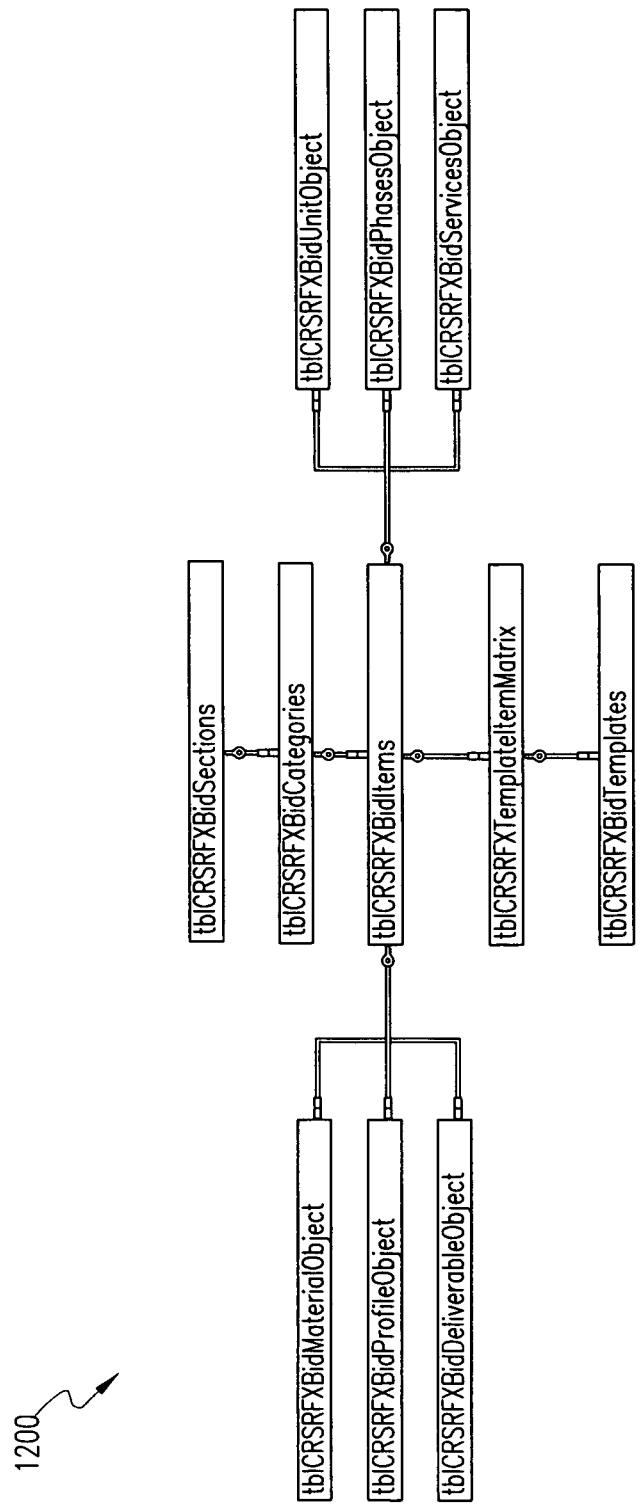
Figure 13:
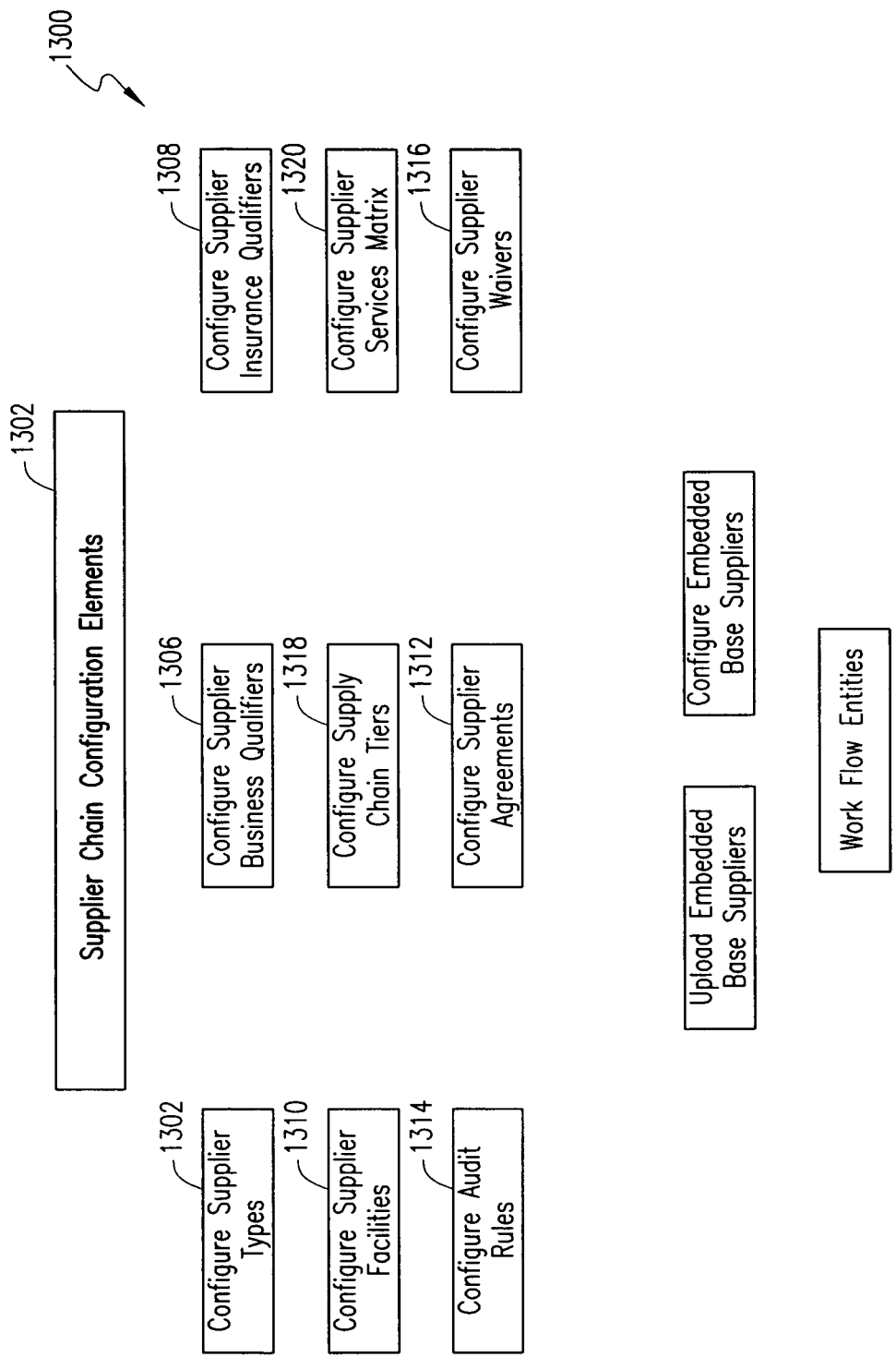
Figure 14:
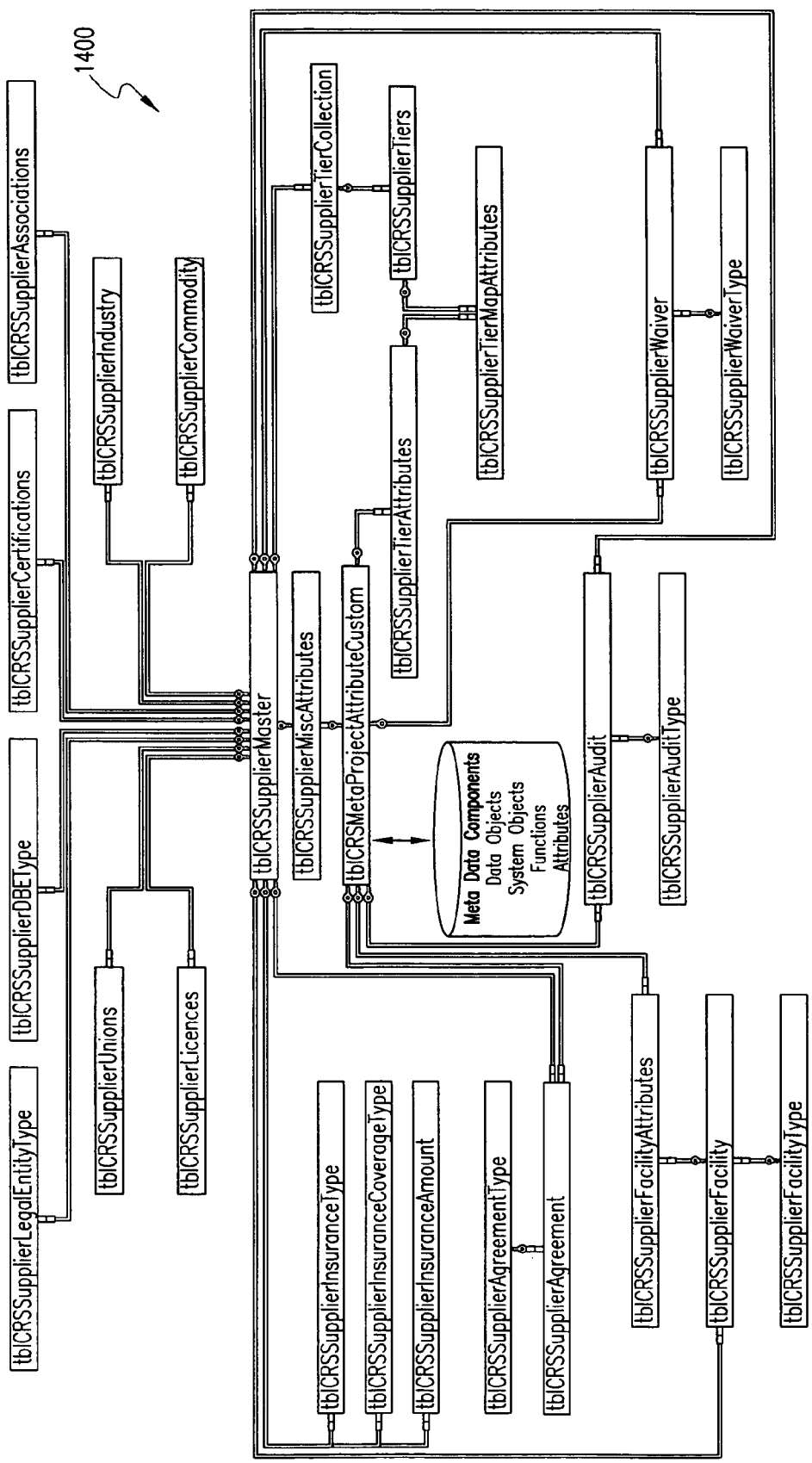
Figure 15:
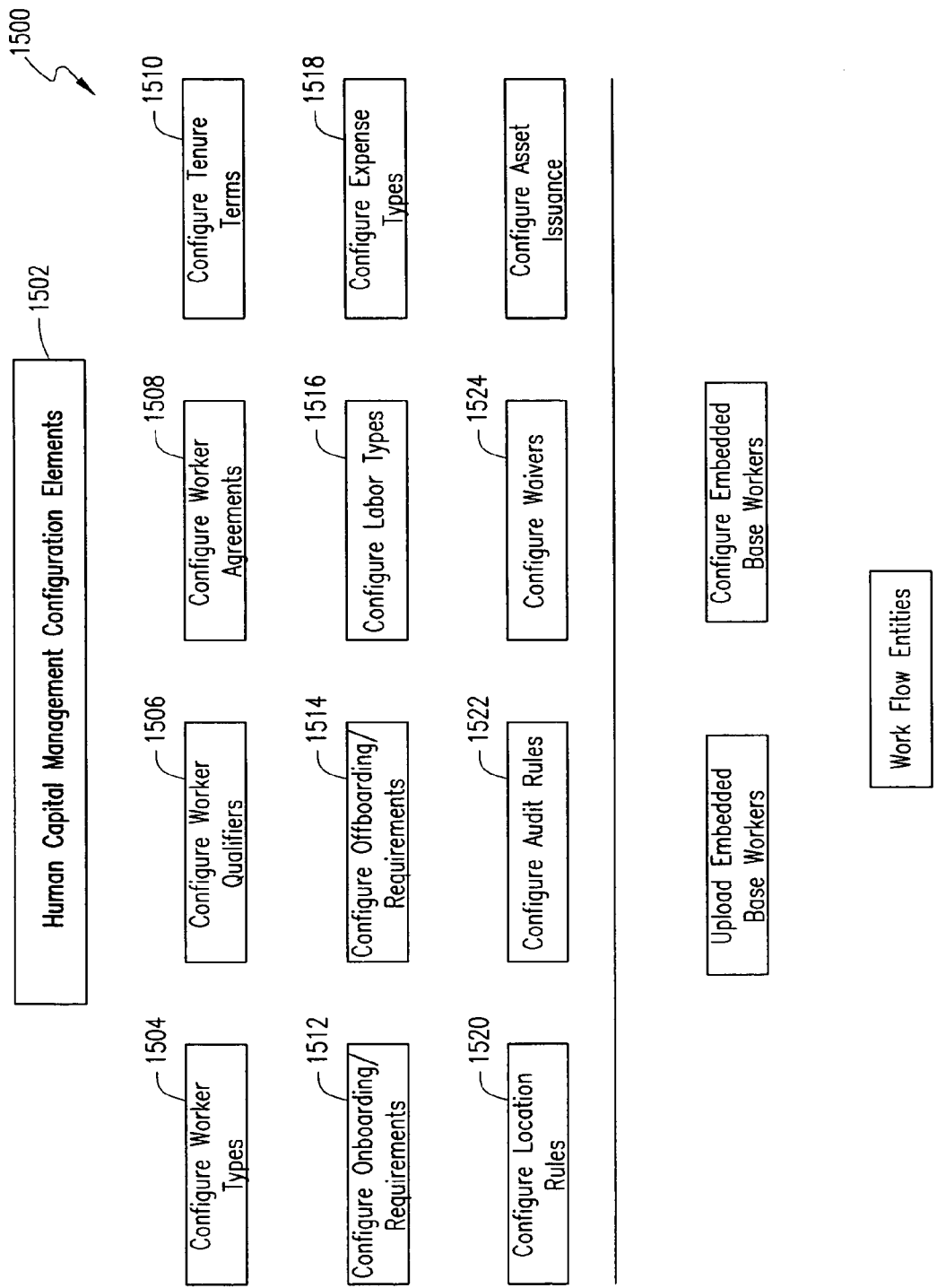
Figure 16:
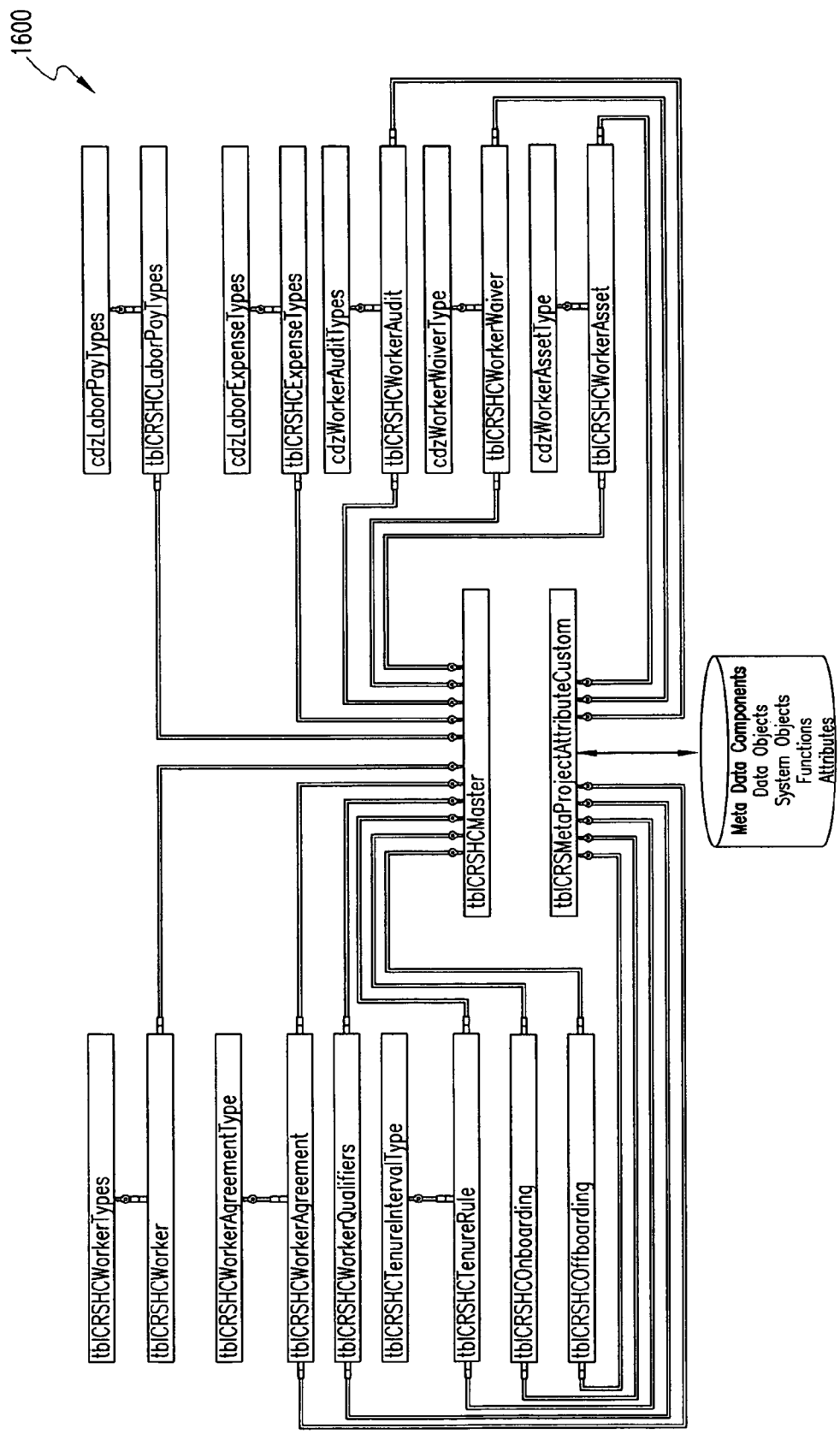
Figure 17:
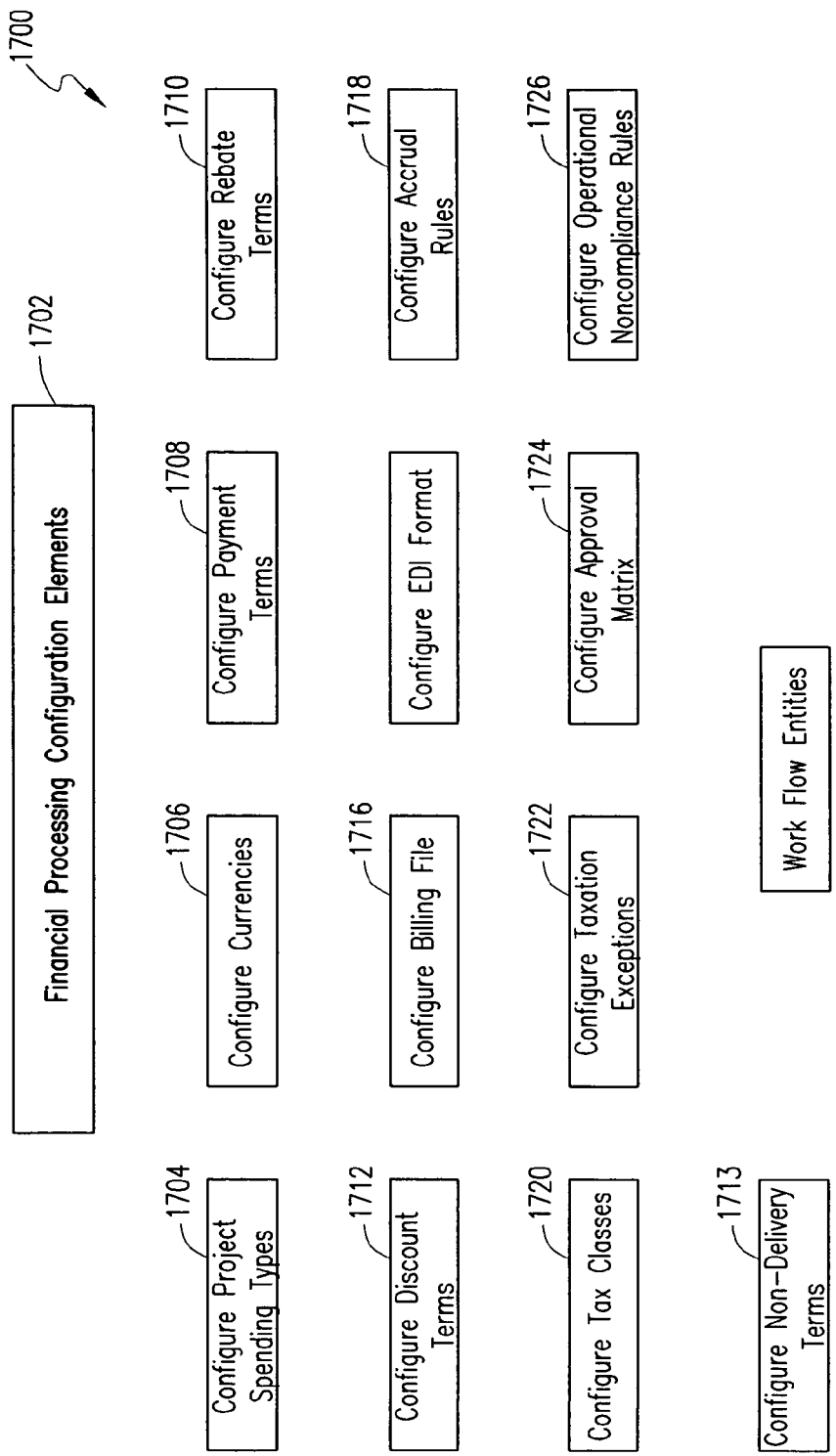
Figure 18:
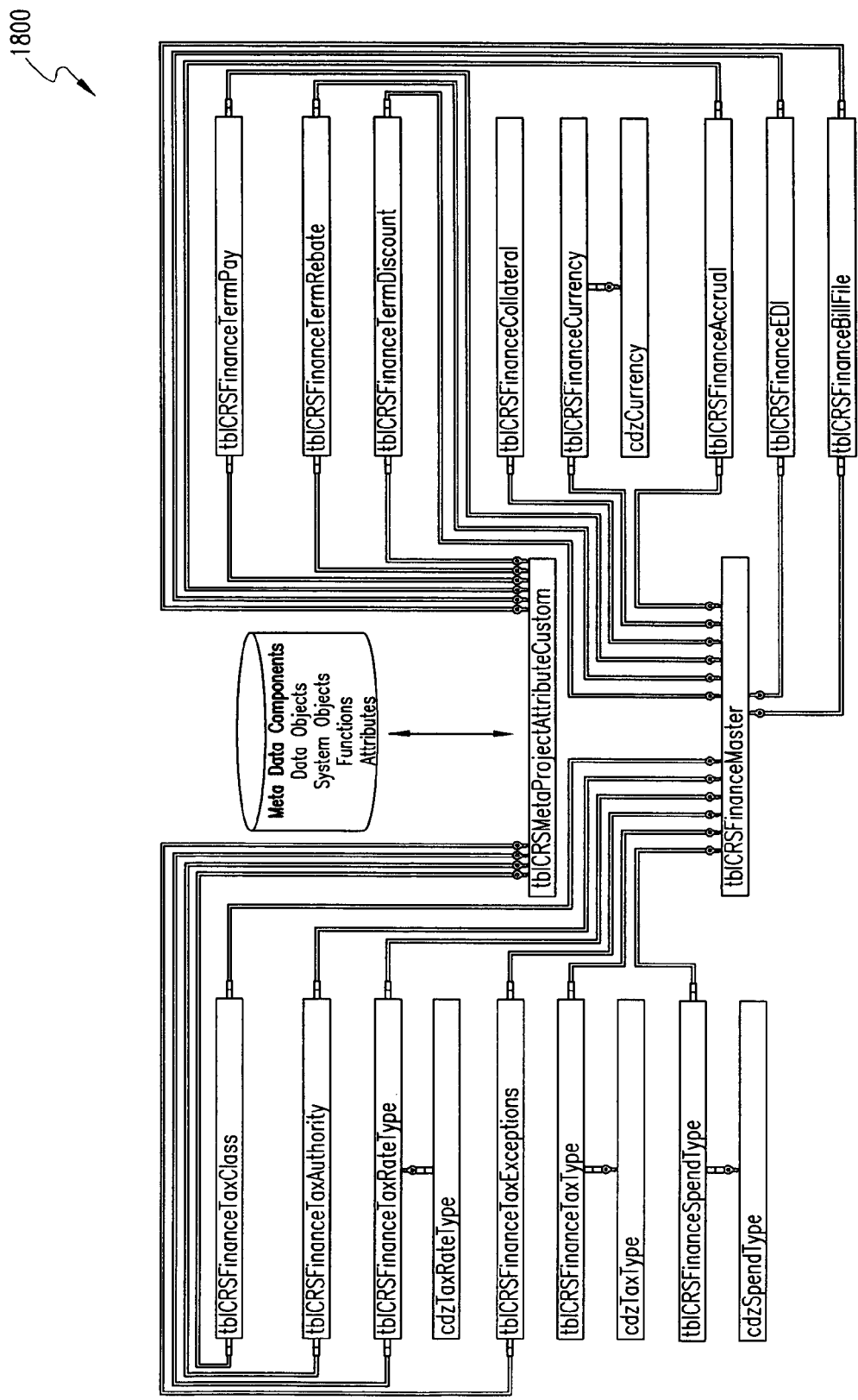
Figure 19:
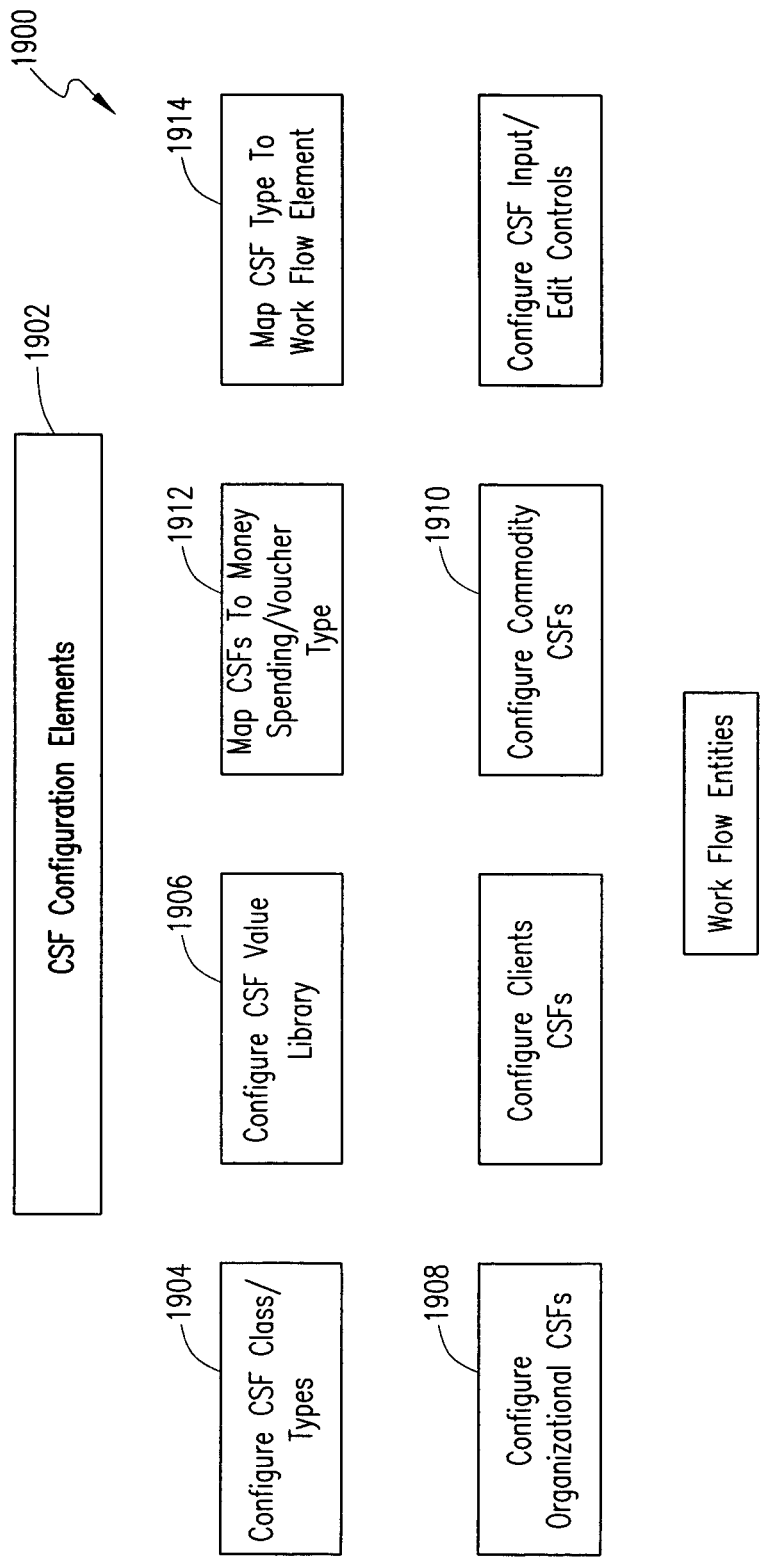
Figure 20:
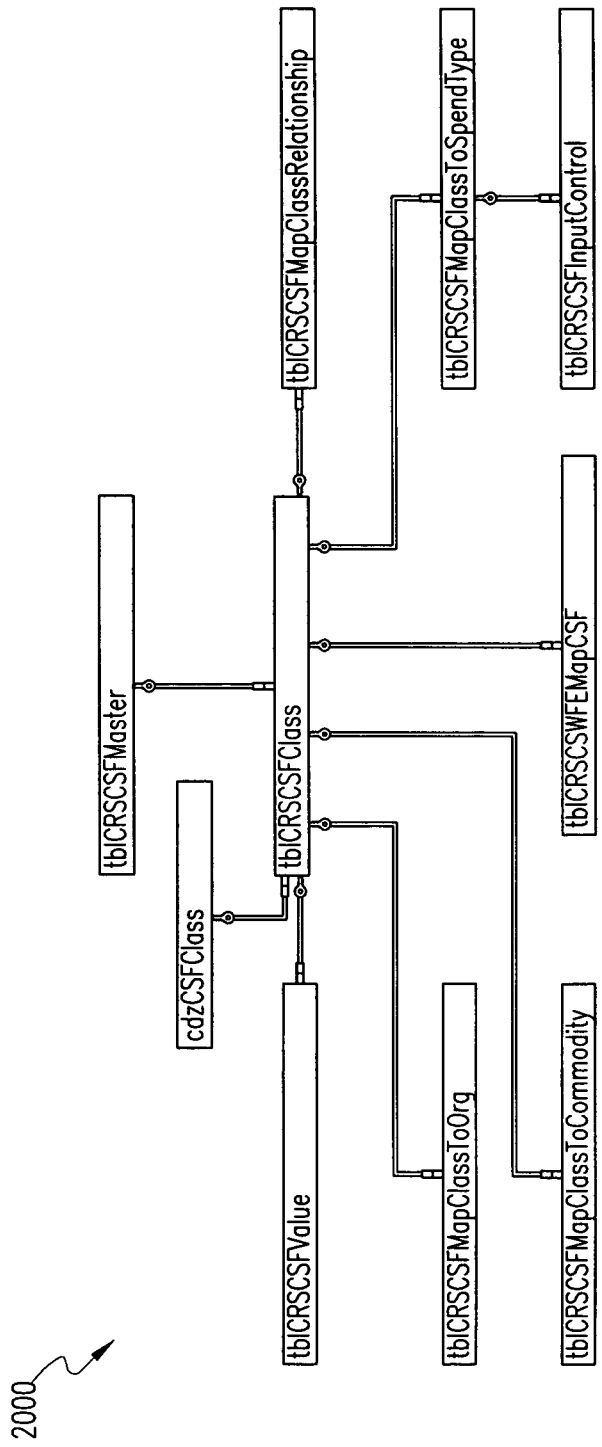
Figure 21:
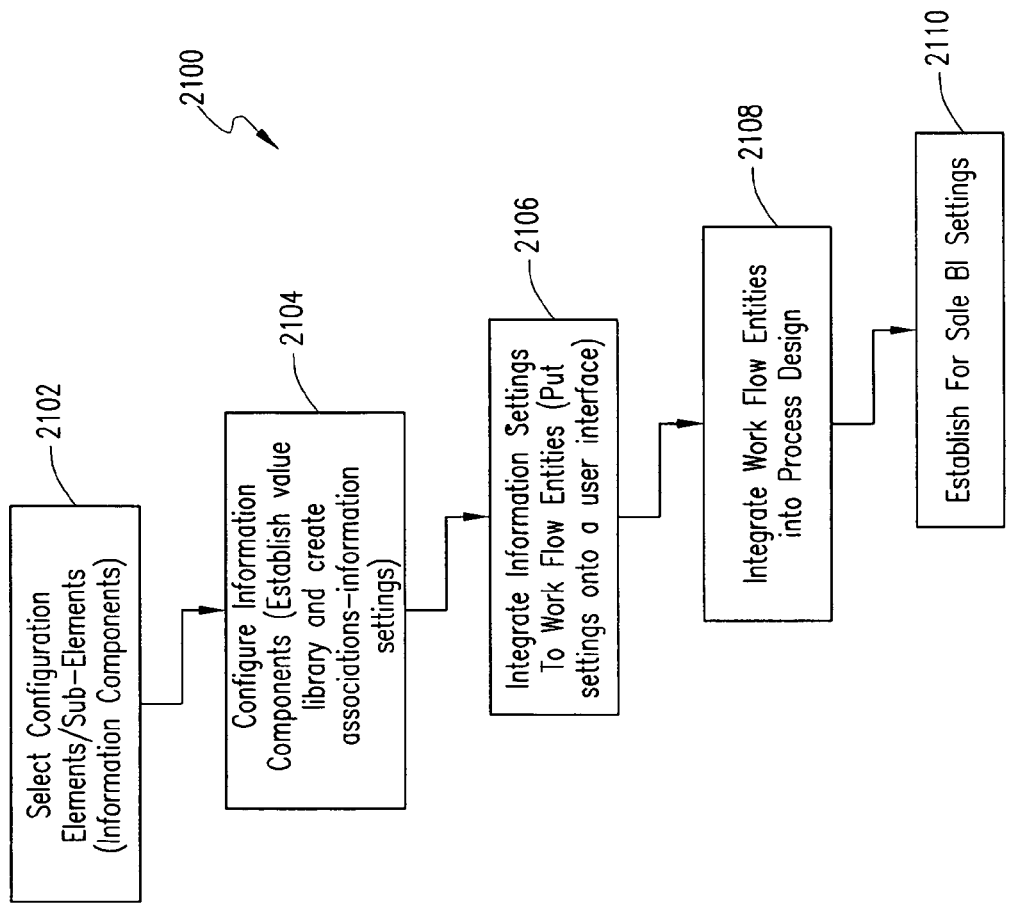
Figure 22:
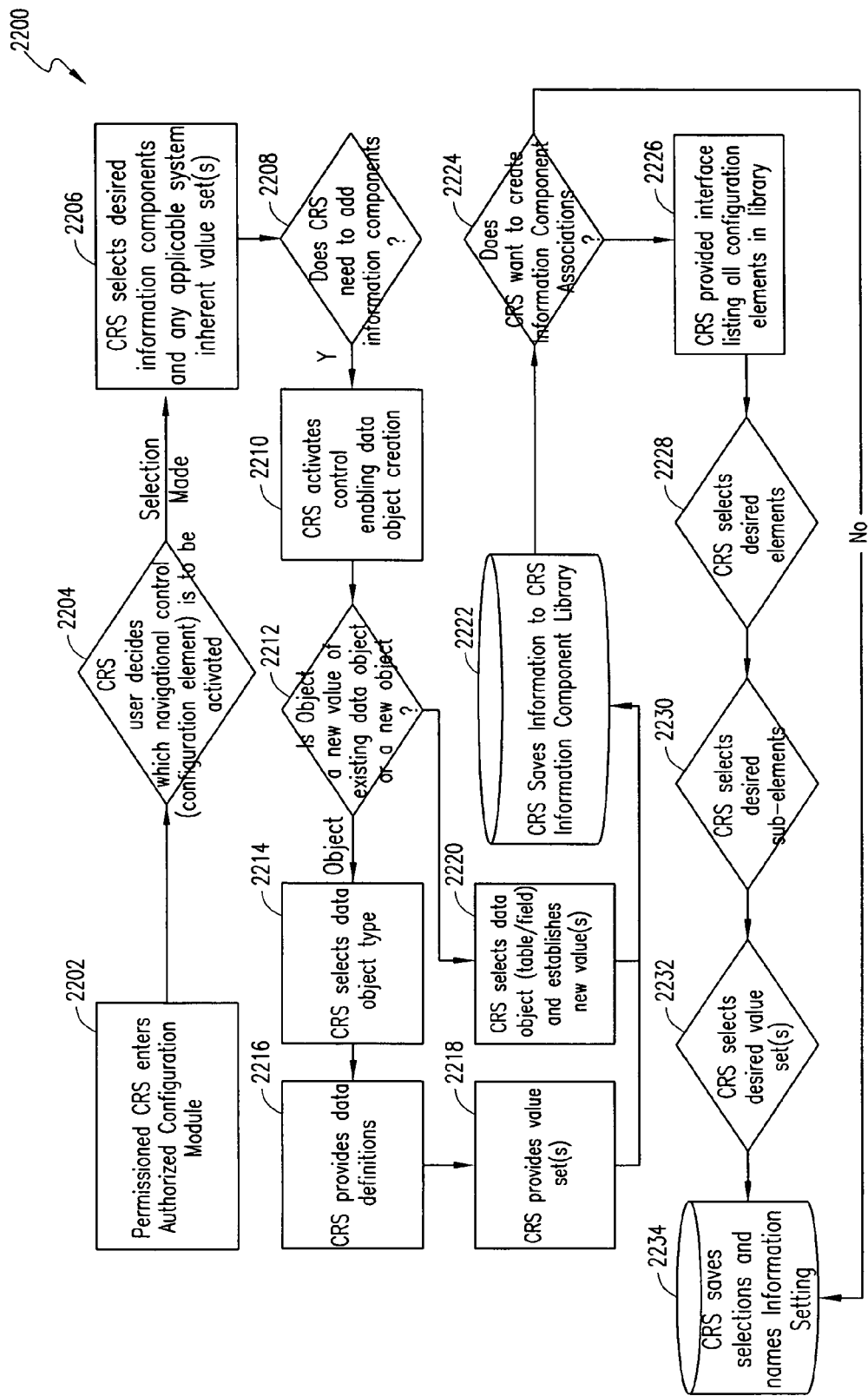
Figure 23A:
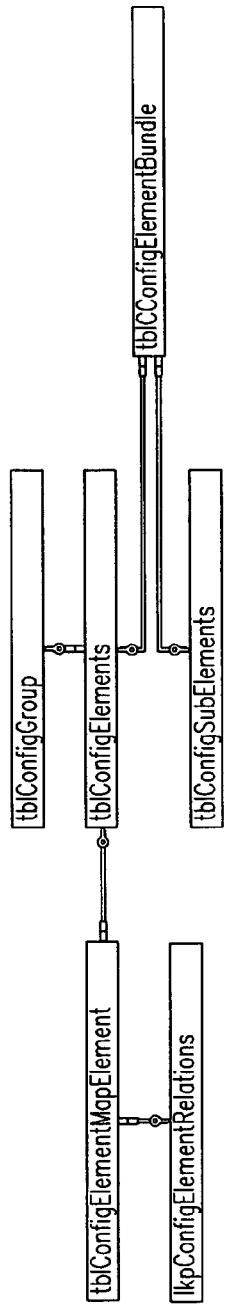
Figure 23B:
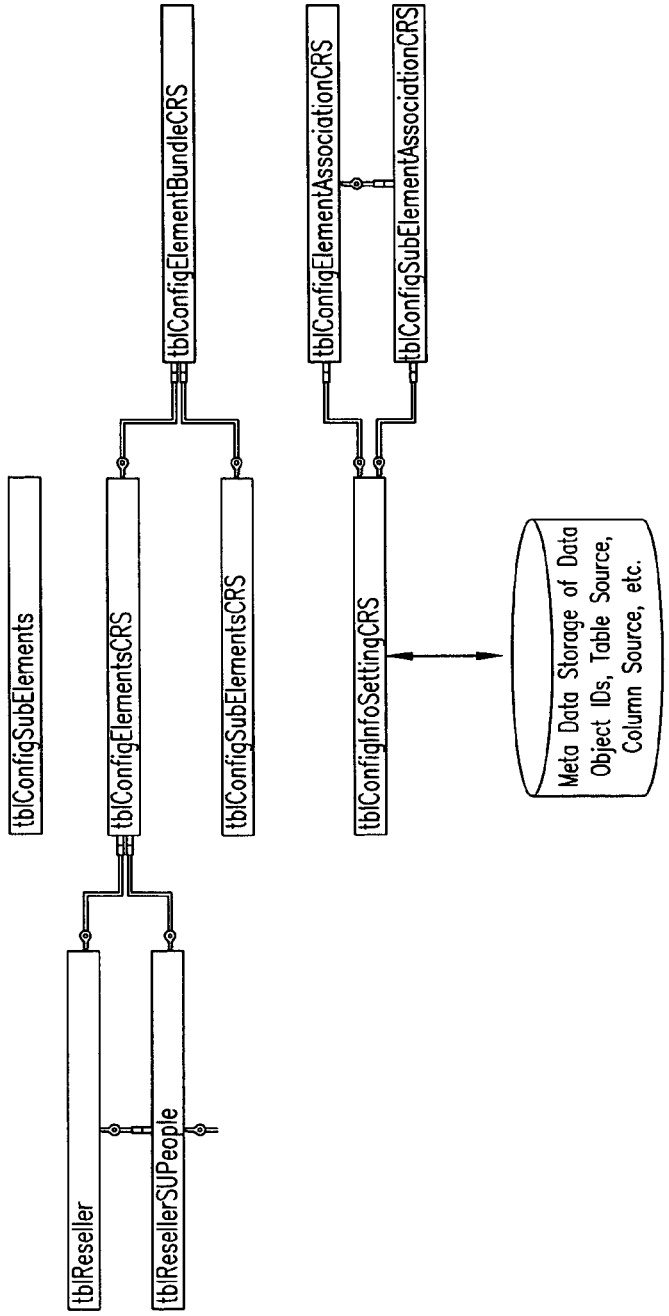
Figure 24:
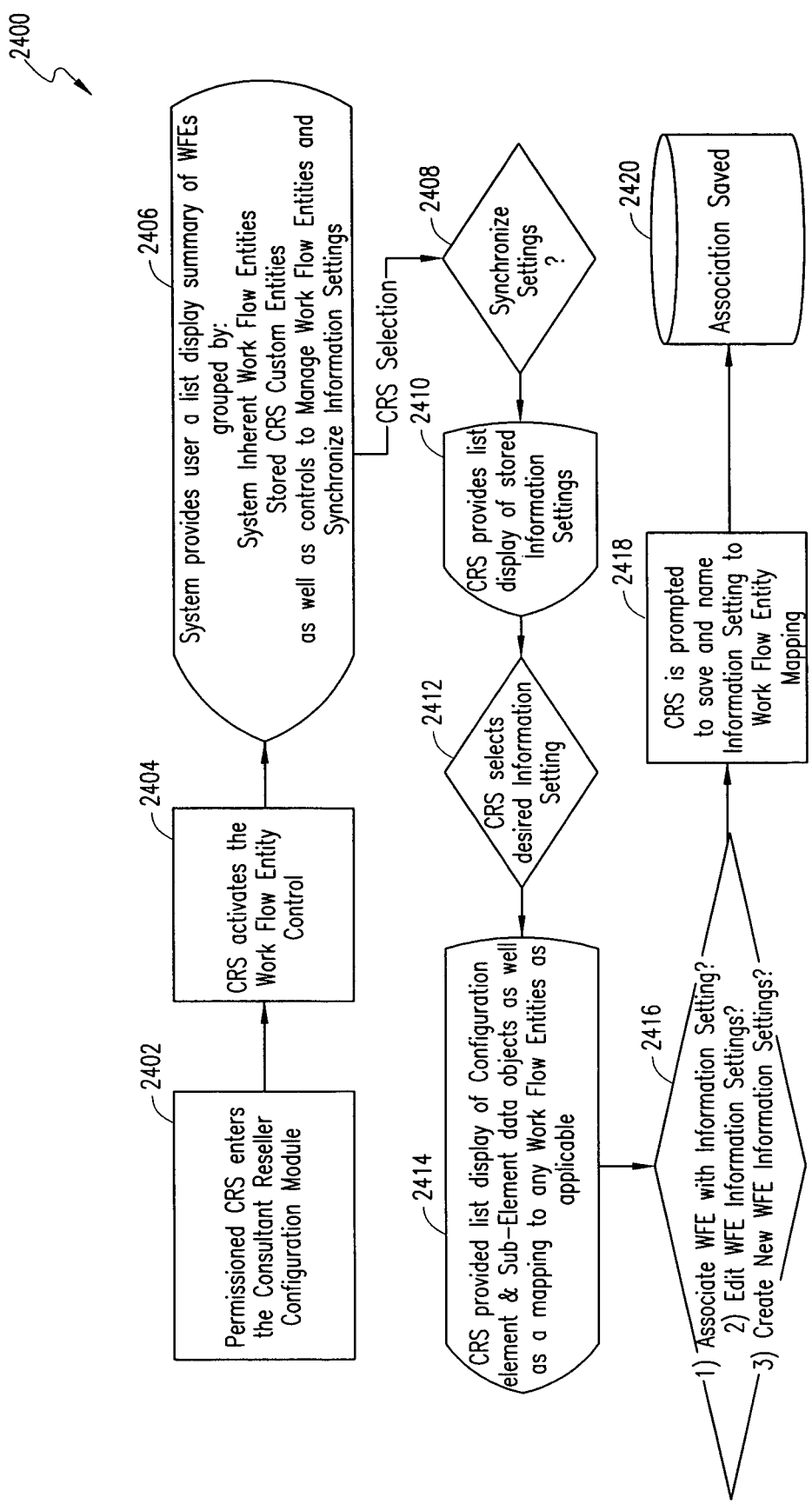
Figure 25:
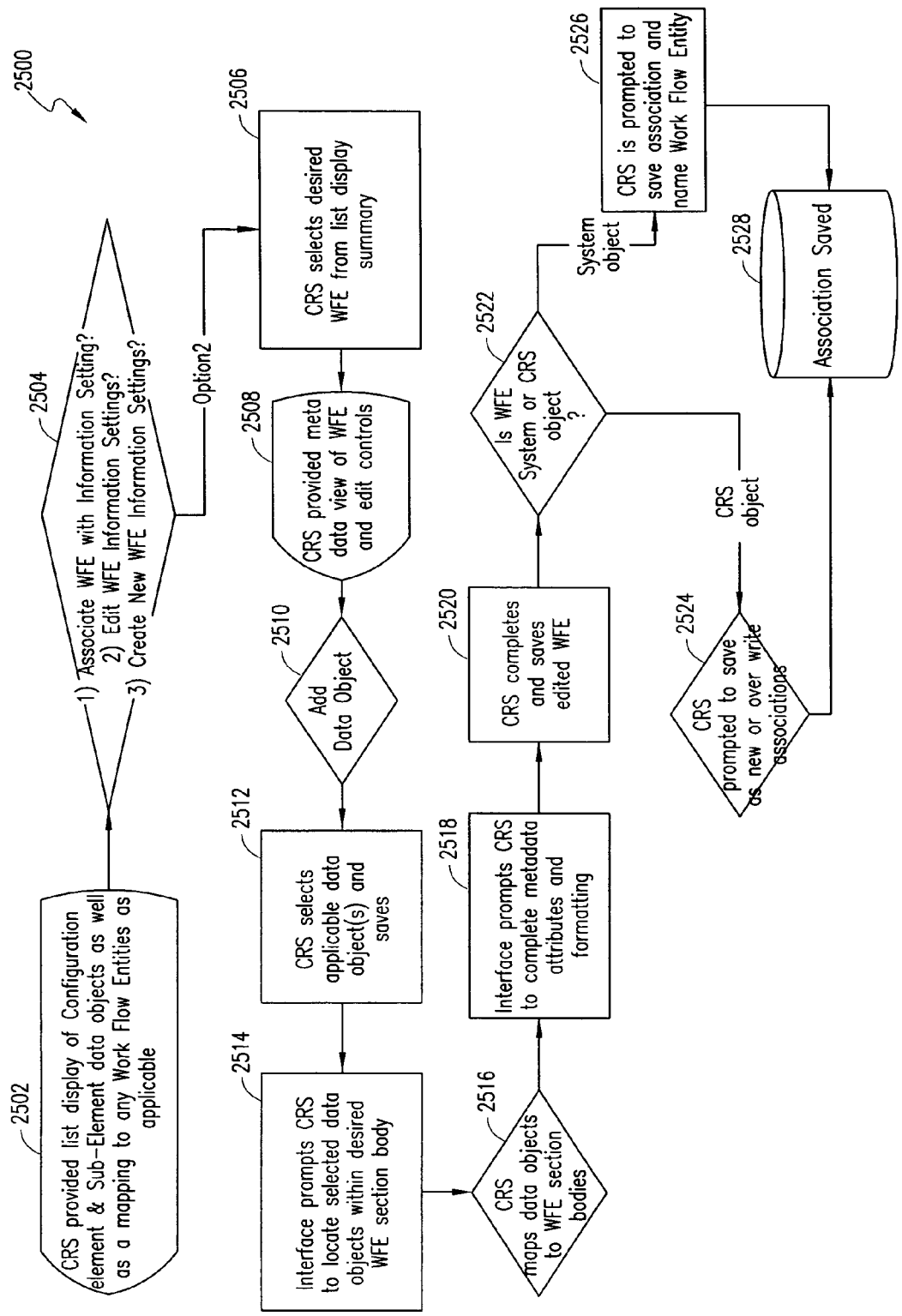
Figure 26:
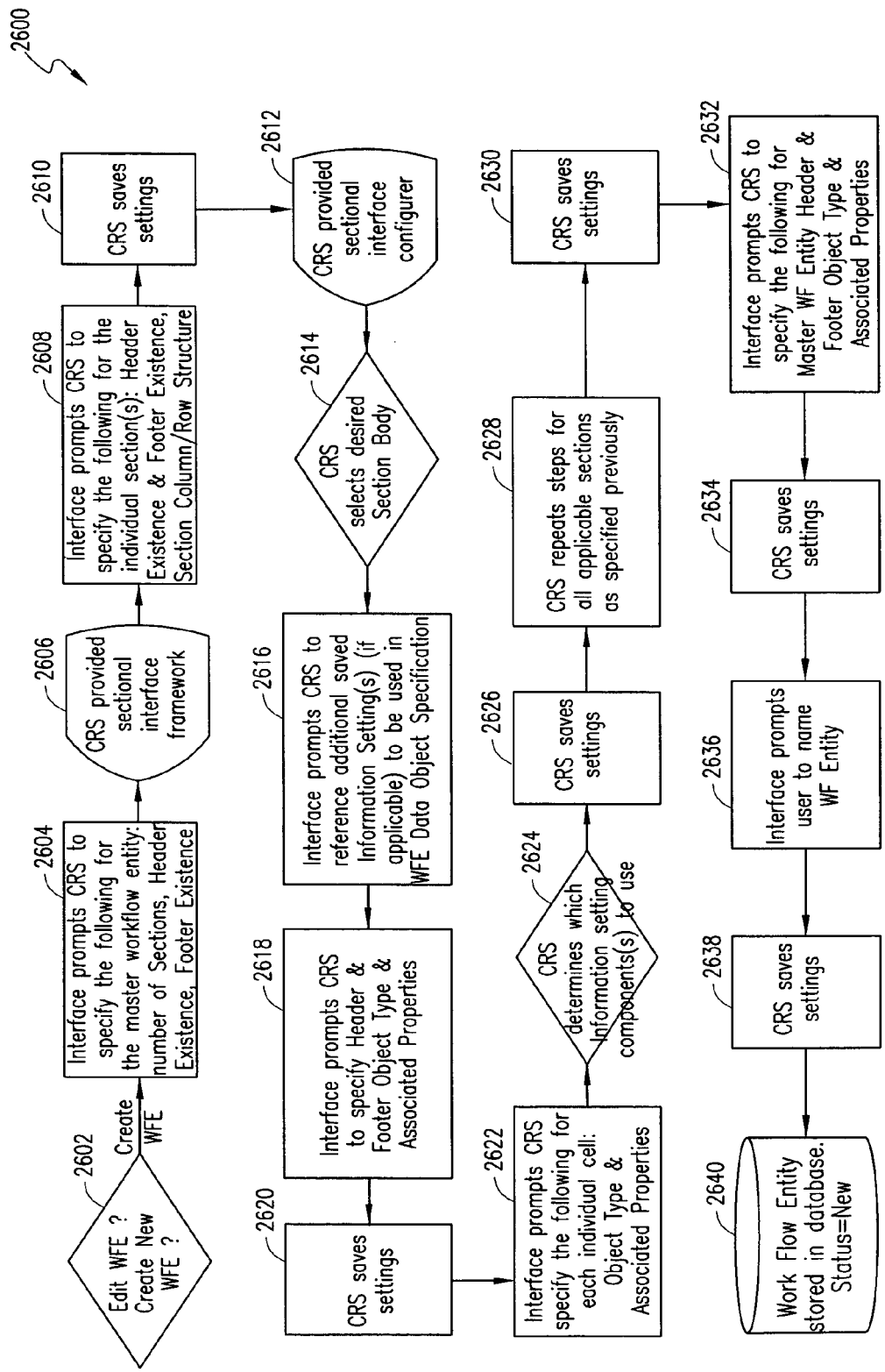
Figure 27:
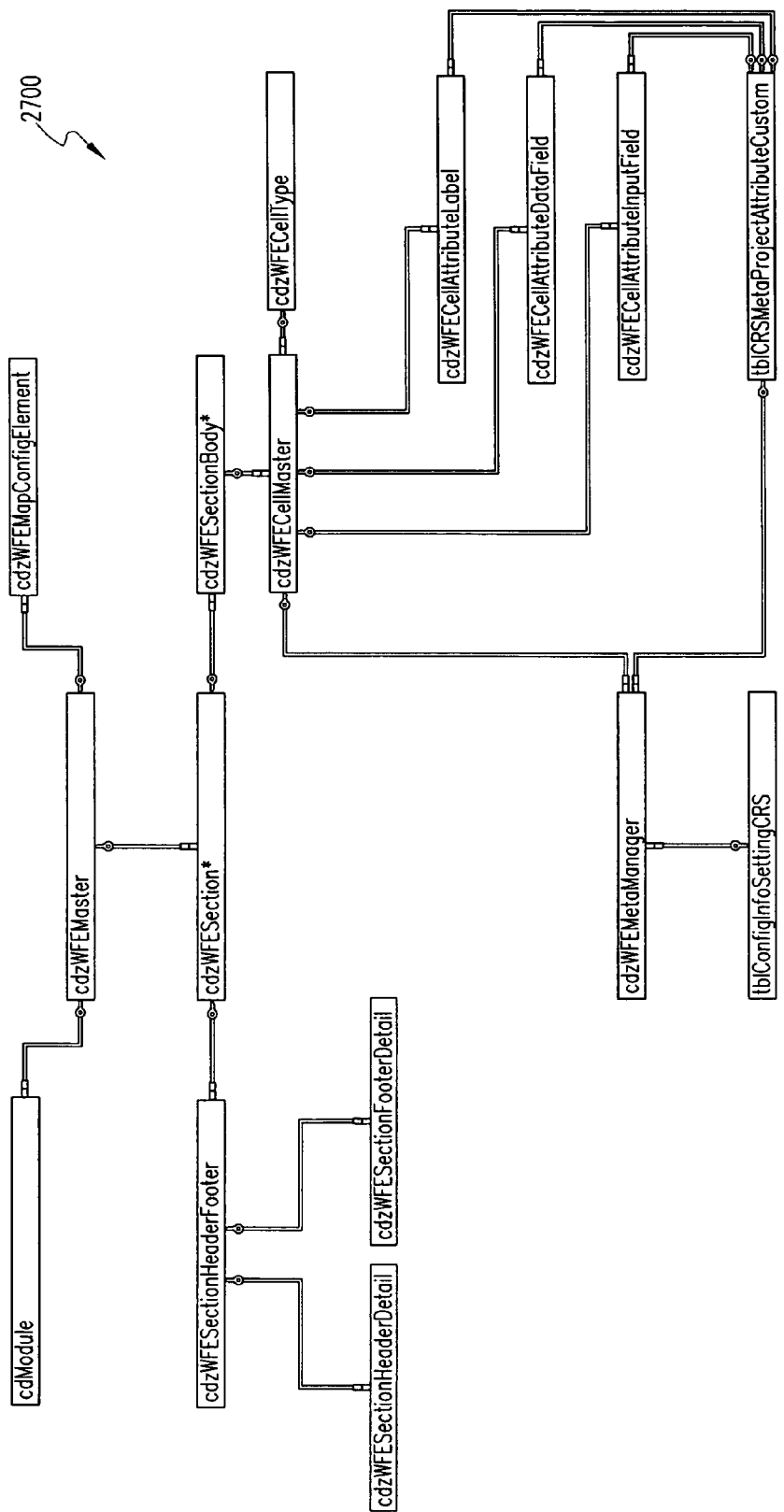
Figure 28:
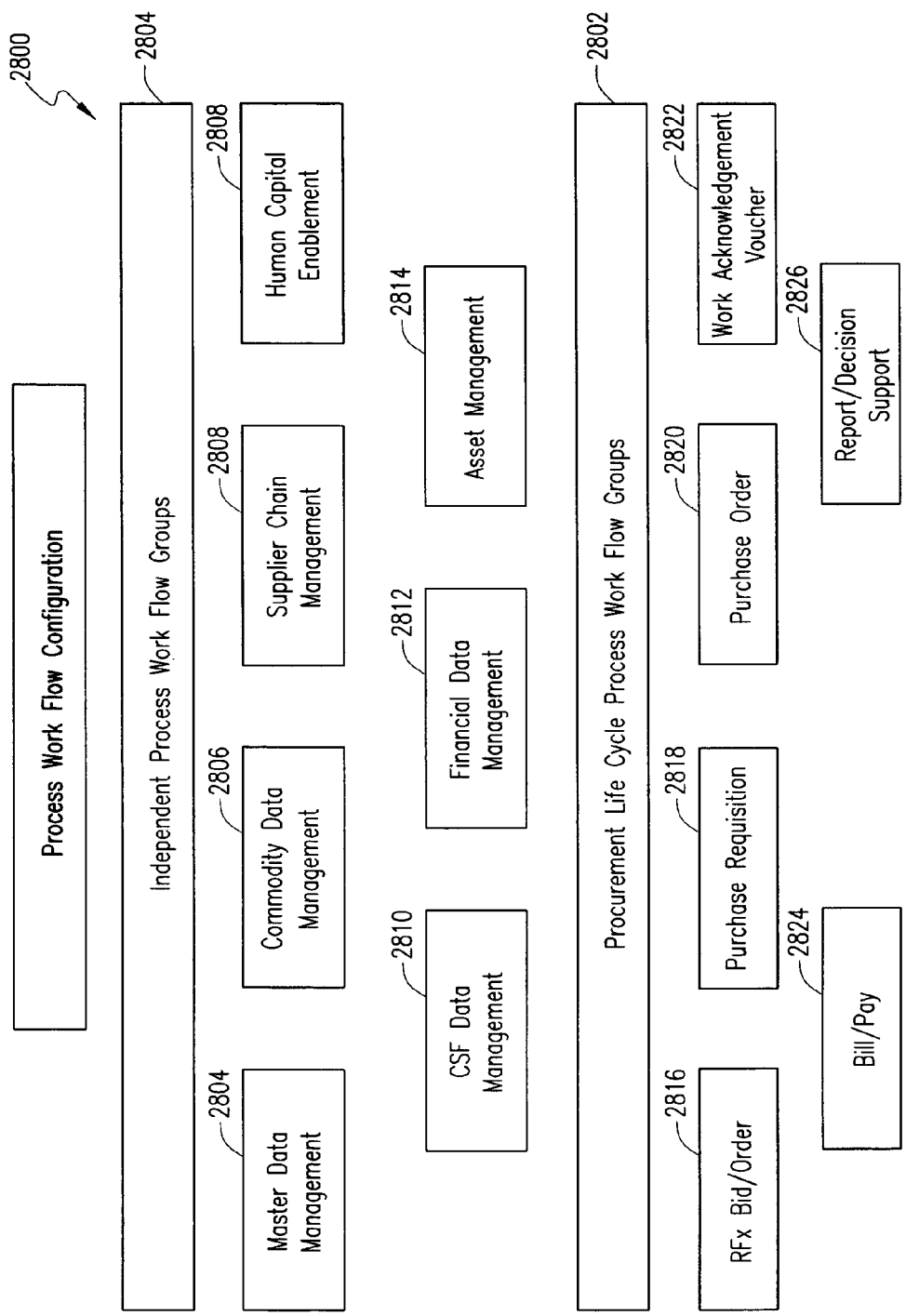
Figure 29:
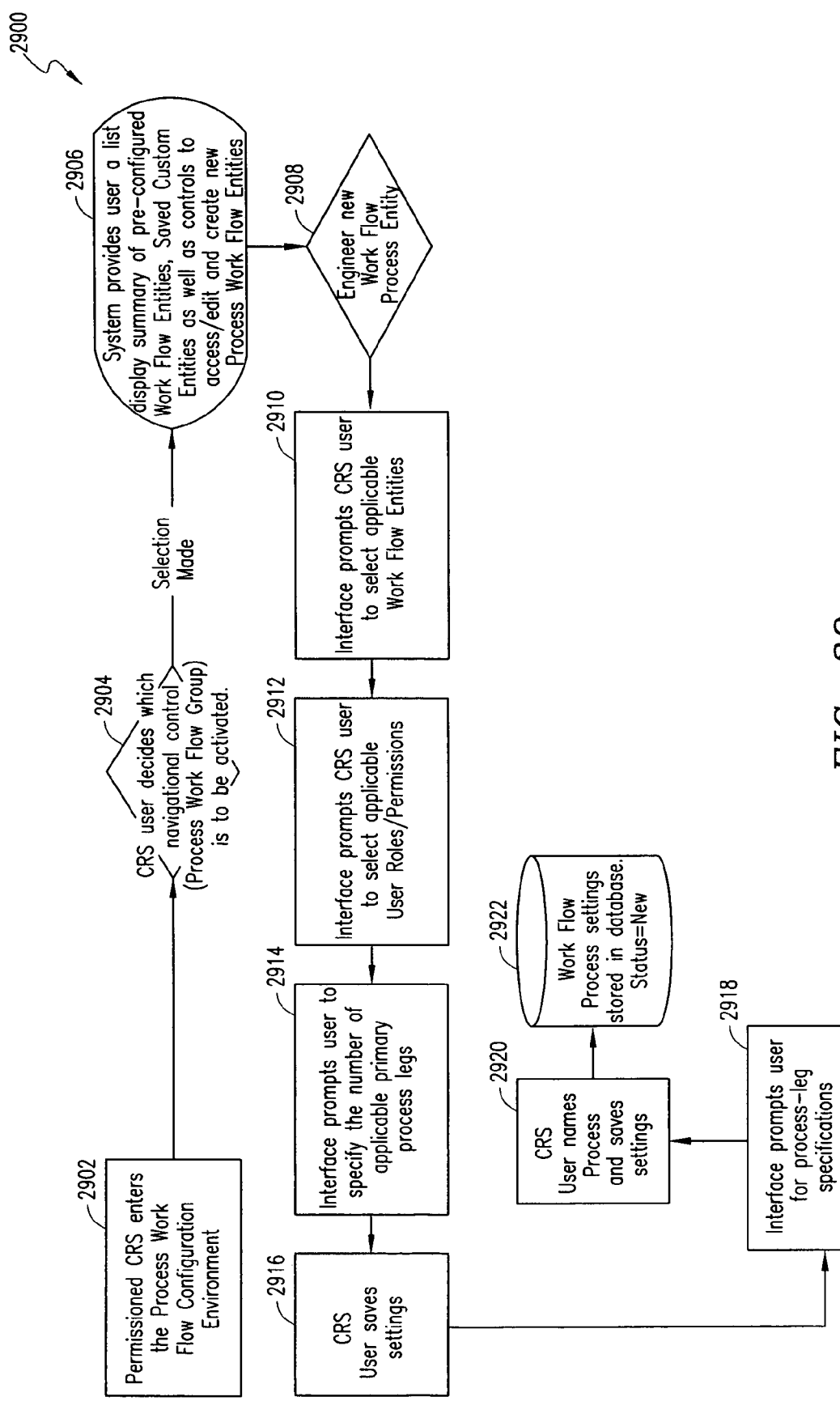
Figure 30:
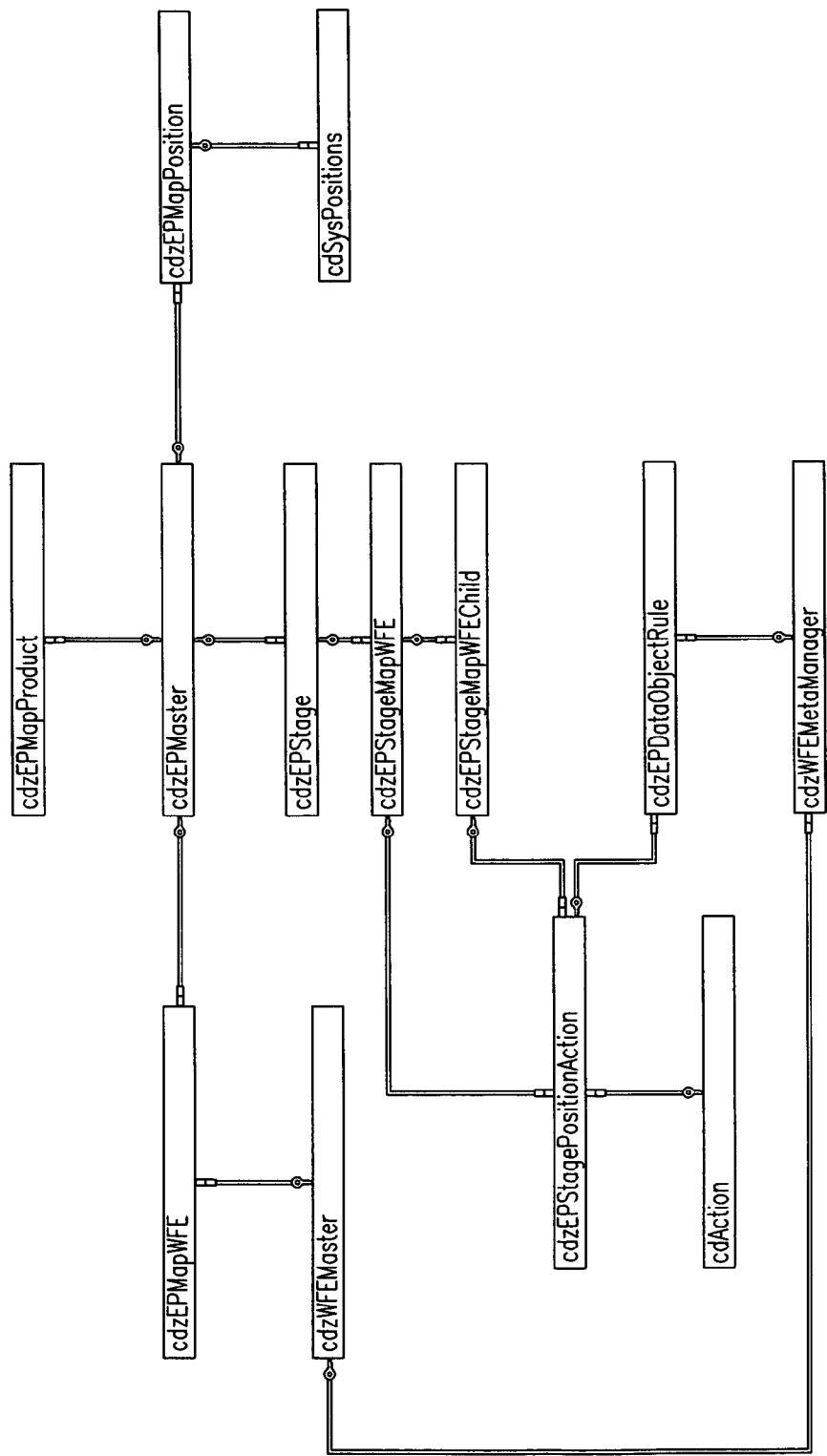
Figure 31:
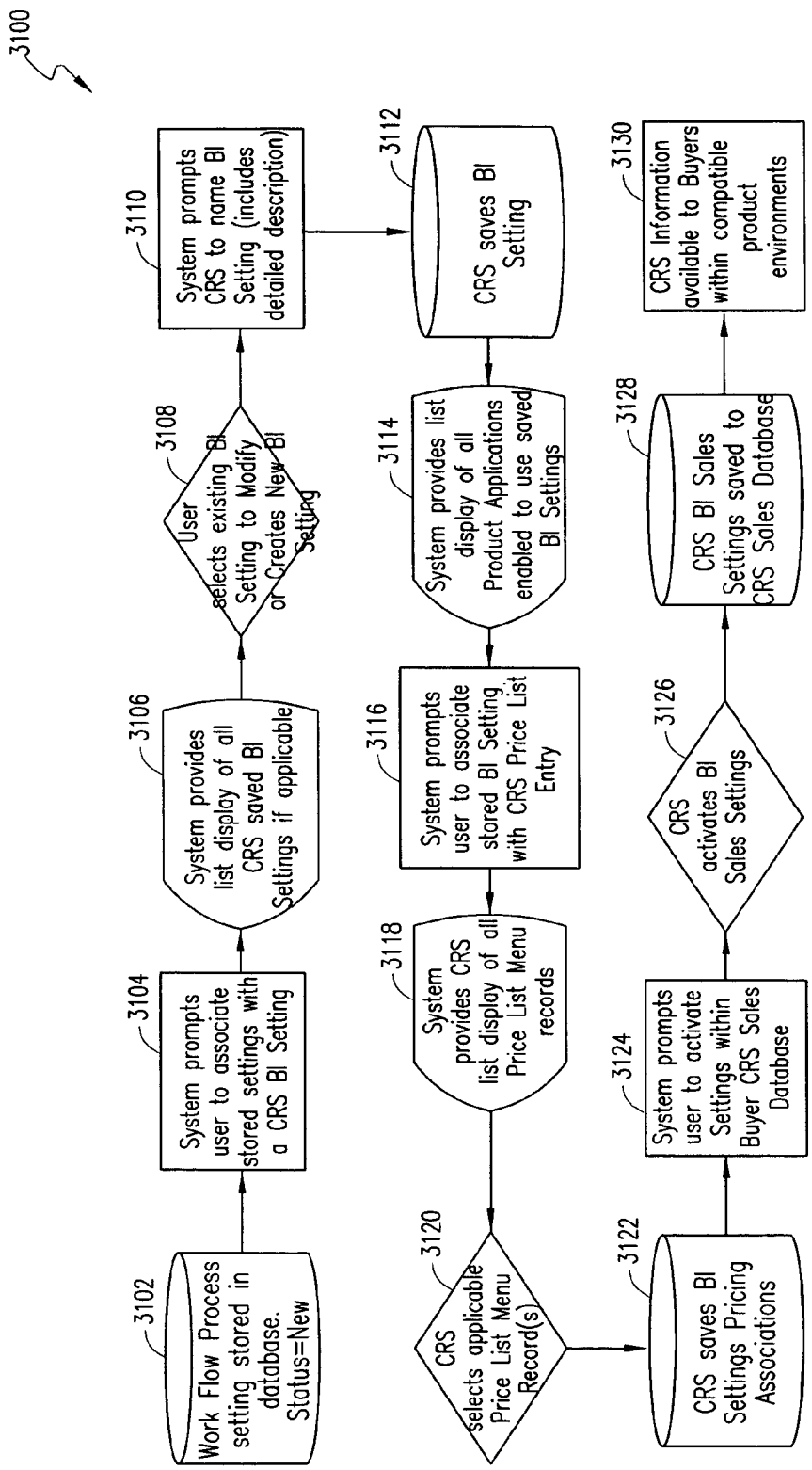
Figure 32:
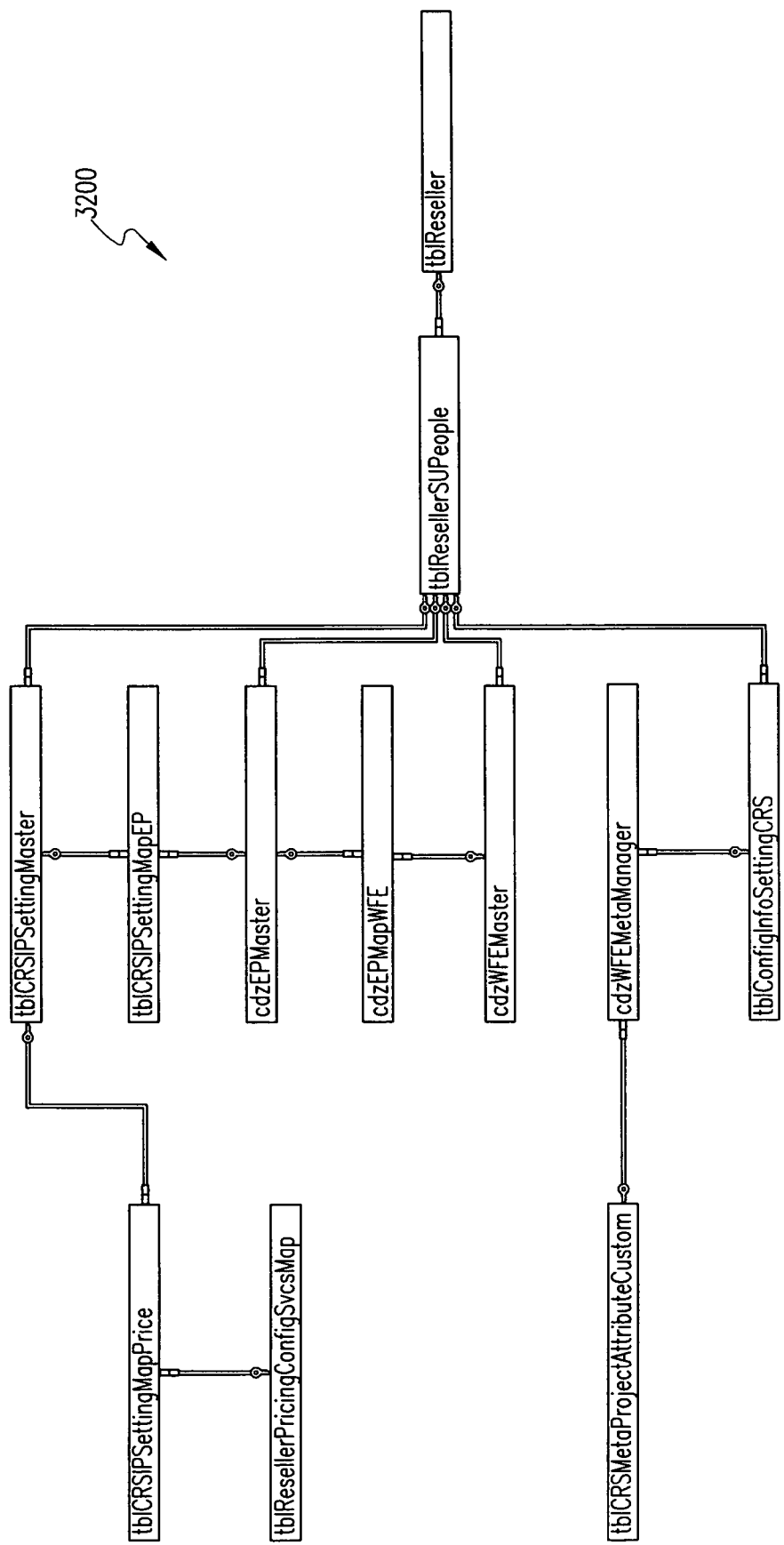
Figure 33:
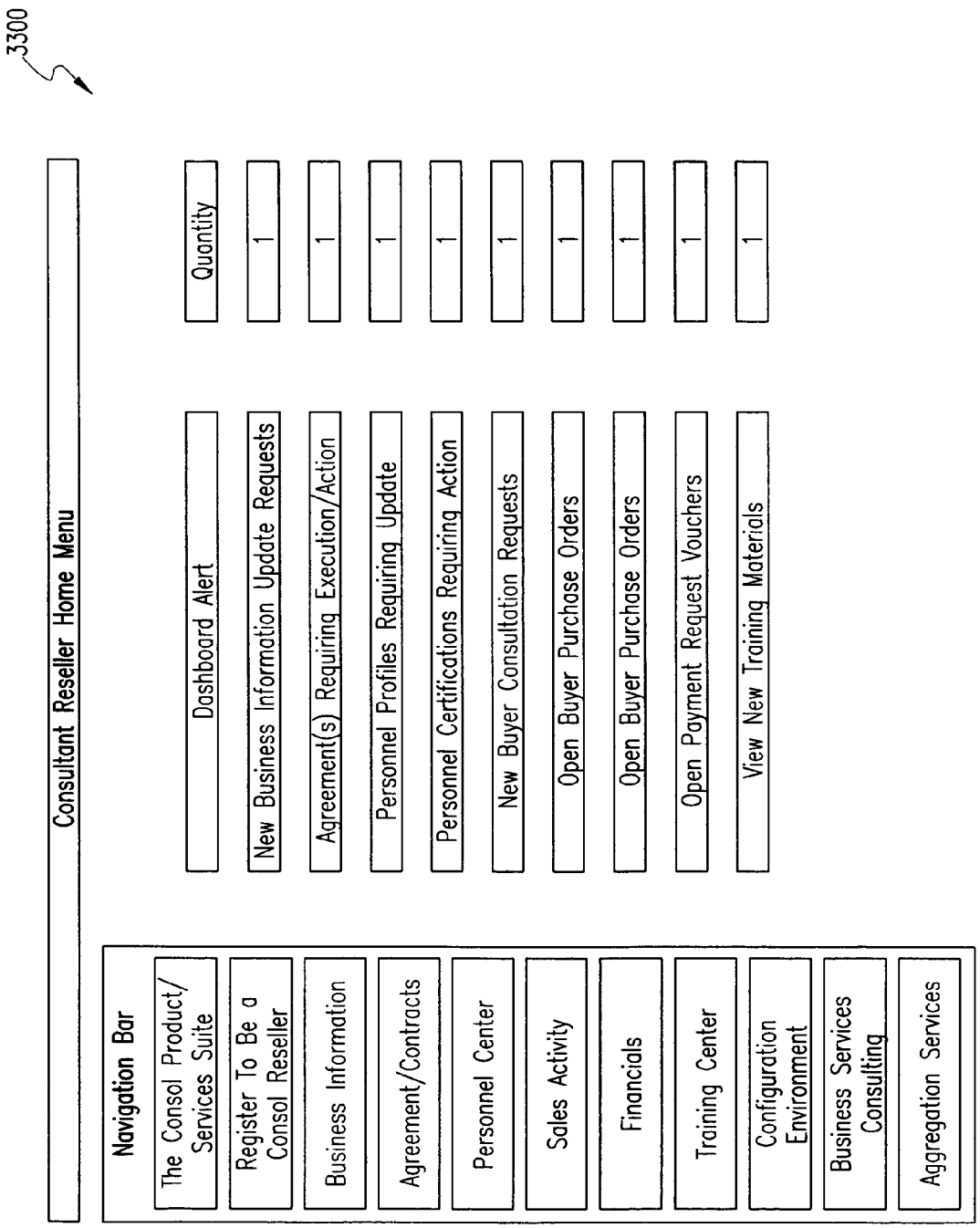
Figure 34:
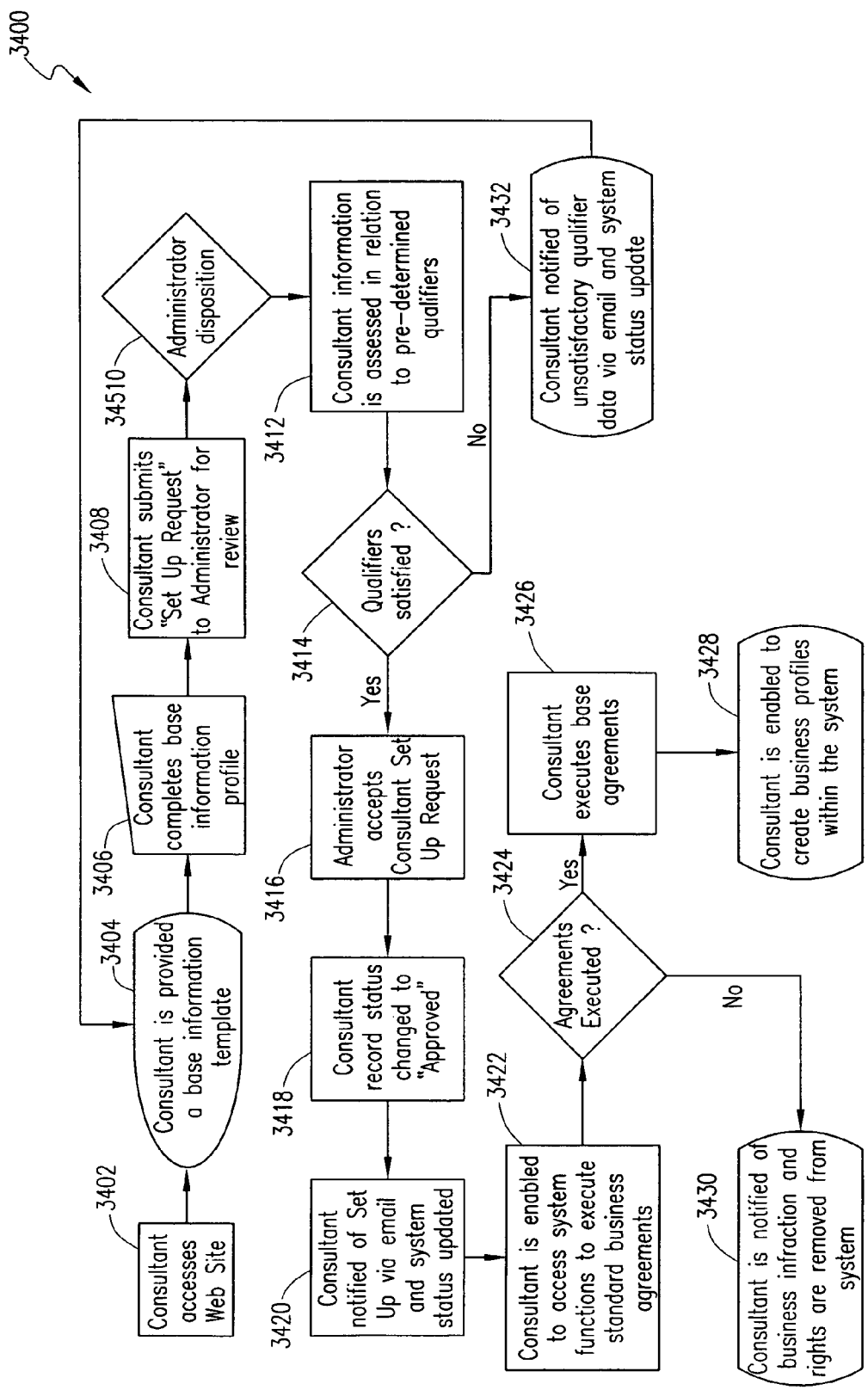
Figure 35:
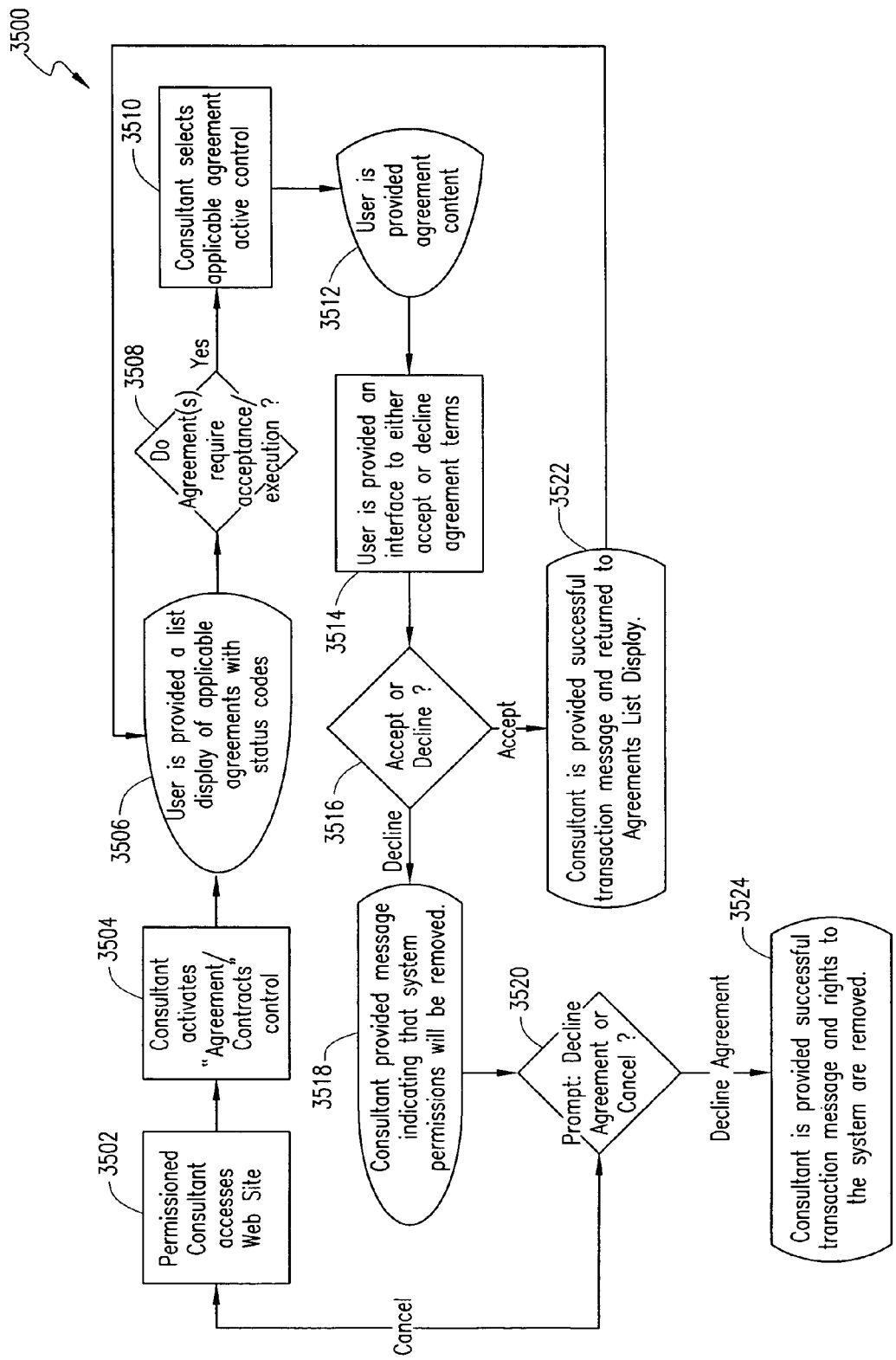
Figure 36:
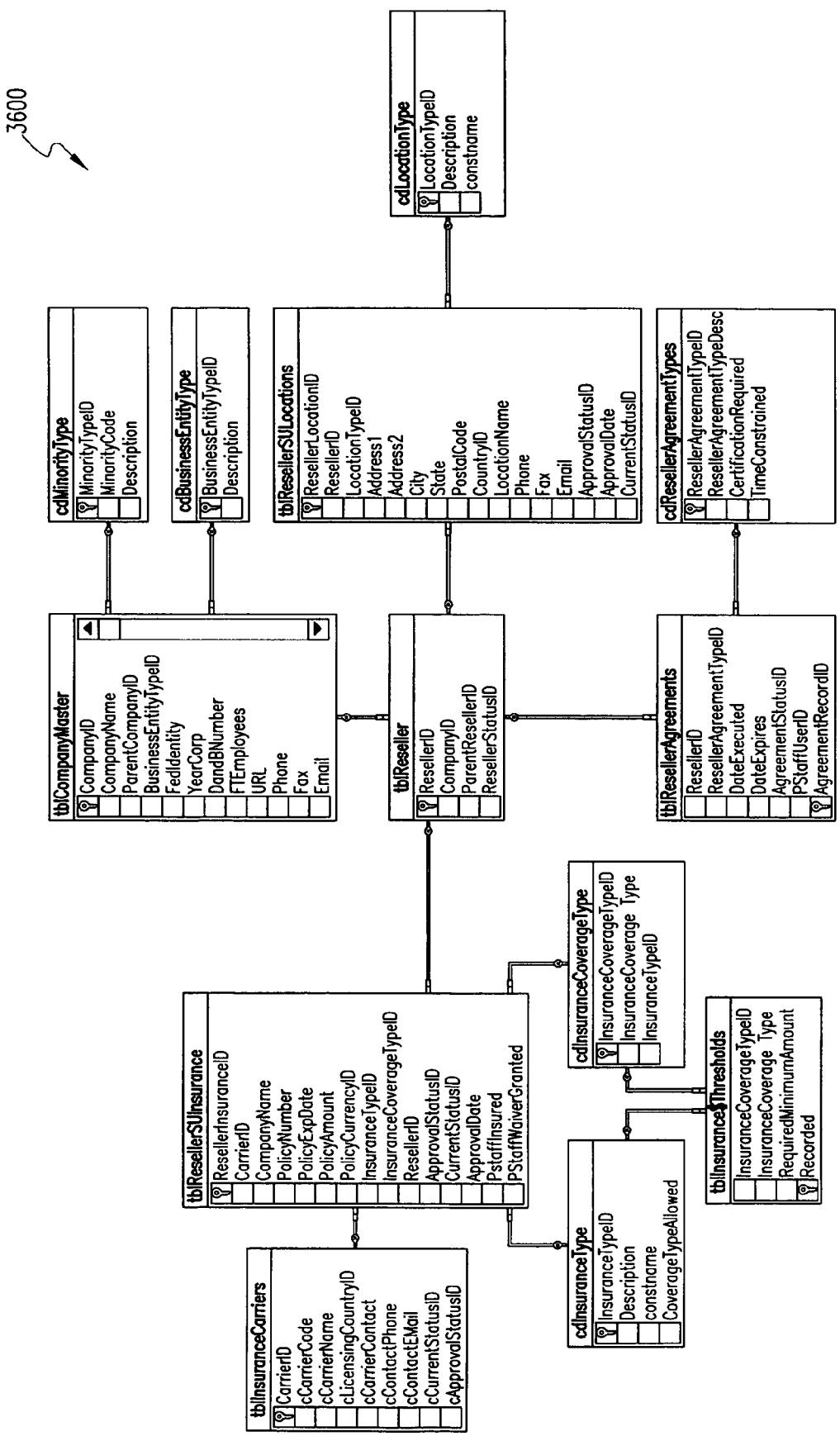
Figure 37:
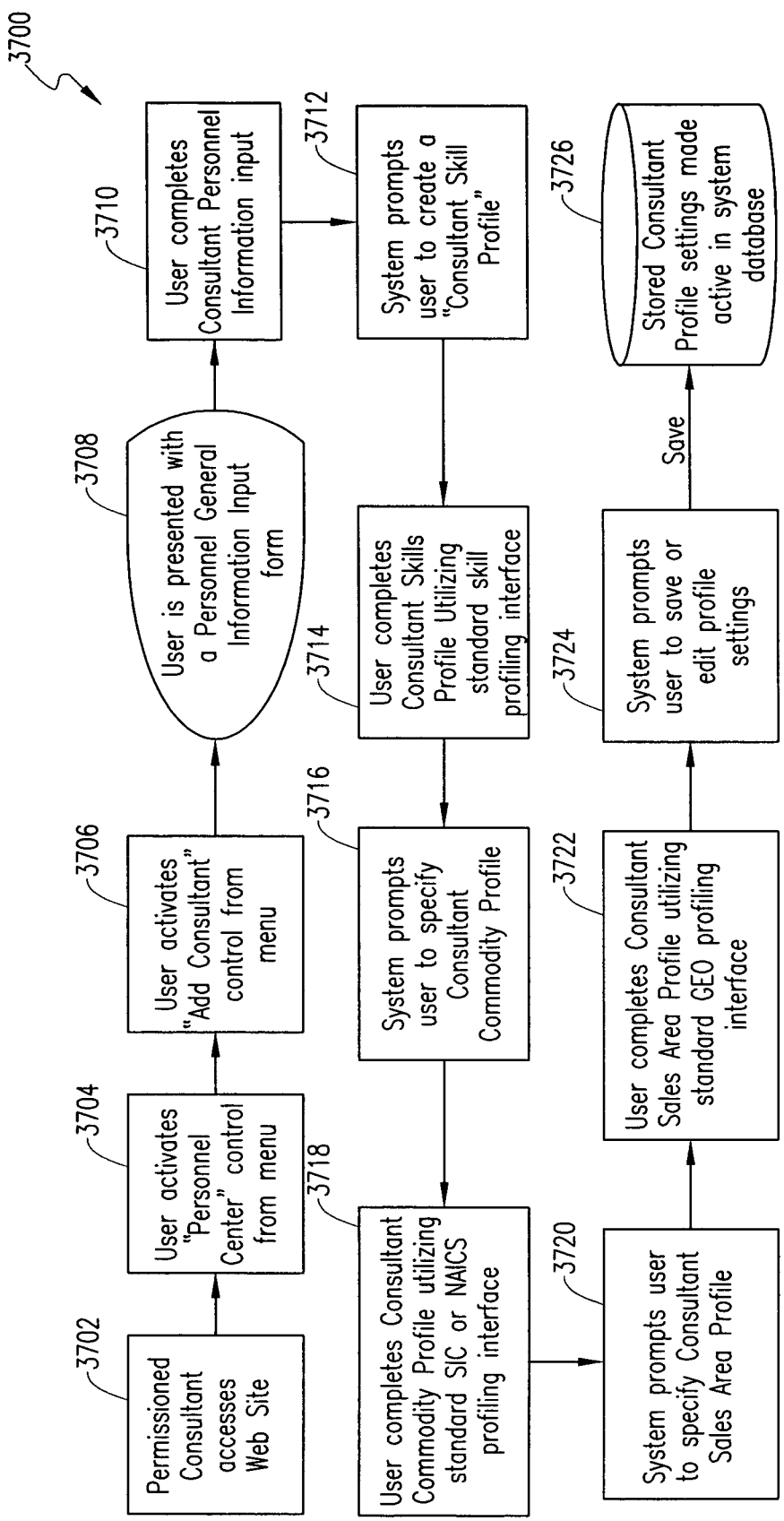
Figure 38:
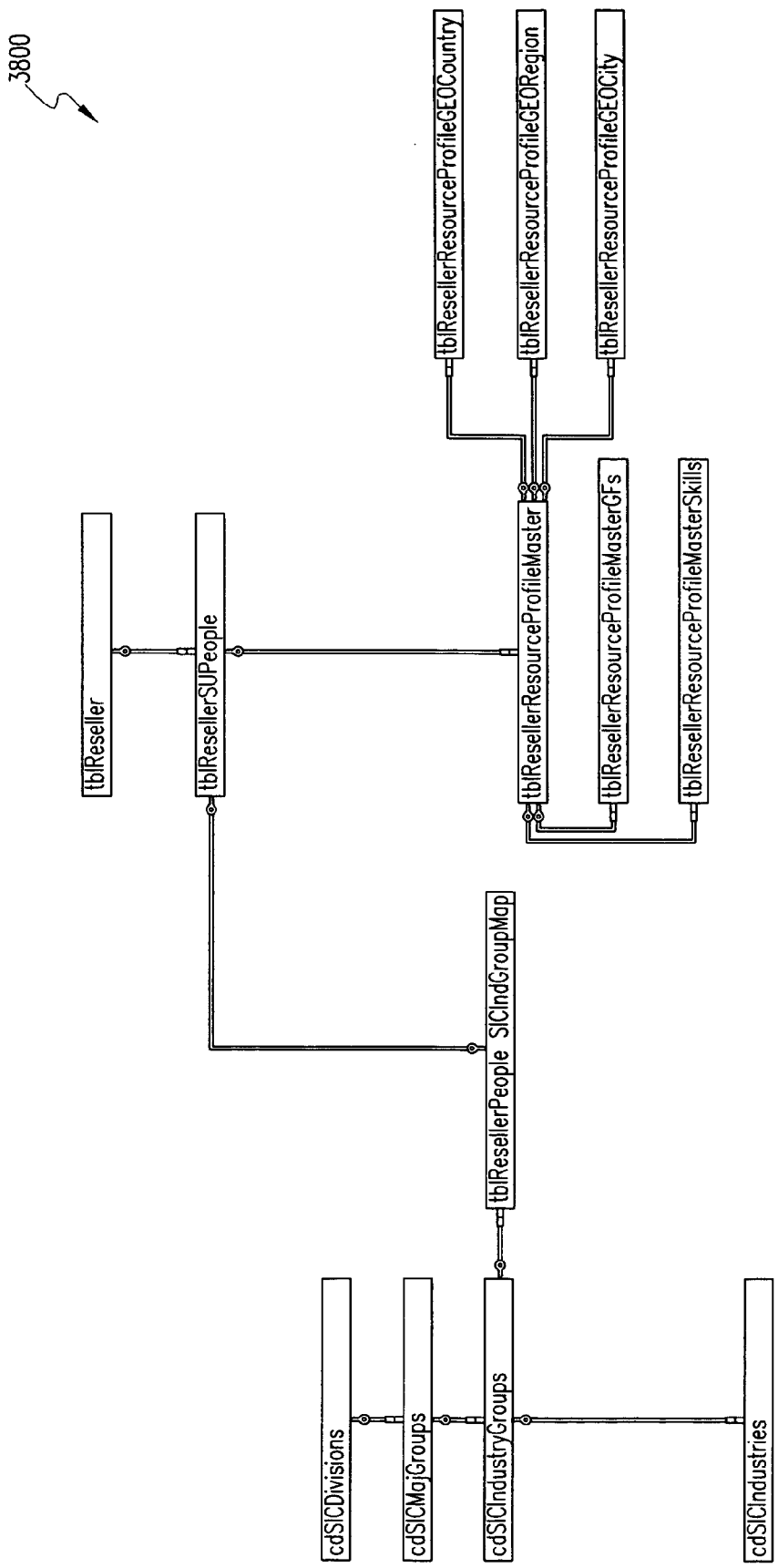
Figure 39:
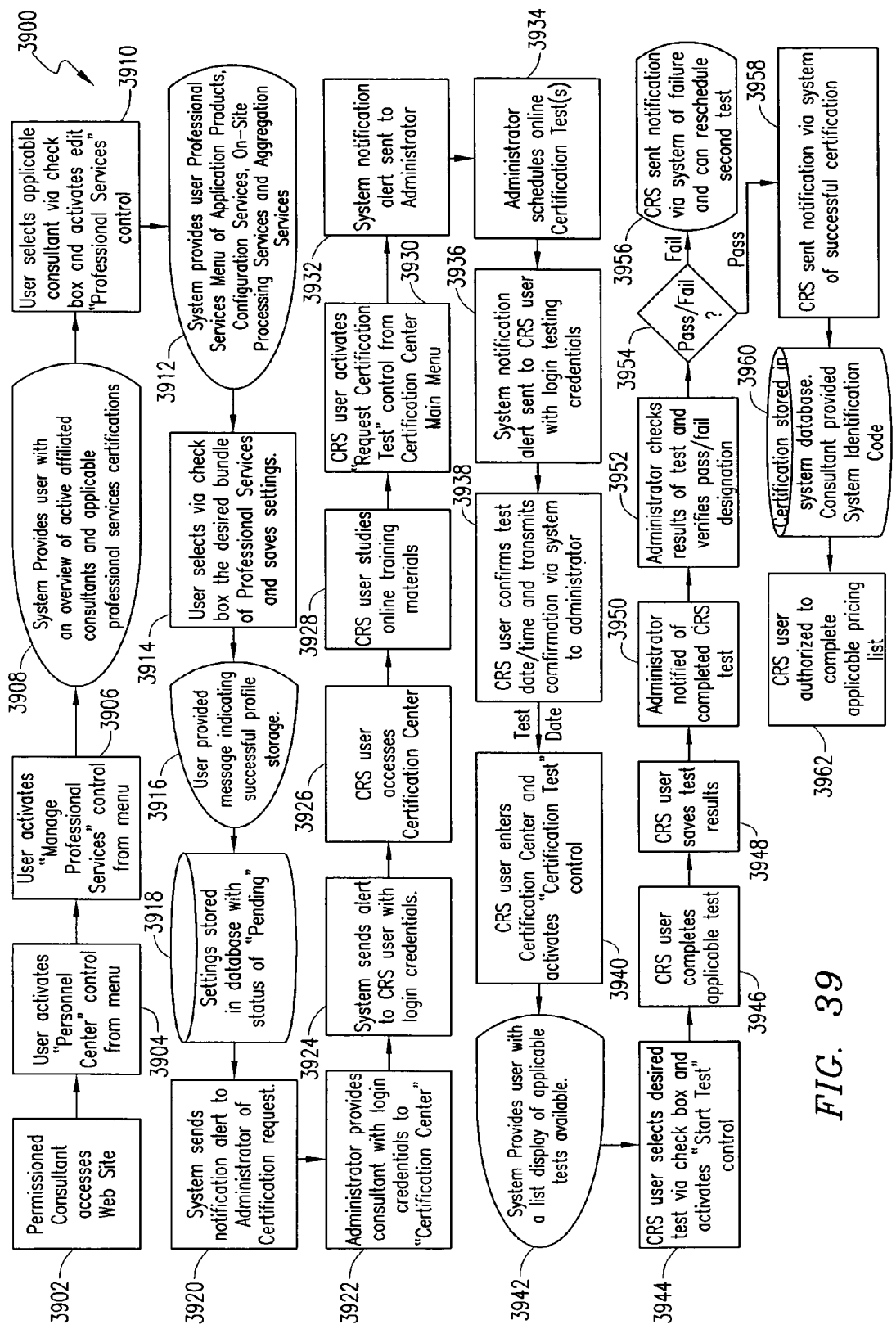
Figure 40:
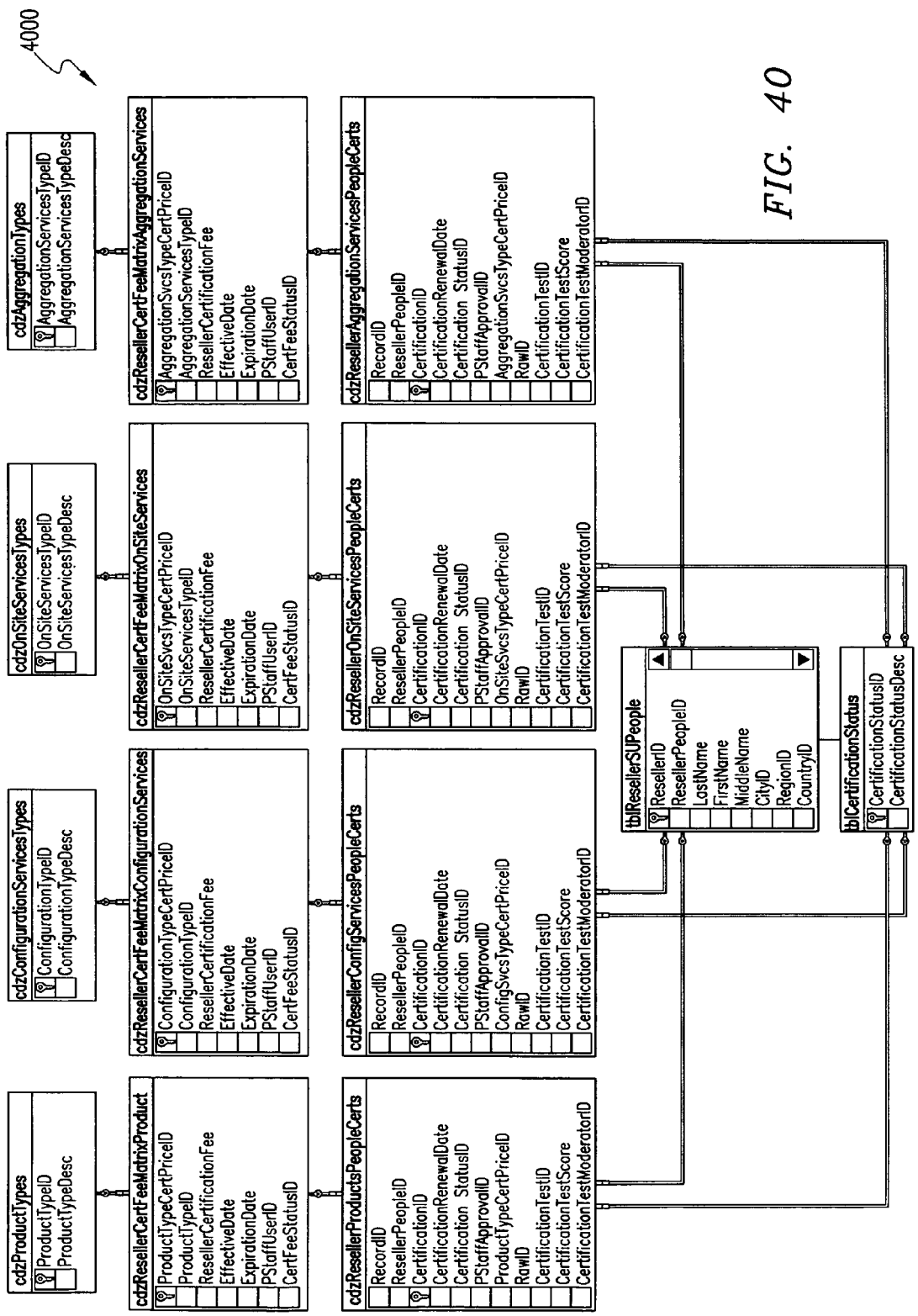
Figure 41:
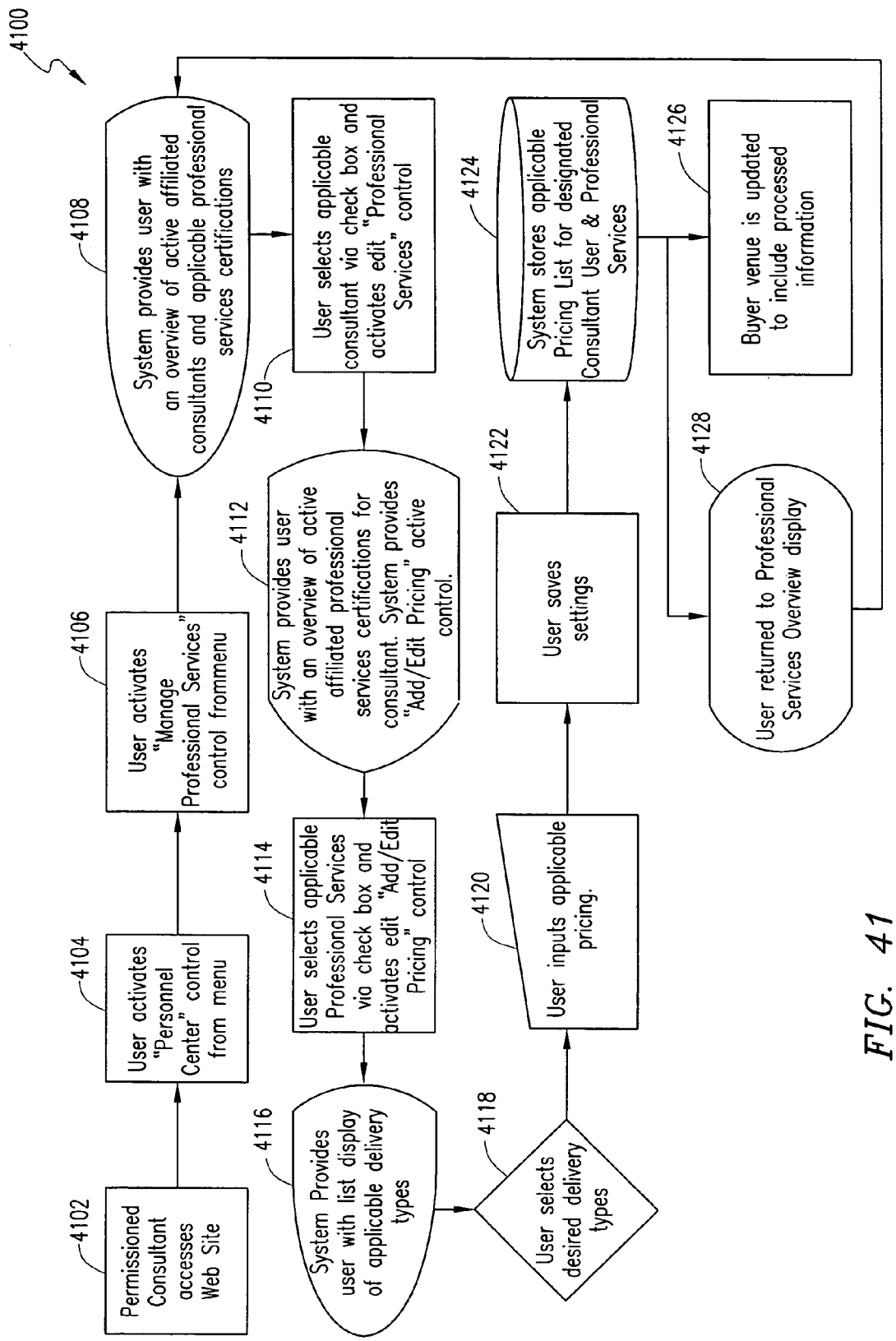
Figure 42:
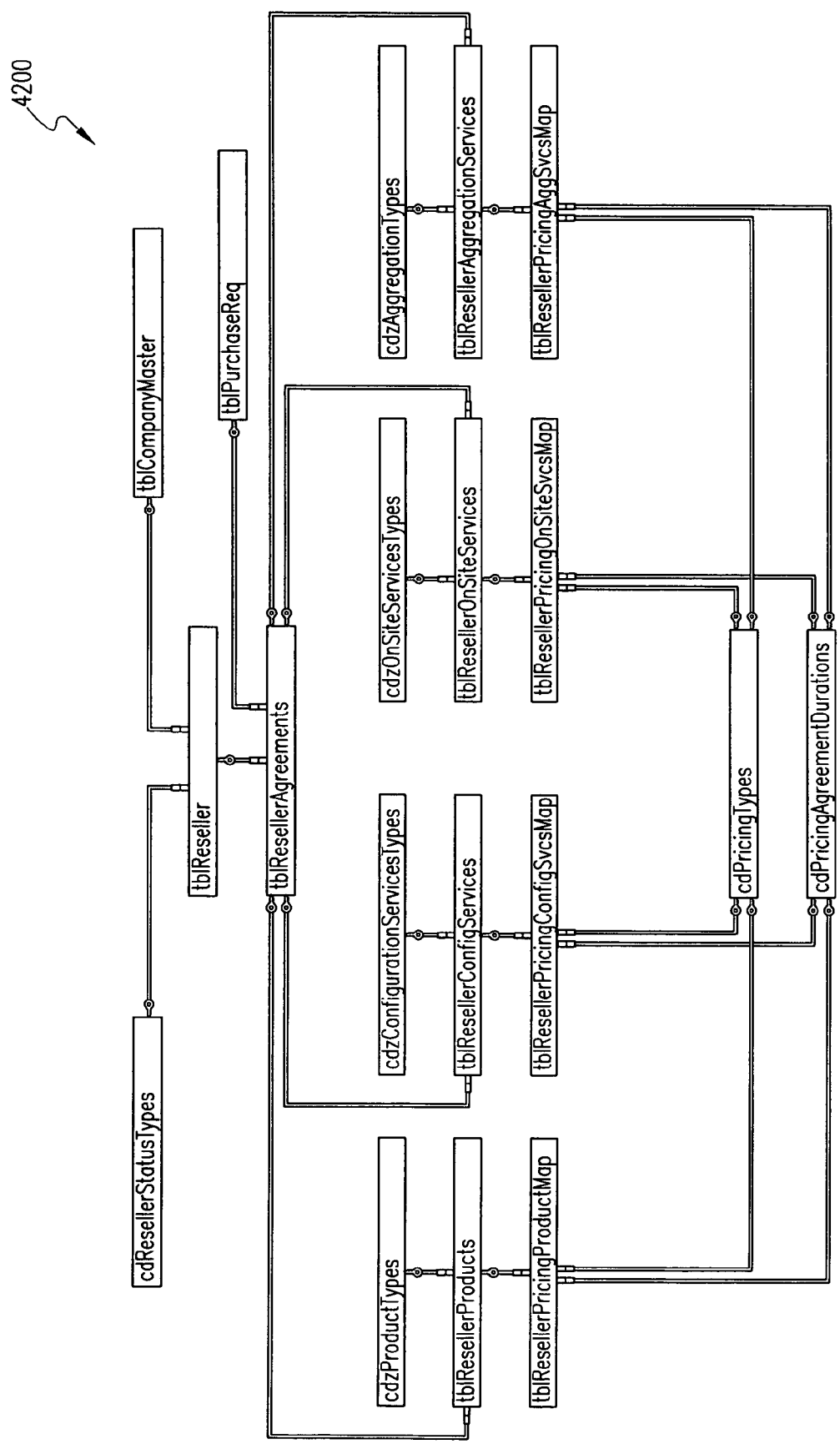
Figure 43:
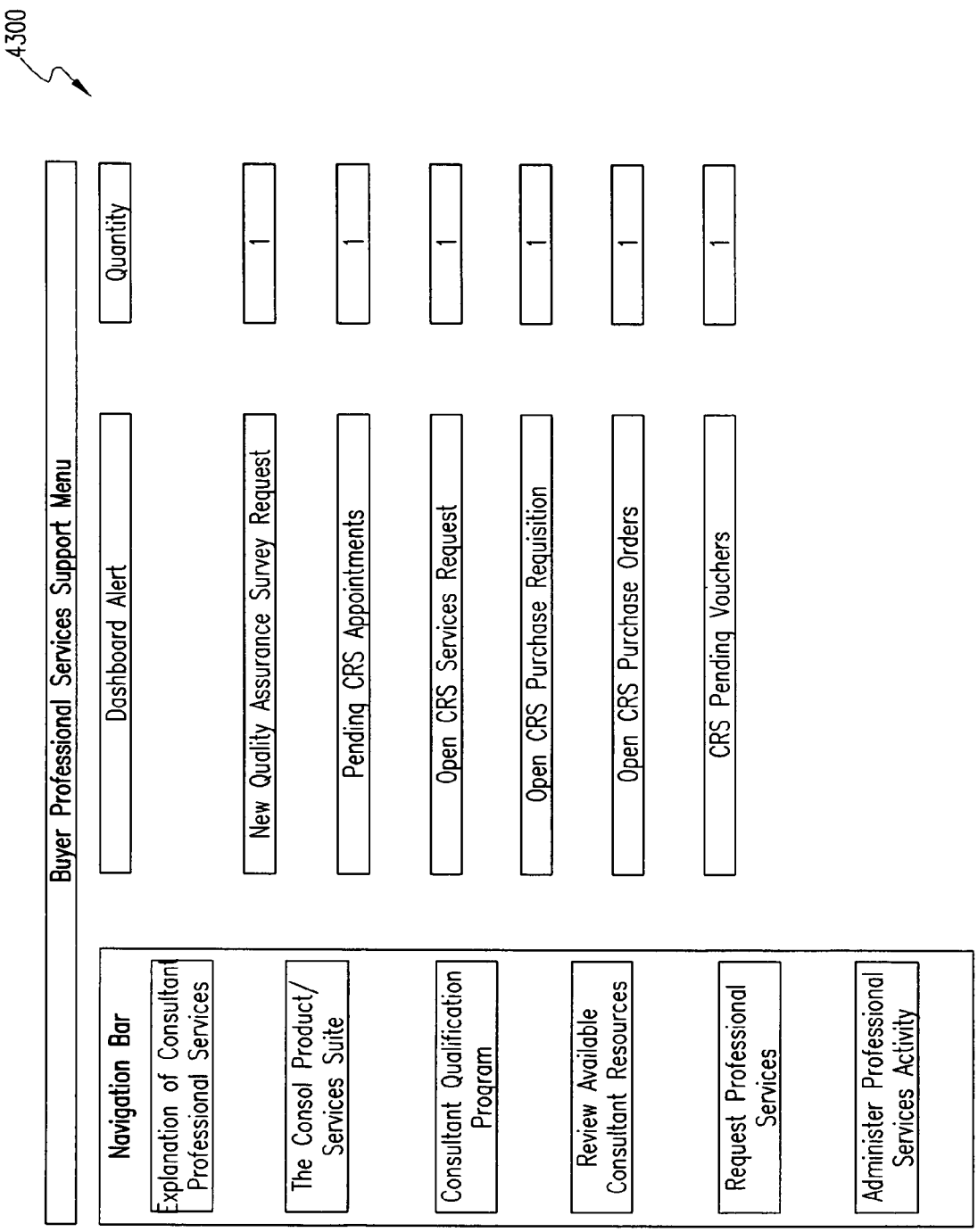
Figure 44:
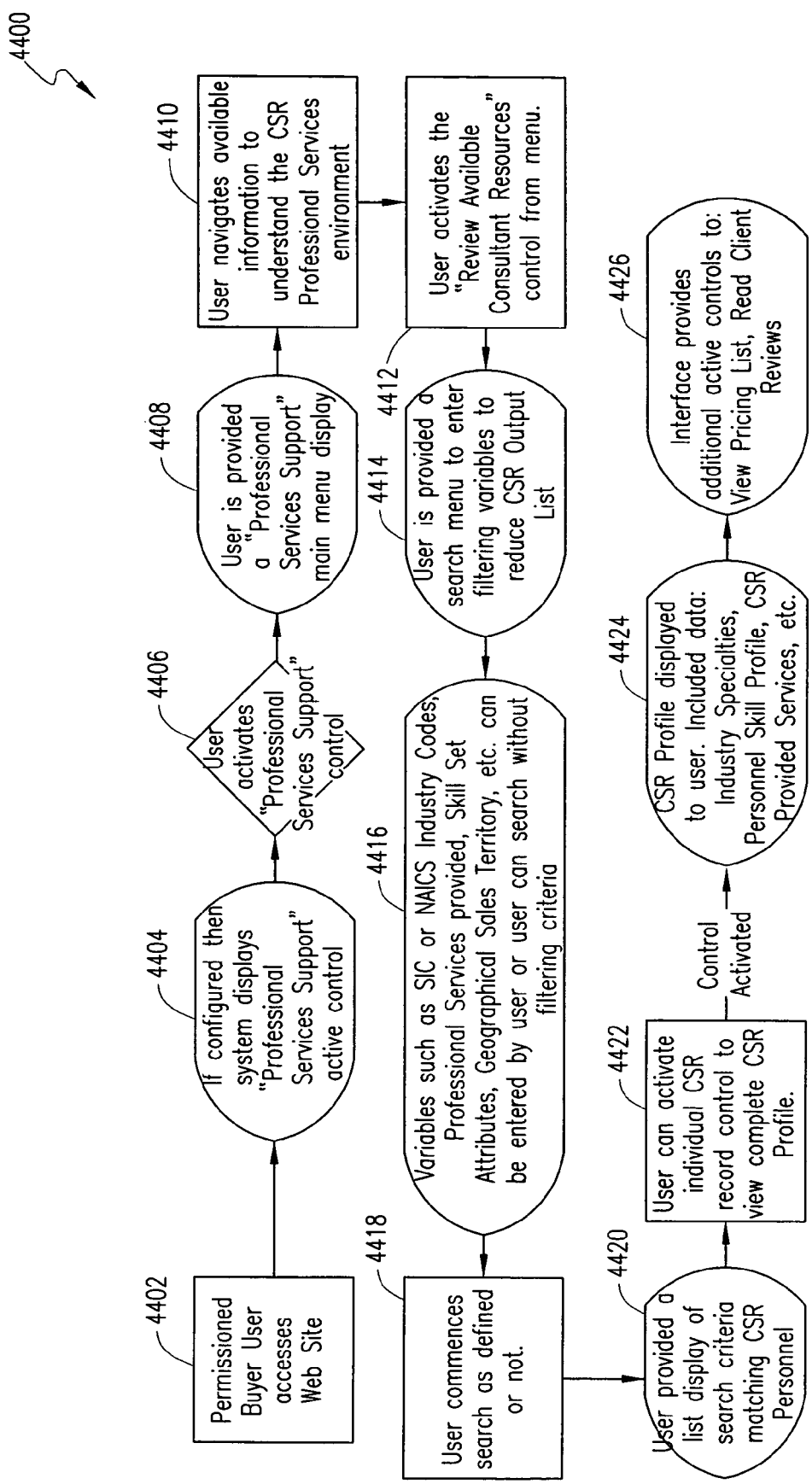
Figure 45:
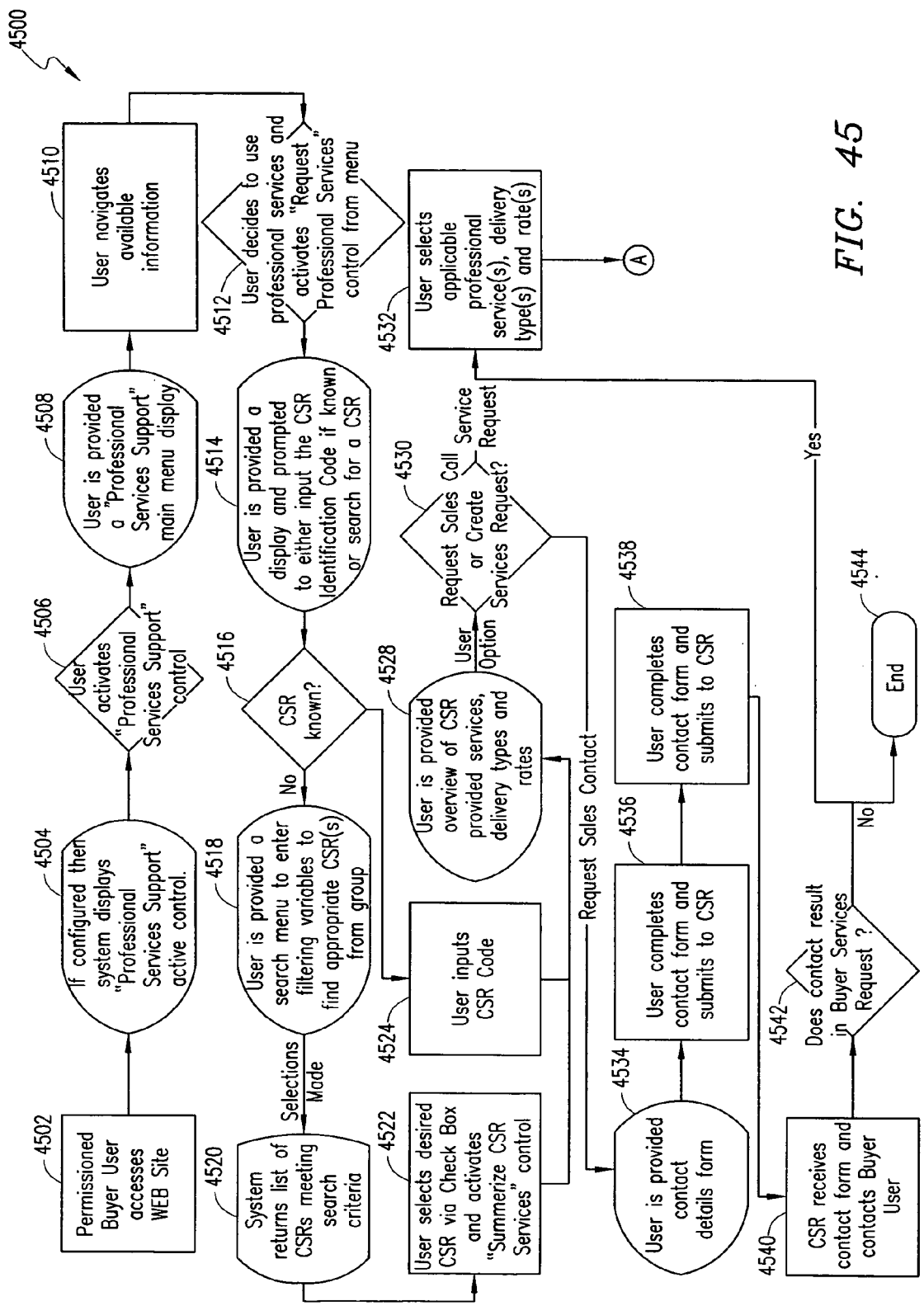
Figure 46:
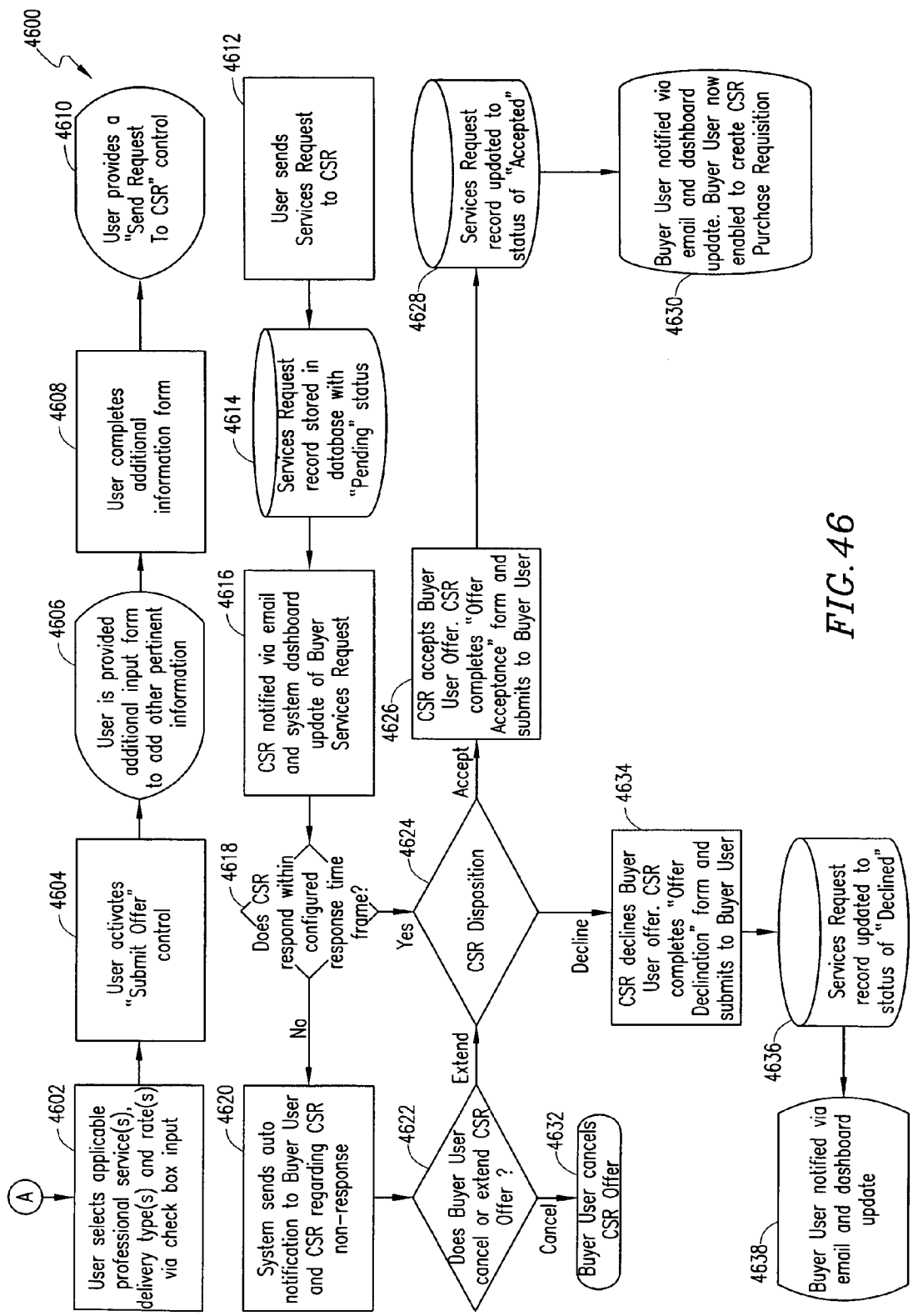
Figure 47:
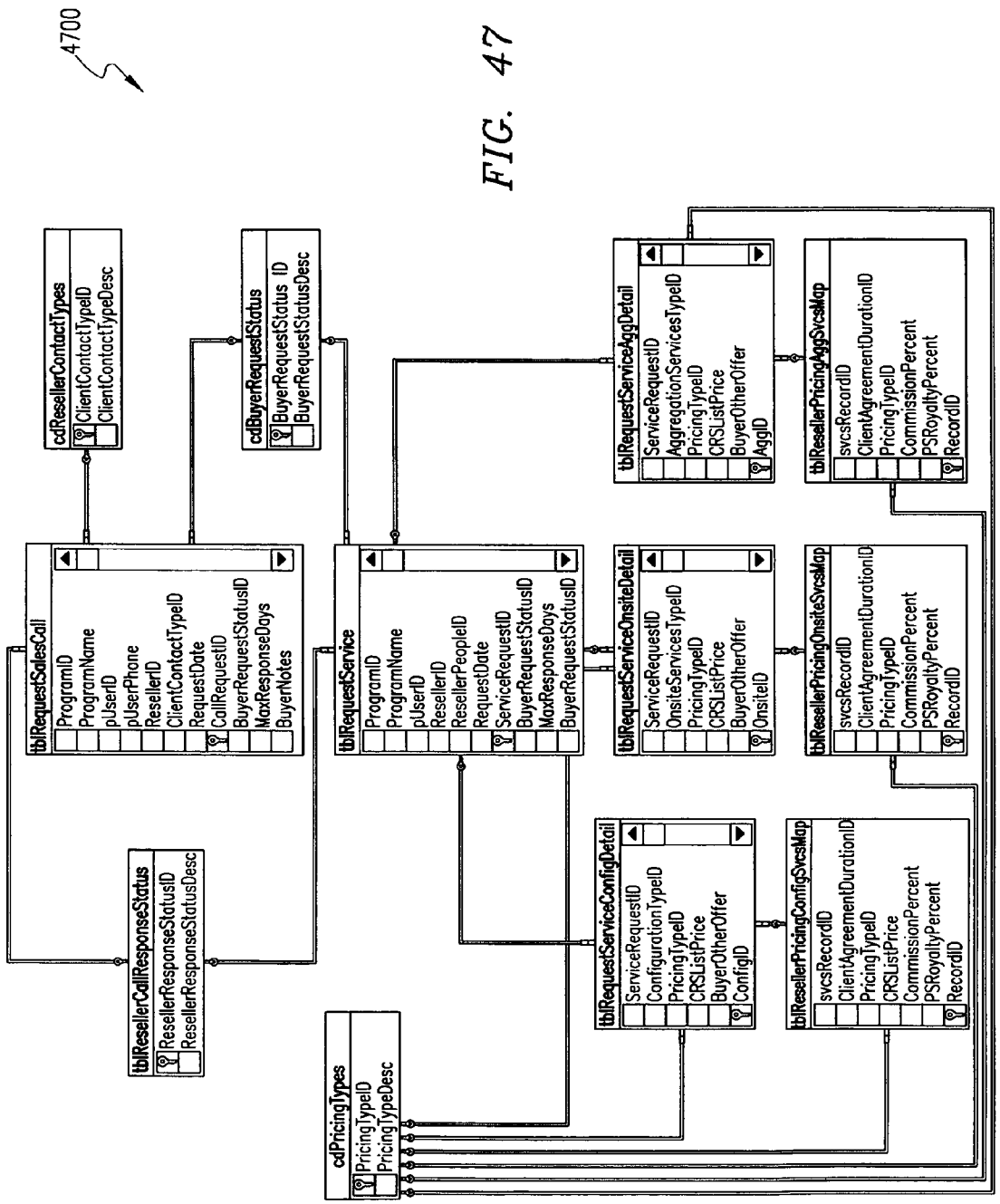
Figure 48:
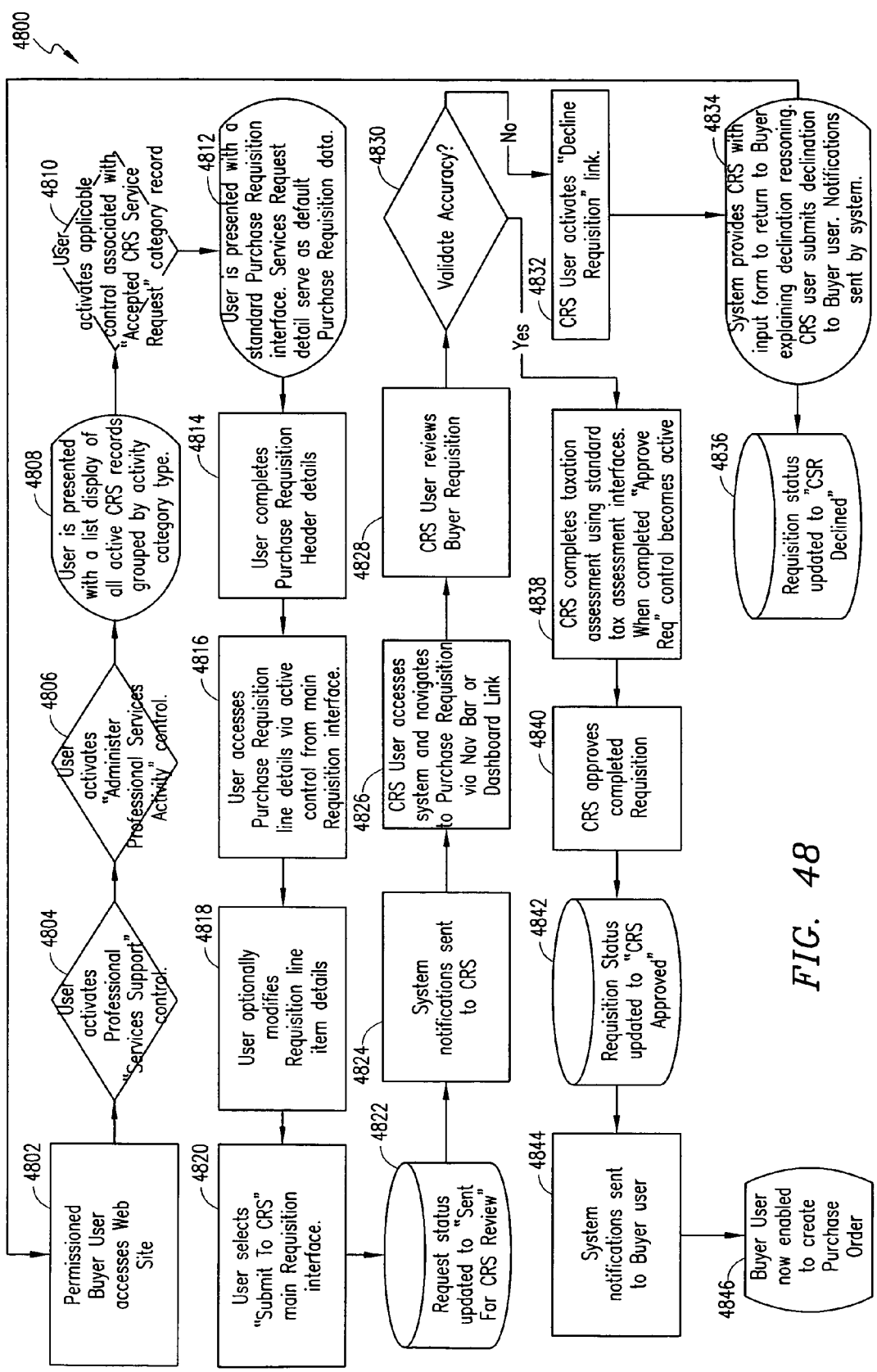
Figure 49:
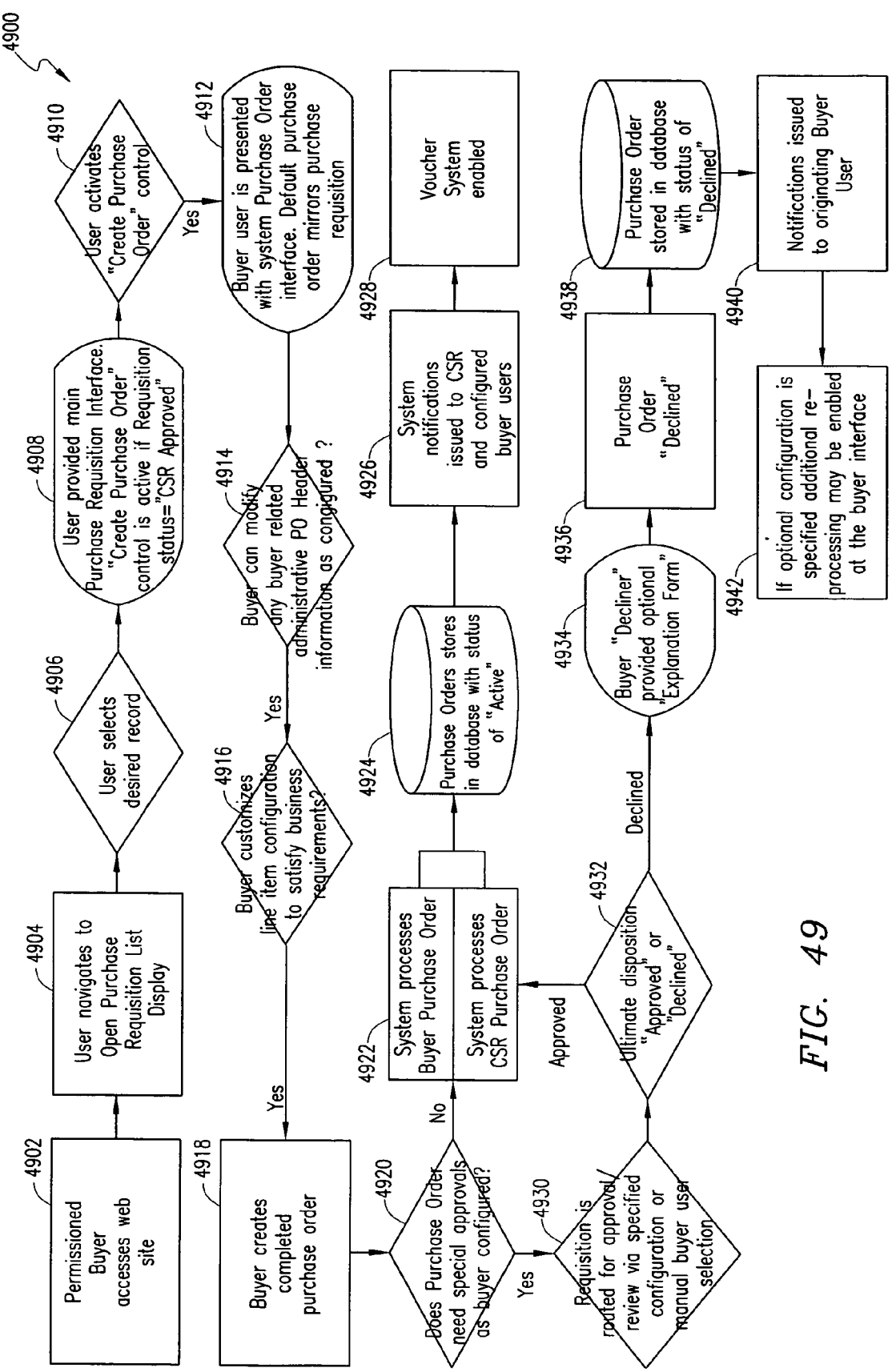
Figure 50:
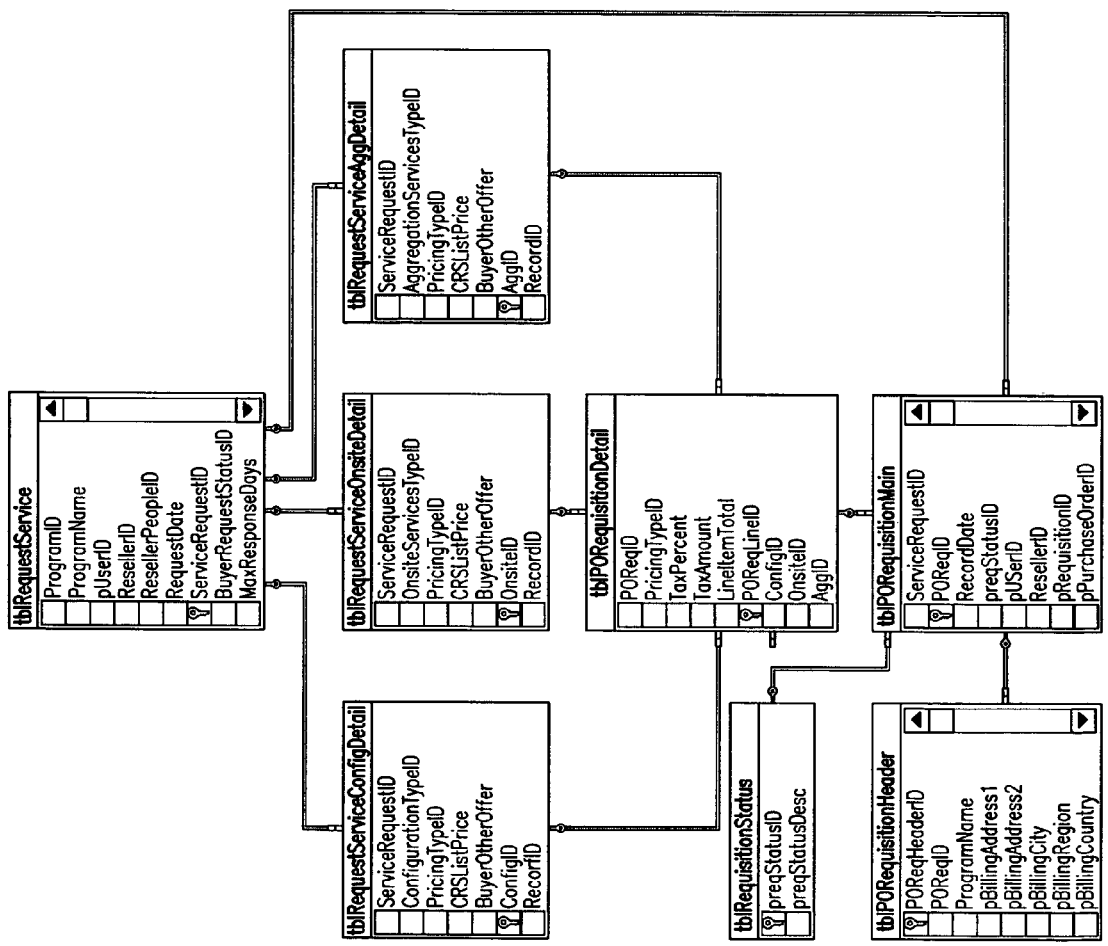
Figure 51:
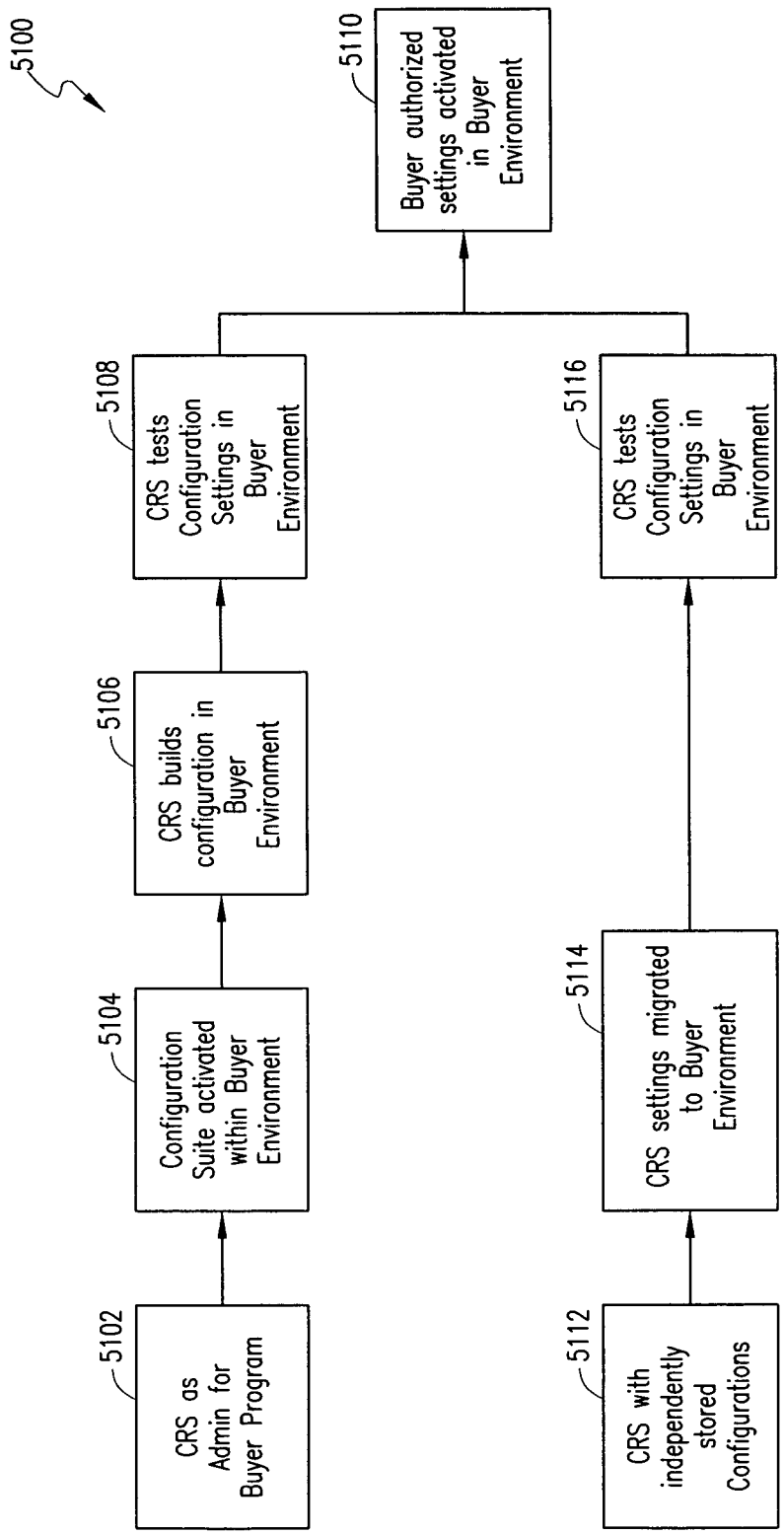
Figure 52:
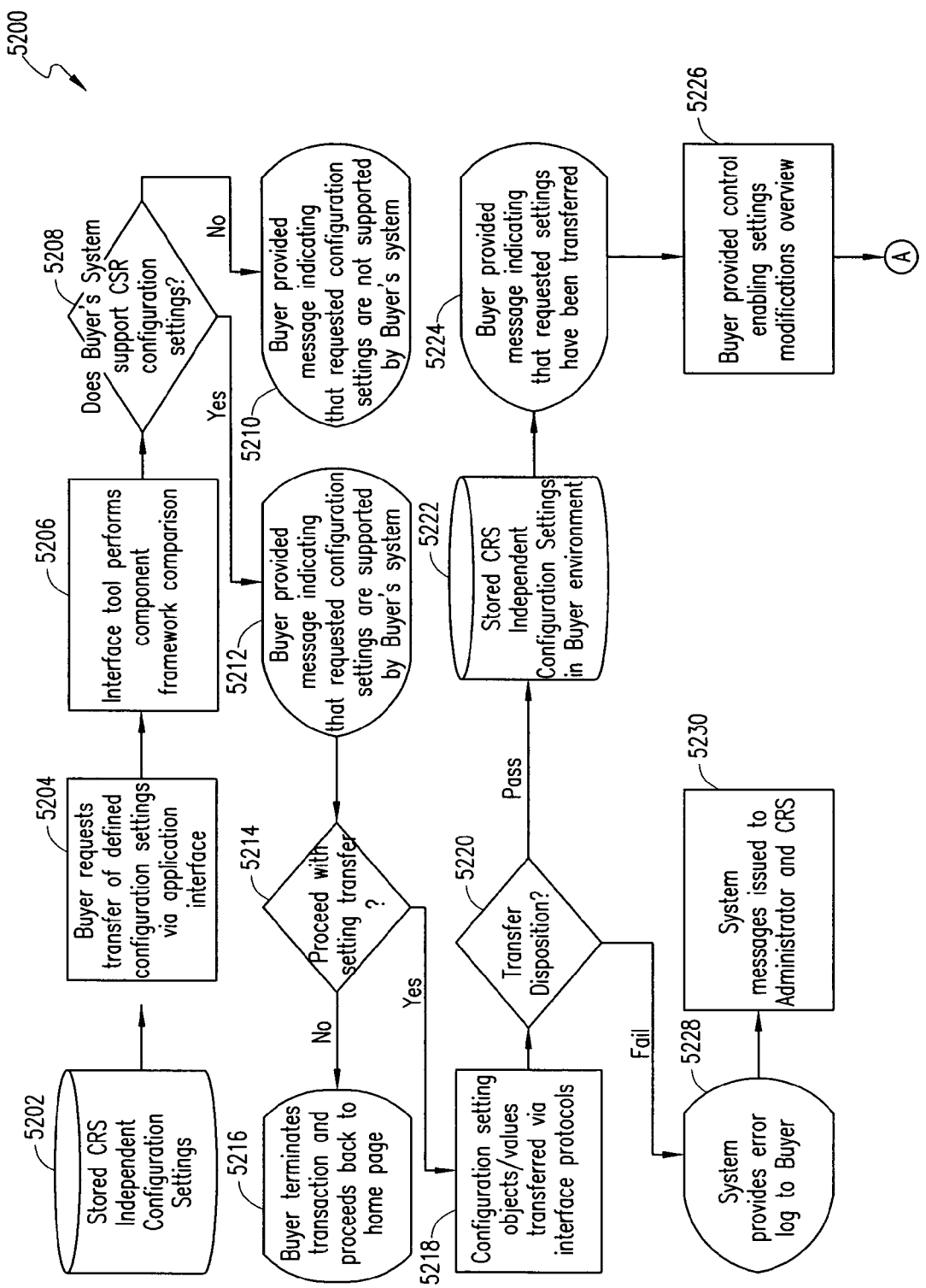
Figure 53:
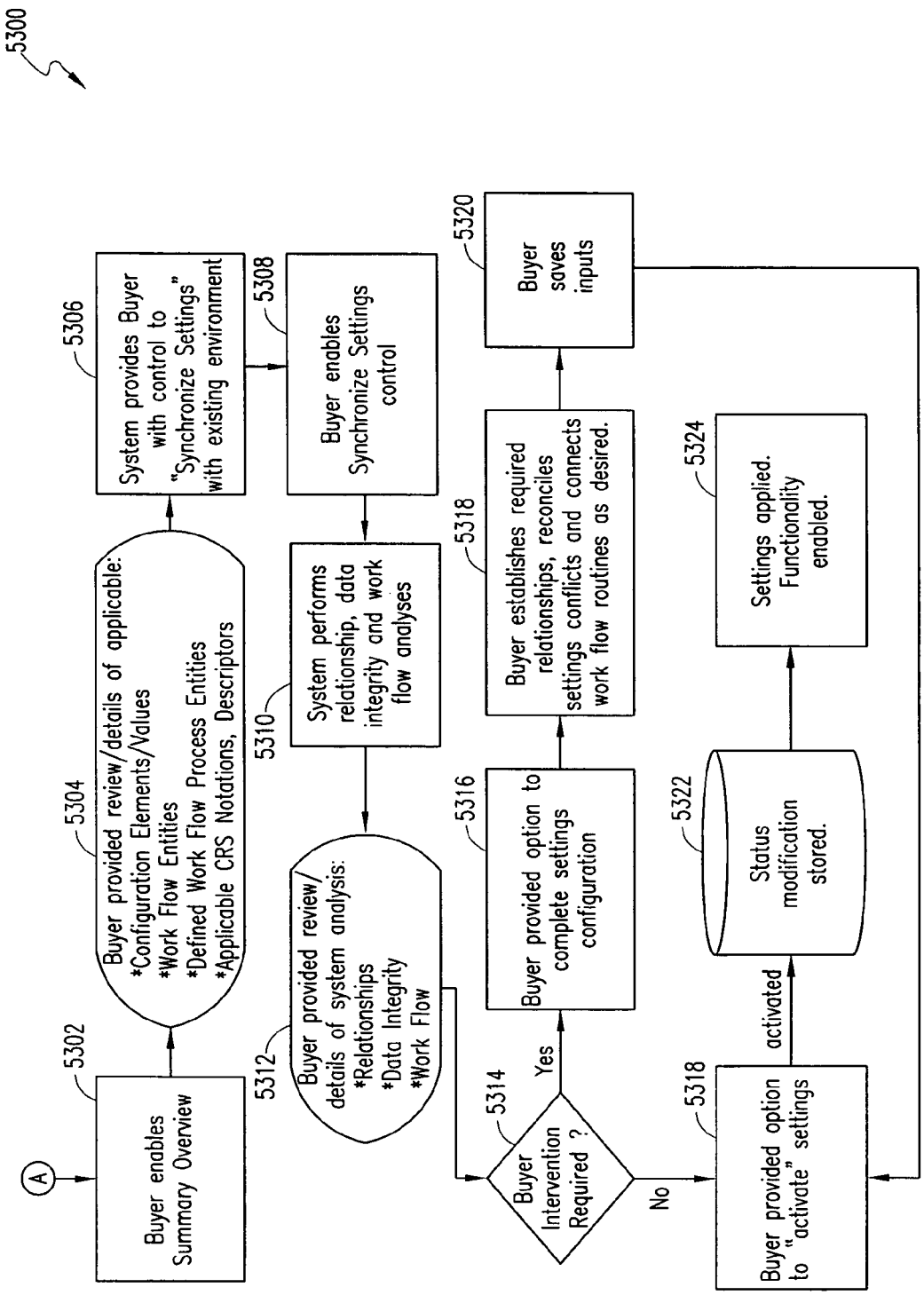
Figure 54:
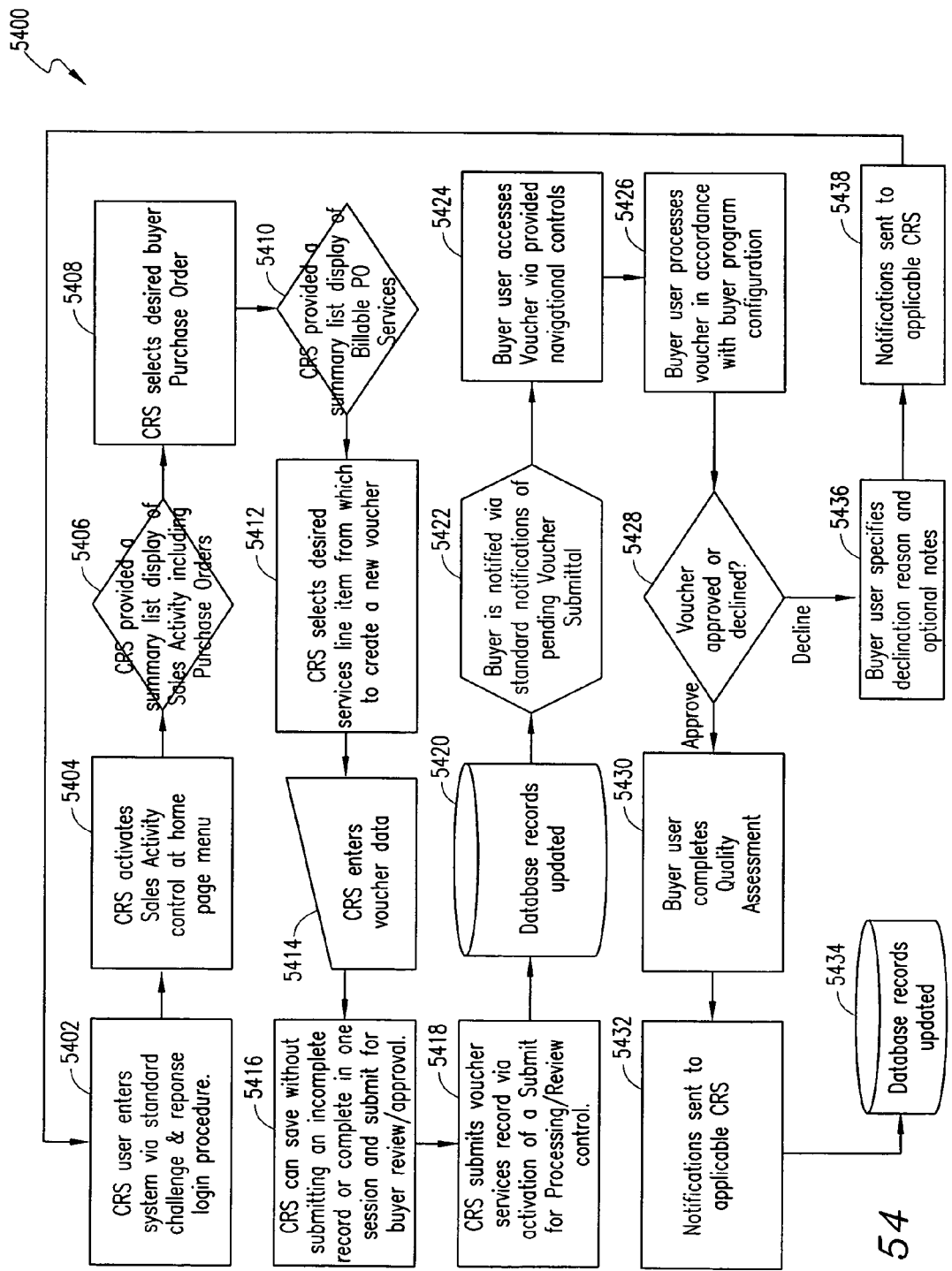
Figure 55:
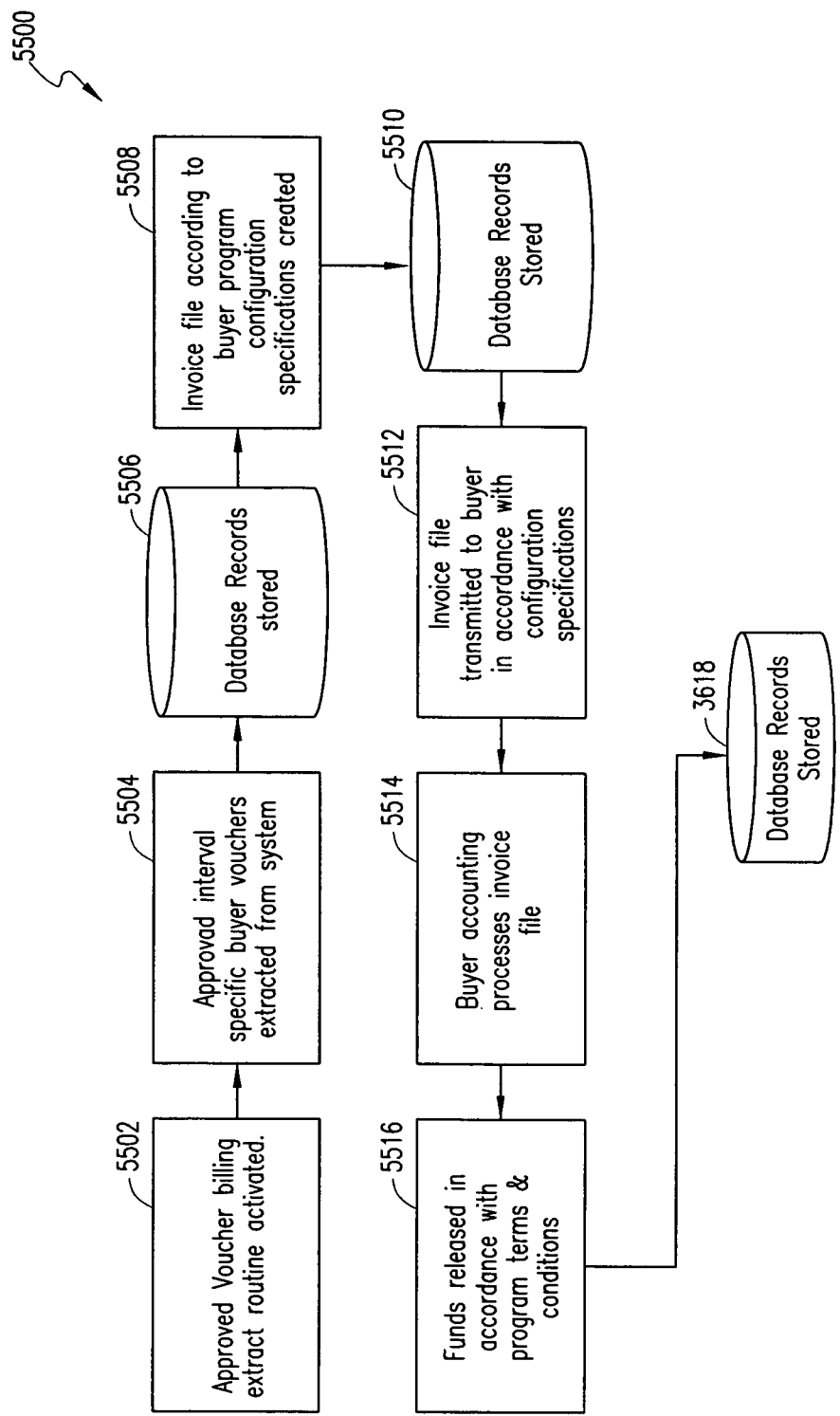
Figure 56:
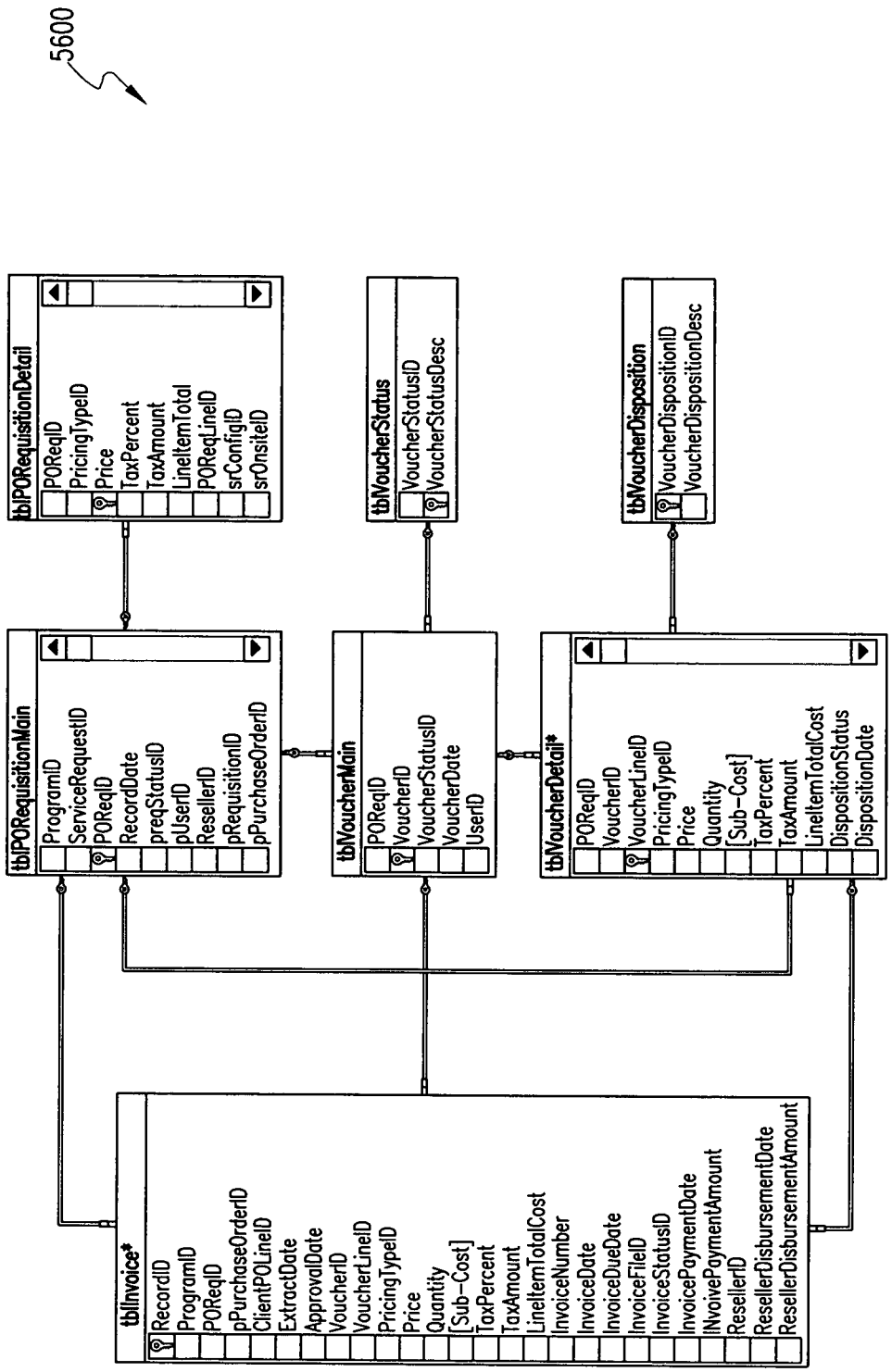

FIG. 9 is an exemplary data schema used for the Project Sector and Project Type configuration elements FIG. 10 is an exemplary data schema used for the Business Sector, Skill Set Matrix, Skill Profiles and Rate Cards configuration elements FIG. 11 is an exemplary data schema used for the SIC Matrix, Material Commodity Matrix, Material Master, Custom Commodity Matrix and Custom Commodity Attributes configuration elements;

FIG. 12 is an exemplary data schema used for the Bid Item Library and Bid Item Templates configuration elements;

FIG. 13 is a visual representation of configuration elements contained within the supply chain management configuration module;

FIG. 14 is an exemplary data schema used for the supply chain configuration module 506;

FIG. 15 is a visual representation of a plurality of configuration elements 1502 contained within the human capital management configuration module 508;

FIG. 16 is an exemplary data schema used for the Human Capital Management Configuration Module FIG. 17 is a visual representation of financial configuration elements 1702 contained within the financial processing configuration module 520;

FIG. 18 is an exemplary data schema used for the Financial Processing Configuration Module;

FIG. 19 is a visual representation of configuration elements contained within the collateral source field (CSF) Configuration Module 510;

FIG. 20 is an exemplary data schema used for the Collateral Data-CSF Management Configuration Module FIG. 21 is an exemplary high-level process flow depicting an overall CRS BI process;

FIG. 22 is an exemplary high level process flow depicting selection and building by a CRS of information components and association to create information settings;

FIG. 23A is an exemplary database schema supporting configuration element to configuration sub-element relationships and configuration element associations;

FIG. 23B is an exemplary database schema supporting CRS information settings;

FIG. 24 illustrates an exemplary high level process design depicting a CRS Information Setting Association to a System Inherent Work Flow Entity (WFE);

FIG. 25 illustrates an exemplary high level process design depicting a CRS Information Setting Association to an existing Work Flow Entity (WFE) entailing the editing of the WFE;

FIG. 26 is an exemplary high level process design depicting a CRS Information Setting Association to a Work Flow Entity (WFE) entailing the creation of the WFE;

FIG. 27 is an exemplary data base schema supporting Information Settings Integration into Work Flow Entities;

FIG. 28 is an exemplary visual representation of a Work Flow Process Engineering Configuration Interface Menu;

FIG. 29 is an exemplary high level process overview of a Work Flow Process Engineering Method;

FIG. 30 is an exemplary data base schema supporting the Work Flow Process Engineering Method of FIG. 29;

FIG. 31 is an exemplary high level process overview of the CRS business information Setting Creation/Storage and Pricing Method and can be viewed as a logical extension of FIG. 29;

FIG. 32 is an exemplary database schema supporting the CRS business information Setting Creation/Storage and Pricing Method;

FIG. 33 is an exemplary CRS home WEB page depicting a variety of accessible functionality and available dashboard alerts;

FIG. 34 is a high level process definition for CRS system access and on boarding;

FIG. 35 is a high level process definition for CRS base agreement execution;

FIG. 36 is an exemplary database schema supporting base/initial CRS on boarding and set up within the system;

FIG. 37 is a high level process definition for CRS Personnel Commodity Profiling;

FIG. 38 is an exemplary database schema supporting CRS Personnel Commodity Profiling;

FIG. 39 is a high level process definition for CRS Personnel Professional Services Profiling;

FIG. 40 is an exemplary database schema supporting CRS Personnel Professional Services Profiling;

FIG. 41 is a high level process definition for CRS Personnel Professional Services Pricing;

FIG. 42 is an exemplary database schema supporting CRS Personnel Professional Services Pricing;

FIG. 43 is an exemplary Buyer home Professional Services Support WEB page depicting a variety of accessible functionality and available dashboard alerts;

FIG. 44 is a high level process definition enabling Buyer access to CRS Professional Services Profiling;

FIGS. 45-46 represent a high level process definition enabling a Buyer to create a CRS services request or sales call;

FIG. 47 is an exemplary database schema supporting a Buyer to CRS services/sales call request;

FIG. 48 is a high level process definition enabling a Buyer and CRS to process a services request purchase requisition;

FIG. 49 is a high level process definition enabling a Buyer and CRS to process a services request purchase order;

FIG. 50 is an exemplary database schema supporting the purchase requisition/order processing;

FIG. 51 is an exemplary high level process definition of CRS to Buyer BI Settings Delivery Method;

FIGS. 52-53 illustrate an exemplary database high level process definition of CRS to Buyer BI Settings Environment Integration;

FIG. 54 illustrates an exemplary high level Bill/Pay Request Voucher process work flow;

FIG. 55 is an exemplary Accounting process work flow;

FIG. 56 is an exemplary supporting Vouchering Database Schema.

TABLES

In addition to the above-listed FIGURES, the Detailed Description includes the following exemplary Data Tables:

Table 1—Exemplary storage table housing the identities of products/applications

Table 2—Exemplary storage table housing the identities of functional application modules Table 3—Exemplary storage table housing the identities of the application modular elements Table 4—Exemplary storage table housing the relationships between Consol Products and individual Modular Elements Table 5—Exemplary storage table housing the identities of the Buyer Programs Table 6—Exemplary storage table housing the identities of Consol Application Products used within individual Buyer Programs Table 7—Exemplary storage table housing the identities of Application Configuration Groups Table 8—Exemplary storage table housing the identities of configuration elements Table 9—Exemplary storage table housing the relationship between Module Elements and configuration elements Table 10—Exemplary storage table housing the identities of CRS onsite services that can be provided Table 12—Exemplary storage table housing the relationship between "Onsite Services that can be provided and Application Module Elements used for the delivery of the services Table 13—Exemplary storage table housing the identities of CRS "Aggregation Services that can be provided Table 14—Exemplary storage table housing the relationship between "Aggregation Services that can be provided and Application Module Elements used for the delivery of the services Table 15—Exemplary metadata storage table housing the details of newly created customized objects via the configuration interface Table 16—Exemplary storage table housing the details applicable to an organizational framework designed by a CRS Table 17—Exemplary storage table housing the applicable organizational hierarchy relationships relevant to the CRS organizational framework Table 18—Exemplary storage table housing the Type of organization/description relevant to the CRS organizational framework Table 19—Exemplary storage table housing the details of any custom objects and attributes applicable to the "Organization Matrix" configuration element that are created by a CRS Table 20—Exemplary storage table housing the mapping relationships between specific Organization Level and Attributes.

Table 21—Exemplary storage table housing "Employee Grades/Levels" used within the system Table 22—Exemplary storage table housing the applicable employee grade hierarchy relationships relevant to the CRS organizational framework where applicable Table 23—Exemplary storage table housing the base details applicable to a buyer employee personnel record Table 24—Exemplary storage table housing the details applicable to those CRS Custom Attributes created to be associated with buyer employee personnel record(s).

Table 25—Exemplary storage table housing all available attributes applicable to Buyer Entity employee record(s)

Table 26—Exemplary storage table housing all User Roles/Positions defined within the environment.

Table 27—Exemplary storage table housing the buyer entity User Groups

Table 28—Exemplary storage table housing the mapping relationship between User Group(s) and User Roles Table 29—Exemplary storage table housing the mapping relationship between Employee Grade/Level and User Groups Table 30—Exemplary storage table serving as a master container by which a facility element can be created within the environment Table 31—Exemplary storage table housing the details associated with custom attributes created to better define and manage facilities Table 32—Exemplary storage table housing the details of all attributes created to better define and manage facilities Table 33—Exemplary storage table housing the identity of the system provided individual countries used within the solution Table 34—Exemplary storage table housing the identity of the system provided individual regions Table 35—Exemplary storage table housing the identity of the system provided individual population centers/cities used within the solution (examples of Population Centers are—Cities, Townships, Municipalities, Towns, etc.

Table 36—Exemplary storage table housing the identity of custom Multi-National groups created within the system Table 37—Exemplary storage table housing the mapping relationship between individual countries and applicable custom multi-national groups Table 38—Exemplary storage table housing the identity of custom Multi-Regional groups created within the system (an example would be The New England Region-USA)

Table 39—Exemplary storage table housing the mapping relationship between individual regions and applicable custom multi-regional groups Table 40—Exemplary storage table housing the identity of custom Multi-Population Center/City groups created within the system Table 41—Exemplary storage table housing the mapping relationship between individual population centers and applicable custom multi-population center groups Table 42—Exemplary storage table housing the details applicable to custom attributes created to better define and manage geographical segmentation schemes Table 43—Exemplary storage table housing the Project Sector identities stored within the solution Table 44—Exemplary storage table housing the Project Family identities stored within the solution Table 45—Exemplary storage table housing the hierarchical relationship between system provided Project Sectors and those created by the CRS.

Table 46—Exemplary storage table housing the hierarchical relationship types between system provided Project Sectors and those created by the CRS Table 47—Exemplary storage table housing the hierarchical relationship between system provided Project Families and those created by the CRS.

Table 48—Exemplary storage table housing the hierarchical relationship types between system provided Project families and those created by the CRS Table 49—Exemplary storage table housing the identities of Project Type Codes used by the CRS Table 50—Exemplary storage table housing the identities of Project Impact Codes used by the CRS Table 51—Exemplary storage table housing the identities of Project Event Codes used by the CRS Table 52—Exemplary storage table housing the identities of Project Event Importance Codes used by the CRS Table 53—Exemplary storage table housing the identities of Project Status Codes used by the CRS Table 54—Exemplary storage table housing the identities of Project Performance Status Codes used by the CRS Table 55—Exemplary storage table housing the identities of Project Deliverable Status Codes used by the CRS Table 56—Exemplary storage table housing the identities of Project Deliverable Quality Codes used by the CRS Table 57—Exemplary storage table housing the identities of Project Phase Type Codes used by the CRS Table 58—Exemplary storage table housing the identities of Project Phase Status Codes used by the CRS Table 59—Exemplary storage metadata table housing details associated with custom Project Type Attributes created by a CRS Table 60—Exemplary storage table housing the identity of Business Sectors used by the CRS Table 61—Exemplary storage table housing the identity of Business Arenas used by the CRS Table 62—Exemplary storage table housing the identity of Business Families used by the CRS Table 63—Exemplary storage table housing the identity of General Functions used by the CRS Table 64—Exemplary storage table housing the mapping of General Functions to Business Families used by the CRS Table 65—Exemplary storage table housing the identity of Skill Set Categories used by the CRS Table 66—Exemplary storage table housing the identity of specific Business Skills Set used by the CRS Table 67—Exemplary storage table housing the mapping of Skills to their respective Skill Set Category as used by the CRS Table 68—Exemplary storage table housing the mapping of Business Skill Categories to their respective Business Families as used by the CRS Table 69—Exemplary storage table housing the master identity of a Skill Profile used by the CRS Table 70—Exemplary storage table housing the General Functions associated with a stored Skill Profile used by the CRS Table 71—Exemplary storage table housing the Business Skill Categories associated with a stored Skill Profile used by the CRS Table 72—Exemplary storage table housing the Business Skills associated with a stored Skill Profile used by the CRS Table 73—Exemplary storage table housing the master identity of a Rate Card associated with Skill Profile used by the CRS Table 74—Exemplary storage table housing the details of a Rate Card associated with Skill Profile used by the CRS Table 75—Exemplary storage table housing the SIC Division details used by a CRS Table 76—Exemplary storage table housing the SIC Major Group details used by a CRS Table 77—Exemplary storage table housing the SIC Industry Group details used by a CRS Table 78—Exemplary storage table housing the SIC Industry details used by a CRS Table 79—Exemplary storage table housing the Custom Commodity Class details used by a CRS Table 80—Exemplary storage table housing the Custom Commodity Group details used by a CRS Table 81—Exemplary storage table housing the Custom Commodity Sub-Group details used by a CRS Table 82—Exemplary storage table housing the Custom Commodity details used by a CRS Table 83—Exemplary storage table housing the Custom Commodity Item details used by a CRS Table 84—Exemplary storage table housing the System Provided Commodity Item Attribute details used by a CRS Table 85—Exemplary storage table housing the Custom Created Commodity Item Attribute details used by a CRS Table 86—Exemplary storage table mapping the Custom Created Commodity Item Attribute details to the System provided Commodity Item Attribute details used by a CRS Table 87—Exemplary storage table mapping the Custom Created Commodity Schema to the SIC Commodity Schema Table 88—Exemplary storage table housing the details applicable to RFx Bid Items used by a CRS; be they system provided or custom created Table 89—Exemplary storage table housing the details applicable to RFx Bid Categories used by a CRS; be they system provided or custom created Table 90—Exemplary storage table housing the details applicable to RFx Bid Sections used by a CRS; be they system provided or custom created Table 91—Exemplary storage table housing the details applicable to Material Bid Object used by a CRS; be they system provided or custom created Table 92—Exemplary storage table housing the details applicable to Skill Profile Bid Object used by a CRS; be they system provided or custom created Table 93—Exemplary storage table housing the details applicable to Deliverable Bid Object used by a CRS; be they system provided or custom created Table 94—Exemplary storage table housing the details applicable to Bid Unit Object used by a CRS; be they system provided or custom created Table 95—Exemplary storage table housing the details applicable to Bid Phase Object used by a CRS; be they system provided or custom created Table 96—Exemplary storage table housing the details applicable to Bid Services Object used by a CRS; be they system provided or custom created Table 97—Exemplary storage table housing the details applicable to Bid Templates used by a CRS; be they system provided or custom created Table 98—Exemplary storage table housing the mapping details applicable to RFx Bid Items and RFx Bid Templates used by a CRS Table 99—Exemplary storage table housing the identity of CRS Supplier Management record collection(s)

Table 100—Exemplary storage table housing details relative to custom attributes associated with types and qualifiers applicable to suppliers Table 101—Exemplary storage table housing details relative to supplier Legal Entity types associated with the CRS solution Table 102—Exemplary storage table housing details relative to supplier Diversified Business Entity types associated with the CRS solution Table 103—Exemplary storage table housing details relative to supplier Certification(s) associated with the CRS solution Table 104—Exemplary storage table housing details relative to supplier Professional Associations applicable to the CRS solution Table 105—Exemplary storage table housing details relative to supplier Industry Associations applicable to the CRS solution Table 106—Exemplary storage table housing details relative to supplier Commodity Associations applicable to the CRS solution Table 107—Exemplary storage table housing details relative to supplier Labor Union affiliation applicable to the CRS solution Table 108—Exemplary storage table housing details relative to specialized supplier Licensing applicable to the CRS solution Table 109—Exemplary storage table housing details relative to supplier Business Insurance types applicable to the CRS solution Table 110—Exemplary storage table housing details relative to supplier Business Insurance coverage types applicable to the CRS solution Table 111—Exemplary storage table housing details relative to supplier Business Insurance Coverage Threshold amounts applicable to the CRS solution Table 112—Exemplary storage table housing details relative to supplier Agreement types applicable to the CRS solution Table 113—Exemplary storage table housing details relative to supplier Agreement Content/Format applicable to the CRS solution Table 114—Exemplary storage table housing details relative to supplier Facility types applicable to the CRS solution Table 115—Exemplary storage table housing details relative to supplier Facility records applicable to the CRS solution Table 116—Exemplary storage table housing details relative to supplier Facility Attributes applicable to the CRS solution Table 117—Exemplary storage table housing details relative to supplier Business Waiver types applicable to the CRS solution Table 118—Exemplary storage table housing details relative to supplier Business Waiver Attributes—content/format, etc, applicable to the CRS solution Table 119—Exemplary storage table housing details relative to supplier Audit types applicable to the CRS solution Table 120—Exemplary storage table housing details relative to supplier Audit Attributes—content/format, etc, applicable to the CRS solution Table 121—Exemplary storage table housing the identity of CRS Supplier Tier Collections applicable to the CRS solution Table 122—Exemplary storage table housing the identity of CRS individual Supplier Tiers applicable to the CRS solution Table 123—Exemplary storage table housing the details of CRS Tier Attributes applicable to the CRS solution Table 124—Exemplary storage table housing the mapping details of CRS Tier Attributes to specific CRS Tiers applicable to the CRS solution Table 125—Exemplary storage table housing the identity of CRS Human Capital Management record collection(s)

Table 126—Exemplary storage table housing the Worker Type Codes used by the CRS

Table 127—Exemplary storage table housing the Worker Type data collection used by the CRS Table 128—Exemplary storage table housing the Worker Type Agreement Type Codes used by the CRS Table 129—Exemplary storage table housing the Worker Type Agreement details used by the CRS Table 130—Exemplary storage table housing the Worker Qualifiers used by the CRS Table 131—Exemplary storage table housing the Worker Tenure Interval Type Codes used by the CRS Table 132—Exemplary storage table housing the Worker Tenure Rule details used by the CRS Table 133—Exemplary storage table housing the Worker Onboarding Requirement details used by the CRS Table 134—Exemplary storage table housing the Worker Offboarding Requirement details used by the CRS Table 135—Exemplary storage table housing the Worker Pay Type Codes used by the CRS Table 136—Exemplary storage table housing the Worker Pay Type details used by the CRS Table 137—Exemplary storage table housing the Worker Expense Type Codes used by the CRS Table 138—Exemplary storage table housing the Worker Expense Type details used by the CRS Table 139—Exemplary storage table housing the Worker Audit Type Codes used by the CRS Table 140—Exemplary storage table housing the Worker Audit Type details used by the CRS Table 141—Exemplary storage table housing the Worker Waiver Type Codes used by the CRS Table 142—Exemplary storage table housing the Worker Waiver Type details used by the CRS Table 143—Exemplary storage table housing the Worker Asset Type Codes used by the CRS Table 144—Exemplary storage table housing the Worker Asset Type details used by the CRS Table 145—Exemplary storage table housing the identity of CRS Financial Management record collection(s)

Table 146—Exemplary storage table housing Spend Type Codes inherent to the system Table 147—Exemplary storage table housing Spend Type Codes used by the CRS Table 148—Exemplary storage table housing Monetary Currency Codes inherent to the system Table 149—Exemplary storage table housing Monetary Currency Codes used by the CRS Table 150—Exemplary storage table housing the identity of custom CRS Collateral Currencies used Table 151—Exemplary storage table housing Tax Types inherent to the system Table 152—Exemplary storage table housing Tax Types used by the CRS Table 153—Exemplary storage table housing Tax Rate Types inherent to the system Table 154—Exemplary storage table housing Tax Rate Types used by the CRS Table 155—Exemplary storage table housing Tax Classes used by the CRS Table 156—Exemplary storage table housing Tax Authorities used by the CRS Table 157—Exemplary storage table housing Tax Exceptions used by the CRS Table 158—Exemplary storage table housing Payment Terms used by the CRS Table 159—Exemplary storage table housing Discount Terms used by the CRS Table 160—Exemplary storage table housing Rebate Terms used by the CRS Table 161—Exemplary storage table housing Accrual Types used by the CRS Table 162—Exemplary storage table housing Bill File Types used by the CRS Table 163—Exemplary storage table housing EDI File Types used by the CRS Table 164—Exemplary storage table housing the identity of CRS CSF record collection(s)

Table 165—Exemplary storage table housing CSF Class Types used by the CRS

Table 166—Exemplary storage table housing CSF Class Types inherent to the system Table 167—Exemplary storage table housing the CSF Class Type relationships established by the CRS Table 168—Exemplary storage table housing the specific CSF Value Library applicable to those constraining value buckets established for specific CSF Classes Table 169—Exemplary storage table housing the CSF Class Type mappings to Master Data Organizations established by the CRS Table 170—Exemplary storage table housing the CSF Class Type mappings to Commodity Items established by the CRS Table 171—Exemplary storage table housing the CSF Class Type mappings to Spending Types (Vouchers) established by the CRS Table 172—Exemplary storage table housing the User Position CSF data management rights established by the CRS in conjunction with Voucher processing Table 173—Exemplary storage table housing the CSF Class Type mappings to Workflow Entities established by the CRS Table 174—Exemplary storage table housing the details applicable to Configuration Sub-Elements Table 175—Exemplary storage table housing the mapping relationship between configuration elements and applicable Configuration Sub-Elements inherent within the system Table 176—Exemplary storage table housing the mapping relationships between associated configuration elements inherent within the system Table 177—Exemplary storage table housing the relationship types that exist between associated configuration elements inherent within the system Table 178—Exemplary storage table housing the configuration elements used by the CRS Table 179—Exemplary storage table housing the identity and applicable details of Configuration Sub-Elements used by the CRS Table 180—Exemplary storage table housing the mapping relationship between configuration elements and applicable Configuration Sub-Elements used by the CRS Table 181—Exemplary storage table representing the master container for a CRS Information Setting Table 182—Exemplary storage table housing configuration element Association within a CRS BI Setting Table 183—Exemplary storage table housing Configuration Sub-Element Association and details within a CRS BI Setting Table 188—Exemplary storage table representing the master container for a Work Flow Entity Table 189—Exemplary storage table housing the identities of sections existing within a Work Flow Entity container Table 190—Exemplary storage table housing the identities both header and footer applicable to a section existing within a Work Flow Entity container Table 191—Exemplary storage table housing the details of the header applicable to a section existing within a Work Flow Entity container Table 192—Exemplary storage table housing the details of the footer applicable to a section existing within a Work Flow Entity container Table 193—Exemplary storage table housing the meta data object format applicable to a section body contained within a Work Flow Entity container Table 194—Exemplary storage representing the master container for each Metadata Cell applicable to a section body contained within a Work Flow Entity container Table 195—Exemplary storage representing the Metadata Cell types that can be associated with a master container cell Table 196—Exemplary storage housing label attributes applicable to a Metadata Cell Table 197—Exemplary storage housing data field attributes applicable to a Metadata Cell Table 198—Exemplary storage housing input field attributes applicable to a Metadata Cell Table 199—Exemplary storage housing the mapping relationships between Work Flow Entity and applicable configuration elements Table 200—Exemplary storage housing the meta data attribute mapping relationships between Work Flow Entity Cells and CRS BI Stored Settings Table 201—Exemplary storage table representing the master container for a Work Flow Engineered Process Entity Table 202—Exemplary storage table housing the mapping relationships between a WFE Process and applicable WFEs Table 202—Exemplary storage table housing the details of the system inherent User Role Positions Table 204—Exemplary storage table housing the mapping relationships between a WFE Process and applicable User Role Positions Table 205—Exemplary storage table housing the mapping relationships between a WFE Process and applicable Stages/Legs contained within the WFE Process Table 206—Exemplary storage table housing the mapping relationships between a WFE Process Stage and applicable Status Code associated with the WFE Process Stage Table 207—Exemplary storage table housing the status constraint relationships between a Parent WFE Process and an associated Child WFE Process Table 208—Exemplary storage table housing the identities and details relative to WFE Process Status Codes Table 209—Exemplary storage table housing the rules applicable to Specific Actions available to Specific User Role Positions while a WFE is in a Specific Process Leg and what Specific WFE Process Status will be assigned based upon the user Position Action taken.

Table 210—Exemplary storage table housing the identities and values applicable to User Role Actions Table 211—Exemplary storage table representing the master container for a CRS business information (BI) Setting Bundle Table 212—Exemplary storage table housing the mapping relationships between business information (BI) Setting and Stored Engineered Process Work Flows Table 213—Exemplary storage table housing the CRS pricing details applicable to a stored BI Setting Table 214—Exemplary storage table housing the identity and details applicable to companies operating within the e-commerce environment Table 215—Exemplary storage table housing the types of Diversified Business Entity codes applicable to companies operating within the e-commerce environment Table 216—Exemplary storage table housing the Legal Business Entity type codes applicable to companies operating within the e-commerce environment Table 217—Exemplary storage table housing the identities of Consultant Reseller business entities operating within the e-commerce environment Table 218—Exemplary storage table housing details relative to Business Locations affiliated with Consultant Reseller business entities operating within the e-commerce environment Table 219—Exemplary storage table housing the Business Location type codes used within the system Table 220—Exemplary storage table housing the CRS Agreement type codes used within the system Table 221—Exemplary storage table housing the details applicable to CRS Agreements Executed Table 222—Exemplary storage table housing the details applicable to CRS Business Insurance Coverage information Table 223—Exemplary storage table housing the Business Insurance type codes applicable to CRS insurance coverage information Table 224—Exemplary storage table housing the Business Insurance coverage type codes applicable to CRS insurance coverage information Table 225—Exemplary storage table housing the Business Insurance Coverage Threshold amounts applicable to CRS insurance coverage information Table 226—Exemplary storage table housing the details applicable to Business Insurance Carriers applicable to CRS insurance coverage information Table 227—Exemplary storage table housing the CRS Approval Status Codes used within the system Table 228—Exemplary storage table housing the details applicable to individual CRS Personnel operating within the system Table 229—Exemplary storage table representing the master container for a CRS Personnel Skill Profile Table 230—Exemplary storage table housing the General Functions applicable to a CRS Personnel Skill Profile Table 231—Exemplary storage table housing the specific skills/attributes applicable to a CRS Personnel Skill Profile Tables 232-234—Exemplary storage tables housing the specific country—region—population center service areas supported by CRS personnel Table 235—Exemplary storage table housing the CRS Sales Contact types used within the system Tables 236-239—Exemplary storage tables housing the SIC Industry Code hierarchy used within the system Table 240—Exemplary storage tables housing the SIC Industry Code mappings to a CRS personnel Table 241—Exemplary database storage table housing the standard CRS Certification Fees applicable to "Product Application Sales"

Table 242—Exemplary database storage table housing the details of individual CRS personnel "Product Sales" certification(s)

Table 243—Exemplary database storage table housing the types of Professional Configuration Services Certifications which CRS personnel can acquire Table 244—Exemplary database storage table housing standard CRS Certification Fees applicable to "Professional Configuration Services"

Table 245—Exemplary database storage table housing the details of individual CRS personnel "Professional Configuration Services" certification(s)

Table 246—Exemplary database storage table housing standard CRS Certification Fees applicable to "Professional Onsite Services"

Table 247—Exemplary database storage table housing the details of individual CRS personnel "Professional Onsite Services" certification(s)

Table 248—Exemplary database storage table housing standard CRS Certification Fees applicable to "Professional Aggregation Services"

Table 249—Exemplary database storage table housing the details of individual CRS personnel "Professional Aggregation Services" certification(s)

Table 250—Exemplary database storage table housing the types of Status codes applicable to CRS Certification(s)

Table 251—Exemplary database storage table housing details of CRS Entity Product Sales Agreements Table 252—Exemplary database storage table housing CRS Entity Product Application Sales Commission Rates premised upon client licensing agreement duration Table 253—Exemplary database storage table housing details of CRS Professional Configuration Services Sales Agreements Table 254—Exemplary database storage table housing CRS Entity Configuration Services Pricing data Table 255—Exemplary database storage table housing details of CRS Professional Onsite Services Sales Agreements Table 256—Exemplary database storage table housing CRS Entity Professional Onsite Services Pricing data Table 257—Exemplary database storage table housing details of CRS Professional Aggregation Services Sales Agreements Table 258—Exemplary database storage table housing CRS Entity Professional Aggregation Services Pricing data Table 259—Exemplary database storage table housing Pricing types used within the system Table 260—Exemplary database storage table housing Agreement Duration Intervals used within the system Table 261—Exemplary storage table housing the details of the Buyer Sales Call Request Table 262—Exemplary storage table housing the types of Buyer Sales Call Contact types that can be opted Table 263—Exemplary storage table housing the Status codes potentially applicable to a Buyer Sales Call Request Table 264—Exemplary storage table housing Status codes potentially applicable CRS Response Table 265—Exemplary storage table housing the base details of the Buyer Professional Services Request Table 266—Exemplary storage table housing specific details applicable to Professional Configuration BI services. Records in this table must be associated with at least one record in Table 265

Table 267—Exemplary storage table housing specific details applicable to Professional Onsite services. Records in this table must be associated with at least one record in Table 265

Table 268—Exemplary storage table housing specific details applicable to Professional Aggregation services. Records in this table must be associated with at least one record in Table 265

Table 269—Exemplary storage table housing the base details of the Buyer Purchase Requisitions Table 270—Exemplary storage table housing the header details of the Buyer Purchase Requisition (Billing information, terms, etc)

Table 271—Exemplary storage table housing the line item details of the Buyer Purchase Requisition Table 272—Exemplary storage table housing the potential status types of the Buyer Purchase Requisition Table 273—Exemplary storage table housing the Base Details of the CRS Voucher Table 274—Exemplary storage table housing the Line Item Details of the CRS Voucher Table 275—Exemplary storage table housing the Status Code types applicable to a CRS Voucher Table 276—Exemplary storage table housing the Buyer Disposition types applicable to a CRS Voucher Table 277—Exemplary storage table housing the Voucher Extract, Buyer Invoice and CRS Payment Details

DETAILED DESCRIPTION OF EXEMPLARY EMBODIMENTS OF THE INVENTION

Embodiment(s) of the invention will now be described more fully with reference to the accompanying Drawings. The invention may, however, be embodied in many different forms and should not be construed as limited to the embodiment(s) set forth herein. The invention should only be considered limited by the claims as they now exist and the equivalents thereof.

For purposes of this patent application, the term business information (BI) includes know how, subject-matter expertise, trade secrets, proprietary methods and processes, industry-specific knowledge, and any other information or data used by a consultant in a particular business environment that can be suitably formatted for input and storage in a relational database. The BI way, but need not necessarily be, subject to protection as intellectual property in the form of, for example, patents, trademarks, copyrights, and trade secrets. BI is intended to encompass the term "intellectual property" as used in U.S. Provisional Patent Application No. 60/549,137. Horizontal BI relates to either generic full commerce life cycle management or component/partial commerce life cycle management), while vertical BI is related to a specific industry or business market segment. For example, Horizontal BI may be subject-matter expertise that is processing or methodology centric to business concerns such as, for example, procurement, accounting, or invoice processing. In contrast, a CRS may have Vertical BI expertise, which may be interpreted to mean that the CRS can generate BI that, when utilized by a buyer entity, enables enhanced management of specific commodities or industries such as, for example, in the oil industry.

In various embodiments of the invention, a CRS is provided a tangible business configuration environment that allows all or some elements of the consultant's BI to be stored in the form of relational-database settings. The environment enables the transfer of the stored settings between the CRS and a buyer in need of the settings. Various embodiments of the invention also include a settings synchronization interface tool that enables transfer of the settings into a buyer's environment while avoiding disruptions or failures due to conflicting settings between the buyer's environment and an environment of the CRS.

Database environment order permits creation, storage, and synchronized transfer of BI between a buyer and CRS, since various embodiments of the invention may be used in a full robust enterprise fashion or to a lesser extent to meet less-intensive business objectives. Thus, not all professional services, aggregation services, or configuration services that may be offered in connection with various embodiments of the invention are necessarily applicable to all embodiments. For example, a buyer entity would not be able to use CRS bid services or applicable configuration settings if the buyer entity is utilizing only a time-keeping product that has no bidding functionality and is designed to only capture labor hours worked.

Various embodiments of the invention may also include a collection of components including modules, functions, actions, database elements, work flow elements, and configuration settings. In a typical embodiment, offered products are logically mapped to components in a database management model. Each buyer program is also typically mapped to a product in the database management model. The mappings enable the various embodiments to logically determine specific professional services certifications/settings that may potentially be applicable to given buyer programs.

Figure 1A:
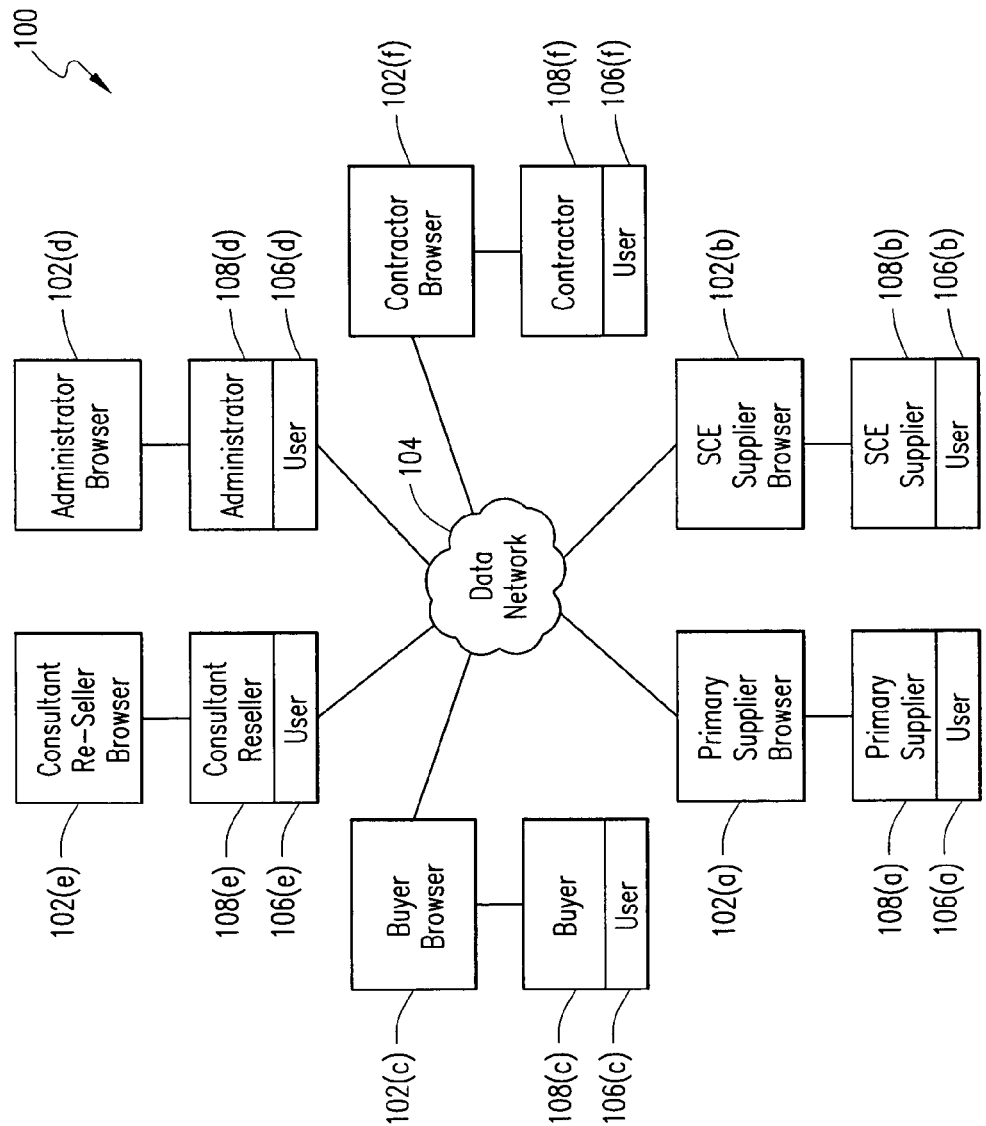
FIG. 1A is a block diagram illustrating a computer network 100 in accordance with principles of the present invention.

Referring now to the FIGURES, FIG. 1 is a block diagram illustrating a computer network 100 in accordance with principles of the present invention. In the network 100, a primary supplier browser 102(a), a sub-contracting entity (SCE) supplier browser 102(b), a buyer browser 102(c), an administrator browser 102(d), a consultant re-seller browser 102(e) and a contractor browser 102(f) can be used, respectively, by users 106(a)-106(f) to interact with one another via a data network 104. The user 106(a) is associated with a primary supplier 108(a). The user 106(b) is associated with an SCE supplier 108(b). The user 106(c) is associated with a buyer 108(c). The user 106(e) is associated with a consultant re-seller 108(e). The user 106(d) is associated with an administrator 108(d). The user 106(f) is associated with a contractor 108(f). The network 100 may be, for example, the Internet or an intranet. The browsers 102 may be, for example, any available web browser or any type of Internet Service Provider (ISP) connection that provides access to the network 100.

Figure 1B:
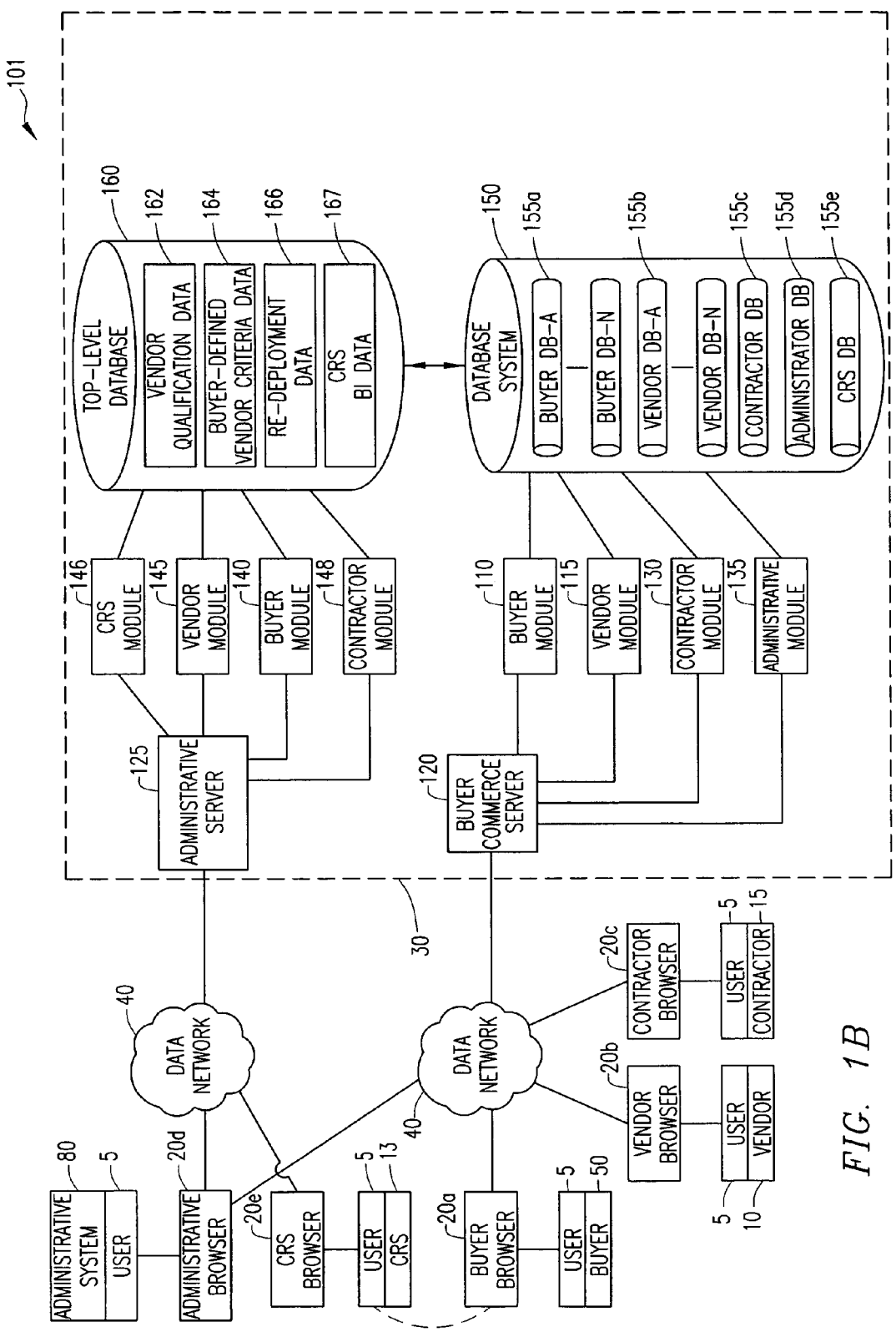
FIG. 1B is a block diagram illustrating a system 101 in accordance with principles of the invention.

FIG. 1B is a block diagram illustrating a system 101 in accordance with principles of the invention. A CRS environment 30 can be implemented within the system 101 as shown in FIG. 1B. A user 5 may enter the system 101 via a data network 40 via a web browser 20. A user 5 may include any person associated with a vendor 10, a buyer 50, an administrator 80 (e.g., a third-party or buyer-employed administrator), a consultant re-seller (CRS) 13, or a contractor 15. By way of example, but not limitation, the data network 40 can be the Internet or an Intranet and the web browser 20 can be any available web browser or any type of Internet Service Provider (ISP) connection that provides access to the data network 40.

Vendor users 5 access the system 101 through a vendor browser 20b, buyer users 5 access the system 101 via a buyer browser 20a, contractor users 5 access the system 101 via a contractor browser 20c, CRS users 5 access the system 101 via a CRS browser 20e or via the buyer browser 20a, and administrative users 5 access the system 101 through an administrative browser 20d. The browsers 20 access the system 101 through a buyer commerce server 120 or an administrative server 125, each of which is capable of pushing web pages to the vendor browser 20a, buyer browser 20b, contractor browser 20c, CRS browser 20e, and administrative browser 20d, respectively.

The buyer commerce server 120 enables vendors 10, buyers 50, contractors 15, CRS 13, and administrators 80 to interface to a database system 150. The database system 150 maintains data related to the vendors 10, buyers 50, contractors 15, CRS 13, and administrators 80. The data related to each of the vendors 10, buyers 50, contractors 15, CRS 13, and administrators 80 can be stored in a single database 155, in multiple shared databases 155, or in separate databases 155 within the database server 150 for security and convenience purposes, the latter being illustrated. For example, the database system 150 can be distributed throughout one or more locations, depending on the location and preference of the buyers 50, vendors 10, CRS 13, administrators 80, and contractors 15.

A user interface to the buyer users 5 is provided by the buyer commerce server 120 through a buyer module 110. For example, the buyer module 110 can populate web pages pushed to the buyer browser 20a using the data stored in the particular buyer database 155a. The buyer module 110 can include any hardware, software, and/or firmware required to perform the functions of the buyer module 110 and can be implemented as part of the buyer commerce server 120, or within an additional server (not explicitly shown).

The system 101 further provides an additional user interface to administrative users 5 through the administrative web server 125. The administrative web server 125 enables administrators 80 to interface to a top-level database 160. The top-level database 160 maintains data related to the vendors 10, buyers 50, CRS 13, and contractors 15 registered with the system 101. For example, the top-level database 160 can maintain vendor qualification data 162, buyer-defined vendor criteria data 164, CRS business information (BI) data 167, and contractor re-deployment data 166.

To access information related to the vendors 10, the administrative web server 125 uses a vendor module 145 to push web pages to the administrative browser 20d related to the vendors 10. For example, the vendor module 145 can access vendor qualification information 162 to qualify the vendors 10 for a particular buyer 50 or for a particular industry. Likewise, the administrative web server 125 can push web pages to the administrative browser 20d related to the buyer-defined vendor criteria information 164 through a buyer module 140 in order to qualify vendors 10 for a particular buyer 50. A contractor module 148 enables administrators 80 to access contractor re-deployment data 166 entered by contractors 15 through the buyer commerce server 120 and retrieved into the top-level database 160 from a contractor database 155. The re-deployment data 166 can include, for example, an indication of the mobility of the contractor, desired geographical areas, contractor skills, desired pay and other contractor information that can be used to assist administrators 80 in qualifying vendors 10 for buyers 50. A CRS module 146 enables administrators 80 to access CRS BI data 167 entered by the CRS 13 through the buyer commerce server 120 and retrieved into the top-level database 160 from a CRS database 155.

Figure 2:
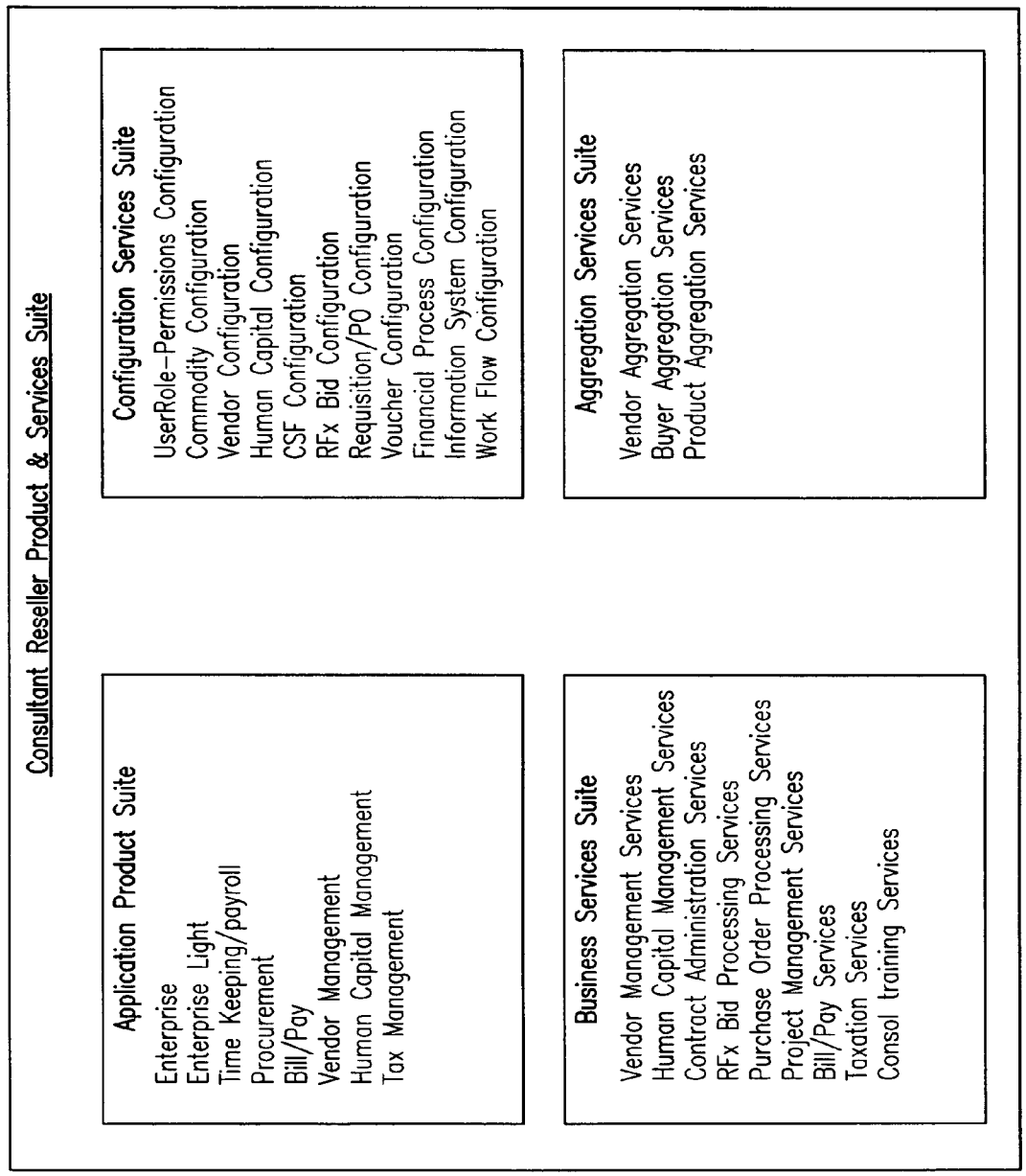
FIG. 2 is a diagram illustrating a consultant re-seller product and services suite in accordance with principles of the present invention.

FIG. 2 is a diagram illustrating a consultant re-seller product and services suite in accordance with principles of the present invention. Various embodiments of the invention may be conceptualized as a combination of sub-processes and sub-systems. These sub-processes and sub-systems may, in many instances, be used independently of one another to promote broader business support outside the scope of project work.

Figure 3:
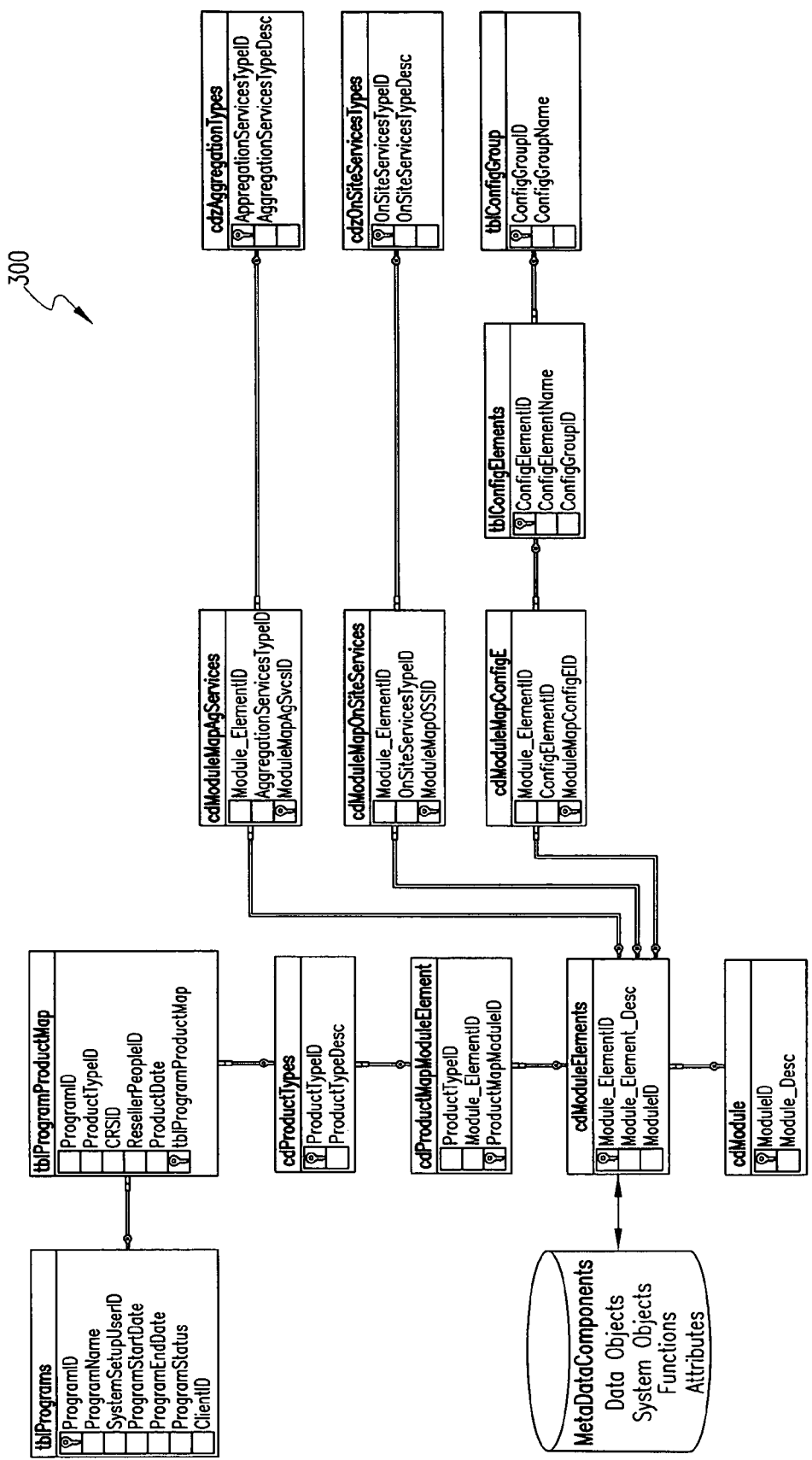
FIG. 3 illustrates a product resource management database schema that enables interoperability between buyer systems and CRS settings.

FIG. 3 illustrates a product resource management database schema that enables interoperability between buyer systems and CRS settings. Those having skill in the art will appreciate that a FIG. 3 illustrates a high-level interoperability structure between a buyer and environmental settings.

Figure 4:
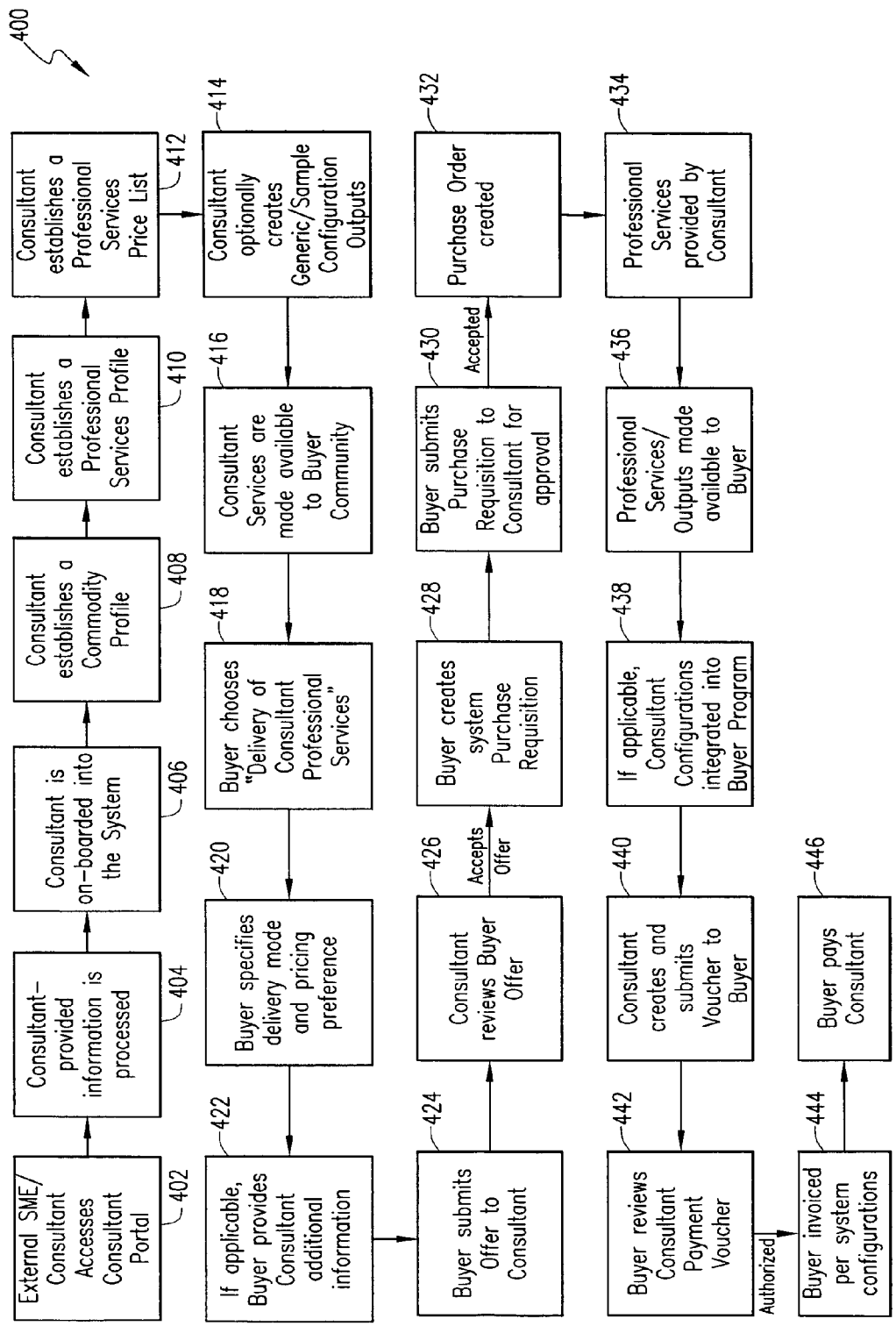
FIG. 4 is a flow diagram illustrating a high-level process for consultant re-seller services.

FIG. 4 is a flow diagram illustrating a high-level process for consultant re-seller services. A flow 400 begins at step 402, at which step an external subject matter expert (SME) consultant (e.g., a CRS) accesses a system consultant portal. At step 404, information provided by the consultant to the consultant portal is processed. At step 406, the consultant is on-boarded into a system in accordance with principles of the present invention. At step 408, the consultant establishes a commodity profile. At step 410, the consultant establishes a professional services profile. At step 412, the consultant establishes a professional services price list. At step 414, the consultant may optionally create generic/sample configuration outputs. At step 416, consultant services are made available to a buyer community. At step 418, the buyer chooses delivery of consultant professional services. At step 420, the buyer specifies delivery mode and pricing preference. At step 422, the buyer provides additional information to the consultant, if applicable. At step 424, the buyer submits an offer to the consultant. At step 426, the consultant reviews the buyer's offer; upon acceptance of the buyer's offer, the buyer creates a system purchase requisition at step 428. At step 430, the buyer submits a purchase requisition to the consultant for approval. Upon acceptance of the purchase requisition, a purchase order is created at step 432.

At step 434, professional services are provided by the consultant. At step 436, professional services/outputs are made available to the buyer. At step 438, if applicable, consultant configurations are integrated into the buyer program. At step 440 the consultant creates and submits a voucher to the buyer. At step 442, the buyer reviews the consultant payment voucher. Upon authorization of the consultant payment voucher, the buyer is invoiced per system configurations at step 444. At step 446, the buyer pays the consultant.

Referring now to Appendix A, which includes a plurality of tables in both a design view and a data view, design-view Tables 1 and 14 and data view Tables 1, 2-3, 7-8, and 10 are particularly pertinent to the discussion above relative to FIGS. 1-4. Tables 1-14 illustrate that each product includes a unique set of system components and objects. The data view Table 1 illustrates an exemplary product segmentation. An existing product segmentation is indicative of various BI container groups that may be provided by a CRS. In Table 4, specific modular elements can be matched directly to a product without forcing a default all-or-none via a relationship between product and module. Not all elements within a module need to be matched to a product. In Table 8, it will be apparent that configuration elements are associated with configuration groups. The referenced tables provide deeper insight into the entire Product Management Schema as depicted in FIG. 3. In addition, the content of the Module Elements will be apparent to one having skill in the art, as the database may be used to define and manage relationships between products and features and the Module Elements representing the business components or concepts employed. Configuration elements map to module elements, which in turn map to modules and up to a specific set of features of a system in accordance with principles of the invention.

Figure 5:
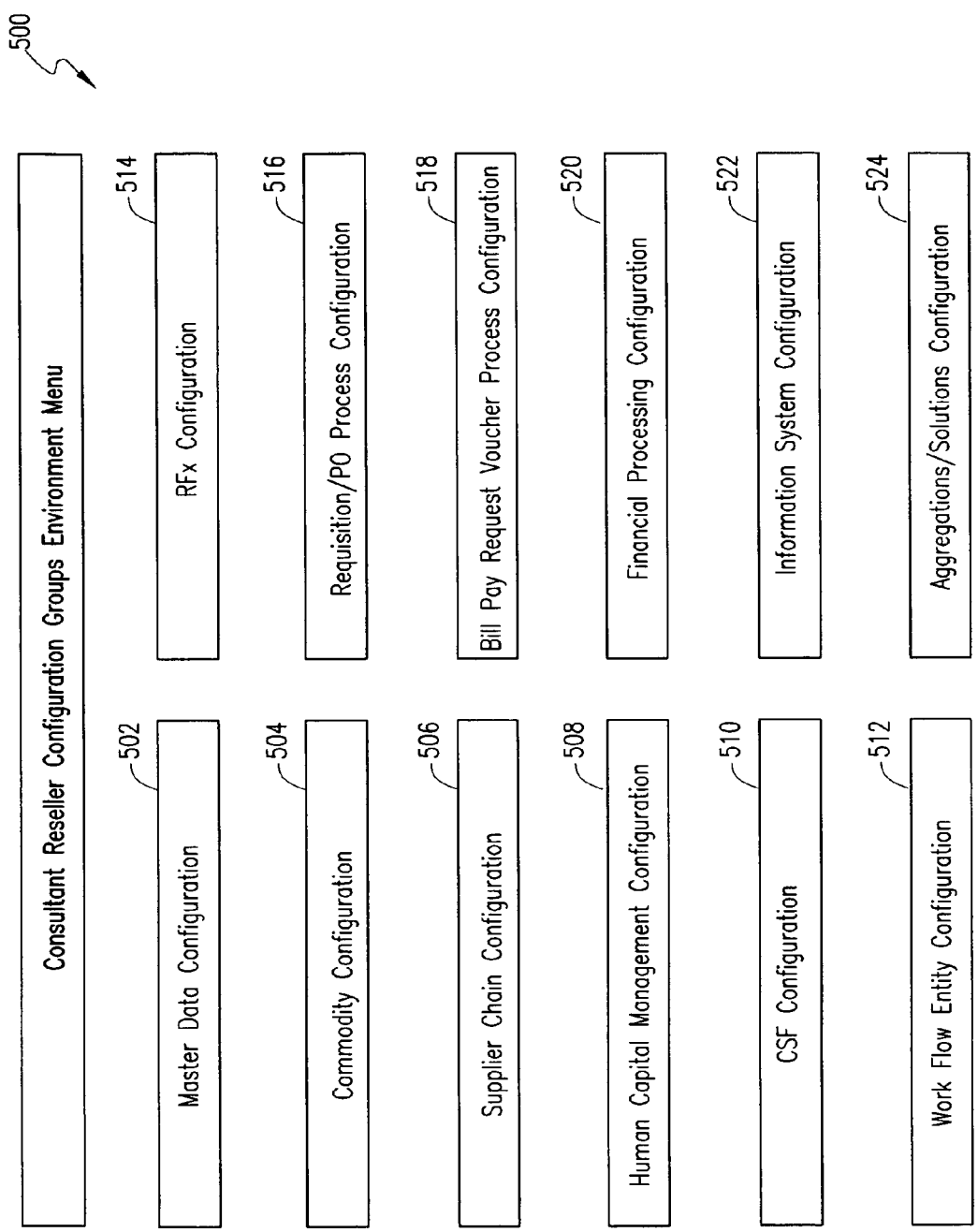
FIG. 5 is a diagram illustrating a consultant-reseller configuration groups environment menu.

FIG. 5 is a diagram illustrating a consultant-reseller configuration groups environment menu. For purposes of the present application, BI may include an individual's experiences, trade secrets, industry knowledge, and commodity knowledge. Various embodiments of the invention may be implemented in the contexts of electronic commerce as well as traditional commerce/procurement business systems, for example, for goods, non-employee personnel, and services. A given individual's BI may thus be considered to be an abstract entity in that it may exist independently, although typically not in a tangible or concrete form. Therefore, a content platform must be in place so that the BI can be documented in a format usable by a relational database. Without a tangibility framework, disparate and diverse storage containers, data tables, or text documents to house the BI would result. The tangibility framework is segmented into a plurality of core groups as illustrated in the consultant reseller configuration groups environment menu 500 of FIG. 5. The menu 500 includes a master data configuration module 502, a commodity configuration module 504, a supplier configuration module 506, a human capital management configuration module 508, a CSF configuration module 510, a work flow entity configuration module 512, an RFx-bid process configuration module 514, a requisition-purchase order process configuration module 516, a bill pay request voucher process configuration module 518, a financial processing configuration module 520, an information system-reporting configuration module 522, a solutions/aggregations module 524.

In various embodiments, one or more of the configuration modules 502-524 may be used in different ways to develop and store business information settings. A first mode is a simple mode in which configuration data created within one module element functions as a standalone setting. In the first mode, a CRS is, in effect, creating a setting that does not need to be joined with other settings to be used by a buyer entity. An example of this type of configuration would be when a CRS that has expertise in supplier management creates a setting that stores for a buyer entity general business qualifiers that the CRS recommends the buyer use.

A second mode uses configuration data from two or more configuration elements within one configuration module that are associated with each other to represent a setting for buyer entity utilization. In the second mode, a CRS is creating a setting that uses more than one configuration element. An example of this type of configuration would be when a CRS that has expertise in human capital procurement creates specific personnel skill profile(s) for a particular type of labor engagement and combines the profile(s) with applicable billing or pay rate information based upon the CRS's experiences. In this example, the CRS may choose, for example, to market the setting as a package to potential buyer entities.

A third mode uses configuration data from two or more configuration elements within a plurality of configuration modules that are associated with each other to represent a setting for buyer entity utilization. A bundle of settings can be represented as a CRS industry solution. In the third mode, the CRS may recognize value in creating multiple settings and relationships and sell to buyer entities a solution that does not need to be treated as a piece-meal or integral part of the buyer entity's commerce environment. Third-mode solutions tend to be vertical market-centric, such as when the CRS has specialized in-depth knowledge about, for example, a particular industry segment.

Interaction of the configuration modules and configuration elements is dynamic. Various embodiments of the invention may be loaded with pre-populated values within configuration modules/element data storage tables. A CRS or buyer entity may thus use all or a subset of the pre-populated values to create settings. On the other hand, the CRS or buyer entity may create new values based upon individual BI. There are no inherent limits relative to configuration elements that may be used in accordance with principles of the invention.

Custom configuration elements may, in various embodiments, be created to satisfy business needs, so long as the created custom configuration elements are associated with a system-designated configuration module or configuration element to insure interoperability during BI transfer from one environment to another, as is described in detail relative to FIGS. 51-53.

Figure 6:
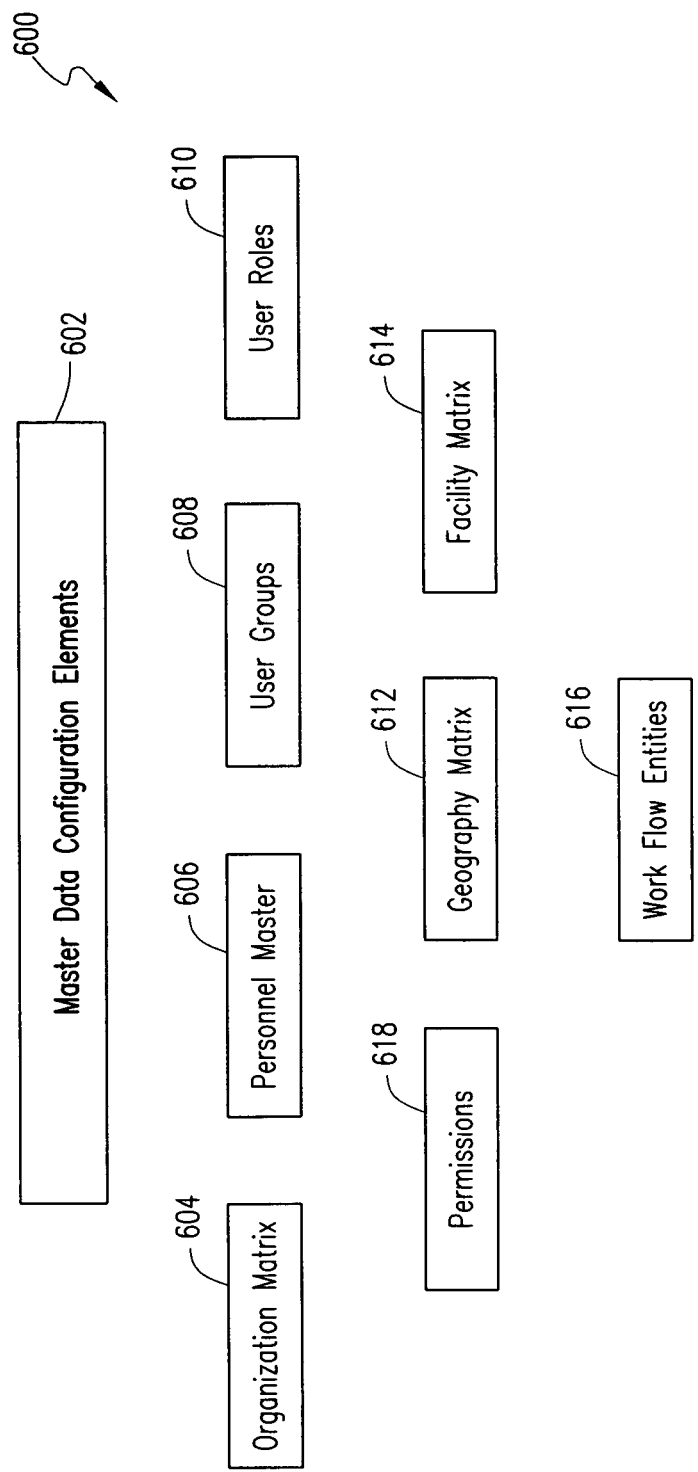
FIG. 6 is an exemplary visual representation of the CRS master data configuration elements.

FIG. 6 is an exemplary visual representation of CRS master data configuration elements. An element diagram 600 illustrates configuration elements contained within the master data configuration module 502. Illustrative types of BI that can be created and stored in various embodiments of the invention will be described. In some embodiments of the invention, a CRS establishes information buckets and, via selection of system-housed information values or creation of new custom values if needed, creates a CRS information library.

The master data configuration module 502 includes a plurality of master data configuration elements 602. The master data configuration elements 602 relate to the basic infrastructure of a buyer business organization or a CRS solution. Within the master data configuration module 502, a buyer organization and various personnel may be logically integrated into an e-commerce environment. The master data configuration elements 602 include an organization matrix element 604. The element 604 includes data storage containers by which a buyer entity may be defined relative to its organizational structure. For example, information regarding divisions, business units, cost centers, and their relationships may also be contained within the organization matrix element 604.

The master data configuration elements 602 include a personnel master configuration element 606, which includes data storage containers by which personnel within a buyer entity may be defined in terms of, for example, organizational alignment, organizational hierarchy, geography, work facility, and employee-non-employee status.

The master data configuration elements 602 also include a user groups configuration element 608, which includes data storage containers where buyer personnel are placed in groups to facilitate and manage data processing events. Examples of user groups include "Executives", "Line Managers", and "Administrators." User groups typically work in conjunction with user roles inasmuch as user groups tend to perform specific roles.

The master data configuration elements 602 also include a user roles configuration element 610, which includes data storage containers where specific buyer roles are defined premised upon the buyer's business model. Examples of user roles include "Timecard Approver", "Purchase Order Approver", "Supplier Manager", "Personnel Supervisor", and "ISO Compliance Coordinator."

The master data configuration elements 602 also include a geography matrix configuration element 612, which includes data storage containers defining the scope and layer definition of a buyer entity. For example: Is a buyer entity domestic or international? Does a buyer entity use a custom "regional" segmentation schema? Does a buyer entity use Mail/Zip Codes for business processing?

The master data configuration elements 602 also include a facility matrix configuration element 614, which includes data storage containers that identify and define attributes applicable to physical plants associated with a buyer entity. For example, information regarding facility activities, safety regulations, occupation constraints, and delivery access may be maintained within the element 614.

The master data configuration elements 602 also include a work flow entities configuration element 616, which includes information pertinent to core system work flow entities (e.g., documents/screens) used by a buyer entity, modified core system work flow entities, and custom work flow entities. Workflow entity configuration will be described in more detail below with respect to FIGS. 24-30. The master data configuration elements 602 also include a permissions configuration element 618, which includes information pertinent to buyer-entity permissions for access to various system functionality.

Although the configuration elements 604-618 are most often defined by a buyer entity, there are numerous scenarios where access to outside CRS BI settings could be of value. As one skilled in the art will appreciate, the configuration elements 604-618 may house general and detailed data about an individual buyer entity's organization and how the buyer entity interacts with both system-processing elements and other configuration modules. A CRS with expertise in, for example, business management, human capital management, facilities management, occupational health and safety management, and/or security management could conceivably provide valuable BI settings within the configuration module 502 that could be used by a buyer entity to optimize its business undertakings.

Figure 7:
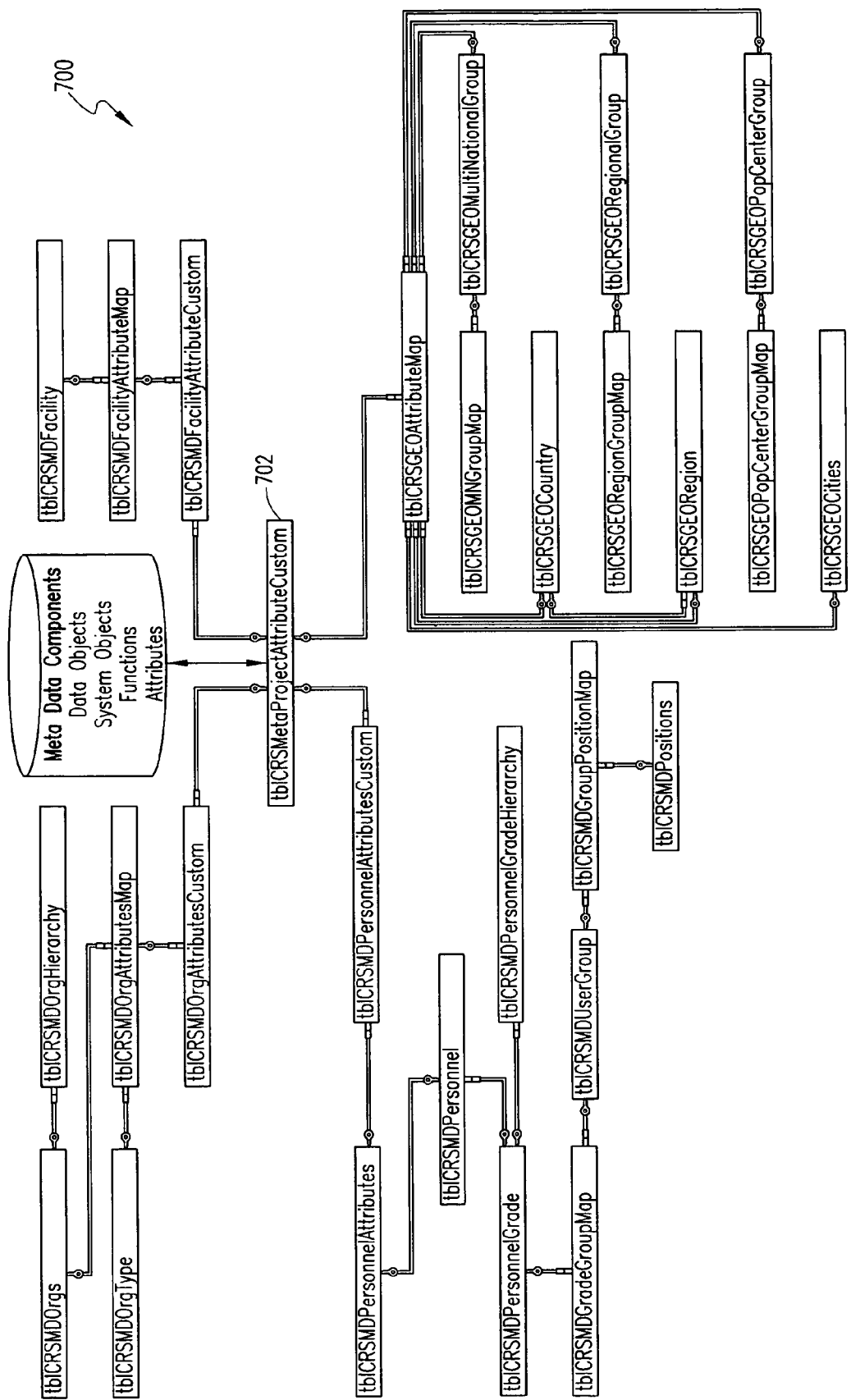
FIG. 7 is a diagram representing a database schema for the master data configuration module 502.

FIG. 7 is a diagram representing a database schema for the master data configuration module 502. A diagram 700 includes a table tblCRSMetaProjectAttributeCustom 702, which table serves as a metadata enabling engine that can store new configuration BI information in the form of new configuration elements or sub-elements and values associated therewith. For example, base personnel information is stored in one system table and another table houses attributes applicable to personnel, such as "Salary Range" or "Job Performance Rating." A CRS with expertise in psychology and economics might have insight into what aspects make, for example, for a good procurement buyer.

In the event that the system 101 does not already have tables or data fields to enable capture and analysis of this information, the CRS can use the metadata enabling engine 702 to create a new element or sub-element aligned with the personnel master configuration element 606 and define parameters of a new table object or group of tables to capture the requisite information. An illustrative manner in which the CRS could integrate the new object(s) into the system 101 will be described below relative to FIG. 22.

Referring again to the tables in Appendix A, design-view Tables 15-42 are particularly pertinent to the discussion above relative to FIGS. 6-7. Table 15 illustrates a mapping of a customization to an existing configuration element as well as to the creator thereof. In addition, via metadata and use of the SQL variant, specific values associated with a single data object need not necessarily be limited to a simple text input. For example, a CRS may create merely a new data field for an existing system table, but want the user to select a value from a group of pre-defined values. On the other hand, the value applicable to a data field "CRS Custom Attribute Value" could be much more complex and constitute an entire form or an entire embedded table unto itself.

Table 20 illustrates that not all information elements created by a CRS would necessarily be pertinent to all organizations. For example, certain information elements created to better define a financial organization may not be pertinent to a sales or procurement organization. Table 20 enables management of the various information elements. The CRS can unilaterally map in the aforementioned manner when the CRS creates the organization data. When utilized in conjunction with a buyer entity, the buyer entity may re-configure various relationships as needed.

Regarding Table 21, although "grade/levels" may not be a standard for employee differentiation, an off-the-shelf provided structure may be used to facilitate employee management. Moreover, other database keys could be used by a buyer entity to map employees to user groups or positions, for example. In Table 26, it is apparent that the illustrated configuration element is process and industry sensitive; therefore, it would typically be a primary BI storage receptacle. Table 29 enables automated mapping as opposed to performing manual/individual employee configuration. Table 34 illustrates exemplary global regions. Table 35 illustrates exemplary population centers.

Regarding User Roles, as indicated above, industry-specific user roles may be particularly appropriate for CRS configuration. For example, in the pharmaceutical industry, a user role such as "FDA Procedure Control Administrator" could be a custom added user role. Regarding Facilities, for example, a CRS with expertise in employee safety could define attributes applicable to OSHA rules and regulations as part of an information setting or as an entire information setting. Regarding Geography, a CRS with specific industry knowledge in, for instance, the oil and gas industry, would likely understand an optimized mode of setting up geographical trading groups aligned with how OPEC manages commerce affairs.

Figure 8:
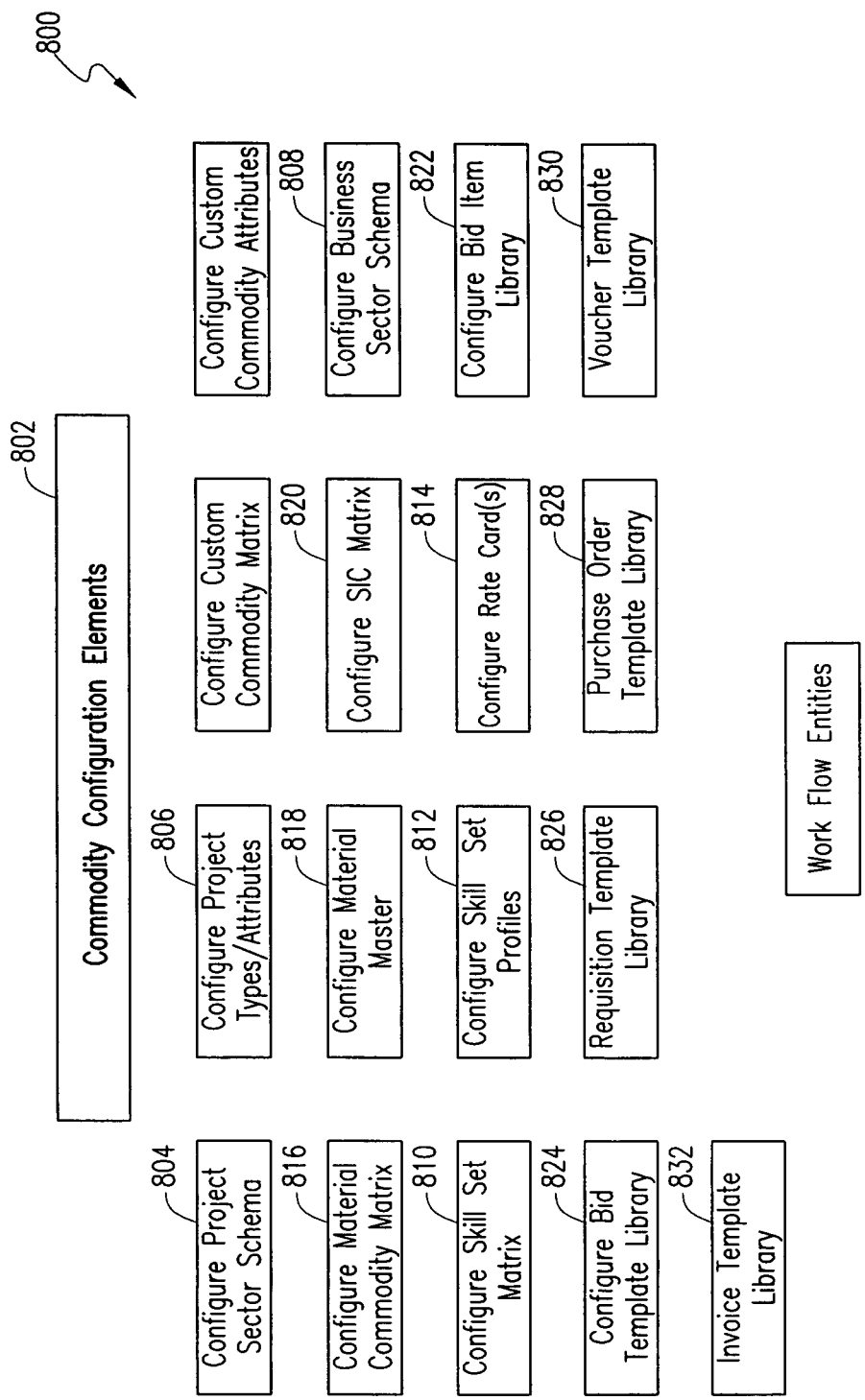
FIG. 8 is a visual representation of configuration elements contained within the commodity configuration module 504.

FIG. 8 is a visual representation of configuration elements contained within the commodity configuration module 504. The commodity configuration module 504 includes a plurality of commerce-management-centric configuration elements 802, as shown in a diagram 800. Commodity management is the cornerstone of effective vendor management, spend management, procurement management, and data management. Within the commodity configuration module 504, a buyer entity's commerce management framework is established.

The commodity configuration elements 802 include a project sector schema configuration element 804, which includes data storage containers and a hierarchical classification scheme that provide commodity definition for the vast array of project work activities typically undertaken by a buyer. Project work is often ignored relative to commoditization due to the often complex nature and co-mingled products and services that may be included within a single project. A standard off-the-shelf hierarchy may be represented by a two tier configuration structure including "Project Sector" as a master of "Project Family".

However, customized project work commoditization can be created via use of project sector hierarchy and project family hierarchy configuration sub-elements of the project sector schema configuration element 804. It should be noted that, although an off-the-shelf Project Sector/Family schema may be employed within various embodiments of the invention, the data structure enables expansion out, for example, to six tiers via a grandparent, parent, child, and grandchild relationship mapping schema, which enables a significantly more detailed project commoditization framework.

The commodity configuration elements 802 also include a Project Type/Attributes configuration element 806, which includes data storage containers and a commodity management scheme that defines types of procurement/project management mode(s) a buyer may use to better define and administer project work. Off-the-shelf project type/attributes include, for example, Project Types, Project Impact Codes, Project Events, Project Event Importance Codes, Project Status, Project Performance Status, Project Delivery Status, Project Delivery Quality, Project Phase(s), and Project Phase Status Codes. Through metadata configuration it is possible to create new project types/attributes and their associated values/content.

The commodity configuration elements 802 also include a Business Sector Schema configuration element 808, which includes data storage containers and a hierarchical classification scheme that provide commodity definition for the vast array of human capital that may be deployed within an enterprise. A standard off-the-shelf hierarchy is represented by a three-tier structure including: Business Sector-Business Arena-Business Family.

The commodity configuration elements 802 also include a Skill Set Matrix configuration element 810, which includes data storage containers and a hierarchical classification scheme that provides skill set definition and standardization in a database format for human capital within an enterprise. The skills matrix is an independent child classification scheme of the Business Sector Schema including General Functions, Skill Categories, and Skills/Attributes.

The commodity configuration elements 802 also include a Skill Set Profiles configuration element 812, which includes a library of stored personnel skill set profiles premised upon the business sector and skill set matrix schemas, used to manage specific business aspects relevant to procurement and human capital. A skill set profile is a stored collection of specific General Functions and Skills/Attributes representing the qualifications and capabilities necessary to perform a specific task or set of tasks. The skill set profile is typically associated with the business sector schema to provide human capital commodity management support. The metadata function applicable to this "configuration bucket" enables CRS input, for example, of skills/attributes and general functions. The CRS can rapidly add Human Capital Profile data to complement an off-the-shelf library of skills/attributes. The CRS has enabled options of using existing off-the-shelf data values and profiles to be used on their own or in various combinations.

The commodity configuration elements 802 also include a Rate Cards configuration element 814, which includes a library of stored pay and/or billing rate data applicable to one or more stored Skill Set Profile. The rate card data sets can be variably configured off-the-shelf to store information applicable, for example, to: "Geography" (County, Region, City, etc), "Laborer Type", "Pay Scale Type", "Industry Sector", "Engagement Team Role" and "Work Environment." If the variables are not consistent with the full range of business requirements, however, additional pricing variables can be developed and stored via metadata configuration. In various embodiments of the invention, rate cards can be developed by the CRS in multiple modes. For instance, the CRS can generate rate cards applicable to off-the-shelf Skill Profiles or custom-created Skill Profiles that have been stored by the CRS. The functionality described herein, though just a limited piece of all potential configuration modules, could constitute an entire business endeavor for the CRS whose expertise is, for example, Human Capital Procurement.

The commodity configuration elements 802 also include a Materials Schema configuration element 816, which includes data storage containers and a hierarchical classification scheme applicable to specific material commodities used by a buyer entity. A standard off-the-shelf hierarchy is represented by a three tier structure including Material Group, Material Class, and Material.

The commodity configuration elements 802 also include a Materials Master/Catalog 818, which includes data storage containers housing specific details relative to specific line item material goods used by a buyer entity.

The commodity configuration elements 802 also include a SIC/NAICS Schema configuration element 820, which includes data storage containers and a hierarchical classification scheme applicable to generic commercial commoditization. This schema is very flexible in that multiple commodity management schemas can be utilized by both CRS and Buyer Entities due to the logical mapping structure. In other words, a buyer entity may employ a standard commodity structure (off-the-shelf or custom-configured) and utilize other CRS commodity management schemes while having all variants mapped into the master structure so as to not disrupt their commodity-management endeavors.

The commodity configuration elements 802 also include a Bid Item Library configuration element 822, which includes data storage containers housing the identity and specific attributes applicable to Bid Items that could be used by a buyer entity to go out for quote to suppliers. Off-the-shelf attributes are detailed in U.S. patent application Ser. No. 10/262,487.

The commodity configuration elements 802 also include a Bid Template Library configuration element 824, which includes a bid template. A bid template is a collection of bid items logically placed together so that a completed request for quote/bid/information (RFx) can be issued to one or more suppliers. The Bid Template Library represents the total collection of a buyer entity's individual bid templates. In various embodiments of the invention, a CRS may build and maintain their own Bid Item and Bid Template Libraries, which permits Buyer Entities to access concise and pertinent RFx Bid packages for products and or services where they do not have the expertise to generate same on their own accord.

The commodity configuration elements 802 also include a Requisition Template Library configuration element 826. Buyer entities often use various data processing formats to facilitate purchase requisition processing due to diverse commodities or diverse internal procedures. The Requisition Template Library is the data storage container housing the identity and specific details associated with a buyer entity's Purchase Requisition Template(s).

The commodity configuration elements 802 also include a Purchase Order Template Library configuration element 828. Buyer entities often use various data processing formats to facilitate purchase order processing due to diverse commodities or diverse internal procedures. The Purchase Order Template Library is the data storage container housing the identity and specific details associated with a buyer entity's Purchase Order Template(s).

The commodity configuration elements 802 also include a Voucher Template Library configuration element 830. Buyer entities often use various data processing formats to facilitate supplier bill/pay request (i.e., Voucher) processing due to diverse commodities or diverse internal procedures. The Voucher Template Library is the data storage container housing the identity and specific details associated with a buyer entity's Bill/Pay Request Template(s).

The commodity configuration elements 802 also include a Invoice Template Library configuration element 832. Buyer entities often use various data processing formats to facilitate invoice processing due to diverse commodities or diverse internal procedures. Subsequently the Invoice Template Library is the data storage containers housing the identity and specific details associated with a buyer entity's Invoice Template(s).

Those having skill in the art will appreciate that the configuration elements 804-832 may be used to facilitate creation of settings that enable the buyer entity to adequately manage their commerce needs relative to the procurement of goods, contract services, labor, and project work. The module 504 enables a buyer entity to set up an information framework that ultimately defines how the buyer entity views the commerce sector.

The commodity configuration module 504 offers opportunities for both CRS as well as buyer entities. CRS likely to use this module include Procurement Specialists, Project Management Specialists, and those CRS with expertise in vertical business markets (e.g., energy or telecommunications fields) where specific market information is critical to procurement data processing and/or pricing management of goods/services/labor or deliverable quality.

FIG. 9 is an exemplary data schema used for the Project Sector and Project Type configuration elements.

FIG. 10 is an exemplary data schema used for the Business Sector, Skill Set Matrix, Skill Profiles, and Rate Cards configuration elements.

FIG. 11 is an exemplary data schema used for the SIC Matrix, Material Commodity Matrix, Material Master, Custom Commodity Matrix and Custom Commodity Attributes configuration elements.

FIG. 12 is an exemplary data schema used for the Bid Item Library and Bid Item Templates configuration elements. In various embodiments of the invention, the Bid Library Systems are pure metadata sub-systems unto themselves with each configuration representing a dynamic permutation within the sub-system.

Referring again to Appendix A, design-view Tables 43-98 and data-view Tables 46-58 are particularly pertinent to the discussion above relative to FIGS. 8-12. In particular, data-view Table 46 illustrates a hierarchy that can be either a parent or grandparent type, which dictates that an existing relationship between project sector and family cannot be broken but does allow for an expanded commoditization. Tables 48 illustrates a hierarchy that can be either a child or grandparent type, which dictates that an existing relationship between project sector and family cannot be broken, but does allow for an expanded commoditization.

FIG. 13 is a visual representation of configuration elements contained within the supplier configuration module. The supplier configuration module 506 represents the means by which a buyer entity can manage all facets of supplier management relative to their commerce environment. Various business aspects of supplier management, from specific liability protection through strategic supplier spend management, can be achieved within the configuration elements if the necessary business information to do so is available.

From a CRS, configuration elements 1302 of the supplier configuration module 506 are ripe for utilization by those individuals with expertise in, for example, procurement, supplier management, contract management, business law, and government affairs, as well as individuals with specific business information relative to distinct vertical business markets. Within the supplier configuration module 506, supplier management settings can be configured in a flexible manner to meet a broad range of business needs.

The supplier configuration elements 1302 include a Supplier Types configuration element 1304, which includes data storage containers that house supplier typecasting data as well as attributes of the legalized supplier business entity. There are numerous variables that can affect how a supplier is to be classified or typecast. An exemplary off-the-shelf variable list includes "Legalized Entity Type, "Diversified Business Entity Type", "Supplier Certifications", "Supplier Business Associations Membership", "Supplier Industry Affiliation", "Supplier Licensing", and "Supplier Labor Union Affiliations".

The supplier configuration elements 1302 include a Supplier Business Qualifiers configuration element 1306, which includes data storage containers that house pertinent details relative to specific business qualification requirements of a supplier or group/type of suppliers. Examples of Business Qualifiers are "Net Worth", "Tax ID", "D&B ID", "Years In Business", and "# of Customers." Classification data used in the Supplier Types configuration element 1304 can also be used in the variable mix as business qualifiers.

The supplier configuration elements 1302 include a Supplier Insurance Qualifiers configuration element 1308, which includes data storage containers that house pertinent details relative to the specific business insurance qualification requirements of a supplier or group/type of suppliers. Examples of Business Insurance Types are "General Liability", "Errors & Omissions", "Automotive", and "Employee Dishonesty."

The supplier configuration elements 1302 include a Supplier Facilities configuration element 1310, which includes data storage containers that house pertinent details and attributes relative to specific facilities types for a supplier or group of suppliers. Examples of Supplier Facility Types are "Administrative/Financial Processing Facility", "R&D Facility", "Training Facility", and "Distribution/Warehousing Facility." Although the average business person may be able to construct a fairly comprehensive generic supplier facility list, the relationship between facility type used and specific attributes of those facilities typically varies greatly from industry to industry.

The supplier configuration elements 1302 include a Supplier Agreements configuration element 1312, which includes data storage containers that house pertinent details relative to Supplier Agreements. Although many buyer enterprises use generic or boiler plate agreement templates, different industries and activities expose a buyer entity to varying levels of liability exposure. Thus, it would be optimal to maintain a "Supplier Agreement Library" that houses specific agreements for specific business needs. Examples of Supplier Agreements are "Non-Disclosure" (NDA) and "Master Services" (MSA). Often even large enterprises with sufficient legal support fail to adequately maintain a proper agreements library. Most small to medium buyer enterprises do not have the resources to carry internal legal support and subsequently run the greatest liability risks.

The supplier configuration elements 1302 include a Supplier Audit Rules configuration element 1314, which includes data storage containers that house pertinent details relative to a buyer entity's Supplier Audit Rules. Rules such as audit types, audit frequency, audit documentation requirements, may be stored in the configuration element 1314. A rudimentary example would be as follows: Rule=A supplier of temporary labor audit rule. Confirmation of temporary laborer tax withholdings. Frequency=Upon the third time card submitted by the temporary employee. Documentation=Copy of laborer pay stub and filed W-2.

The supplier configuration elements 1302 include a Supplier Business Waivers configuration element 1316, which includes data storage containers that house pertinent details relative to a buyer entity's Supplier Business Waiver Rules. Business qualification waivers are often granted to a specific supplier or a group of suppliers to either foster strategic supplier utilization or meet industry or governmental regulations. An example of a simple supplier business qualification waiver would be: Business Requirement: Supplier Net Worth >$1,000,000. Exception/Waiver Rule 1: Supplier Attribute=Diversified Business. Entity Exception/Waiver Rule 1: RFx Applicable to Government Solutions Organization. There are numerous occasions in which it makes sense to grant business qualification waivers, but only to those who are, for example, skilled in a specific industry, governmental affairs, or specific economic zoned geographical locations.

The supplier configuration elements 1302 include a Supplier Tiers configuration element 1318, which includes data storage containers that house the supplier tier structure and pertinent attributes applicable to the tiers. Procurement and Supplier Management professionals understand fully the difference between strategic and tactical commerce solutions. Because so much of a buyer entity's success can be directly related to the effectiveness of their spend management strategy, it is common to employ strategic supplier spend methods. Many ancillary objectives drive supplier tiering. Samples of these motives are "Development of a supply partner base", "Local supplier based support", "Diversified supplier based support", and "Discount leveraging."

The supplier configuration elements 1302 include a Supplier Services Matrix configuration element 1320, which includes data storage containers that house details pertinent to how a buyer entity uses suppliers within its commerce system. The configuration element 1320 may combine details from other configuration elements to map out which suppliers will be used, for provision of what types of goods or services, in which geographical facilities to support which buyer entity facilities and organizations. Settings within the configuration element 1320 may be used to dictate on a regular basis how and with whom a buyer entity conducts business.

FIG. 14 is an exemplary data schema used for the supplier configuration module 506.

Referring again to Appendix A, design-view Tables 99-124 and 15 are particularly pertinent to the discussion above relative to FIGS. 13-14.

FIG. 15 is a visual representation of a plurality of configuration elements 1502 contained within the human capital management configuration module 508. Increased utilization of temporary labor in recent years has changed the rules of procurement and human resources management. Within the configuration module 508, a CRS can tailor the rules and regulations of human capital procurement and engagement management to meet the needs of their specific buyer entity and environment. CRS that may leverage the configuration elements 1502 typically have expertise in Human Resource Management, Project Management, Procurement, Labor Law, or Finance.

Business enterprises have changed significantly over the last two decades to meet the growing demand to keep pace technologically and economically in the face of growing global competition. One significant change is the manner in which today's enterprise employs labor or human capital. Today's business environment often calls for the greater utilization of temporary or contract labor, as well as outsourcing programs for business endeavors considered to be non-core to the enterprise. The aforementioned changes do not come without risks. Liability exposure is often far greater, which may place tremendous stress upon an enterprise. Within the configuration module 508, a buyer entity can put into place settings that may serve to significantly reduce this liability exposure.

The human capital management configuration elements 1502 include a Worker Types configuration element 1504, which includes data storage containers housing the types and applicable attributes of worker types employed within a buyer entity. Examples of Worker Types are "Supplier Employee Contract Laborer", "Independent Contractor (1099)", "Non-bridged Retiree", "Consultant", "Project Team Member", "Intern", and "H-1 Visa." There are reasons why these designations, among others, may be used; in many cases, the worker type will determine how the buyer entity interacts, or does not interact, with a given worker.

The human capital management configuration elements 1502 include a Worker Qualifiers configuration element 1506, which includes data storage containers housing details pertinent to worker qualifiers. The worker qualifiers are often specific to the worker type, but need not always be. Examples of Worker Qualifiers are "Citizenship", "Education", "Trade Certification", "Vision Capability", "Language Spoken", "Drug Screen", and "Background Check."

The human capital management configuration elements 1502 include a Worker Agreements configuration element 1508, which includes data storage containers housing details pertinent to worker agreements. Similar to Supplier Agreements in intent, examples of Worker Agreements are "Acknowledgement of Temporary Work Assignment" (ATW), "business information" (BI), "Non-Disclosure" (NDA), and "Payment of Tax Agreement." Also akin to the supplier agreement mode is the fact that many agreements will be specific to worker type. For instance, many buyer entities will not secure a "Worker Payment of Tax" agreement unless there is a taxation risk, such as with an Independent Contractor.

The human capital management configuration elements 1502 include a Worker Tenure configuration element 1510, which includes data storage containers housing details pertinent to worker tenure limits. Many enterprises have been beset with temporary worker legal actions. However, there are steps that can be taken to mitigate and even eliminate certain co-employment risks. One of these mitigation areas is limiting the relationship time frame (i.e., engagement period) between the buyer entity and used temporary laborers; however, this is a balancing act. In many cases, tenure is dictated by a variety of factors.

The human capital management configuration elements 1502 include a Worker Onboarding Requirements configuration element 1512, which includes data storage containers housing details pertinent to worker onboarding requirements, meaning those procedures and protocols that are followed when a new laborer is engaged by the enterprise. These requirements should be tailored, for example, according to the laborer type, engaging facility, work to be performed, and security aspects. Examples of Onboarding Requirements are Orientation/Training Attendance, Completion of emergency contact check list, Safety Dress/Equipment Check List, and Asset Issuance Check List.

The human capital management configuration elements 1502 include a Worker Offboarding Requirements configuration element 1514, which includes data storage containers housing details pertinent to worker offboarding requirements, meaning those procedures and protocols that are followed when the new laborer is disengaged by the enterprise. These offboarding Requirements, like onboarding requirements, should be representative of the engagement particulars.

The human capital management configuration elements 1502 include a Worker Labor Types configuration element 1516, which includes data storage containers housing details pertinent to the allowable labor billing types used within the buyer entity system. Because various industries often work in conditions, it is often preferable to establish first those labor types that are to be encountered. Oftentimes the administrative and legislative aspects of labor are overlooked or ignored, creating administrative and even legal problems for the enterprise. Examples of Worker labor Types are "Straight Time", "Over Time At Time & One Half", "Night Shift Differential", and "Professional Work Day 10 Hours."

The human capital management configuration elements 1502 include a Worker Expense Types configuration element 1518, which includes data storage containers housing details pertinent to the allowable labor related expense types used within the buyer entity system. Due to variances within industries and engagement work performed, it is sometimes preferable, to establish up front what allowable expenses will be authorized by the buyer entity. Examples of Worker Expense Types are Per Diem, Travel, Phone, Mileage, Meals, and Living. Oftentimes unaware buyers fail to address the issue of expense or do so in a haphazard manner resulting in additional costs to the enterprise.

The human capital management configuration elements 1502 include a Worker Location Rules configuration element 1520, which includes data storage containers housing details pertinent to Worker Rules relative to individual buyer or buyer client locations or groups of locations. The rules typically deal with matters of security, safety, business information, or training.

The human capital management configuration elements 1502 include a Worker Audit Rules configuration element 1522, which includes data storage containers housing details pertinent to Worker Audit Rules used by the buyer entity. There are often no audit rules established by buyer entities relative to workers. Examples of Worker Audit Types include "Tax Filing", "Proof of Employment with Supplier of record", "Current Driving License", and "Current Right To Work Proof.".

The human capital management configuration elements 1502 include a Worker Waivers configuration element 1524, which includes data storage containers housing details pertinent to Worker Rule Waivers. As is the case with suppliers, there may be business or hardship issues that call for a temporary relaxation of documented business rules. Within the configuration element 1524, the waivers can be established and rules set up to govern their utilization in a structured manner within the buyer entity.

FIG. 16 is an exemplary data schema used for the Human Capital Management Configuration Module.

Referring again to Appendix A, design-view Tables 125-144 and 15 are particularly pertinent to the discussion above relative to FIGS. 15-16.

FIG. 17 is a visual representation of financial processing configuration elements 1702 contained within the financial processing configuration module 520. Financial aspects represented within the configuration module 520 relate to commercial or spend management. Enterprises often overlook opportunities for realizing savings. In fact, many large enterprise business systems do not account for these types of configuration elements. Within the configuration module 520, the buyer entity's rules and protocols concerning financial transactions are set up and administered.

The financial processing configuration elements 1702 include a Project Spending Types configuration element 1704, which includes data storage containers housing details associated with the various spending allocations that can be made relative to project work. Examples of Money Spending Types are Human Capital Labor, Worker Related Expenses, Fixed Price Deliverables, and Materials. The importance of these spending types becomes apparent when large sums of money are allocated for project work and project work is used as the lowest level of commodity spending classification.

The financial processing configuration elements 1702 include a Currencies configuration element 1706, which includes data storage containers housing details associated with the various spending currencies used by a buyer enterprise. In many instances, enterprises standardize on one or a few currencies due to personal experience or accounting-system limitations. However, there are many commerce situations where transactions should be conducted in specific currencies. When enterprises cannot or do not understand this, there is typically a premium paid.

The financial processing configuration elements 1702 include a Payment Terms configuration element 1708, which includes data storage containers housing details associated with the various payment terms used by the enterprise. Payment terms used as standards within one industry may be completely unknown to many buyer entities that lack that specific knowledge, which may prevent the buyer entity from taking advantage of favorable accounting payment terms available.

The financial processing configuration elements 1702 include a Rebate Terms configuration element 1710, which includes data storage containers housing details associated with the various volume rebate terms used by the enterprise. Although the use of volume rebates is widespread, the utilization thereof is typically quite distinct within specific vertical markets, which may prevent the buyer entity from taking advantage of favorable volume rebate terms available.

The financial processing configuration elements 1702 include a Discount Terms configuration element 1712, which includes data storage containers housing details associated with the various discount terms used by the enterprise. Many buyer entities are unaware that certain industries such as, for example, the motor and inter-modal freight carriage industries, have pricing that is discounted. These standard discounts vary by commodity line, short vs. long haul, and geography. The buyer entities that do not know of these types of discounts often pay full list or tariff rates.

The financial processing configuration elements 1702 include a Non-Delivery Terms configuration element 1713, which includes data storage containers housing details associated with the various supplier non-performance/non-delivery terms used by the enterprise. Different industries and different types of projects or contract work within the industries are saddled with varying levels of risk and liabilities. Many buyer entities do not know that these industries may also have distinct supplier non-performance penalty models, which may be detrimental to a buyer entity.

The financial processing configuration elements 1702 include a Billing File configuration element 1716, which includes data storage containers housing details associated with the billing file(s) used by a buyer entity. The financial configuration elements 1702 include an EDI Formatting configuration element 1716, which includes data storage containers housing details associated with the EDI file(s) used by a buyer entity.

The financial processing configuration elements 1702 include a Accrual Rules configuration element 1718, which includes data storage containers housing details associated with the accrual rules and protocols used by a buyer entity. Although accrual rules need to be tailored after General Accepted Accounting Principles, savings can often be realized once proper procurement tracking and configuration is made. Many buyer entities do not have the adequate expertise or systems to leverage these savings opportunities.

The financial processing configuration elements 1702 include a Tax Classes configuration element 1720, which includes data storage containers housing details associated with taxation classes used by a buyer entity. Oftentimes, complex and or vague taxation regulations enforced at federal, state, or local levels, cause problems for buying entities that do not have the expertise to manage taxation properly. This lack of expertise may causes financial losses as well as increased liabilities to the buyer entity.

The financial processing configuration elements 1702 include a Tax Exceptions configuration element 1722, which includes data storage containers housing details associated with taxation exception rules and protocols used by a buyer entity. Misunderstanding under what circumstances taxation is not applicable may result in lost savings opportunities to buyer entities.

The financial processing configuration elements 1702 include an Approval Matrix configuration element 1724, which includes data storage containers housing details associated with financial transaction processing approval rules and protocols used by a buyer entity. The financial configuration elements 1702 include an Operational Non-Compliance Rules configuration element 1726, which includes data storage containers housing details associated with organizational non-compliance with established financial transaction processing approval rules and protocols used by a buyer entity.

FIG. 18 is an exemplary data schema used for the Financial Processing Configuration Module.

Referring again to Appendix A, design-view Tables 145-163 and 15 are considered particularly pertinent to the above discussion relative to FIG. 17-18.

FIG. 19 is a visual representation of configuration elements contained within the collateral source field (CSF) Configuration Module 510. Those having skill in the art will note within various data table structures and data model figures reference to a metadata component. Various embodiments of the invention come with inherent data model and structures; if nothing else were included therein, a CRS would be left with only providing BI applicable to those provided data model and structures. Metadata enables the CRS to add value to existing value collections inherent to the embodiment. For example, a CRS may add a new supplier legal entity type that is not typically known. A CRS may also, for example, add attributes applicable to specific data elements that are not inherent to the system. For example, a CRS may add additional field data applicable to a personnel record. A CRS may also add new data objects as well as applicable attributes that are not inherent to the embodiment. For example, a CRS may add a new data parameter to the resource profile rate card with its own supporting base data.

Many currently-available enterprise applications (e.g., SAP, ORACLE) have certified bolt-on packages numbering in the thousands to accommodate various functional nuances. In most cases these bolt-on packages are industry solutions that dictate slight variations pertinent to system data structures and process engineering. The metadata approach used in various embodiments of the invention addresses the data structure issue and enables a CRS to develop and store the nuances within a common environment. Typical practice within the art has been for buyers to have consultants establish these nuances within the consultant's own environment only via on-site configuration or through introduction of additional software.

Perhaps the most overlooked business optimization opportunity lies in the typical enterprise's lack of understanding or the ability to leverage collateral data. A typical business environment/system plans to acquire and use specific data elements during the course of business processing that are necessary for primary functional organizations such as, for example, purchasing, accounting, finance, budgeting however, what is often overlooked (e.g., because of ignorance or data-processing restrictions) is acquisition, storage, and utilization of critical (but usually designated non-core) business information.

Business systems are designed to process transactions and acquire specific data elements; however, in most cases, specific types of transactions/events mandate the acquisition of additional information that may or may not be pre-defined. Furthermore, the typical business system cannot accommodate the data processing of the ancillary information. Therefore, manual work-arounds or additional systems are used and, in many cases, the ancillary information is in effect ignored. The CSF configuration module 510 represents a dynamic expansion function enabling data processing and information management outside the restrictions of primary system database configuration. Within the configuration module 510, many types of collateral data elements applicable to the buyer entity's environment are identified, given attributes, and integrated into various relevant business processes premised upon configured rules.

Returning to FIG. 19, the CSF configuration element 1902 includes a CSF Class/Types configuration element 1904, which includes data storage containers housing the identity and details applicable to CSF Class/Types existing within the CSR environment. Examples of General CSF Class/Types are "Master Data CSFs", "Commodity Management CSFs", "Supplier Management CSFs", "Human Capital Management CSFs", "Financial CSFs". Samples of Specific CSF Class/Types are: "Model/Serial Numbers", "Project Codes", "Task Codes", "Client Commodity Codes", "Tax Codes", "UPC", and Phone Numbers. Class/Type relationships may also established; in other words, one CSF class may depend upon another in a parent/child relationship. One purpose of using a structure relative to CSFs is to facilitate usage and data management. There will be typical uses for specific types of data during different processes. Putting these diverse data elements into a management structure enables proper association of either individual or groups of CSF data to the processing events.

The CSF configuration elements 1902 include a CSF Value Library configuration element 1906, which includes data storage containers housing the details applicable to specific CSF values existing within a buyer entity environment. These values are applicable to a defined CSF Class/Type. Some CSF values dependent upon utilization may be acquired at the point of transaction and may be unknown to a buyer entity, such as a specific "UPC", Uniform Product Code, purchased by an employee while on business-related travel. In contrast, other CSF data fields may be controlled by the buyer entity, such as, for example, which general ledger expense code to use for a transaction type. In the latter case, a buyer entity employee may have options as to which specific CSF value to use during data processing, which would mean that the options would need to pre-exist so that a selection could be made. The pre-existing CSF value options are contained within the CSF Value library.

The CSF configuration elements 1902 include a CSF Map Organization configuration element 1908, which includes data storage containers housing the relationship between CSF Class/Types and buyer entity organizations. It is not uncommon within a buyer entity to have different collateral data management needs for distinct organizational elements; therefore, relationships are created to facilitate data processing and data acquisition.

The CSF configuration elements 1902 include a CSF Map Commodity configuration element 1910, which includes data storage containers housing the relationship between CSF Class/Types and specific commodity items or groups. Certain commodities, such as some goods, for example, have associated data attributes (e.g., Model Number, Serial Number) that should be managed. Other commodities, such as Project Services, have other collateral data attribute associations, such as, for example, Project Number and Task Number.

The CSF configuration elements 1902 include a CSF Map Spending Type configuration element 1912, which includes data storage containers housing the relationship between CSF Class/Types and Commercial Spending Types. Once the full range of CSFs is established, the CSFs may be logically mapped to Commercial Transaction Types so that data acquisition is complete and accurate. Some CSFs typically are applicable to a limited number of transactions. For example a "Model/Serial Number" is pertinent to a procured material while a "Client Facility Non-Access Reason" is applicable to a client service call/visit. The CSF Types should be made available only to a buyer entity's personnel under appropriate conditions.

Those having skill in the art will appreciate that the examples of CSF relationship mapping described herein are exemplary and do not constitute the full potential extent of CSF utilization. A CSF can be established and used in conjunction with any other configuration element, given that the configuration element participates within a work flow entity.

The CSF configuration elements 1902 include a CSF Map Work Flow configuration element 1914, which includes data storage containers housing the relationship between CSF Class/Types and Application Work Flow elements.

FIG. 20 is an exemplary data schema used for the Collateral Data-CSF Management Configuration Module. CSF mapping to organizations and commodities items are presented in FIG. 20 for exemplary purposes. CSFs can be inherited by any modular configuration element(s) to be used in conjunction with any established work flow entity.

Referring again to Appendix A, design-view Tables 164-173 are considered particularly pertinent to the discussion above relative to FIGS. 19-20.

Hereinabove, various types of CRS information components that can be manipulated to optimize commerce solutions are described. Herein below an implementation methodology will be described that allows a CRS to establish working information elements, create applicable relationships, position the information elements onto application work flow entities, and engineer process models in order to create a complete and integrated commerce processing model. Various embodiments of the invention have inherent operational components and may run in a buyer environment independent of any CRS BI Settings. Thus, existing data, work flow entities, and process designs may be integral to the buyer environment.

In various embodiments, each configuration module includes complete data structures and off-the-shelf supporting data value libraries applicable to one or more configuration elements described herein. In accordance with principles of the invention, the CRS may, for example, work at the buyer-entity site where applicable or may instead work remotely through a buyer-entity administrative tool.

A CRS need not necessarily use all the innovations described herein to establish useful settings. For instance, a CRS value proposition may lie in the information provided that could work in conjunction with inherent system data structures, work flow entities, and processes. For example, a CRS might develop specific skill profiles including existing system skills/attributes that are and of value to a buyer in need of such labor type profiling. A CRS need not necessarily work the methods to the most complex degrees possible to be effective.

Referring again to the FIGURES, FIG. 21 is an exemplary high-level process flow depicting an overall CRS BI configuration process. In FIG. 21, a process 2100 is illustrated. A review of the process 2100 demonstrates that CRS BI may be considered to be a collection of information components and values that are integrated into specific work flow containers. The specific work flow containers are molded into designed processes and offered to a buyer community to facilitate the buyer entity's business endeavors. A work flow entity (WFE) may be any form or system interface container by which a user is able to access information, process information, perform an action, or otherwise interface with the system's data object set.

The process 2100 begins at step 2102. At step 2102, configuration elements and/or sub-elements (i.e., information components) are selected. At step 2104, the information components are configured. In other words, at step 2104, a value library is established and associations and information settings are created.

At step 2106, the information settings are integrated into work flow entities. In other words, at step 2106, settings are put onto a user interface. At step 2108, the work flow entities are integrated into a process design. At step 2110, the BI settings in steps 2102-2108 are established for sale.

FIG. 22 illustrates an exemplary high level process flow 2200 depicting selection and building by a CRS of information components and association to create information settings. The process flow begins at step 2202. At step 2202, a permissioned CRS enters an authorized configuration module. At step 2204, the CRS may decide which navigational control (i.e., configuration element) is to be activated. From step 2204, in response to a selection being made by the CRS, execution proceeds to step 2206. At step 2206, the CRS selects desired information components and any applicable system-inherent value(s).

At step 2208, the CRS determines whether there is a need to add information components. Responsive to a determination that there is such a need, execution proceeds to step 2210. At step 2210, the CRS activates a control enabling data object creation. At step 2212, a determination is made whether the object is a new value of an existing data object or a new object. Responsive to a determination that the object is a new object, execution proceeds to step 2214. At step 2214, the CRS selects a data object type. If, at step 2212, it is determined that the object is a new value for an existing data object, execution proceeds to step 2220. At step 2220, the CRS selects the existing data object (i.e., table/field) and establishes new value(s).

From step 2214, execution proceeds to step 2216. At step 2216, the CRS provides data definitions. At step 2218, the CRS provides value(s). From both steps 2218 and 2220, execution proceeds to step 2222. At step 2222, the CRS saves information to a CRS information component library. From step 2222, execution proceeds to step 2224. At step 2224, a determination is made whether the CRS wants to create information component associations. If, at step 2224, it is not determined that the CRS wants to create information component associations, then execution proceeds to step 2234. At step 2234, the CRS saves selections and names the information setting. If, at step 2224, it is determined that the CRS wants to create information component associations, execution proceeds to step 2226. At step 2226, the CRS is provided an interface listing all configuration elements in the library. At step 2228, the CRS selects desired elements. At step 2230, the CRS selects desired sub-elements. At step 2232, the CRS selects desired value set(s). From step 2232, execution proceeds to step 2234.

When a CRS enters a specific configuration element link, a data model providing the CRS with a supporting data object schema is presented. The CRS obtains access to applicable data definitions and business descriptions pertinent to the data objects and is provided access to the system inherent data values relative to the respective data tables. The CRS then has the following options: 1) select the specific data objects available as desired; 2) select any specific existing data values as desired (all or a sub-set); 3) create new data values pertinent to a specific data element as the CRS deems appropriate (of course the value set would need to be compliant at the data definition database layer); 4) create new data objects (fields/tables) that the CRS deems are appropriate and not inherent to the system (This would of course entail the process of defining the properties at the database level); 5) establish any values to be populated within the new data object(s) as deemed appropriate by the CRS; and 6) create any necessary relationships between existing and new data objects as deemed appropriate by the CRS.

The above represents a simple exemplary information development procedure; the procedure could be more complex when using data elements that are inherently associated with multiple attributes. In such a case, numerous database associations would need to be made to insure proper data object association.

For example, in a dynamic configuration process, if a CRS enters the supplier Configuration Module 506 and then the Supplier Types configuration element 1304 upon review of the inherent system "Supplier Types," the CRS may realize that a particular type of minority/diversity supplier designation is not present, but others that the CRS would use are available. In this case, the CRS could select those available data values as desired and opt to create a new record associated with the Supplier Diversified Types table (See Table 102). The CRS could then complete the necessary field values in accordance with the data definitions and store the information. In this instance, the data would be stored within Table 102 "tblCRSSupplierDBEType".

Going a step further, if the CRS realizes that the Supplier Diversified Types table should contain an additional two fields to complete a needed information requirement, the CRS could then use the interface to create two metadata fields and associate the fields with the respective table. The CRS would then need to provide to the database the necessary data definitions. Moreover, if the CRS realizes that these fields should not consist of open data but that the correct data would need to be ascertained from a pre-defined list of values known to the CRS and applicable supplier community, the CRS could create, via metadata, two tables containing a list of potential correct values and associate each with the applicable field previously created. In such a manner, the CRS is not restricted by BI information deficiencies within the system 101 and is able to select existing data objects and introduce new data objects and values to meet the CRS' needs.

The next phase of CRS Information/BI development is associating information elements and values in conjunction with each other to create an BI Information Setting. Although the configuration modules typically include configuration elements, and therefore information, that is designed to work in conjunction with one another, in many cases, only specific bits of information or even only specific data values are pertinent to meet a desired objective. There must therefore be some information-management capability for the CRS. A CRS may have an extremely broad collection of BI relative to numerous industries, with the dissimilar industry data stored in co-mingled fashion within specific system tables. Thus, a mode is needed to segment specific components to a specific buyer target audience that enables a CRS to make BI usage conditional.

Various embodiments of the invention include one or more features that may use only specific collections of configuration components and functionality. Therefore, for a CRS to target the broadest possible scope of buyers, the CRS might want to create multiple information settings of varying scope (e.g., some simple and some more complex). Regardless of complexity, the base information components typically remain the same and exist in one master CRS information library.

Returning to FIG. 22, a CRS may choose to create information associations at the time of base data storage. For example, a CRS working within the Human Capital Management Configuration Module 508 may create information library elements including: 1) Temporary Worker Types; 2) Worker Qualifiers; and 3) Worker Agreements. Initially these are just available information components; however; via the solution association tool, the CRS may choose, for example, to select a specific worker type value and associate same with a specific set of established worker qualifiers. Furthermore, the CRS may choose to introduce another information element, a specific worker agreement, and add it to the association session. Upon completion of the associations, the CRS saves the selections, stores them into the database, and names the completed information setting. In this manner, the CRS has created and stored an information setting. Those having skill in the art will appreciate how information settings may be constrained to a set or sub-set of potential products based upon configuration element identity. At this point the CRS is confined to the CRS Information Library and only through additional procedures can the CRS make the settings functional or active to buyer entities.

FIG. 23A is an exemplary database schema supporting configuration element to configuration sub-element relationships and configuration element associations.

FIG. 23B is an exemplary database schema supporting CRS information settings.

Referring again to Appendix A, design-view Tables 174-183, 7-8, and 217-218 are considered particularly pertinent to the discussion above relative to FIGS. 22-23.

As noted above, a WFE is any form or system interface container by which a user may access information, process information, perform an action, or interface with the system's data object set. Therefore, any user screen may be viewed as representative of a WFE. WFEs, which are designed to perform certain functions, may be classified to include: 1) Access/Rights WFEs (e.g., Challenge/Response User Login screens); and 2) Information Input WFEs (e.g., Base Information interfaces by which information used by the system to manage business transactional data can be updated and managed). Typically, the information interfaces are used by a configuring buyer or a CRS. An example of an information input WFE would be a form that allows a buyer employee to update personal information in the database such as work location, phone number, or password. WFEs may also be classified to include: 3) Information Output WFEs (e.g., Reports for where a data set is provided in response to a query); and 4) Data Processing WFEs (e.g., Business Process Information interfaces by which information is both displayed and acquired typically with the intent of updating transactional business system data objects, such as tables). An example of a data processing WFE would be a form, such as, for example, a RFx that enables a buyer to manage information about a specific bid requirement or a Purchase requisition.

Because the system 101 may be used as a robust commercial procurement tool, many WFEs may serve as functional templates, with some being rather simple and others more complex. Most WFEs focus upon information input and output WFEs. More complex and critical WFEs, though fewer in number, focus upon event/transactional activities such as, for example, bids, purchase orders, and billing vouchers.

WFEs are typically relatively inactive without being associated with a work flow process. First, how and why a CRS would create such a container, in unassociated fashion, will be described below. Thereafter, integration into a designed work flow process will be described. The WFE may be conceptualized as a viewing or processing container for a core data object set used within the system 101. In terms of the CRS, the WFEs represent the means by which they are selected, created, and stored "information settings" are used by the users (e.g., a buyer entity). Thus, all of the data objects applicable to a CRS information setting should be integrated into a WFE, lest a buyer never get to use the informational components.

In light of the above, in various embodiments of the invention, a CRS has three options when it comes to managing information components on a WFE: 1) A functional system inherent WFE already exists and contains the desired information components (meaning that the WFE needs no modification and is planned to be used in "as-is fashion" by the CRS. This is typically a case where the CRS value lies not in new data objects but in informational content.); 2) A functional WFE already exists and does not contain the desired information components (meaning that the CRS needs to modify the WFE to reflect all the information components desired); and 3) A functional system inherent WFE does not exist (meaning that the CRS needs to create a new WFE to account for desired functionality not inherent within the system. This new WFE may or may not entail the use of custom CRS information components.

FIG. 24 illustrates an exemplary high level process design depicting a CRS information setting association to a system inherent WFE. In FIG. 24, CRS information settings synchronizations are addressed and a settings association process with a WFE where no data object manipulation is necessary is described. A process 2400 begins at step 2402. At step 2402, a permissioned CRS enters the consultant reseller configuration module. At step 2404, the CRS activates a work flow entity control. At step 2406, the system 101 provides the user a list display summary of WFEs grouped by system inherent work flow entities, stored CRS custom entities, and controls to manage work flow entities and synchronize information settings.

From step 2406, and responsive to selection by the CRS, execution proceeds to step 2408. At step 2408, the CRS may choose to synchronize settings. Responsive to a decision by the CRS to synchronize settings at step 2408, execution proceeds to step 2410. At step 2410, the CRS is provided a list display of stored information settings. At step 2412, the CRS selects a desired information setting. At step 2414, the CRS is provided a list to display of configuration element and configuration sub-element data objects as well as a mapping to any applicable work flow entities. From step 2414, execution proceeds to step 2416. At step 2416, the CRS may choose to (1) associate the WFE with an information setting; (2) edit WFE information settings; or (3) create a new WFE information setting. From step 2416, and responsive to selection of option 1 at step 2416, the CRS is prompted to save and name the information setting to work flow entity mapping at step 2418. From step 2418, execution proceeds to step 2420. At step 2420, the association is saved.

FIG. 25 illustrates an exemplary high level process design depicting a CRS Information Setting Association to an existing WFE entailing editing of the WFE. In FIG. 25, CRS data object manipulation of an existing WFE is addressed. In this case, a suitable WFE container already exists; however, the CRS is in need of expanding the data object collection on the WFE to meet the demands of information components specified within the CRS information setting.

A process 2500 begins at step 2502, at which step the CRS is provided a list display of configuration element and sub-element data objects as well as a mapping to any work flow entities as applicable. At step 2504, the CRS may choose to (1) associate the WFE with an information setting; (2) edit WFE information settings; or (3) create a new WFE information setting. From step 2504, and responsive to selection by the CRS of option 2, execution proceeds to step 2506. At step 2506, the CRS selects the desired WFE from a list display summary. At step 2508, the CRS is provided a metadata view of WFE and edit controls.

From step 2508, and responsive to CRS selection at step 2508, execution proceeds to step 2510. At step 2510, the CRS may add a data object. At step 2512, the CRS selects applicable data object(s) and saves. At step 2514, an interface prompts the CRS to locate the selected data objects within a desired WFE section body. At step 2516, the CRS maps data objects to the WFE section bodies. At step 2518, the interface prompts the CRS to complete metadata attributes and formatting.

At step 2520, the CRS completes and saves any edited WFEs. At step 2522, a determination is made whether the WFE is a system object or a CRS object. Responsive to a determination that a WFE is a system object, execution proceeds to step 2526. At step 2526, the CRS is prompted to save the association and name the work flow entity. If, at step 2522, the WFE is determined to be a CRS object, execution proceeds to step 2524. At step 2524, the CRS is prompted to save as new or overwrite previous associations relative to the CRS object. From each of steps 2524 and 2526, execution proceeds to step 2528. At step 2528, the association is saved.

FIG. 26 is an exemplary high level process design depicting a CRS information setting association to a WFE entailing creation of the WFE. In FIG. 26, CRS data object manipulation and creation of a new WFE are addressed. In this case, no suitable WFE container for the CRS information components exists. A process 2600 begins at step 2602. At step 2602, the CRS is given an option to either edit the WFE or create a new WFE. Responsive to a decision to create a new WFE, at step 2604, the interface prompts the CRS to specify, for the master work flow entity, number of sections, header existence, and footer existence. At step 2606, the CRS is provided a sectional interface framework via a graphical user interface (GUI). At step 2608, the interface prompts the CRS to specify, for the individual sections, header existence and footer existence, and section column/road structure. At step 2610, the CRS save the settings made previously in the process 2600.

From step 2610, execution proceeds to step 2612. At step 2612, the CRS is provided a sectional interface configurer. At step 2614, the CRS selects a desired section body. At step 2616, the interface prompts the CRS to reference additional saved information setting(s) as applicable to be used in WFE data object specification. At step 2618, interface prompts the CRS to specify header and footer objects type and associated properties. At step 2620, the CRS saves settings made at step 2618.

From step 2620, execution proceeds to step 2622. At step 2622, the interface prompts the CRS to specify, for each individual cell, object type and associated properties. At step 2624, the CRS determines which information setting component(s) to use. At step 2626, the CRS saves settings made at step 2624. At step 2628, the CRS repeats the steps for all applicable sections as specified previously. If the CRS configures, via the GUI, that the WFE will contain two distinct sections (e.g., a WFE that contains both Supplier Information as well as Buyer Information), then each section will typically have its own header, footer, and data objects contained therein.

At step 2630, the CRS saves settings made at step 2628. At step 2632, the interface prompts the CRS to specify, for the master WFE, header and footer objects type and associated properties for the WFE as a singular entity. An available metadata layout for form/object configuration may be utilized in Visual Basic and NET applications, for example. At step 2634, the CRS saves settings made at step 2632. At step 2636, the interface prompts the user to name the WFE. At step 2638, the CRS saves settings made at step 2636. At step 2640, the WFE is stored in the database as a new WFE.

FIG. 27 is an exemplary database schema supporting information settings integration into work flow entities.

Referring again to Appendix A, design-view Tables 188-199, 2, 15, and 181 are considered particularly pertinent to the discussion above relative to FIGS. 24-27.

Returning to FIG. 13, assume that a CRS has created additional supplier "Business Qualifiers" values applicable to existing system inherent data objects. The system inherent WFE used to acquire this information from suppliers reflects the data objects and there would be no need to modify the metadata structure of the WFE. However, if the CRS still wants their specific values only contained within their saved information setting used on the WFE, the CRS need only associate the system inherent WFE with their information setting and only those settings values would be used during the subsequent data processing, thereby over-riding any system inherent data values configured for the data field on the WFE The above example illustrates CRS Option 1 described above.

As another example, if a CRS has created additional supplier Business Qualifiers in the form of new data objects such as a new field for an existing table or new table(s) altogether, the system inherent WFE used to acquire this information from suppliers would not reflect these new attributes (i.e., information components of Tables 15 and 100, respectively). Therefore, the CRS would need to modify this WFE so that all desired additional information components could be reflected within the applicable WFE and subsequently acquired/processed. Upon modification of the existing WFE, the system creates a new WFE and adds same to the specific CRS library. A modification to an existing WFE results in the creation of a new CRS WFE. The above example illustrates CRS Option 2 described above.

As another example, if it is assumed that a CRS has created a Custom Audit Type with Custom Audit Rules supported by CRS information components, the CRS will need to create a new custom Audit WFE and configure the Audit WFE to reflect the information components as desired (i.e., Information components of Tables 15 and 120, respectively). The above example illustrates CRS Option 3 described above.

The synchronization of information settings to work flow entities serves as an overall CRS Information Settings management tool. Through the various summary list displays that are provided, a CRS need not worry about what information components have or have not been integrated. The system is also flexible enough to either force or not force full data object inclusion of a CRS information setting into a WFE.

FIG. 28 is an exemplary visual representation of a Work Flow Process Engineering Configuration Interface Menu 2800. The menu 2800 represents an illustrative main process engineering work flow menu having a logical separation between core Procurement Life Cycle Process Work Flow Groups 2802 and Independent Work Flow Process Groups 2804.

The Procurement Life Cycle Work Flow Groups 2802 represent those combined business data processing functions that make up an end-to-end sourcing to decision support procurement business solution. In contrast, the Information Component Work Flow Groups 2804 may be used to achieve three objectives: 1) manage information acquisition and storage procedures pertinent to core system data containers, 2) enable variably configured sub-processes to work in conjunction with the Core Procurement Life Cycle Work Flow Processes 2804; and 3) enable variably configured sub-processes to work independently to satisfy commodity management requirements of a specific buyer or CRS solution.

For instance, an independent work flow process may be needed to enable a buyer entity's personnel to inform business application data repositories, for example, that an individual has been transferred to a new location or has a new job title. The WFE and specific procedures followed to enable data acquisition, processing, and record updating represent an Independent Work Flow Process affiliated with the Master Data Management configuration module 502. Although the information is important, the work flow is independent of the core procurement processing functions of sourcing to decision support. This example is particularly pertinent to the objective of managing information acquisition and storage procedures pertinent to core system data containers.

In most circumstances, work flow entities and processes would need to be in place for all configuration elements so that information could be administered and managed. However, not all work flow processes affiliated with a configuration module serve the sole purpose of information component administration. Some independent work flow processes are meant to manage commodity transactional information. Using temporary worker on-boarding requirements is an example of an independent work flow processes used to manage commodity transactional information. Although the rules and information components are typically configured before a worker is engaged, activity is minimal until a temporary worker is engaged through the system 101.

As another example, there would need to be minimally a purchase order containing details of the procurement transaction within a buyer system before a "temporary worker on-boarding process" could be enabled. Thus, an independent work flow process combined with a core procurement process would result. The assumption in this example is that the buyer environment is designed to be a commercial procurement business solution. This example is pertinent to the objective of enabling variably configured sub-processes to work in conjunction with the Procurement Life Cycle Work Flow Processes 2802.

As another example, the buyer environment may include configuration components and work flow processes to satisfy a much less-intensive business requirement, such as, for example, temporary labor administration. In such a case, the buyer environment could be a Human Capital Management product. In this example, there would be no traditional purchase order creating the need for a work flow entity and work flow process because the procurement functionality is not inherent within the pertinent product offering. This example is pertinent to the objective of enabling variably configured sub-processes to work independently to satisfy commodity management requirements of a specific buyer or CRS solution.

Since there are numerous product offerings, it is incumbent upon a CRS to create work flow processes suitable to their planned BI usage. For instance, a CRS may have particular expertise in both Human Capital Management as well as Procurement. The CRS may want to offer BI solutions that could be used within a buyer environment that only uses Human Capital Management as well as a buyer environment that uses a full complement of available system features.

An engineered process work flow is a Work Flow Entity (i.e., user interface container/form) configured to proceed through various stages of a start-to-finish life cycle premised upon specific actions being taken by specific users with predefined rules established to acquire, store, and manage information. The components of an engineered process work flow include: 1) WFE(s) (Embedded information objects); 2) Process Life Cycle Stages; 3) WFE(s) Status 4) Users/User Roles; 5) User Role Actions; and 6) Data Object Management Instructions.

The independent process workflow groups 284 include a master data management group 2804, a commodity data management group 2806, a supplier chain management group 2808, a human capital enablement group 2808, a CSF data management group 2810, a financial data management group 2812, and an asset management group 2814. The procurement life cycle process workflow groups 2802 includes an RFx bid-order group 2816, a purchase requisition group 2818, a purchase order group 2820, a work acknowledgment voucher group 2822, a bill/pay group 2824, and a report/decision support group 2826.

FIG. 29 is an exemplary high level process overview of a Work Flow Process Engineering Method. Although FIG. 29 depicts the creation of a new work flow process, other options for the CRS also exist. For instance, a CRS could take a standard system work flow process and integrate the CRS WFE, the CRS could take a standard system work flow process and modify it, or the CRS could create a custom-engineered process using a system inherent work flow entity.

In FIG. 29, a flow 2900 begins at step 2902, at which step a permissioned CRS enters a process work flow configuration environment. At step 2904, the CRS user decides which navigational control (i.e., process work flow group) is to be activated. Responsive to a selection having been made at step 2904, execution proceeds to step 2906. At step 2906, the system provides the CRS user a list display summary of pre-configured process work flow entities, saved custom entities, and controls to access/edit and create new process work flow entities. At step 2908, a new work flow process entity is engineered.

At step 2910, an interface prompts the CRS user to select applicable work flow entities. At step 2912, an interface prompts the CRS user to select applicable user roles and permissions. At step 2914, an interface prompts the CRS user to specify a number of applicable primary process legs. At step 2916, the CRS user saves settings.

At step 2918, an interface prompts the user to specify various options for each process leg. The options specified may include work flow elements, rolls/permissions, data processing actions available for each user role, a process status change where applicable to each available action, and a work flow routing source (i.e., user role) applicable to each action. If desired, the interface may also allow additional conditional work flow configuration. Conditional rules that can be used include settings/values specified within the configuration elements. Further, sub-process work flows that enable variable work flow engineering that would take place within a primary or core specified process are also supported. At step 2920, the CRS user names the work flow process and saves settings. At step 2922, the work flow process settings are stored in a database with a status of "new".

FIG. 30 is an exemplary data base schema supporting the Work Flow Process Engineering Method of FIG. 29 and represents an exemplary supporting data model for the WFE Process Engineering Method. As illustrated in a schema 3000, a master storage container is present for each WFE Process, which container is mapped to products. WFE(s), as well as User Role Positions, are affiliated with the process. Multiple WFEs are supported within a single process flow that can contain parent-child work flows. Once these elements are established, actual configuration may begin.

A CRS may define for the system configuration interface a number of applicable process legs or stages. For each stage, the CRS may establish a relative control status. In the case of multiple WFEs (i.e., parent-child processes), the status for the child WFE would be constrained by the status code of the Parent. If not, multiple processes could not run in tandem. Once these elements are defined, included User Role Positions applicable to each stage are introduced to the process legs, actions each User Position can take are defined, and as a result of the action, what impact to the WFE status is made. The CRS continues through all stages until the desired work flow process reaches culmination. Data object rules are attached to the WFE Process Stage, which represents the integration of the data objects contained on the WFE(s) with the system database 160. It is common to process various data elements on a singular WFE at various stages of a processing sequence. This data object integration method enables the information to be managed at all stages of the WFE process life cycle.

Referring again to Appendix A, design-view Tables 201-210, and 188 are considered particularly pertinent to the discussion above relative to FIGS. 28-30.

FIG. 31 is an exemplary high level process overview of a CRS business information setting creation/storage and pricing method and can be viewed as a logical extension of FIG. 29. As indicated by a process 3100, considerable functionality may be made available to a CRS in the way of BI Settings Management, such as: 1) editing of a system inherent Engineered Process; and 2) editing of a customized CRS Engineered Process. During the process 3100, the CRS may establish a unified collection of desired: 1) information settings; and 2) application work flow elements and necessary process work flow design(s) to optimize a specific business endeavor. This unified collection would typically need to be associated with a CRS price offering. A CRS may have numerous stored BI settings. In some cases, the stored BI settings could be identical, with the exception of the data or value sets deployed, as the case when solutions are crafted for variable industries that may use similar processes and work flow forms.

The process 3100 begins at step 3102. At step 3102, work flow process settings are stored in a database with a status of new. At step 3104, the system prompts the user to associate the stored settings with a CRS business information setting. At step 3106, the system provides a list display of all CRS-saved BI settings, if applicable. At step 3108, the user selects an existing BI setting to modify or create a new BI setting. Responsive to selection of a new BI setting to create at step 3108, execution proceeds to step 3110. At step 3110, the system prompts the CRS to name the BI setting, including a detailed description thereof. At step 3112, the CRS saves the BI setting.

At step 3114, the system provides a list display of all product applications enabled to use the saved BI setting. At step 3116, the system prompts the user to associate the stored BI setting with a CRS price list entry. At step 3118, the system provides a CRS list display of all price list menu records. At step 3120, the CRS selects applicable price list menu record(s). At step 3122, the CRS saves BI setting pricing associations. At step 3124, the system prompts the user to activate settings within a buyer CRS sales database. At step 3126, the CRS activates BI sales settings. At step 3128, the CRS BI sales settings are saved to the CRS sales database. At step 3130, the CRS information is made available to buyers within compatible product environments.

FIG. 32 is an exemplary database schema supporting the CRS business information Setting Creation/Storage and Pricing Method. The Schema of FIG. 32 is a co-mingled data schema with data elements used to support CRS information mapped into data tables used specifically for system inherent information.

Referring again to Appendix A, design-view Tables 15, 181, 188, 200-202, 211-213, 217, 229, and 254 are considered particularly pertinent to the discussion above relative to FIGS. 31-32.

The description thus far has focused mainly on making CRS BI tangible in the sense of putting the BI into a form that can be utilized by a system (e.g., the system 101) implemented via a plurality of relational databases. Now the description will turn to a discussion of integrating the tangible CRS BI into a business system & method.

FIG. 33 is an exemplary CRS home menu depicting a variety of accessible functionality and available dashboard alerts. In various embodiments of the invention, a potential CRS may gain access to a secure web site whose navigational controls will enable the CRS to register with the web site. Such an exemplary web page is shown in FIG. 33. Access to specific functions is predicated upon the CRS' permission status/level; therefore, a first time access would not typically result in access to most of the navigational controls depicted in FIG. 33.

FIG. 34 is a high level process definition for CRS system access and on boarding. A flow 3400 illustrates in more detail the consultant on boarding process illustrated at steps 302-306 of FIG. 3. The flow 3400 begins at step 3402, at which step the consultant accesses a web site of a system (e.g. the system 101) in accordance with principles of the present invention. At step 3404, the consultant is provided a base information template. At step 3406, the consultant completes a base information profile. At step 3408, the consultant submits a set of requests to an administrator for review. At step 3410, disposition by the administrator of the setup request takes place. At step 3412, consultant information is accessed in relation to pre-determined qualifiers. At step 3414, if it is determined that the qualifiers are satisfied, execution proceeds to step 3416. If it is not determined that the qualifiers have been satisfied at step 3414, execution proceeds to step 3432. At step 3432, the consultant is notified of unsatisfactory qualifier data and system status is updated. From step 3432, execution returns to step 3404.

At step 3416, the administrator accepts the consultant's setup request. At step 3418, a consultant records data status is changed to approved. At step 3420, the consultant is notified of setup via e-mail and system status is updated. At step 3422, the consultant is enabled to access system functions to execute standard business agreements. At step 3424, if the agreements are executed, execution proceeds to step 3426. If, at step 3424, the entity agreements are not executed, execution proceeds to step 3430. At step 3426, the consultant executes base BI agreements. From step 3426, execution proceeds to step 3428. At step 3428, the consultant is enabled to create business profiles within the system. At step 3430, the consultant is notified of a business infraction and rights of the consultant are removed from the system.

As depicted in FIG. 34, the potential CRS needs to complete a general information profile, which typically is their responses to specific business qualifiers. Various embodiments could be used to either fully automate or make fully manual the business qualifier assessment process show in FIG. 34.

FIG. 35 is a flow diagram illustrating a consultant re-seller base agreement execution process. Upon satisfactory qualifier assessment, the potential CRS can be prompted to execute standard agreements such as, for example, "Non-disclosure" and "System Access" agreements. An exemplary agreements execution process is depicted in FIG. 35. Those having skill in the art will appreciate that other qualifier assessment processes besides those illustrated in FIG. 35 could be used without departing from principles of the invention.

A flow 3500 begins at step 3502, at which step a permissioned consultant accesses a web site of a system (e.g., the system 101) in accordance with principles of the present invention. At step 3504, the consultant activates an agreement/contracts control. At step 3506, a user of the consultant is provided with a list display of applicable agreements with status codes. At step 3508, a determination is made whether the agreements require acceptance/execution. If it is so determined at step 3508, execution proceeds to step 3510, at which step the consultant selects applicable agreement active control. At step 3512, the user of the consultant is provided with agreement content.

At step 3514, the user is provided an interface to either accept or decline the agreement terms. At step 3516, determination is made whether the agreement terms have been accepted or declined. If, at step 3516, the agreement terms are accepted, execution proceeds to step 3522. At step 3522, the consultant is provided a successful transaction message and is returned to the agreements list display of step 3506.

If, at step 3516, the agreement terms are declined, execution proceeds to step 3518. At step 3518, the consultant is provided a message that indicates that system permissions will be removed. At step 3520, the consultant is prompted to decline the agreement or cancel. If the consultant user opts to cancel, execution returns to step 3502. If the consultant user opts to decline the agreement, execution proceeds to step 3524. At step 3524, the consultant is provided a successful transaction message and rights to the system are removed.

FIG. 36 is a database table view illustrating a consultant re-seller base setup data model.

Referring again to Appendix A, design-view Tables 214-217 and data-view Tables 219-220, and 227 are considered particularly pertinent to the discussion above relative to FIGS. 33-36.

FIG. 37 is a flow diagram illustrating a consultant re-seller personnel commodity profiling process. A flow 3700 begins at step 3702. At step 3702, a permissioned consultant accesses a website of a system in accordance with principles of the present invention. At step 3704, the user of the consultant activates a personnel center control from a menu. At step 3706, the user activates an add consultant control from the menu. At step 3708, the user is presented with a personnel general information input form. At step 3710, the user completes a consultant personnel information input. At step 3712, the system prompts the user to create a consultant skill profile. At step 3714, the user completes a consultant skills profile utilizing a standard skill profiling interface. At step 3716, the system prompts the user to specify a consultant commodity profile. At step 3718, the user completes a consultant commodity profile utilizing standard SIC or NAICS profiling interface. At step 3720, the system prompts the user to specify a consultant sales area profile.

At step 3722, the user completes the consultant sales area profile utilizing standard GEO profiling interface. At step 3724, the system prompts the user to save or edit profile settings. Responsive to a save command, at step 3726, the consultant profile settings that were saved are made active in a database of the system.

Although FIG. 37 may be viewed as depicting the setup and commodity expertise profiling as a homogeneous process, it may also be viewed as including two distinct sub-systems. After base information setup, the CRS is prompted to use a skills profiling method to define, for example, CRS personnel skills and experiences. Furthermore, the use of a broad commodity classification system such as SIC or NAICS may be included so that the CRS personnel can be associated with specific business industries that are readily identifiable by the buyer community. Beyond the credentials, the CRS personnel need to be associated to specific geographic areas and how sales/consultant meetings are handled within the geographic areas.

FIG. 38 is a database table view illustrating a consultant commodity profiling data model.

Referring again to Appendix A, design-view Tables 228-240, and 217 and data-view Table 235 are considered particularly pertinent to the discussion above relative to FIGS. 37-38.

FIG. 39 is a flow diagram illustrating a consultant-reseller personnel professional services profiling process. Once a CRS record is set up, there needs to be a process by which the CRS personnel are associated with one or more specific services that can be made available to a buyer by the system (e.g., the system 101). A flow 3900 begins at step 3902. At step 3902, a permissioned consultant accesses a web site of a system in accordance with principles of the present invention. At step 3904, the user activates a personnel center control from a menu. At step 3906, the user activates a manage professional services control from the menu. At step 3908, the system provides the user with an overview of active affiliated consultants and applicable professional services certifications.

At step 3910, the user selects an applicable consultant via a check box and activates an edit professional services control. At step 3912, the system provides the user a professional services menu of application products, configuration services, on-site processing services, and aggregation services.

At step 3914, the user selects, via a check box, a desired bundle of professional services and saves settings. At step 3916, the user is provided a message indicating successful profile storage. At step 3918, settings are stored in a database with a status of pending. At step 3920, the system sends a notification alert of the certification request to an administrator. At step 3922, the administrator provides the consultant with log in credentials to a certification center. At step 3924, the system sends an alert to the user with log in credentials. At step 3926, the consultant user accesses the certification center. At step 3928, the user studies on line training materials. At step 3930, the consultant activates a request certification test control from a main menu of the certification center.

At step 3932, a system notification alert is sent to the administrator. At step 3934, the administrator schedules on line certification tests. At step 3936, a system notification alert is sent to the consultant user with log in testing credentials. At step 3938, the user confirms the test date and time and transmits a confirmation via the system to the administrator. At step 3940, the user enters the certification center and activates the certification test control. At step 3942, the system provides the user with a list display of applicable tests available. At step 3944, the user selects a desired test via a check box and activates a start test control.

At step 3946, the consultant user completes the applicable test or tests. At step 3948, the consultant user saves test results. At step 3950, the administrator is notified of the completed consultant test. At step 3952, the administrator checks the results of the test and verifies pass/fail designation.

At step 3954, if it is determined that the test has been passed, execution proceeds to step 3958. If, however, it is determined at step 3954 that the test has been failed, the consultant is sent notification via the system of failure and is permitted to reschedule a secondary test. At step 3958, the consultant is sent notification via the system of successful certification. At step 3960 the certification is stored in the system database and the consultant is provided a system identification code. At step 3962, the consultant user is now authorized to complete an applicable pricing list. In various embodiments of the invention, other embodiments could entail off-line certification as well as other modes could be employed.

FIG. 40 is a database table view of a consultant re-seller professional services profiling data model.

Referring again to Appendix A, design-view Tables 241-250, 1, 10, 13, and 228 and data-view Table 250 are considered particularly pertinent to the discussion above relative to FIGS. 39-40.

FIG. 41 is a flow diagram illustrating a consultant re-seller personnel professional services pricing process. A flow 4100 begins at a step 4102. At the step 4102, a permissioned consultant accesses a website of a system in accordance with principles of the present invention. At step 4104, the user activates a personnel center control from a menu. At step 4106, the user activates a managed professional services control from the menu. At step 4108, the system provides the user with an overview of active affiliated consultants and applicable professional services certifications.

At step 4110, the user selects applicable consultant via a check box and activates an edit professional services control. At step 4112, the system provides the user with an overview of active affiliated professional services certifications for the consultant. The system also provides an add/edit pricing active control at step 4112. At step 4114, the user selects applicable professional services via a check box and activates the add/edit pricing control. At step 4116, the system provides the user with a list display of applicable delivery types. At step 4118, the user selects the desired delivery types.

At step 4120, the user inputs applicable pricing. At step 4122, the user saves settings relative to the input applicable pricing. At step 4124, the system stores an applicable pricing list for designated consultant user and professional services. At step 4126, the buyer venue is updated to include the processed information. At step 4128, the user is returned to the professional services overview display. From step 4128, execution returns to step 4108.

FIG. 42 is a database table view illustrating a consultant re-seller pricing data model.

Referring again to Appendix A, design-view Tables 241-260, 1, 10, 13, 214, 217, 220, 227 and 244, as well as data-view Tables 259-260 are considered particularly pertinent to the discussion above relative to FIGS. 41-42.

FIGS. 43-46 address in particular a sub-system that enables a buyer to search for CRS professional services offerings and ultimately engage CRS(s) upon mutual agreement to terms. In other embodiments, the described sub-system can be used to create, for example, quotations for CRS having similar BI offerings.

FIG. 43 is a diagram illustrating a buyer professional services support menu. FIG. 43 represents an illustrative snapshot of the buyer's system interface. The interface provides numerous functional navigation points enabling a buyer to adequately interface with a CRS population. A dashboard sub-system on the interface is an administrative support mechanism.

FIG. 44 is a flow diagram illustrating a buyer-enabled access method to a consultant re-seller profile. There are numerous buyer search filters that can be manipulated to define a search. A system filter is also employed to limit only those CRS search results compatible to the searching buyer's environment. Product management logic normalizes the system to prevent buyer requests to CRS entities that are not logical due to a buyer environment-to-CRS-professional-services incompatibility. However, in various other embodiments of the invention, additional CRS search options may be made available to the buyer and services requests locked out for those CRS professional services that are incompatible to the buyer environment.

Returning to FIG. 44, a flow 4400 begins at step 4402. At step 4402, a permissioned buyer user accesses a website of a system in accordance with principles of the present invention. At step 4404, if the system has been configured, the system displays a professional services support active control. At step 4406, the user activates the professional services support control. At step 4408, the user is provided a professional services support main menu display.

At step 4410, the user navigates available information to understand the CRS professional services environment. At step 4412, the user activates the review available consultant resources control. At step 4414, the user is provided a search menu to enter filtering variables to reduce a CRS output list. At step 4416, variables, such as, for example, SIC or NAICS industry codes professional services provided, skill set attributes, or geographical sales territory may be entered by the user. In addition, the user may search without using filtering criteria. At step 4418, the user commences the search as defined or not defined (i.e. according to whether filtering criteria were or were not entered).

At step 4420, the user is provided a list display of search criteria matching CRS personnel. At step 4422, the user may activate individual CRS record control to view complete CRS profile. Responsive to activation of the individual CRS record control, at step 4424, the CRS profile is displayed to the user. Data included in the CRS profile may be, for example, industry specialties, personnel skill profile, or CRS provided services. At step 4426, the interface provides additional active controls to view price lists and read client reviews.

FIGS. 45-46 are flow diagrams that collectively illustrate a buyer services request method. A flow 4500 begins at step 4502, at which step a permissioned buyer user accesses a website of a system in accordance with principles of the present invention. At step 4504, if the system has been configured, the system displays a professional services support active control. At step 4506 the buyer user activates a professional services support control. At step 4508, the buyer user is provided a professional services support main menu display. At step 4510, the buyer user navigates available information.

At step 4512, the buyer user decides to use professional services and activates a request professional services control. At step 4514, the buyer user is provided a display and is prompted to input a CRS identification code, if known, or search for a CRS. At step 4516, a determination is made whether the CRS is known. If it is so determined at step 4516, execution proceeds to step 4524. If it is not so determined at step 4516, execution proceeds to step 4518. At step 4518, the buyer user is provided a search menu to enter filtering variables to find appropriate CRS's. At step 4524, the buyer user inputs a CRS code for the known CRS.

From step 4518, execution proceeds to step 4520. Responsive to selections being made, at step 4520, the system returns a list of CRS that meet the applicable search criteria. At step 4522, the buyer user selects a desired CRS via a check box and activates a summarized CRS services control. From either of steps 4522 or 4524, execution proceeds to step 4528. At step 4528, the buyer user is provided an overview of CRS provided services, delivery types, and rates. From step 4528, execution proceeds to step 4530 responsive to the buyer user selecting a particular option.

At step 4530, a determination is made whether a sales call has been requested or a services request created. Responsive to a service request having been created, execution proceeds to step 4532, at which step the buyer user selects applicable professional services, delivery types, and rates. Responsive to a sales contact having been requested, execution proceeds to step 4534. At step 4534, the user is provided a contact details form. At step 4536, the buyer user completes a contact form and submits to the CRS. At step 4538, the buyer user completes a contact form and submits to the CRS. At step 4540, the CRS receives the contact form and contacts the buyer user. At step 4542, a determination is made whether the contact results in a buyer services request. If it is not so determined at step 4542, execution proceeds to step 4544, at which step execution ends. If it is so determined at step 4542, execution returns to step 4532.

From step 4532, execution proceeds to step 4602 of a flow 4600 illustrated in FIG. 46. At step 4602, the user selects applicable professional services, delivery types, and rates via a check box input. At step 4604, the user activates a submit offer control. At step 4606, the user is provided an additional input form to add other pertinent information. At step 4608, the user completes the additional information form. At step 4610, the user is provided a send request to CRS control. At step 4612, the user sends a service request to the CRS.

At step 4614, a services request record is stored in a database with a pending status. At step 4616, the CRS is notified via e-mail and a system-board update of the buyer services request. At step 4618, determination is made whether the CRS has responded within a configured response timeframe. If it is so determined, execution proceeds to step 4624. If it is not so determined, execution proceeds to step 4620.

At step 4620, the system sends an automatic notification to the buyer user and to the CRS regarding the CRS non-response. At step 4622, a determination is made whether the buyer user has cancelled or extended the CRS offer. If, at step 4622, it is determined that the buyer user has cancelled the CRS offer, execution proceeds to step 4632. At step 4632, the buyer user cancelled the CRS offer. If, at step 4622, it is determined that the buyer user has extended the CRS offer, execution proceeds to step 4624.

At step 4624 CRS disposition is determined. If, at step 4624, the CRS disposition is accepted, execution proceeds to step 4626. At step 4626, the CRS accepts the buyer user offer and the CRS completes an offer acceptance form and submits same to the buyer user. If, at step 4624, it is determined that the CRS disposition is declined, execution proceeds to step 4634. At step 4634, the CRS declines the buyer user offer and the CRS completes an offer declination form and submits the completed form to the buyer user. At step 4636, a services request record is updated to a status of declined. At step 4638, the buyer user is notified via e-mail and a dashboard update.

At step 4626, the CRS accepts the buyer user offer and the CRS completes an offer acceptance form and submits the completed form to the buyer user. At step 4628, a services request record is updated to a status of accepted. At step 4630, the buyer user is notified via e-mail and dashboard update and is now enabled to create a CRS purchase requisition.

FIG. 47 illustrates an exemplary database schema supporting a Buyer to CRS services/sales call request.

Referring again to Appendix A, design-view Tables 261-268, 254, 256, 258-259, 217, 220, 227 and 244, as well as data-view Tables 262-264 are considered particularly pertinent to the discussion above relative to FIGS. 43-47.

FIG. 48 is a flow diagram that illustrates a consultant reseller professional services purchase requisition process. A flow 4800 begins at step 4802, at which step a permissioned buyer user accesses a website of a system in accordance with principles of the present invention. At step 4804, the user activates a professional services support control. At step 4806, the user activates an administer professional services activity control. At step 4808, the user is presented with a list display of all active CRS records grouped by activity category type. At step 4810, the user activates an applicable control associated with an accepted CRS service request category record. At step 4812, the user is presented with a standard purchase requisition interface. A services request detail serves as default purchase requisition data. At step 4814, the user completes purchase requisition header details. At step 4816, the user accesses purchase requisition line details via an active control from the main requisition interface.

At step 4818, the user optionally modifies requisition line item details. At step 4820, the user selects a submit to CRS active control from the main requisition interface. At step 4822, the requisition status is updated to sent for CRS review. At step 4824, the system notifications are sent to the CRS. At step 4826, the CRS user accesses the system and navigates to purchase requisition via a navigation bar or a dashboard link. At step 4828, the CRS user reviews the buyer requisition.

At step 4830, accuracy of the buyer requisition is validated. If, at step 4830, accuracy is validated, execution proceeds to step 4838. If accuracy is not validated at step 4830, execution proceeds to step 4832. At step 4838, the CRS completes a taxation assessment using standard tax assessment interface. When the taxation assessment has been completed, an approved requisition control becomes active. At step 4832, the CRS user activates a decline requisition link. At step 4834, the system provides the CRS with an input form to return to the buyer explaining the declination reasoning. The CRS user submits the declination to the buyer user and notifications are sent by the system. At step 4836, the requisition status is updated to CRS declined. At step 4840, the CRS approves the completed requisition. At step 4842, the requisition status is updated to CRS approved. At step 4844, system notifications are sent to the buyer user. At step 4846, the buyer user is enabled to create a purchase order.

FIG. 49 is a flow diagram that illustrates a consultant-reseller professional services purchase order process. A flow 4900 begins at step 4902. At step 4902, a permissioned buyer user accesses a website of a system in accordance with principles of the present invention. At step 4904, the buyer user navigates to an open purchase requisition list display. At step 4906, the buyer user selects a desired record from the open purchase requisition list display. At step 4908, the buyer user is provided a main purchase requisition interface. If a requisition status is CRS approved, a create purchase order control is active. At step 4910, the buyer user may activate a create purchase order control. If, at step 4910, the buyer user has activated the create purchase order control, execution proceeds to step 4912.

At step 4912, the buyer user is presented with a system purchase order interface. A default purchase order mirrors the previously-created purchase requisition. At step 4914, the buyer may modify any buyer-related administrative purchase order header information as configured. If, at step 4914, the buyer has modified any buyer-related administrative purchase order header information as configured, execution proceeds to step 4916. At step 4916, the buyer may customize line item configurations to satisfy business requirements. If, at step 4916, the buyer has customized line item configurations to satisfy business requirements, execution proceeds to step 4918.

At step 4918, the buyer creates a completed purchase order. From step 4918, execution proceeds to step 4920. At step 4920, a determination is made whether the purchase order needs special approvals as buyer configured. If it is not so determined, at step 4922, the system processes the buyer purchase order and the CRS purchase order. If, at step 4920, it is determined that the purchase order does need special approvals as buyer configured, execution proceeds to step 4930. At step 4930, the requisition is routed for approval/review via a specified configuration or manual buyer user selection. From step 4922, execution proceeds to step 4924. At step 4924, purchase orders are stored in a database with a status of active. At step 4926, system notifications are issued to the CRS and configured buyer users. At step 4928, a voucher system is enabled.

From step 4930, execution proceeds to step 4932, at which step ultimate disposition of approved or declined is made. If the ultimate disposition is approved, execution returns to step 4922. If the ultimate disposition is declined, at step 4934, a buyer decliner is provided an optional explanation form. At step 4936, a purchase order indicated to have been declined is created. At step 4938, the purchase order is stored in the database with a status of declined. At step 4940, notifications are issued to the originating buyer user. At step 4942, if optional configuration is specified, additional re-processing may be enabled at the buyer interface.

FIG. 50 is an exemplary database schema supporting the purchase requisition/order processing.

Referring again to Appendix A, design-view Tables 265-272 and data-view Table 272 are considered particularly pertinent to the discussion above relative to FIGS. 48-50.

In various embodiments of the invention, more than one way of an BI Settings transfer may be employed. For example, in addition to the setting transfer process described above, a CRS can create settings within a buyer environment by: 1) physically accessing the buyer environment from the buyer site as an authorized buyer user; or 2) being given remote access to the buyer environment and creating settings in that manner.

FIG. 51 is a flow diagram illustrating a high-level consultant re-seller professional configurations services delivery process. A flow 5100 begins at step 5102. At step 5102 a CRS as administrator for a buyer program enters a system (e.g., the system 101) in accordance with principles of the present invention. At step 5104, a configuration suite is activated within a buyer environment. At step 5106, the CRS builds configuration in the buyer's environment. At step 5108, the CRS tests the configuration settings in the buyer's environment. At step 5110, the buyer authorized settings are activated in the buyer's environment. The flow 5100 may be also be started at step 5112. At step 5112, a CRS with independently-stored configurations enters the system in accordance with principles of the present invention. At step 5114, the CRS settings are migrated to the buyer's environment via, for example, XML, XSD, and TYPE SQUARE technologies. At step 5116, the CRS tests the configuration settings in the buyer's environment. From step 5116, execution proceeds to step 5110.

FIGS. 52-53 are flow diagrams illustrating a high-level consultant re-seller professional configuration services integration process. A flow 5200 begins at step 5202. At step 5202, stored CRS independent configuration settings are accessed. At step 5204, the buyer requests transfer of defined configuration settings via an application interface. At step 5206, an interface tool performs a component framework comparison. At step 5208, a determination is made whether the buyer's systems supports the CRS configuration settings. If, at step 5208, it is not so determined, execution proceeds to step 5210. At step 5210, the buyer is provided a message indicating that requested configurations settings are not supported by the buyer's system.

If at step 5208, it is determine that the buyer's system supports the CRS configuration settings, execution proceeds to step 5212. At step 5212, the buyer is provided a message indicating that requested configuration settings are supported by the buyer's system. At step 5214, a determination is made whether to proceed with settings transfer. If it is determined not to proceed with settings transfer, execution proceeds to step 5216. At step 5216, the buyer terminates the transaction and proceeds back to a home page. If, at step 5214, it is determined to proceed with settings transfer, execution proceeds to step 5218. At step 5218, configuration setting objects/values are transferred via interface protocols such as, for example, XML, XSD, Metadata, ODBC.

At step 5220, a transfer disposition determination is made. If at step 5220, a pass determination is made, execution proceeds to step 5222. If, at step 5220, a failed determination is made, execution proceeds to step 5228. At step 5222, the CRS independent configuration settings are stored in the buyer environment. At step 5224, the buyer is provided a message indicating that requested settings have been transferred. At step 5226, the buyer is provided control enabling settings modifications overview. At step 5228, the system provides an error log to the buyer at step 5230, system messages are issued to the administrator to the CRS.

From step 5226, execution proceeds to step 5302 of a flow 5300 of FIG. 53. At step 5302, the buyer enables a summary overview. At step 5304, the buyer is provided review/details of applicable configuration elements/values, work flow entities, defined work flow process entities, and applicable CRS notations and descriptors. At step 5306, the system provides the buyer with control to synchronize settings with the existing buyer environment. At step 5308, the buyer enables synchronize settings control. At step 5310, the system performs relationship, data integrity, and work flow analyses. At step 5312, the buyer is provided review/details of system analysis with respect to relationships, data integrity, and work flow. At step 5314, a determination is made whether buyer intervention is required. If it is so determined at step 5314, execution proceeds to step 5316. If it is not so determined at step 5314, execution proceeds to step 5318.

At step 5316, the buyer is provided an option to complete settings configuration. At step 5318, the buyer establishes required relationships, reconciles settings conflicts, and connects work flow routines as desired. At step 5320, the buyer saves inputs. From step 5320, execution returns to step 5318. At step 5318, the buyer is provided an option to activate settings. Responsive to activation at step 5318, execution proceeds to step 5322, at which step status modification is stored. At step 5324, the settings are applied and functionality is enabled.

A settings transfer will rarely fail due to operation of the product management schema that shields Buyer Entities from BI settings because of an application functionality deficiency. CRS information settings map to configuration elements, which map to module elements, which map to products. Thus, information settings set up for functionality associated with a given product are not displayed or made available to buyer entities utilizing another product if, for example, the other product cannot use the settings due to exclusion of the functionality within the other product.

Furthermore the need for a buyer to intervene regarding CRS settings is often due to configuration variances. For instance, if a CRS BI Setting contains specific user role types that do not match any user role types utilized by the buyer entity, a process applicable to the BI setting would not work because there would be no buyer user records mapped to the CRS user role position. Therefore, the system would notify the buyer and the buyer would map existing user group(s) or individual personnel to this user role position to alleviate the "null" personnel record mapping. The system may also enable a buyer entity to run tandem configuration settings, meaning that the buyer entity can run multiple configurations and not have to worry about modifying their master configurations.

FIG. 54 is a flow diagram illustrating consultant re-seller-buyer voucher processing. A flow 5400 begins at step 5402. At step 5402, the CRS user enters the system via a standard challenge and response log in procedure. At step 5404, the CRS activates a sales activity control at a home page menu. At step 5406, the CRS is provided a summary list display of sales activity including purchase orders. At step 5408, the CRS selects a desired buyer purchase order. At step 5410, the CRS is provided the summary list display of billable purchase order services. At step 5412, the CRS selects desired services line item from which to create a new voucher. At step 5414, the CRS enters voucher data. At step 5416, the CRS may save without submitting an incomplete record or complete in one session and submit for buyer review/approval.

At step 5418, the CRS submits a voucher services record via activation of a submit for processing/review control. At step 5420, database records are updated. At step 5422, the buyer is notified via standard notifications of a pending voucher submittal. At step 5424, the buyer user accesses the voucher via provided navigational controls. At step 5426, the buyer user processes the voucher in accordance with a buyer configured program configuration.

At step 5428, the voucher is approved or declined. If, at step 5428, the voucher is approved, execution proceeds to step 5430. If, at step 5428, the voucher is declined, execution proceeds to step 5436. At step 5430, the buyer user completes quality assessment. At step 5432, notifications are sent to the applicable CRS. At step 5434 the database records are updated. At step 5436, the buyer user specifies the declination reason and optionally enters notes. At step 5438 notifications are sent to the applicable CRS. From step 5438, execution returns to step 5402.

FIG. 55 is a flow diagram illustrating a consultant re-seller-buyer accounting process. A flow 5500 begins at step 5502. At step 5502, an approved voucher billing extraction routine is activated. At step 5504, approved interval specific buyer vouchers are extracted from the system. At step 5506, database records are stored. At step 5508, an invoice file according to buyer program configuration specifications is created. At step 5510, database records are stored. At step 5512, the invoice file is transmitted to the buyer in accordance with configuration specifications. At step 5514, the buyer's accounting program processes the invoice file. At step 5516, funds are released in accordance with program terms and conditions. At step 5518, database records are stored.

FIG. 56 illustrates FIG. 56 an exemplary supporting Vouchering Database Schema.

Referring again to Appendix A, design-view Tables 269-271 and 273-277, as well as data-view Tables 275-276 are considered particularly pertinent to the discussion above relative to FIGS. 54-56.

Exemplary Data Tables 1-10 and 12-277 follow:

| | | Table Key | |
|---|---|---|---|
| | | cdProductTypes (Design View) | |
| | Column | Data Type | Length |
| 1 - Design | ProductTypeID | int | 4 |
| | ProductTypeDesc | varchar | 50 |
| | | cdProductTypes (Data View) | |
| | ProductTypeID | ProductTypeDesc | |
| 1 - Data | 1 | ConsolEnterprise | |
| | 2 | ConsolLite | |
| | 3 | Procurement | |
| | 4 | VendorManagement | |
| | 5 | HumanCapitalManagement | |
| | 6 | RFxBidManagement | |
| | 7 | TimeKeeping | |
| | 8 | Vouchering | |
| | 9 | Finance | |
| | 10 | Tax Solutions | |
| | | cdModule (Design View) | |
| | Column | Data Type | Length |
| 2 - Design | ModuleID | int | 4 |
| | Module_Desc | varchar | 50 |

-continued

| | | Table Key | |
|---|---|---|---|
| | | cdModule (Data View) | |
| | ModuleID | Module_Desc | |
| 2 - Data | 1 | Master_Data | |
| | 2 | Commodity_Management | |
| | 3 | Vendor_Management | |
| | 4 | Human_Capital_Management | |
| | 5 | Financial_Management | |
| | 6 | CSF_Management | |
| | 7 | RFx_Bid_Management | |
| | 8 | Purchase_Requisition | |
| | 9 | Purchase_Order | |
| | 10 | Voucher | |
| | 11 | Bill_Pay | |
| | 12 | Reporting | |
| | | cdModuleElements (Design View) | |
| | Column | Data Type | Length |
| 3 - Design | Module_ElementID | int | 4 |
| | Module_Element_Desc | varchar | 50 |
| | ModuleID | int | 4 |
| | | cdModuleElements (Data View) | |
| 3 - Data | 1 | Organization_Matrix | |
| | 2 | Personnel_Master | |
| | 3 | User_Groups | |
| | 4 | User_Roles | |
| | 5 | Permissions | |
| | 6 | Geography_Matrix | |
| | 7 | Facility_Matrix | |
| | 8 | Project_Sector | |
| | 9 | Business_Sector | |
| | 10 | Project_Type | |
| | 11 | Material_Master | |
| | 12 | SIC_Matrix | |
| | 13 | NAICS_Matrix | |
| | 14 | Custom_Commodity_Matrix | |
| | 15 | Custom_Commodity_Attributes | |
| | 16 | Skill_Set_Matrix | |
| | 17 | Skill_Profile_Library | |
| | 18 | Rate_Card | |
| | 19 | Bid_Item_Library | |
| | 20 | Bid_Template_Library | |
| | 21 | Supplier_Type_Library | |
| | 22 | Supplier_Business_Qualification | |
| | 23 | Supplier_Insurance_Qualification | |
| | 24 | Supplier_Tiering | |
| | 25 | Supplier_Services_Matrix | |
| | 26 | Supplier_Agreements | |
| | 27 | Supplier_Waivers | |
| | 28 | Supplier_Audits | |
| | 29 | Supplier_Embedded_Base_Upload | |
| | 30 | Worker_Type_Library | |
| | 31 | Worker_Qualifiers | |
| | 32 | Worker_Agreements | |
| | 33 | Worker_Tenure_Matrix | |
| | 34 | Worker_Onboarding | |
| | 35 | Worker_Offboarding | |
| | 36 | Worker_Labor_Types | |
| | 37 | Worker_Expense_Types | |
| | 38 | Worker_Facility_Rules | |
| | 39 | Worker_Audit_Rules | |
| | 40 | Worker_Waivers | |
| | 41 | Worker_Asset_Issuance | |
| | 42 | Worker_Embedded_Base_Upload | |
| | 43 | Spending_Type_Library | |
| | 44 | Currency_Types | |
| | 45 | Discount_Terms | |
| | 46 | Payment_Terms | |
| | 47 | Rebate_Terms | |
| | 48 | Tax_Classes | |
| | 49 | Tax_Exemptions | |
| | 50 | Billing_File | |

-continued

| | Table Key |
|---|---|
| 51 | EDI_File |
| 52 | EFT_File |
| 53 | Accrual_Matrix |
| 54 | PO_Spend_Management |
| 55 | Asset_Library |
| 56 | Asset_Rules |
| 57 | Financial_Approvals |
| 58 | CSF_Classes |
| 59 | CSF_Library |
| 60 | Spend_CSFs |
| 61 | Organizational_CSFs |
| 62 | External_Client_CSFs |
| 63 | Commodity_CSFs |
| 64 | CSF_Edit_Controls |
| 65 | Order_Details |
| 66 | Bid_CSFs |
| 67 | Bid_Agreements |
| 68 | Bid_Logistics |
| 69 | Bid_Bulletin_Board |
| 70 | Bid_Auto_Post |
| 71 | Bid_Manual_Post |
| 72 | Bid_Response |
| 73 | Bid_Analysis |
| 74 | Bid_Scoring |
| 75 | Bid_Auction |
| 76 | Bid_Requote |
| 77 | Candidate_Submittal |
| 78 | Candidate_Background_Check |
| 79 | Candidate_Interview |
| 80 | Candidate_Tender_Offer |
| 81 | Candidate_Assessment |
| 82 | Candidate_Withdrawal |
| 83 | Bid_Response_Withdrawal |
| 84 | Bid_Tax_Assessment |
| 85 | Bid_Award |
| 86 | Bid_Disposition_Closure |
| 87 | Bid_Quality_Survey |
| 88 | Bid_Award_Inheritance |
| 89 | Req_Details_Edit |
| 90 | Req_Items_Submission |
| 91 | Req_Buyer_Tax_Assessment |
| 92 | Req_Vendor_Assessment |
| 93 | Req_Vendor_Tax_Assessment |
| 94 | Req_CSFs |
| 95 | Req_Approvals |
| 96 | Req_Details_Entry |
| 97 | File_Attachments |
| 98 | File_Attachments |
| 99 | Standard_PO |
| 100 | Blanket_PO |
| 101 | Change_Order |
| 102 | Change_Order_Validation |
| 103 | Spend_Threshold_Management |
| 104 | File_Attachments |
| 105 | PO_Close |
| 106 | Voucher_Buyer_Submission |
| 107 | Voucher_Supplier_Submission |
| 108 | Voucher_Supplier_Worker_Submission |
| 109 | Voucher_Validation |
| 110 | Voucher_Partial |
| 111 | Voucher_NonFinancial |
| 112 | Voucher_CSF_Edit |
| 113 | Voucher_Quality_Assessment |
| 114 | Voucher_NonConstrained |
| 115 | Voucher_Credit |
| 116 | Voucher_Escalation |
| 117 | Voucher_Approval |
| 118 | Bill_File_Specification |
| 119 | Approved_Voucher_Extract |
| 120 | NonApproved_Voucher_Report |
| 121 | EDI_File_Specification |
| 122 | EDI_File |
| 123 | Single_Account_Plant |
| 124 | Multi_Account_Plant |
| 125 | Supplier_Payment |
| 126 | Tax_Report |

| Table Key | | | |
|---|---|---|---|
| cdProductMapModuleElement (Design View) | | | |
| | Column | Data Type | Length |
| 4 - Design | ProductTypeID | int | 4 |
| | Module_ElementID | int | 4 |
| | ProductTMapModuleEID | int | 4 |
| tblPrograms (Design View) | | | |
| | Column | DataType | Length |
| 5 - Design | ProgramID | int | 4 |
| | ProgramName | varchar | 50 |
| | SystemSetupUserID | int | 4 |
| | ProgramStartDate | datetime | 8 |
| | ProgramEndDate | datetime | 8 |
| | ProgramStatus | int | 4 |
| | ClientID | uniqueidentifier | 16 |
| tblProgramProductMap (Design View) | | | |
| | Column | Data Type | Length |
| 6 - Design | ProgramID | int | 4 |
| | ProductTypeID | int | 4 |
| | CRSID | int | 4 |
| | ResellerPeopleID | uniqueidentifier | 16 |
| | ProductDate | datetime | 8 |
| | tblProgramProductMap | int | 4 |
| tblConfigGroup (Design View) | | | |
| | Column | Data Type | Length |
| 7 - Design | ConfigGroupID | int | 4 |
| | ConfigGroupName | varchar | 50 |
| tblConfigGroup (Data View) | | | |
| | ConfigGroupID | ConfigGroupName | |
| 7 - Data | 1 | Master_Data | |
| | 2 | Commodity_Management | |
| | 3 | Vendor_Management | |
| | 4 | Human_Capital_Management | |
| | 5 | Financial_Management | |
| | 6 | CSF_Management | |
| | 7 | RFx_Bid_Management | |
| | 8 | Purchase_Requisition | |
| | 9 | Purchase_Order | |
| | 10 | Voucher | |
| | 11 | Bill_Pay | |
| | 12 | Reporting | |
| tblConfigElements (Design View) | | | |
| | Column | Data Type | Length |
| 8 - Design | ConfigElementID | int | 4 |
| | ConfigElementName | varchar | 50 |
| | ConfigGroupID | int | 4 |
| tblConfigElements (Data View) | | | |
| | ConfigElementID | ConfigElementName | |
| 8 - Data | 1 | Organization_Matrix | |
| | 2 | Personnel_Master | |
| | 3 | User_Groups | |
| | 4 | User_Roles | |
| | 5 | Permissions | |
| | 6 | Geography_Matrix | |
| | 7 | Facility_Matrix | |
| | 8 | Project_Sector | |
| | 9 | Business_Sector | |
| | 10 | Project_Type | |

-continued

| | Table Key |
|---|---|
| 11 | Material_Master |
| 12 | SIC_Matrix |
| 13 | NAICS_Matrix |
| 14 | Custom_Commodity_Matrix |
| 15 | Skill_Set_Matrix |
| 16 | Skill_Profile_Library |
| 17 | Rate_Card_Matrix |
| 18 | Bid_Item_Library |
| 19 | Bid_Template_Library |
| 20 | Supplier_Type_Library |
| 21 | Supplier_Business_Qualification |
| 22 | Supplier_Insurance_Qualification |
| 23 | Supplier_Tiering |
| 24 | Supplier_Services_Matrix |
| 25 | Supplier_Agreements |
| 26 | Supplier_Waivers |
| 27 | Supplier_Audits |
| 28 | Supplier_Embedded_Base_Upload |
| 29 | Worker_Type_Library |
| 30 | Worker_Qualifiers |
| 31 | Worker_Agreements |
| 32 | Worker_Tenure_Matrix |
| 33 | Worker_Onboarding |
| 34 | Worker_Offboarding |
| 35 | Worker_Labor_Types |
| 36 | Worker_Expense_Types |
| 37 | Worker_Facility_Rules |
| 38 | Worker_Audit_Rules |
| 39 | Worker_Waivers |
| 40 | Worker_Asset_Issuance |
| 41 | Worker_Embedded_Base_Upload |
| 42 | Spending_Type_Library |
| 43 | Currency_Types |
| 44 | Discount_Terms |
| 45 | Payment_Terms |
| 46 | Rebate_Terms |
| 47 | Tax_Classes |
| 48 | Tax_Exemptions |
| 49 | Billing_File |
| 50 | EDI_File |
| 51 | EFT_File |
| 52 | Accrual_Matrix |
| 53 | PO_Spend_Management |
| 54 | Asset_Library |
| 55 | Asset_Rules |
| 56 | Financial_Approvals |
| 57 | CSF_Classes |
| 58 | CSF_Library |
| 59 | Spend_CSFs |
| 60 | Organizational_CSFs |
| 61 | External_Client_CSFs |
| 62 | Commodity_CSFs |
| 63 | CSF_Edit_Controls |
| 64 | Order_Details |
| 65 | Bid_CSFs |
| 66 | Bid_Agreements |
| 67 | Bid_Logistics |
| 68 | Bid_Bulletin_Board |
| 69 | Bid_Auto_Post |
| 70 | Bid_Manual_Post |
| 71 | Bid_Response |
| 72 | Bid_Analysis |
| 73 | Bid_Scoring |
| 74 | Bid_Auction |
| 75 | Bid_Requote |
| 76 | Candidate_Submittal |
| 77 | Candidate_Background_Check |
| 78 | Candidate_Interview |
| 79 | Candidate_Tender_Offer |
| 80 | Candidate_Assessment |
| 81 | Candidate_Withdrawal |
| 82 | Bid_Response_Withdrawal |
| 83 | Bid_Tax_Assessment |
| 84 | Bid_Award |
| 85 | Bid_Disposition_Closure |
| 86 | Bid_Quality_Survey |
| 87 | Bid_Award_Inheritance |

| | | Table Key | |
|---|---|---|---|
| | 88 | Req_Details_Edit | |
| | 89 | Req_Items_Submission | |
| | 90 | Req_Buyer_Tax_Assessment | |
| | 91 | Req_Vendor_Assessment | |
| | 92 | Req_Vendor_Tax_Assessment | |
| | 93 | Req_CSFs | |
| | 94 | Req_Approvals | |
| | 95 | Req_Details_Entry | |
| | 96 | File_Attachments | |
| | 97 | File_Attachments | |
| | 98 | Standard_PO | |
| | 99 | Blanket_PO | |
| | 100 | Change_Order | |
| | 101 | Change_Order_Validation | |
| | 102 | Spend_Threshold_Management | |
| | 103 | File_Attachments | |
| | 104 | PO_Close | |
| | 105 | Voucher_Buyer_Submission | |
| | 106 | Voucher_Supplier_Submission | |
| | 107 | Voucher_Supplier_Worker_Submission | |
| | 108 | Voucher_Validation | |
| | 109 | Voucher_Partial | |
| | 110 | Voucher_NonFinancial | |
| | 111 | Voucher_CSF_Edit | |
| | 112 | Voucher_Quality_Assessment | |
| | 113 | Voucher_NonConstrained | |
| | 114 | Voucher_Credit | |
| | 115 | Voucher_Escalation | |
| | 116 | Voucher_Approval | |
| | 117 | Bill_File_Specification | |
| | 118 | Approved_Voucher_Extract | |
| | 119 | NonApproved_Voucher_Report | |
| | 120 | EDI_File_Specification | |
| | 121 | EDI_File | |
| | 122 | Single_Account_Plant | |
| | 123 | Multi_Account_Plant | |
| | 124 | Supplier_Payment | |
| | 125 | Tax_Report | |

| | | cdModuleEMapConfigE (Design View) | |
|---|---|---|---|
| | Column | Data Type | Length |
| 9 - Design | Module_ElementID | int | 4 |
| | ConfigElementID | int | 4 |
| | ModuleEMapConfigEID | int | 4 |

| | | cdzOnSiteServicesTypes (Design View) | |
|---|---|---|---|
| | Column | Data Type | Length |
| 10 - Design | OnSiteServicesTypeID | int | 4 |
| | OnSiteServicesTypeDesc | varchar | 50 |

| | | cdzOnSiteServicesTypes (Data View) | |
|---|---|---|---|
| | OnSiteServicesTypeID | OnSiteServicesTypeDesc | |
| 10 - Data | 1 | VendorManagementServices | |
| | 2 | HumanCapitalManagementServices | |
| | 3 | ContractAdministrationServices | |
| | 4 | BidProcessingServices | |
| | 5 | PurchaseOrderProcessingServices | |
| | 6 | ProjectManagementServices | |
| | 7 | Bill/PayServices | |
| | 8 | TaxationServices | |
| | 9 | ConsolTrainingServices | |

| | | cdModuleEMapOnSiteServices (Design View) | |
|---|---|---|---|
| | Column | Data Type | Length |
| 12 - Design | Module_ElementID | int | 4 |
| | OnSiteServicesTypeID | int | 4 |
| | ModuleEMapOSSID | int | 4 |

-continued

| | Table Key | | |
|---|---|---|---|
| | cdzAggregationTypes (Design View) | | |
| | Column | Data Type | Length |
| 13 - Design | AggregationServicesTypeID | int | 4 |
| | AggregationServicesTypeDesc | varchar | 50 |
| | cdzAggregationTypes (Data View) | | |
| | AggregationServicesTypeID | AggregationServicesTypeDesc | |
| 13 - Data | 1 | ClientAggregators | |
| | 2 | SupplierAggregators | |
| | 3 | ProductAggregators | |
| | cdModuleEMapAgServices (Design View) | | |
| | Column | Data Type | Length |
| 14 - Design | Module_ElementID | int | 4 |
| | ConfigElementID | int | 4 |
| | ModuleEMapConfigEID | int | 4 |
| | tblCRSMetaProjectAttributeCustom (Design View) | | |
| | Column | Data Type | Length |
| 15 - Design | ResellerID | int | 4 |
| | ResellerPeopleID | uniqueidentifier | 16 |
| | ConfigElementID | int | 4 |
| | CRS_Custom_AttributeID | uniqueidentifier | 16 |
| | CRS_Custom_AttributeName | varchar | 50 |
| | CRS_Custom_Attribute_Data_Type | int | 4 |
| | CRS_Custom_Attribute_Value | sql_variant | |
| | tblCRSMDOrgs (Design View) | | |
| | Column | Data Type | Length |
| 16 - Design | CRSOrgLevelID | uniqueidentifier | 16 |
| | CRSOrgLevelName | varchar | 50 |
| | ResellerID | int | 4 |
| | ResellerPeopleID | uniqueidentifier | 16 |
| | ConfigElementID | int | 4 |
| | CRSOrgCorpDesc | varchar | 5000 |
| | Create_Date | datetime | 8 |
| | tblCRSMDOrgHierarchy (Design View) | | |
| | Column | Data Type | Length |
| 17 - Design | CRSOrgCollectionID | uniqueidentifier | 16 |
| | CRSOrgCollectionName | varchar | 50 |
| | CRSOrgLevelID | uniqueidentifier | 16 |
| | HierarchyOrder | numeric | 9 |
| | tblCRSMDOrgType (Design View) | | |
| | Column | Data Type | Length |
| 18 - Design | CRSOrgTypeID | uniqueidentifier | 16 |
| | CRSOrgTypeName | varchar | 50 |
| | CRSOrgTypeDesc | varchar | 500 |
| | [Sys-OrgTypeID] | int | 4 |
| | [[Sys-OrgTypeName] | char | 10 |
| | ResellerID | int | 4 |
| | ResellerPeopleID | uniqueidentifier | 16 |
| | ConfigElementID | int | 4 |
| | Create_Date | datetime | 8 |
| | tblCRSMDOrgAttributesCustom (Design View) | | |
| | Column | Data Type | Length |
| 19 - Design | CRS_Custom_AttributeID | uniqueidentifier | 16 |
| | CRS_Custom_Attribute_Value | sql_variant | |

Table Key

| | CRSOrgAttributeID | uniqueidentifier | 16 |
|---|---|---|---|
| | TraceRecordID | uniqueidentifier | 16 | tblCRSMDOrgAttributesMap (Design View)

| | Column | Data Type | Length |
|---|---|---|---|
| 20 - Design | CRSOrgLevelID | uniqueidentifier | 16 |
| | CRSOrgTypeID | uniqueidentifier | 16 |
| | CRSOOrgAttributeID | uniqueidentifier | 16 |
| | CRS_Custom_AttributeID | uniqueidentifier | 16 | tblCRSMDPersonnelGrade (Design View)

| | Column | Data Type | Length |
|---|---|---|---|
| 21 - Design | CRSPersonnelGradeID | uniqueidentifier | 16 |
| | CRSPersonnelGradeTitle | varchar | 50 |
| | CRSPersonnelGradeDesc | varchar | 500 |
| | ResellerID | int | 4 |
| | ResellerPeopleID | uniqueidentifier | 16 |
| | ConfigElementID | int | 4 |
| | Create_Date | datetime | 8 | tblCRSMDPersonnelGradeHierarchy (Design View)

| | Column | Data Type | Length |
|---|---|---|---|
| 22 - Design | CRSPersonnelGradeID | uniqueidentifier | 16 |
| | CRSPGHierarchyLevel | numeric | 9 |
| | CRSPGHLMap | uniqueidentifier | 16 | tblCRSMDPersonnel (Design View)

| | Column | Data Type | Length |
|---|---|---|---|
| 23 - Design | UserGUID | uniqueidentifier | 16 |
| | Employee_ID | nvarchar | 10 |
| | First_Name | nvarchar | 50 |
| | Last_Name | nvarchar | 50 |
| | Last_Name_2nd | nvarchar | 50 |
| | Middle_Name | nvarchar | 10 |
| | Active | bit | 1 |
| | DateUpdated | datetime | 8 |
| | CRSPersonnelGradeID | uniqueidentifier | 16 |
| | CRSPersonnelUD | uniqueidentifier | 16 |
| | WorkLocationID | int | 4 |
| | Phone | varchar | 50 |
| | Fax | varchar | 50 |
| | Email | varchar | 50 | tblCRSMDPersonnelAttributesCustom (Design View)

| | Column | Data Type | Length |
|---|---|---|---|
| 24 - Design | CRSPersonnelAttributeMapID | uniqueidentifier | 16 |
| | CRS_Custom_AttributeID | uniqueidentifier | 16 |
| | CRS_Custom_Attribute_Value | sql_variant | |
| | RecordTraceID | uniqueidentifier | 16 | tblCRSMDPersonnelAttributes (Design View)

| | Column | Data Type | Length |
|---|---|---|---|
| 25 - Design | EmployeeType | uniqueidentifier | 16 |
| | HireDate | datetime | 8 |
| | LastEvaluationDate | datetime | 8 |
| | SalaryLevelID | uniqueidentifier | 16 |
| | JobTitleID | uniqueidentifier | 16 |
| | JobFunctionID | uniqueidentifier | 16 |
| | TeamRoleID | uniqueidentifier | 16 |
| | EducationLevelID | uniqueidentifier | 16 |
| | BondStatus | uniqueidentifier | 16 |
| | DrugScreenStatus | uniqueidentifier | 16 |
| | RightToWorkID | uniqueidentifier | 16 |
| | CRSPersonnelUD | uniqueidentifier | 16 |

Table Key

|  | CRSPersonnelAttributeMapID | uniqueidentifier | 16 |
|---|---|---|---|
|  | CRS_Custom_AttributeID | uniqueidentifier | 16 | tblCRSMDPositions (Design View)

| | Column | Data Type | Length |
|---|---|---|---|
| 26 - Design | CRSPositionID | uniqueidentifier | 16 |
| | CRSPositionName | varchar | 50 |
| | CRSPositionNameDesc | varchar | 5000 |
| | ResellerID | int | 4 |
| | ResellerPeopleID | uniqueidentifier | 16 |
| | ConfigElementID | int | 4 |
| | Create_Date | datetime | 8 |
| | SysPositionID | int | 4 |
| | SysPositionName | varchar | 50 | tblCRSMDUserGroup (Design View)

| | Column | Data Type | Length |
|---|---|---|---|
| 27 - Design | CRSGroupID | uniqueidentifier | 16 |
| | CRSGroupName | varchar | 50 |
| | CRSPositionNameDesc | varchar | 5000 |
| | ResellerID | int | 4 |
| | ResellerPeopleID | uniqueidentifier | 16 |
| | ConfigElementID | int | 4 |
| | Create_Date | datetime | 8 | tblCRSMDGroupPositionMap (Design View)

| | Column | Data Type | Length |
|---|---|---|---|
| 28 - Design | CRSPositionID | uniqueidentifier | 16 |
| | CRSGroupID | uniqueidentifier | 16 |
| | CRSGroupPositionMapID | uniqueidentifier | 16 |
| | Create_Date | datetime | 8 | tblCRSMDGradeGroupMap (Design View)

| | Column | Data Type | Length |
|---|---|---|---|
| 29 - Design | CRSPersonnelGradeID | uniqueidentifier | 16 |
| | CRSGroupID | uniqueidentifier | 16 |
| | CRSGradeGroupMapID | uniqueidentifier | 16 |
| | Create_Date | datetime | 8 | tblCRSMDFacility (Design View)

| | Column | Data Type | Length |
|---|---|---|---|
| 30 - Design | CRSFacilityMasterID | uniqueidentifier | 16 |
| | CRS_Facility_Name | varchar | 50 |
| | CRS_Facility_Desc | varchar | 500 |
| | ResellerID | int | 4 |
| | ResellerPeopleID | uniqueidentifier | 16 |
| | ConfigElementID | int | 4 |
| | Create_Date | datetime | 8 | tblCRSMDFacilityAttributesCustom (Design View)

| | Column | Data Type | Length |
|---|---|---|---|
| 31 - Design | CRSFacilityAttributeMapID | uniqueidentifier | 16 |
| | CRS_Custom_AttributeID | uniqueidentifier | 16 |
| | CRS_Custom_Attribute_Value | sql_variant | |
| | CRS_Custom_AttributeMapID | uniqueidentifier | 16 | tblCRSMDFacilityAttributeMap (Design View)

| | Column | Data Type | Length |
|---|---|---|---|
| 32 - Design | CRSFacilityMasterID | uniqueidentifier | 16 |
| | CRSFacilityAttributeMapID | uniqueidentifier | 16 |
| | CRSFacilityTypeID | uniqueidentifier | 16 |
| | CRSFacilityOccupancyID | uniqueidentifier | 16 |
| | CRSFacilityOccupationTypeID | uniqueidentifier | 16 |

-continued

| Table Key | | |
|---|---|---|
| CRSFacilityFunctionID | sql_variant | |
| CRSFacilityHazMatID | sql_variant | |
| CRSFacilityAccessModeID | sql_variant | |
| CRSFacilityPowerPlantID | sql_variant | |
| CRSFacilityCommSystemID | sql_variant | |
| CRS_Custom_AttributeID | uniqueidentifier | 16 |

| tblCRSGEOCountry (Design View) | | | |
|---|---|---|---|
| | Column | Data Type | Length |
| 33 - Design | CountryID | int | 4 |
| | CountryName | varchar | 100 |
| | CountryAbbr | varchar | 50 |
| | CurrencyName | varchar | 100 |
| | CurrencyUnicode | varchar | 50 |
| | defaultvalue | bit | 1 |
| | RegionTypeName | varchar | 100 |

| tblCRSGEORegion (Design View) | | | |
|---|---|---|---|
| | Column | Data Type | Length |
| 34 - Design | Region_ID | int | 4 |
| | Region_Name | nvarchar | 50 |
| | Region_Abbreviation | nvarchar | 4 |
| | Region_Type | varchar | 50 |
| | Country_ID | int | 4 |

| tblCRSGEOCities (Design View) | | | |
|---|---|---|---|
| | Column | Data Type | Length |
| 35 - Design | City_ID | int | 4 |
| | City_Name | nvarchar | 255 |
| | Region_Name | nvarchar | 4 |
| | Region_ID | int | 4 |
| | Country_ID | int | 4 |
| | Country_ID | int | 4 |

| tblCRSGEOMultiNationalGroup (Design View) | | | |
|---|---|---|---|
| | Column | Data Type | Length |
| 36 - Design | CRSNationalCollectionID | uniqueidentifier | 16 |
| | CRSNationalCollectionName | varchar | 50 |
| | CRSNationalCollectionDesc | varchar | 5000 |
| | ResellerID | int | 4 |
| | ResellerPeopleID | uniqueidentifier | 16 |
| | ConfigElementID | int | 4 |
| | Create_Date | datetime | 8 |

| tblCRSGEOMNGroupMap (Design View) | | | |
|---|---|---|---|
| | Column | Data Type | Length |
| 37 - Design | CRSNationalCollectionID | uniqueidentifier | 16 |
| | CountryID | int | 4 |
| | CRSNationalCollectionMapID | uniqueidentifier | 16 |

| tblCRSGEORegionalGroup (Design View) | | | |
|---|---|---|---|
| | Column | Data Type | Length |
| 38 - Design | CRSRegionalCollectionID | uniqueidentifier | 16 |
| | CRSRegionalCollectionName | varchar | 50 |
| | CRSRegionaCollectionDesc | varchar | 5000 |
| | ResellerID | int | 4 |
| | ResellerPeopleID | uniqueidentifier | 16 |
| | ConfigElementID | int | 4 |
| | Create_Date | datetime | 8 |

| Table Key | | | |
|---|---|---|---|
| | tblCRSGEORegionGroupMap(Design View) | | |
| | Column | Data Type | Length |
| 39 - Design | CRSRegionalCollectionID | uniqueidentifier | 16 |
| | RegionID | int | 4 |
| | CRSRegionalCollectionMapID | uniqueidentifier | 16 |
| | tblCRSGEOPopCenterGroup (Design View) | | |
| | Column | Data Type | Length |
| 40 - Design | CRSPCCollectionID | uniqueidentifier | 16 |
| | CRSPCCollectionName | varchar | 50 |
| | CRSPCCollectionDesc | varchar | 5000 |
| | ResellerID | int | 4 |
| | ResellerPeopleID | uniqueidentifier | 16 |
| | ConfigElementID | int | 4 |
| | Create_Date | datetime | 8 |
| | tblCRSGEOPopCenterGroupMap (Design View) | | |
| | Column | Data Type | Length |
| 41 - Design | CRSPCCollectionID | uniqueidentifier | 16 |
| | City_ID | int | 4 |
| | CRSPCCollectionMapID | uniqueidentifier | 16 |
| | tblCRSGEOAttributeMap (Design View) | | |
| | Column | Data Type | Length |
| 42 - Design | CRS_Custom_AttributeID | uniqueidentifier | 16 |
| | City_ID | int | 4 |
| | Region_ID | int | 4 |
| | Country_ID | int | 4 |
| | CRSNationalCollectionID | uniqueidentifier | 16 |
| | CRSRegionalCollectionID | uniqueidentifier | 16 |
| | CRSPopCenterCollection | uniqueidentifier | 16 |
| | CRS_Custom_AttributeMapID | uniqueidentifier | 16 |
| | CRS_Custom_Attribute_Value | sql_variant | |
| | tblCRSProjectSector (Design View) | | |
| | Column | Data Type | Length |
| 43 - Design | CRS_Project_Sector_ID | uniqueidentifier | 16 |
| | CRS_Project_Sector_Name | varchar | 50 |
| | ResellerID | int | 4 |
| | ResellerPeopleID | uniqueidentifier | 16 |
| | ConfigElementID | int | 4 |
| | [Sys-Project_Sector_ID] | int | 4 |
| | [Sys-Project_Sector_Name] | varchar | 50 |
| | Create_Date | datetime | 8 |
| | Status_ID | int | 4 |
| | tblCRSProjectFamily (Design View) | | |
| | Column | Data Type | Length |
| 44 - Design | CRS_Project_Family_ID | uniqueidentifier | 16 |
| | CRS_Project_Sector_ID | uniqueidentifier | 16 |
| | CRS_Project_Family_Name | varchar | 50 |
| | [Sys-Project_Sector_ID] | int | 4 |
| | [Sys-Project_Family_ID] | int | 4 |
| | [Sys-Project_Family_Name] | varchar | 50 |
| | tblCRSProjectSectorHierarchy (Design View) | | |
| | Column | Data Type | Length |
| 45 - Design | CRS_Related_Project_Sector_ID | uniqueidentifier | 16 |
| | Hierarchy_Relationship_Type_ID | int | 4 |
| | CRS_Hierarchy_ID | uniqueidentifier | 16 |
| | CRS_Hierarchy_Name | varchar | 50 |
| | Create_Date | datetime | 8 |

Table Key tblCRSProjectSectorHierarchyType (Design View)

| | Column | Data Type | Length |
|---|---|---|---|
| 46 - Design | Hierarchy_Relationship_Type_ID | int | 4 |
| | Hierarchy_Relationship_Type_Name | char | 50 | tblCRSProjectSectorHierarchyType (Data View)

| | Hierarchy_Relationship_Type_ID | Hierarchy_Relationship_Type_Name |
|---|---|---|
| 46 - Data | 1 | Parent |
| | 2 | Grand Parent | tblCRSProjectFamilyHierarchy (Design View)

| | Column | Data Type | Length |
|---|---|---|---|
| 47 - Design | Related_CRS_Project_Family_ID | uniqueidentifier | 16 |
| | PF_Hierarchy_Relationship_Type_ID | int | 4 |
| | CRS_PF_Hierarchy_ID | uniqueidentifier | 16 |
| | CRS_Hierarchy_Name | varchar | 50 |
| | Create_Date | datetime | 8 | tblCRSProjectFamilyHierarchyType (Design View)

| | Column | Data Type | Length |
|---|---|---|---|
| 48 - Design | PF_Hierarchy_Relationship_Type_ID | int | 4 |
| | PF_Hierarchy_Relationship_Type_Name | char | 50 | tblCRSProjectFamilyHierarchyType (Data View)

| | PF_Hierarchy_Relationship_Type_ID | PF_Hierarchy_Relationship_Type_Name |
|---|---|---|
| 48 - Data | 1 | Child |
| | 2 | Grand Child | tblCRSProjectType (Design View)

| | Column | Data Type | Length |
|---|---|---|---|
| 49 - Design | CRSProjectTypeID | uniqueidentifier | 16 |
| | CRSProjectTypeName | varchar | 50 |
| | [Sys-Project_Type_ID] | int | 4 |
| | [Sys-Project_Type] | varchar | 50 |
| | Create_Date | datetime | 8 |
| | ResellerID | int | 4 |
| | ResellerPeopleID | uniqueidentifier | 16 |
| | ConfigElementID | int | 4 | tblCRSProjectImpactCode (Design View)

| | Column | Data Type | Length |
|---|---|---|---|
| 50 - Design | CRSProjectImpactCode | uniqueidentifier | 16 |
| | CRSProjectImpactCodeName | varchar | 50 |
| | [Sys-ProjectImpactCodeID] | int | 4 |
| | [Sys-ProjectImpactCode] | varchar | 50 |
| | Create_Date | datetime | 8 |
| | ResellerID | int | 4 |
| | ResellerPeopleID | uniqueidentifier | 16 |
| | ConfigElementID | int | 4 | tblCRSProjectEvent (Design View)

| | Column | Data Type | Length |
|---|---|---|---|
| 51 - Design | ProjectEventID | int | 4 |
| | ProjectEventDesc | varchar | 50 |
| | ResellerID | int | 4 |
| | ResellerPeopleID | uniqueidentifier | 16 |
| | ConfigElementID | int | 4 |
| | CRS_Project_EventID | uniqueidentifier | 16 |
| | CRS_Project_Event_Name | varchar | 50 |

Table Key tblCRSProjectEventImportance (Design View)

| | Column | Data Type | Length |
|---|---|---|---|
| 52 - Design | ActivityImportanceID | int | 4 |
| | ActivityImportanceDesc | varchar | 50 |
| | ResellerID | int | 4 |
| | ResellerPeopleID | uniqueidentifier | 16 |
| | ConfigElementID | int | 4 |
| | CRSActivityImportanceID | uniqueidentifier | 16 |
| | CRSActivityImportanceName | varchar | 50 |
| | Create_Date | datetime | 8 | tblCRSProjectStatus (Design View)

| | Column | Data Type | Length |
|---|---|---|---|
| 53 - Design | CRSProjectStautsID | uniqueidentifier | 16 |
| | CRSProjectStautsName | varchar | 50 |
| | [Sys-ProjectStatusID] | int | 4 |
| | [Sys-ProjectStatusName] | varchar | 50 |
| | Create_Date | datetime | 8 |
| | ResellerID | int | 4 |
| | ResellerPeopleID | uniqueidentifier | 16 |
| | ConfigElementID | int | 4 | tblCRSProjectPerformanceStatus (Design View)

| | Column | Data Type | Length |
|---|---|---|---|
| 54 - Design | PerformanceStatusID | int | 4 |
| | PerformanceStatusDesc | varchar | 50 |
| | CRS_Performance_StatusID | uniqueidentifier | 16 |
| | CRS_Performance_Status_Name | varchar | 50 |
| | ResellerID | int | 4 |
| | ResellerPeopleID | uniqueidentifier | 16 |
| | ConfigElementID | int | 4 |
| | Create_Date | datetime | 8 | tblCRSProjectDeliverableStatus (Design View)

| | Column | Data Type | Length |
|---|---|---|---|
| 55 - Design | DeliverableStatusID | int | 4 |
| | DeliverableStatusDesc | varchar | 50 |
| | ResellerID | int | 4 |
| | ResellerPeopleID | uniqueidentifier | 16 |
| | ConfigElementID | int | 4 |
| | CRSDeliverableStatusID | uniqueidentifier | 16 |
| | CRSDeliverableStatusName | varchar | 50 | tblCRSProjectDeliveryQuality (Design View)

| | Column | Data Type | Length |
|---|---|---|---|
| 56 - Design | QAid | int | 4 |
| | QualityLevelDesc | varchar | 50 |
| | ResellerID | int | 4 |
| | ResellerPeopleID | uniqueidentifier | 16 |
| | ConfigElementID | int | 4 |
| | CRS_Delivery_QualityID | uniqueidentifier | 16 |
| | CRS_Delivery_Quality_Name | varchar | 50 | tblCRSProectPhaseType (Design View)

| | Column | Data Type | Length |
|---|---|---|---|
| 57 - Design | ResellerID | int | 4 |
| | ResellerPeopleID | uniqueidentifier | 16 |
| | ConfigElementID | int | 4 |
| | CRSProjectPhaseTypeID | uniqueidentifier | 16 |
| | CRSProjectPhaseTypeDesc | varchar | 50 |
| | Create_Date | datetime | 8 |

-continued

| | Table Key | | |
|---|---|---|---|
| | tblCRSProjectPhaseStatus (Design View) | | |
| | Column | Data Type | Length |
| 58 - Design | PhaseStatusID | int | 4 |
| | PhaseStatusDesc | varchar | 50 |
| | ResellerID | int | 4 |
| | ResellerPeopleID | uniqueidentifier | 16 |
| | ConfigElementID | int | 4 |
| | CRSProjectPhaseStatusID | uniqueidentifier | 16 |
| | CRSProjectPhaseStatusName | varchar | 50 |
| | Create_Date | datetime | 8 |
| | tblCRSMetaProjectAttributeCustom (Design View) | | |
| | Column | Data Type | Length |
| 59 - Design | ResellerID | int | 4 |
| | ResellerPeopleID | uniqueidentifier | 16 |
| | ConfigElementID | int | 4 |
| | CRS_Custom_AttributeID | uniqueidentifier | 16 |
| | CRS_Custom_AttributeName | varchar | 50 |
| | CRS_Custom_Attribute_Data_Type | int | 4 |
| | CRS_Custom_Attribute_Value | sql_variant | |
| | tblCRSBusinessSector (Design View) | | |
| | Column | Data Type | Length |
| 60 - Design | CRSBusinessSectorID | uniqueidentifier | 16 |
| | CRSBusinessSectorName | varchar | 50 |
| | ResellerID | int | 4 |
| | ResellerPeopleID | uniqueidentifier | 16 |
| | ConfigElementID | int | 4 |
| | [Sys-BusinessSectorID] | int | 4 |
| | [Sys-BusinessSectorName] | varchar | 50 |
| | Create_Date | datetime | 8 |
| | tblCRSBusinessArena (Design View) | | |
| | Column | Data Type | Length |
| 61 - Design | CRSBusinessArenaID | uniqueidentifier | 16 |
| | CRSBusinessArenaName | varchar | 50 |
| | CRSBusinessSectorID | uniqueidentifier | 16 |
| | [Sys-BusinessArenaID] | int | 4 |
| | [Sys-BusinessArenaName] | varchar | 50 |
| | tblCRSBusinessFamily (Design View) | | |
| | Column | Data Type | Length |
| 62 - Design | CRSBusinessFamilyID | uniqueidentifier | 16 |
| | CRSBusinessFamilyName | varchar | 50 |
| | CRSBusinessArenaID | uniqueidentifier | 16 |
| | [Sys-BusinessFamilyID] | int | 4 |
| | [Sys-BusinessFamilyName] | varchar | 50 |
| | tblCRSGeneralFunction (Design View) | | |
| | Column | Data Type | Length |
| 63 - Design | CRSGeneralFunctionID | uniqueidentifier | 16 |
| | CRSGeneralFunctionName | varchar | 50 |
| | [Sys-GeneralFunctionID] | int | 4 |
| | [Sys-GeneralFunctionName] | varchar | 50 |
| | tblCRSGeneralFunctionBusinessFamily (Design View) | | |
| | Column | Data Type | Length |
| 64 - Design | CRSBusinessFamilyID | uniqueidentifier | 16 |
| | CRSGeneralFunctionID | uniqueidentifier | 16 |
| | RecordMapID | uniqueidentifier | 16 |

Table Key tblCRSBusinessCategory (Design View)

| | Column | Data Type | Length |
|---|---|---|---|
| 65 - Design | CRSBusinessCategoryID | uniqueidentifier | 16 |
| | CRSBusinessCategoryName | varchar | 50 |
| | [Sys-BusinessCategoryID] | int | 4 |
| | [Sys-BusinessCategoryName] | varchar | 50 | tblCRSBusinessSkill (Design View)

| | Column | Data Type | Length |
|---|---|---|---|
| 66 - Design | CRSBusinessSkillID | uniqueidentifier | 16 |
| | CRSBusinessSkillName | varchar | 50 |
| | [Sys-BusinessSkillID] | int | 4 |
| | [Sys-BusinessSkillName] | varchar | 50 | tblCRSBusinessCategorySkill (Design View)

| | Column | Data Type | Length |
|---|---|---|---|
| 67 - Design | CRSBusinessCategoryID | uniqueidentifier | 16 |
| | CRSBusinessSkillID | uniqueidentifier | 16 |
| | RecordMapID | uniqueidentifier | 16 | tblCRSBusinessCategoryFamily (Design View)

| | Column | Data Type | Length |
|---|---|---|---|
| 68 - Design | CRSBusinessCategoryID | uniqueidentifier | 16 |
| | CRSBusinessFamilyID | uniqueidentifier | 16 |
| | required | bit | 1 |
| | RecordMapID | uniqueidentifier | 16 | tblCRSResourceProfileMaster (Design View)

| | Column | Data Type | Length |
|---|---|---|---|
| 69 - Design | CRSResourceProfileID | uniqueidentifier | 16 |
| | CRSResourceProfileName | varchar | 50 |
| | ResellerID | int | 4 |
| | ResellerPeopleID | uniqueidentifier | 16 |
| | ConfigElementID | int | 4 |
| | Create_Date | datetime | 8 | tblCRSResourceProfileMasterGFs (Design View)

| | Column | Data Type | Length |
|---|---|---|---|
| 70 - Design | CRSResourceProfileID | uniqueidentifier | 16 |
| | CRSGeneralFunctionID | uniqueidentifier | 16 |
| | RecordMapID | uniqueidentifier | 16 | tblCRSResourceProfileMasterCategory (Design View)

| | Column | Data Type | Length |
|---|---|---|---|
| 71 - Design | CRSResourceProfileID | uniqueidentifier | 16 |
| | CRSBusinessCategoryID | uniqueidentifier | 16 |
| | RecordMapID | uniqueidentifier | 16 | tblCRSResourceProfileMasterSkills (Design View)

| | Column | Data Type | Length |
|---|---|---|---|
| 72 - Design | CRSResourceProfileID | uniqueidentifier | 16 |
| | CRSBusinessSkillID | uniqueidentifier | 16 |
| | RecordMapID | uniqueidentifier | 16 | tblCRSResourceProfileRateMaster (Design View)

| | Column | Data Type | Length |
|---|---|---|---|
| 73 - Design | CRSResourceProfileID | uniqueidentifier | 16 |
| | CRSResourceProfileRateID | uniqueidentifier | 16 |
| | Create_Date | datetime | 8 |

| | Table Key | | |
|---|---|---|---|
| | Start_Period | datetime | 8 |
| | End_Period | datetime | 8 |
| | Status | int | 4 |
| | HourlyStraightTimeBM | money | 8 |

| tblCRSResourceProfileRateCard (Design View) | | | |
|---|---|---|---|
| | Column | Data Type | Length |
| 74 - Design | PricingDetailID | uniqueidentifier | 16 |
| | CRSResourceProfileRateID | uniqueidentifier | 16 |
| | CountryID | int | 4 |
| | CountryPriceVariance | float | 8 |
| | Region_ID | int | 4 |
| | RegionPriceVariance | float | 8 |
| | City_ID | int | 4 |
| | CityPriceVariance | float | 8 |
| | IndustrySectorID | int | 4 |
| | IndustrySectorPriceVariance | float | 8 |
| | ContractorTypeID | int | 4 |
| | ContractorTypePriceVariance | float | 8 |
| | TeamRoleID | int | 4 |
| | TeamRolePricingVariance | float | 8 |
| | WorkEnvironmentID | int | 4 |
| | WorkEnvironmentPriceVariance | float | 8 |
| | LaborRateTypeID | int | 4 |
| | LaborRateTypePriceVariance | float | 8 |
| | CRS_Custom_AttributeID | uniqueidentifier | 16 |

| cdSICDivisions (Design View) | | | |
|---|---|---|---|
| | Column | Data Type | Length |
| 75 - Design | SICDivisionID | int | 4 |
| | SICDivisionCode | varchar | 1 |
| | SICDivisionName | varchar | 255 |
| | SICCommodityHierarchy | numeric | 9 |

| cdSICMajGroups (Design View) | | | |
|---|---|---|---|
| | Column | Data Type | Length |
| 76 - Design | SICMajorGroupCode | int | 4 |
| | SICMajorGroupName | varchar | 255 |
| | SICDivisionID | int | 4 |
| | SICCommodityHierarchy | numeric | 9 |

| cdSICIndustryGroups (Design View) | | | |
|---|---|---|---|
| | Column | Data Type | Length |
| 77 - Design | SICIndustryGroupCode | int | 4 |
| | SICIndustryGroupName | varchar | 255 |
| | SICMajorGroupCode | int | 4 |
| | SICCommodityHierarchy | numeric | 9 |

| cdSICIndustries (Design View) | | | |
|---|---|---|---|
| | Column | Data Type | Length |
| 78 - Design | SICCode | varchar | 4 |
| | SICCodeDescription | varchar | 255 |
| | SICIndustryGroupCode | int | 4 |
| | SICCommodityHierarchy | numeric | 9 |

| tblCRSCommodityClass (Design View) | | | |
|---|---|---|---|
| | Column | Data Type | Length |
| 79 - Design | CRSCommodityClassID | uniqueidentifier | 16 |
| | CRSCommodityClassName | varchar | 50 |
| | ResellerID | int | 4 |
| | ResellerPeopleID | uniqueidentifier | 16 |
| | ConfigElementID | int | 4 |
| | Create_Date | datetime | 8 |
| | CRSCommodityHierarchy | numeric | 9 |

-continued

| | Table Key | | |
|---|---|---|---|
| | tblCRSCommodityGroup (Design View) | | |
| | Column | Data Type | Length |
| 80 - Design | CRSCommodityClassID | uniqueidentifier | 16 |
| | CRSCommodityGroupID | uniqueidentifier | 16 |
| | CRSCommodityGroupName | varchar | 50 |
| | CRSCommodityHierarchy | numeric | 9 |
| | tblCRSCommoditySubGroup (Design View) | | |
| | Column | Data Type | Length |
| 81 - Design | CRSCommodityGroupID | uniqueidentifier | 16 |
| | CRSCommoditySubGroupID | uniqueidentifier | 16 |
| | CRSCommoditySubGroupName | varchar | 50 |
| | CRSCommodityHierarchy | numeric | 9 |
| | tblCRSCommodity (Design View) | | |
| | Column | Data Type | Length |
| 82 - Design | CRSCommoditySubGroupID | uniqueidentifier | 16 |
| | CRSCommodity | uniqueidentifier | 16 |
| | CRSCommodityName | varchar | 50 |
| | CRSCommodityHierarchy | numeric | 9 |
| | tblCRSCommodityItem (Design View) | | |
| | Column | Data Type | Length |
| 83 - Design | CRSCommodity | uniqueidentifier | 16 |
| | CRSCommodityItem | uniqueidentifier | 16 |
| | CRSCommodityItemName | varchar | 50 |
| | CRSCommodityShortItemDesc | varchar | 500 |
| | tblCRSCommodityItemAttributes (Design View) | | |
| | Column | Data Type | Length |
| 84 - Design | CRSCommodityItem | uniqueidentifier | 16 |
| | UnitOfMeasure | int | 4 |
| | StandardPkgQuantity | int | 4 |
| | ProductWarranty | bit | 1 |
| | ProductWarrantyTerms | varchar | 5000 |
| | MSDS | bit | 1 |
| | SingleSource | bit | 1 |
| | SingleSourceMFG | varchar | 100 |
| | ModelNumber | varchar | 50 |
| | SerialNumber | varchar | 50 |
| | MadeToOrder | bit | 1 |
| | [MadeToOrderLeadTime-Days] | numeric | 9 |
| | AttributeRecordID | uniqueidentifier | 16 |
| | tblCRSCommodityItemAttributesCustom (Design View) | | |
| | Column | Data Type | Length |
| 85 - Design | CRSCommodityItemAttributeID | uniqueidentifier | 16 |
| | CRSCommodityItemAttributeName | varchar | 100 |
| | CRSCommodityItemAttributeDataType | int | 4 |
| | ResellerID | int | 4 |
| | ResellerPeopleID | uniqueidentifier | 16 |
| | CRSDefaultValue | varchar | 500 |
| | Create_Date | datetime | 8 |
| | tblCRSCommodityItemAttributesMap (Design View) | | |
| | Column | Data Type | Length |
| 86 - Design | AttributeRecordID | uniqueidentifier | 16 |
| | CRSCommodityItemAttributeID | uniqueidentifier | 16 |
| | RecordMapID | uniqueidentifier | 16 |

| Table Key | | | |
|---|---|---|---|
| tblCRSCommoditySICMap (Design View) | | | |
| | Column | Data Type | Length |
| 87 - Design | CRSCommodityHierarchy | numeric | 9 |
| | SICCommodityHierarchy | numeric | 9 |
| | CRSSICCommodityMapID | uniqueidentifier | 16 |
| | ResellerID | int | 4 |
| | ResellerPeopleID | uniqueidentifier | 16 |
| | CRSCommodityClassID | uniqueidentifier | 16 |
| | SICDivisionID | int | 4 |
| | CRSCommodityGroupID | uniqueidentifier | 16 |
| | CRSCommoditySubGroupID | uniqueidentifier | 16 |
| | CRSCommodity | uniqueidentifier | 16 |
| | SICMajorGroupCode | int | 4 |
| | SICIndustryGroupCode | int | 4 |
| | SICCode | varchar | 4 |
| tblCRSRFXBidItems (Design View) | | | |
| | Column | Data Type | Length |
| 88 - Design | RFX_Item_ID | uniqueidentifier | 16 |
| | RFX_Item | varchar | 255 |
| | [Sys-RFx_Item_ID] | int | 4 |
| | [Sys-RFx_Item_Name] | varchar | 50 |
| | ResellerID | int | 4 |
| | ResellerPeopleID | uniqueidentifier | 16 |
| | ConfigElementID | int | 4 |
| | Date_Created | datetime | 8 |
| | Disablement_Allowed | char | 1 |
| | Supplier_Bid_Display | char | 1 |
| | Supplier_Response_Item | char | 1 |
| | Buyer_Data_Type | sql_variant | |
| | Buyer_Field_Length | varchar | 255 |
| | ASP_Item_Display_Order | numeric | 9 |
| | Supplier_Response_Data_Type | sql_variant | |
| | supplier_Field_Length | varchar | 255 |
| | Scorable | char | 1 |
| | isCurrencyTotal | char | 1 |
| | isCurrencyDependent | char | 1 |
| | CurrencyDependentRFX_Item_ID | int | 4 |
| | BuyerLabel | varchar | 50 |
| | SupplierResponseLabel | varchar | 50 |
| | BuyerDefaultValue | varchar | 4000 |
| | CRS_Select | varchar | 200 |
| | CalendarFlag | char | 1 |
| | CalendarType | char | 1 |
| | CRS_RFX_Category_ID | uniqueidentifier | 16 |
| tblCRSRFXBidCategories (Design View) | | | |
| | Column | Data Type | Length |
| 89 - Design | CRS_RFX_Category_ID | uniqueidentifier | 16 |
| | CRS_RFX_Category_Name | varchar | 255 |
| | ResellerID | int | 4 |
| | ResellerPeopleID | uniqueidentifier | 16 |
| | ConfigElementID | int | 4 |
| | Date_Created | datetime | 8 |
| | [Sys-RFX_Category_ID] | int | 4 |
| | [Sys-RFX_Category_Name] | varchar | 255 |
| | RFX_Section_ID | int | 4 |
| | ASP_Category_Display_Order | numeric | 9 |
| | Label_Comments | varchar | 1000 |
| | CurrentStatusID | int | 4 |
| | CRS_RFX_Section_ID | uniqueidentifier | 16 |
| tblCRSRFXBidSections (Design View) | | | |
| | Column | Data Type | Length |
| 90 - Design | CRS_RFX_Section_ID | uniqueidentifier | 16 |
| | CRS_RFX_Section_Name | varchar | 255 |
| | ResellerID | int | 4 |
| | ResellerPeopleID | uniqueidentifier | 16 |
| | ConfigElementID | int | 4 |

| | Table Key | | |
|---|---|---|---|
| | Date_Created | datetime | 8 |
| | [Sys-RFX_Section_ID] | int | 4 |
| | [Sys-RFX_Section_Name] | varchar | 255 |
| | ASP_Section_Display_Order | numeric | 9 |
| | Label_Comments | varchar | 1000 |
| | RFX_Section_Visible | char | 1 |
| | currentstatusid | int | 4 |
| | SubsectionFlag | char | 1 |

| | tblCRSRFXBidMaterialObject (Design View) | | |
|---|---|---|---|
| | Column | Data Type | Length |
| 91 - Design | RFX_Item_ID | uniqueidentifier | 16 |
| | CRS_Material_Object | sql_variant | |
| | CRS_Material_Meta_Form | sql_variant | |
| | CRS_Value_Container | sql_variant | |
| | CRSSub_Item_Collection_ID | uniqueidentifier | 16 |

| | tblCRSRFXBidProfileObject (Design View) | | |
|---|---|---|---|
| | Column | Data Type | Length |
| 92 - Design | RFX_Item_ID | uniqueidentifier | 16 |
| | CRS_Profile_Object | sql_variant | |
| | CRS_Profile_Meta_Form | sql_variant | |
| | CRS_Value_Container | sql_variant | |
| | CRSSub_Item_Collection_ID | uniqueidentifier | 16 |

| | tblCRSRFXBidDeliverableObject (Design View) | | |
|---|---|---|---|
| | Column | Data Type | Length |
| 93 - Design | RFX_Item_ID | uniqueidentifier | 16 |
| | CRS_Deliverable_Object | sql_variant | |
| | CRS_DeliverableI_Meta_Form | sql_variant | |
| | CRS_Value_Container | sql_variant | |
| | CRSSub_Item_Collection_ID | uniqueidentifier | 16 |

| | tblCRSRFXBidUnitObject (Design view) | | |
|---|---|---|---|
| | Column | Data Type | Length |
| 94 - Design | RFX_Item_ID | uniqueidentifier | 16 |
| | CRS_Unit_Object | sql_variant | |
| | CRS_UnitI_Meta_Form | sql_variant | |
| | CRS_Value_Container | sql_variant | |
| | CRSSub_Item_Collection_ID | uniqueidentifier | 16 |

| | tblCRSRFXBidPhasesObject (Design View) | | |
|---|---|---|---|
| | Column | Data Type | Length |
| 95 - Design | RFX_Item_ID | uniqueidentifier | 16 |
| | CRS_Phases_Object | sql_variant | |
| | CRS_Phases_Meta_Form | sql_variant | |
| | CRS_Value_Container | sql_variant | |
| | CRSSub_Item_Collection_ID | uniqueidentifier | 16 |

| | tblCRSRFXBidServicesObject (Design View) | | |
|---|---|---|---|
| | Column | Data Type | Length |
| 96 - Design | RFX_Item_ID | uniqueidentifier | 16 |
| | CRS_Services_Object | sql_variant | |
| | CRS_Services_Meta_Form | sql_variant | |
| | CRS_Value_Container | sql_variant | |
| | CRSSub_Item_Collection_ID | uniqueidentifier | 16 |

| | tblCRSRFXBidTemplates (Design View) | | |
|---|---|---|---|
| | Column | Data Type | Length |
| 97 - Design | CRS_RFX_Template_ID | uniqueidentifier | 16 |
| | CRS_RFX_Template_Name | varchar | 50 |
| | CRS_RFX_Template_Desc | varchar | 500 |
| | ResellerID | int | 4 |

Table Key

|  |  |  |  |
|---|---|---|---|
|  | ResellerPeopleID | uniqueidentifier | 16 |
|  | ConfigElementID | int | 4 |
|  | Date_Created | datetime | 8 |
|  | [Sys-RFX_Template_ID] | int | 4 |
|  | [Sys-RFX_Template_Name] | varchar | 255 |
|  | IsProject | char | 1 |
|  | OrderStatusID | int | 4 |
|  | Direct_Source | char | 10 |
|  | ASP_Display_Order | int | 4 |
|  | currentstatusid | int | 4 |
|  | Active | char | 1 | tblCRSRFXTemplateItemMatrix (Design View)

|  | Column | Data Type | Length |
|---|---|---|---|
| 98 - Design | CRS_RFX_Template_ID | uniqueidentifier | 16 |
|  | RFX_Item_ID | uniqueidentifier | 16 |
|  | Association_Date | datetime | 8 |
|  | [Sys-RFX_Template_ID] | int | 4 |
|  | [Sys-RFX_Item_ID] | int | 4 |
|  | DefaultValue | varchar | 4000 |
|  | RFx_Section_ID | int | 4 |
|  | RFx_Category_ID | int | 4 |
|  | Record_ID | uniqueidentifier | 16 | tblCRSSupplierMaster (Design View)

|  | Column | Data Type | Length |
|---|---|---|---|
| 99 - Design | CRSSupplierMasterID | uniqueidentifier | 16 |
|  | CRSSupplierMasterName | varchar | 50 |
|  | ResellerID | int | 4 |
|  | ResellerPeopleID | uniqueidentifier | 16 |
|  | ConfigElementID | int | 4 |
|  | Create_Date | datetime | 8 | tblCRSSupplierMiscAttributes (Design View)

|  | Column | Data Type | Length |
|---|---|---|---|
| 100 - Design | SupplierYearsInBusiness | numeric | 9 |
|  | FinanicalNetWorth | money | 8 |
|  | CustomerCount | numeric | 9 |
|  | EmployeeCount | numeric | 9 |
|  | FederalTaxID | bit | 1 |
|  | RegionalTaxID | bit | 1 |
|  | LocalTaxID | bit | 1 |
|  | ResellerID | int | 4 |
|  | ResellerPeopleID | uniqueidentifier | 16 |
|  | ConfigElementID | int | 4 |
|  | Create_Date | datetime | 8 |
|  | CRSSupplierMasterID | uniqueidentifier | 16 |
|  | CRSSupplierAttributeID | uniqueidentifier | 16 |
|  | CRS_Custom_AttributeID | uniqueidentifier | 16 | tblCRSMetaProjectAttributeCustom (Design View)

|  | Column | Data Type | Length |
|---|---|---|---|
| 15 - Design | ResellerID | int | 4 |
|  | ResellerPeopleID | uniqueidentifier | 16 |
|  | ConfigElementID | int | 4 |
|  | CRS_Custom_AttributeID | uniqueidentifier | 16 |
|  | CRS_Custom_AttributeName | varchar | 50 |
|  | CRS_Custom_Attribute_Data_Type | int | 4 |
|  | CRS_Custom_Attribute_Value | sql_variant |  | tblCRSSupplierLegalEntityType (Design View)

|  | Column | Data Type | Length |
|---|---|---|---|
| 101 - Design | SysBusinessEntityTypeID | int | 4 |
|  | SysBusinessEntityTypeDesc | varchar | 50 |
|  | CRSBusinessEntityTypeID | uniqueidentifier | 16 |
|  | CRSBusinessEntityTypeDesc | varchar | 50 |
|  | ResellerID | int | 4 |

| Table Key | | |
|---|---|---|
| ResellerPeopleID | uniqueidentifier | 16 |
| ConfigElementID | int | 4 |
| Create_Date | datetime | 8 |
| CRSSupplierMasterID | uniqueidentifier | 16 |

| tblCRSSupplierDBEType (Design View) | | | |
|---|---|---|---|
| | Column | Data Type | Length |
| 102 - Design | SysMinorityTypeID | int | 4 |
| | SysMinorityCode | varchar | 10 |
| | SysMinorityCodeDescription | varchar | 50 |
| | CRSMinorityTypeID | uniqueidentifier | 16 |
| | CRSMinorityCode | char | 10 |
| | CRSMinorityCodeDescription | varchar | 50 |
| | ResellerID | int | 4 |
| | ResellerPeopleID | uniqueidentifier | 16 |
| | ConfigElementID | int | 4 |
| | Create_Date | datetime | 8 |
| | CRSSupplierMasterID | uniqueidentifier | 16 |

| tblCRSSupplierCertifications (Design View) | | | |
|---|---|---|---|
| | Column | Data Type | Length |
| 103 - Design | SysSupplierCertificationTypeID | int | 4 |
| | SysSupplierCertificationTypeDesc | varchar | 100 |
| | SysSupplierCertificationOrg | varchar | 100 |
| | CRSSupplierCertificationTypeID | uniqueidentifier | 16 |
| | CRSSupplierCertificationTypeDesc | varchar | 100 |
| | CRSSupplierCertificationOrg | varchar | 100 |
| | ResellerID | int | 4 |
| | ResellerPeopleID | uniqueidentifier | 16 |
| | ConfigElementID | int | 4 |
| | Create_Date | datetime | 8 |
| | CRSSupplierMasterID | uniqueidentifier | 16 |

| tblCRSSupplierAssociations (Design View) | | | |
|---|---|---|---|
| | Column | Data Type | Length |
| 104 - Design | SysSupplierAssociationMembershipID | int | 4 |
| | SysSupplierAssociationMembershipDesc | varchar | 100 |
| | CRSSupplierAssociationMembershipID | uniqueidentifier | 16 |
| | CRSSupplierAssociationMembershipDesc | varchar | 100 |
| | ResellerID | int | 4 |
| | ResellerPeopleID | uniqueidentifier | 16 |
| | ConfigElementID | int | 4 |
| | Create_Date | datetime | 8 |
| | CRSSupplierMasterID | uniqueidentifier | 16 |

| tblCRSSupplierIndustry (Design View) | | | |
|---|---|---|---|
| | Column | Data Type | Length |
| 105 - Design | SysIndustryID | int | 4 |
| | SysIndustryDesc | varchar | 100 |
| | CRSIndustryID | uniqueidentifier | 16 |
| | CRSIndustryDesc | varchar | 100 |
| | ResellerID | int | 4 |
| | ResellerPeopleID | uniqueidentifier | 16 |
| | ConfigElementID | int | 4 |
| | Create_Date | datetime | 8 |
| | CRSSupplierMasterID | uniqueidentifier | 16 |

| tblCRSSupplierCommodity (Design View) | | | |
|---|---|---|---|
| | Column | Data Type | Length |
| 106 - Design | SysSICIndustryID | int | 4 |
| | SysNAICSIndustryID | int | 4 |
| | CRSCommodity | uniqueidentifier | 16 |
| | ResellerID | int | 4 |
| | ResellerPeopleID | uniqueidentifier | 16 |
| | ConfigElementID | int | 4 |
| | Create_Date | datetime | 8 |

-continued

| | | | |
|---|---|---|---|
| | Table Key | | |
| | CRSSupplierMasterID | uniqueidentifier | 16 |
| | CRSSupplierCommodity | uniqueidentifier | 16 |

| | tblCRSSupplierUnions (Design View) | | |
|---|---|---|---|
| | Column | Data Type | Length |
| 107 - Design | SysLaborUnionAffilliationID | int | 4 |
| | SysLaborUnionAffilliationDesc | varchar | 100 |
| | CRSLaborUnionAffilliationID | uniqueidentifier | 16 |
| | CRSLaborUnionAffilliationDesc | varchar | 100 |
| | ResellerID | int | 4 |
| | ResellerPeopleID | uniqueidentifier | 16 |
| | ConfigElementID | int | 4 |
| | Create_Date | datetime | 8 |
| | CRSSupplierMasterID | uniqueidentifier | 16 |

| | tblCRSSupplierLicences (Design View) | | |
|---|---|---|---|
| | Column | Data Type | Length |
| 108 - Design | CRSLicenseTypeID | uniqueidentifier | 16 |
| | CRSLicenseTypeDesc | varchar | 100 |
| | CRSLicensorDesc | varchar | 100 |
| | ResellerID | int | 4 |
| | ResellerPeopleID | uniqueidentifier | 16 |
| | ConfigElementID | int | 4 |
| | Create_Date | datetime | 8 |
| | CRSSupplierMasterID | uniqueidentifier | 16 |

| | tblCRSSupplierInsuranceType (Design View) | | |
|---|---|---|---|
| | Column | Data Type | Length |
| 109 - Design | SysInsuranceTypeID | int | 4 |
| | SysInsuranceTypDesc | varchar | 100 |
| | CRSinsuranceTypeID | uniqueidentifier | 16 |
| | CRSinsuranceTypeDesc | varchar | 100 |
| | ResellerID | int | 4 |
| | ResellerPeopleID | uniqueidentifier | 16 |
| | ConfigElementID | int | 4 |
| | Create_Date | datetime | 8 |
| | CRSSupplierMasterID | uniqueidentifier | 16 |

| | tblCRSSupplierInsuranceCoverageTypes (Design View) | | |
|---|---|---|---|
| | Column | Data Type | Length |
| 110 - Design | SysInsuranceCoverageTypeID | int | 4 |
| | SysInsuranceCoverageTypeDesc | varchar | 100 |
| | CRSInsuranceCoverageTypeID | uniqueidentifier | 16 |
| | CRSInsuranceCoverageTypeDesc | varchar | 100 |
| | ResellerID | int | 4 |
| | ResellerPeopleID | uniqueidentifier | 16 |
| | ConfigElementID | int | 4 |
| | Create_Date | datetime | 8 |
| | CRSSupplierMasterID | uniqueidentifier | 16 |

| | tblCRSSupplierInsuranceAmount (Design View) | | |
|---|---|---|---|
| | Column | Data Type | Length |
| 111 - Design | CRSInsuranceAmountID | uniqueidentifier | 16 |
| | CRSInsuranceAmountDesc | money | 8 |
| | ResellerID | int | 4 |
| | ResellerPeopleID | uniqueidentifier | 16 |
| | ConfigElementID | int | 4 |
| | Create_Date | datetime | 8 |
| | CRSSupplierMasterID | uniqueidentifier | 16 |

-continued

| | Table Key | | |
|---|---|---|---|
| | tblCRSSupplierAgreementType (Design View) | | |
| | Column | Data Type | Length |
| 112 - Design | SysSupplierTypeAgreementID | int | 4 |
| | SysSupplierTypeAgreementName | varchar | 50 |
| | SysSupplierTypeAgreementDesc | varchar | 1000 |
| | tblCRSSupplierAgreement (Design View) | | |
| | Column | Data Type | Length |
| 113 - Design | SysSupplierAgreementID | int | 4 |
| | SysSupplierAgreementName | varchar | 100 |
| | SysSupplierAgreementDesc | varchar | 1000 |
| | SysSupplierTypeAgreementID | int | 4 |
| | CRSSupplierAgreementID | uniqueidentifier | 16 |
| | CRSSupplierAgreementName | varchar | 100 |
| | CRSSupplierAgreementDesc | varchar | 1000 |
| | ResellerID | int | 4 |
| | ResellerPeopleID | uniqueidentifier | 16 |
| | ConfigElementID | int | 4 |
| | Create_Date | datetime | 8 |
| | CRSSupplierMasterID | uniqueidentifier | 16 |
| | CRSSupplierTypeAgreementID | uniqueidentifier | 16 |
| | CRS_Custom_AttributeID | uniqueidentifier | 16 |
| | tblCRSSupplierFacilityType (Design View) | | |
| | Column | Data Type | Length |
| 114 - Design | CRSSupplierFacilityTypeID | uniqueidentifier | 16 |
| | CRSSupplierFacilityTypeDesc | varchar | 50 |
| | SysSupplierFacilityTypeID | int | 4 |
| | SysSupplierFacilityTypeDesc | varchar | 50 |
| | tblCRSSupplierFacility (Design View) | | |
| | Column | Data Type | Length |
| 115 - Design | CRSSupplierFacilityID | uniqueidentifier | 16 |
| | CRSSupplierFacilityName | varchar | 50 |
| | CRSSupplierFacilityDesc | varchar | 500 |
| | CRSSupplierFacilityTypeID | uniqueidentifier | 16 |
| | ResellerID | int | 4 |
| | ResellerPeopleID | uniqueidentifier | 16 |
| | ConfigElementID | int | 4 |
| | Create_Date | datetime | 8 |
| | CRSSupplierMasterID | uniqueidentifier | 16 |
| | tblCRSSupplierFacilityAttributes (Design View) | | |
| | Column | Data Type | Length |
| 116 - Design | CRSSupplierFacilityID | uniqueidentifier | 16 |
| | CRS_Custom_AttributeID | uniqueidentifier | 16 |
| | CRS_Custom_Attribute_Value | sql_variant | |
| | CRS_Custom_AttributeMapID | uniqueidentifier | 16 |
| | tblCRSSupplierWaiverType (Design View) | | |
| | Column | Data Type | Length |
| 117 - Design | SysSupplierTypeWaiverID | int | 4 |
| | SysSupplierTypeWaiverName | varchar | 50 |
| | SysSupplierTypeWaiverDesc | varchar | 1000 |
| | tblCRSSupplierWaiver (Design View) | | |
| | Column | Data Type | Length |
| 118 - Design | SysSupplierWaiverID | int | 4 |
| | SysSupplierWaiverName | varchar | 100 |
| | SysSupplierWaiverDesc | varchar | 1000 |
| | SysSupplierTypeWaiverID | int | 4 |
| | CRSSupplierWaiverID | uniqueidentifier | 16 |
| | CRSSupplierWaiverName | varchar | 100 |

-continued

| Table Key | | | |
|---|---|---|---|
| | CRSSupplierWaiverDesc | varchar | 1000 |
| | ResellerID | int | 4 |
| | ResellerPeopleID | uniqueidentifier | 16 |
| | ConfigElementID | int | 4 |
| | Create_Date | datetime | 8 |
| | CRSSupplierMasterID | uniqueidentifier | 16 |
| | CRSSupplierTypeWaiverID | uniqueidentifier | 16 |
| | CRS_Custom_AttributeID | uniqueidentifier | 16 |

| tblCRSSupplierAuditType (Design View) | | | |
|---|---|---|---|
| | Column | Data Type | Length |
| 119 - Design | SupplierAuditTypeID | int | 4 |
| | SupplierAuditName | varchar | 50 |

| tblCRSSupplierAudit (Design View) | | | |
|---|---|---|---|
| | Column | Data Type | Length |
| 120 - Design | CRSAuditID | uniqueidentifier | 16 |
| | CRSAuditName | varchar | 50 |
| | CRSAuditDesc | varchar | 1000 |
| | SupplierAuditTypeID | int | 4 |
| | ResellerID | int | 4 |
| | ResellerPeopleID | uniqueidentifier | 16 |
| | ConfigElementID | int | 4 |
| | Create_Date | datetime | 8 |
| | CRSSupplierMasterID | uniqueidentifier | 16 |
| | CRS_Custom_AttributeID | uniqueidentifier | 16 |

| tblCRSSupplierTierCollection (Design View) | | | |
|---|---|---|---|
| | Column | Data Type | Length |
| 121 - Design | CRSSupplierTierGroupID | uniqueidentifier | 16 |
| | CRSSupplierTierDesc | varchar | 100 |
| | ResellerID | int | 4 |
| | ResellerPeopleID | uniqueidentifier | 16 |
| | ConfigElementID | int | 4 |
| | Create_Date | datetime | 8 |
| | CRSSupplierMasterID | uniqueidentifier | 16 |

| tblCRSSupplierTiers (Design View) | | | |
|---|---|---|---|
| | Column | Data Type | Length |
| 122 - Design | CRSSupplierTierGroupID | uniqueidentifier | 16 |
| | CRSSupplierTierID | uniqueidentifier | 16 |
| | CRSSupplierTierName | varchar | 50 |
| | CRSSupplierTierNameDesc | varchar | 5000 |
| | TierHierarchyLevel | numeric | 9 |

| tblCRSSupplierTierAttributes (Design View) | | | |
|---|---|---|---|
| | Column | Data Type | Length |
| 123 - Design | CRSTierAttributeID | uniqueidentifier | 16 |
| | CRSTierAttributeDesc | varchar | 500 |
| | CRS_Custom_AttributeID | uniqueidentifier | 16 |

| tblCRSSupplierTierMapAttributes (Design View) | | | |
|---|---|---|---|
| | Column | Data Type | Length |
| 124 - Design | CRSTierAttributeID | uniqueidentifier | 16 |
| | CRSSupplierTierID | uniqueidentifier | 16 |
| | MappingRecordID | uniqueidentifier | 16 |

| tblCRSHCMaster (Design View) | | | |
|---|---|---|---|
| | Column | Data Type | Length |
| 125 - Design | CRSHumanCapMasterID | uniqueidentifier | 16 |
| | CRSHumanCapMasterName | varchar | 50 |
| | ResellerID | int | 4 |
| | ResellerPeopleID | uniqueidentifier | 16 |

-continued

| | Table Key | | |
|---|---|---|---|
| | ConfigElementID | int | 4 |
| | Create_Date | datetime | 8 |

| | tblCRSMetaProjectAttributeCustom (Design View) | | |
|---|---|---|---|
| | Column | Data Type | Length |
| 15 - Design | ResellerID | int | 4 |
| | ResellerPeopleID | uniqueidentifier | 16 |
| | ConfigElementID | int | 4 |
| | CRS_Custom_AttributeID | uniqueidentifier | 16 |
| | CRS_Custom_AttributeName | varchar | 50 |
| | CRS_Custom_Attribute_Data_Type | int | 4 |
| | CRS_Custom_Attribute_Value | sql_variant | |

| | tblCRSHCWorkerTypes (Design View) | | |
|---|---|---|---|
| | Column | Data Type | Length |
| 126 - Design | CRSWorkerTypeID | uniqueidentifier | 16 |
| | CRSWorkerTypeDesc | varchar | 50 |
| | SysWorkerTypeID | int | 4 |
| | SysWorkerTypeDesc | varchar | 50 |

| | tblCRSHCWorker (Design View) | | |
|---|---|---|---|
| | Column | Data Type | Length |
| 127 - Design | CRSWorkerID | uniqueidentifier | 16 |
| | CRSWorkerName | varchar | 50 |
| | CRSWorkerDesc | varchar | 500 |
| | CRSWorkerTypeID | uniqueidentifier | 16 |
| | ResellerID | int | 4 |
| | ResellerPeopleID | uniqueidentifier | 16 |
| | ConfigElementID | int | 4 |
| | Create_Date | datetime | 8 |
| | CRSHumanCapMasterID | uniqueidentifier | 16 |

| | tblCRSHCWorkerAgreementType (Design View) | | |
|---|---|---|---|
| | Column | Data Type | Length |
| 128 - Design | SysWorkerAgreementTypeID | int | 4 |
| | SysWorkerAgreementTypeName | varchar | 50 |
| | SysWorkerAgreementTypeDesc | varchar | 1000 |

| | tblCRSHCWorkerAgreement (Design View) | | |
|---|---|---|---|
| | Column | Data Type | Length |
| 129 - Design | SysSWorkerAgreementTypeID | int | 4 |
| | SysWorkerAgreementTypeName | varchar | 100 |
| | SysWorkerAgreementTypeDesc | varchar | 1000 |
| | CRSWorkerAgreementID | uniqueidentifier | 16 |
| | CRSWorkerAgreementName | varchar | 100 |
| | CRSWorkerAgreementDesc | varchar | 1000 |
| | ResellerID | int | 4 |
| | ResellerPeopleID | uniqueidentifier | 16 |
| | ConfigElementID | int | 4 |
| | Create_Date | datetime | 8 |
| | CRShumanCapMasterID | uniqueidentifier | 16 |
| | CRSWorkerTypeAgreementID | uniqueidentifier | 16 |
| | CRS_Custom_AttributeID | uniqueidentifier | 16 |

| | tblCRSHCWorkerQualifiers (Design View) | | |
|---|---|---|---|
| | Column | Data Type | Length |
| 130 - Design | NationalCitizenshipStatus | int | 4 |
| | VisaStatusID | int | 4 |
| | BondStatus | int | 4 |
| | CriminalCheckStatus | int | 4 |
| | DrugScreenStatus | int | 4 |
| | CRSHumanCapMasterID | uniqueidentifier | 16 |
| | CRSWorkerQualifierID | uniqueidentifier | 16 |
| | CRS_Custom_AttributeID | uniqueidentifier | 16 |
| | ResellerID | int | 4 |

-continued

| Table Key | | | |
|---|---|---|---|
| | ResellerPeopleID | uniqueidentifier | 16 |
| | ConfigElementID | int | 4 |
| | Create_Date | datetime | 8 |

| tblCRSHCTenureIntervalType (Design View) | | | |
|---|---|---|---|
| | Column | Data Type | Length |
| 131 - Design | ResellerID | int | 4 |
| | ResellerPeopleID | uniqueidentifier | 16 |
| | ConfigElementID | int | 4 |
| | Create_Date | datetime | 8 |
| | CRSTenureIntervalTypeID | uniqueidentifier | 16 |
| | CRSTenureIntervalTypeDesc | varchar | 50 |
| | CRSTenureIntervalUnit | sql_variant | |

| tblCRSHCTenureRule (Design View) | | | |
|---|---|---|---|
| | Column | Data Type | Length |
| 132 - Design | CRSTenureRuleID | uniqueidentifier | 16 |
| | CRSTenureRuleName | varchar | 50 |
| | CRSTenureRuleDesc | varchar | 1000 |
| | CRSTenureIntervalTypeID | uniqueidentifier | 16 |
| | ResellerID | int | 4 |
| | ResellerPeopleID | uniqueidentifier | 16 |
| | ConfigElementID | int | 4 |
| | Create_Date | datetime | 8 |
| | CRS_Custom_AttributeID | uniqueidentifier | 16 |
| | CRSHumanCapMasterID | uniqueidentifier | 16 |

| tblCRSHCOnboarding (Design View) | | | |
|---|---|---|---|
| | Column | Data Type | Length |
| 133 - Design | CRSOnboardingRequirementID | uniqueidentifier | 16 |
| | CRSOnboardingRequirementName | varchar | 50 |
| | CRSOnboardingRequirementDesc | varchar | 1000 |
| | ResellerID | int | 4 |
| | ResellerPeopleID | uniqueidentifier | 16 |
| | ConfigElementID | int | 4 |
| | Create_Date | datetime | 8 |
| | CRS_Custom_AttributeID | uniqueidentifier | 16 |
| | CRSHumanCapMasterID | uniqueidentifier | 16 |

| tblCRSHCOffboarding (Design View) | | | |
|---|---|---|---|
| | Column | Data Type | Length |
| 134 - Design | CRSOffboardingRequirementID | uniqueidentifier | 16 |
| | CRSOffboardingRequirementName | varchar | 50 |
| | CRSOffboardingRequirementDesc | varchar | 1000 |
| | ResellerID | int | 4 |
| | ResellerPeopleID | uniqueidentifier | 16 |
| | ConfigElementID | int | 4 |
| | Create_Date | datetime | 8 |
| | CRS_Custom_AttributeID | uniqueidentifier | 16 |
| | CRSHumanCapMasterID | uniqueidentifier | 16 |

| cdzLaborPayTypes (Design View) | | | |
|---|---|---|---|
| | Column | Data Type | Length |
| 135 - Design | SysLaborTypeID | int | 4 |
| | SysLaborTypeDesc | varchar | 50 |

| tblCRSHCLaborPayTypes (Design View) | | | |
|---|---|---|---|
| | Column | Data Type | Length |
| 136 - Design | SysLaborTypeID | int | 4 |
| | SysLaborTypeDesc | varchar | 50 |
| | CRSLaborTypeID | uniqueidentifier | 16 |
| | CRSLaborTypeDesc | varchar | 50 |
| | ResellerID | int | 4 |
| | ResellerPeopleID | uniqueidentifier | 16 |
| | ConfigElementID | int | 4 |

Table Key -continued

| | | | |
|---|---|---|---|
| | Create_Date | datetime | 8 |
| | CRSHumanCapMasterID | uniqueidentifier | 16 | cdzLaborExpenseTypes (Design View)

| | Column | Data Type | Length |
|---|---|---|---|
| 137 - Design | SysExpenseTypeID | int | 4 |
| | SysExpenseTypeDesc | varchar | 50 | tblCRSHCExpenseTypes (Design View)

| | Column | Data Type | Length |
|---|---|---|---|
| 138 - Design | SysExpenseTypeID | int | 4 |
| | SysExpenseTypeDesc | varchar | 50 |
| | CRSExpenseTypeID | uniqueidentifier | 16 |
| | CRSExpenseTypeDesc | varchar | 50 |
| | ResellerID | int | 4 |
| | ResellerPeopleID | uniqueidentifier | 16 |
| | ConfigElementID | int | 4 |
| | Create_Date | datetime | 8 |
| | CRSHumanCapMasterID | uniqueidentifier | 16 | cdzWorkerAuditTypes (Design View)

| | Column | Data Type | Length |
|---|---|---|---|
| 139 - Design | SysWorkerAuditTypeID | int | 4 |
| | SysWorkerAuditTypeDesc | varchar | 50 | tblCRSHCWorkerAudit (Design View)

| | Column | Data Type | Length |
|---|---|---|---|
| 140 - Design | CRSAuditTypeID | uniqueidentifier | 16 |
| | CRSAuditTypeDesc | varchar | 50 |
| | SysAuditTypeID | int | 4 |
| | ResellerID | int | 4 |
| | ResellerPeopleID | uniqueidentifier | 16 |
| | ConfigElementID | int | 4 |
| | Create_Date | datetime | 8 |
| | CRSHumanCapMasterID | uniqueidentifier | 16 |
| | CRS_Custom_AttributeID | uniqueidentifier | 16 | cdzWorkerWaiverType (Design View)

| | Column | Data Type | Length |
|---|---|---|---|
| 141 - Design | SysWorkerWaiverTypeID | int | 4 |
| | SysWorkerWaiverTypeDesc | varchar | 50 | tblCRSHCWorkerWaiver (Design View)

| | Column | Data Type | Length |
|---|---|---|---|
| 142 - Design | CRSWorkerTypeID | uniqueidentifier | 16 |
| | CRSWorkerTypeDesc | varchar | 50 |
| | SysWorkerWaiverTypeID | int | 4 |
| | ResellerID | int | 4 |
| | ResellerPeopleID | uniqueidentifier | 16 |
| | ConfigElementID | int | 4 |
| | Create_Date | datetime | 8 |
| | CRSHumanCapMasterID | uniqueidentifier | 16 |
| | CRS_Custom_AttributeID | uniqueidentifier | 16 | cdzWorkerAssetType (Design View)

| | Column | Data Type | Length |
|---|---|---|---|
| 143 - Design | SysWorkerAssetTypeID | int | 4 |
| | SysWorkerAssetTypeDesc | varchar | 50 |

| Table Key | | | |
|---|---|---|---|
| tblCRSHCWorkerAsset (Design View) | | | |
| | Column | Data Type | Length |
| 144 - Design | CRSAssetRuleID | uniqueidentifier | 16 |
| | CRSAssetRuleName | varchar | 50 |
| | CRSAssetRuleDesc | varchar | 1000 |
| | CRSWorkerAssetTypeID | uniqueidentifier | 16 |
| | ResellerID | int | 4 |
| | ResellerPeopleID | uniqueidentifier | 16 |
| | ConfigElementID | int | 4 |
| | Create_Date | datetime | 8 |
| | CRSHumanCapMasterID | uniqueidentifier | 16 |
| | CRS_Custom_AttributeID | uniqueidentifier | 16 |
| tblCRSFinanceMaster (Design View) | | | |
| | Column | Data Type | Length |
| 145 - Design | CRSFinanceMasterID | uniqueidentifier | 16 |
| | CRSFinanceMasterName | varchar | 50 |
| | ResellerID | int | 4 |
| | ResellerPeopleID | uniqueidentifier | 16 |
| | ConfigElementID | int | 4 |
| | Create_Date | datetime | 8 |
| tblCRSMetaProjectAttributeCustom (Design View) | | | |
| | Column | Data Type | Length |
| 15 - Design | ResellerID | int | 4 |
| | ResellerPeopleID | uniqueidentifier | 16 |
| | ConfigElementID | int | 4 |
| | CRS_Custom_AttributeID | uniqueidentifier | 16 |
| | CRS_Custom_AttributeName | varchar | 50 |
| | CRS_Custom_Attribute_Data_Type | int | 4 |
| | CRS_Custom_Attribute_Value | sql_variant | |
| cdzSpendType (Design View) | | | |
| | Column | Data Type | Length |
| 146 - Design | SysPMSpendTypeID | int | 4 |
| | SysPMSpendName | varchar | 50 |
| | SysPMSpendDesc | varchar | 1000 |
| tblCRSFinanceSpendType (Design View) | | | |
| | Column | Data Type | Length |
| 147 - Design | CRSPMSpendTypeID | uniqueidentifier | 16 |
| | CRSPMSpendTypeName | varchar | 50 |
| | CRSPMSpendTypeDesc | varchar | 1000 |
| | SysPMSpendTypeID | int | 4 |
| | SysPMSpendDesc | varchar | 50 |
| | ResellerID | int | 4 |
| | ResellerPeopleID | uniqueidentifier | 16 |
| | ConfigElementID | int | 4 |
| | Create_Date | datetime | 8 |
| | CRSFinanceMasterID | uniqueidentifier | 16 |
| cdzCurrency (Design View) | | | |
| | Column | Data Type | Length |
| 148 - Design | SysCurrencyID | int | 4 |
| | SysCurrencyDesc | varchar | 50 |
| | defaultvalue | bit | 1 |
| | constname | varchar | 50 |
| tblCRSFinanceCurrency (Design View) | | | |
| | Column | Data Type | Length |
| 149 - Design | SysCurrencyID | int | 4 |
| | SysCurrencyDesc | varchar | 50 |
| | CRSCurrencyID | uniqueidentifier | 16 |

Table Key

| | Column | Data Type | Length |
|---|---|---|---|
| | CRSCurrencyDesc | varchar | 50 |
| | ResellerID | int | 4 |
| | ResellerPeopleID | uniqueidentifier | 16 |
| | ConfigElementID | int | 4 |
| | Create_Date | datetime | 8 |
| | CRSFinanceMasterID | uniqueidentifier | 16 | tblCRSFinanceCollateral (Design View)

| | Column | Data Type | Length |
|---|---|---|---|
| 150 - Design | CRSCollateralTypeID | uniqueidentifier | 16 |
| | CRSCollateralTypeName | varchar | 50 |
| | CRSCollateralTypeDesc | varchar | 1000 |
| | CRSFinanceMasterID | uniqueidentifier | 16 |
| | ResellerID | int | 4 |
| | ResellerPeopleID | uniqueidentifier | 16 |
| | ConfigElementID | int | 4 |
| | Create_Date | datetime | 8 |
| | UnitOfMeasureID | uniqueidentifier | 16 |
| | UnitOfMeasureDesc | varchar | 50 | cdzTaxType (Design View)

| | Column | Data Type | Length |
|---|---|---|---|
| 151 - Design | SysTaxTypeID | int | 4 |
| | SysTaxTypeName | varchar | 50 |
| | SysTaxTypeDesc | varchar | 5000 | tblCRSFinanceTaxType (Design View)

| | Column | Data Type | Length |
|---|---|---|---|
| 152 - Design | CRSTaxTypeID | uniqueidentifier | 16 |
| | CRSTaxTypeName | varchar | 50 |
| | CRSTaxTypeDesc | varchar | 5000 |
| | CRSFinanceMasterID | uniqueidentifier | 16 |
| | ConfigElementID | int | 4 |
| | Create_Date | datetime | 8 |
| | SysTaxTypeID | int | 4 |
| | SysTaxTypeName | varchar | 50 |
| | SysTaxTypeDesc | varchar | 5000 | cdzTaxRateType (Design View)

| | Column | Data Type | Length |
|---|---|---|---|
| 153 - Design | SysTaxRateTypeID | int | 4 |
| | SysTaxRateTypeName | varchar | 50 |
| | SysTaxRateTypeDesc | sql_variant | | tblCRSFinanceTaxRateType (Design View)

| | Column | Data Type | Length |
|---|---|---|---|
| 154 - Design | CRSTaxRateTypeID | uniqueidentifier | 16 |
| | CRSTaxRateTypeName | varchar | 50 |
| | CRSTaxRateTypeDesc | sql_variant | |
| | CRSFinanceMasterID | uniqueidentifier | 16 |
| | ConfigElementID | int | 4 |
| | Create_Date | datetime | 8 |
| | SysTaxRateTypeID | int | 4 |
| | SysTaxRateTypeName | varchar | 50 |
| | SysTaxRateTypeDesc | sql_variant | |
| | CRS_Custom_AttributeID | uniqueidentifier | 16 | tblCRSFinanceTaxClass (Design View)

| | Column | Data Type | Length |
|---|---|---|---|
| 155 - Design | CRSTaxClassTypeID | uniqueidentifier | 16 |
| | CRSTaxClassTypeName | varchar | 50 |
| | CRSFinanceMasterID | uniqueidentifier | 16 |
| | ConfigElementID | int | 4 |

| Table Key | | | |
|---|---|---|---|
| | Create_Date | datetime | 8 |
| | CRS_Custom_AttributeID | uniqueidentifier | 16 |
| tblCRSFinanceTaxAuthority (Design View) | | | |
| | Column | Data Type | Length |
| 156 - Design | CRSTaxAuthorityTypeID | uniqueidentifier | 16 |
| | CRSTaxAuthorityTypeName | varchar | 50 |
| | SysTaxAuthorityTypeID | int | 4 |
| | SysTaxAuthorityName | varchar | 50 |
| | CRSFinanceMasterID | uniqueidentifier | 16 |
| | ConfigElementID | int | 4 |
| | Create_Date | datetime | 8 |
| | CRS_Custom_AttributeID | uniqueidentifier | 16 |
| tblCRSFinanceTaxExceptions (Design View) | | | |
| | Column | Data Type | Length |
| 157 - Design | CRSExceptionTypeID | uniqueidentifier | 16 |
| | CRSExceptionTypeName | varchar | 50 |
| | CRSFinanceMasterID | uniqueidentifier | 16 |
| | ConfigElementID | int | 4 |
| | Create_Date | datetime | 8 |
| | CRS_Custom_AttributeID | uniqueidentifier | 16 |
| | CRSExceptionTypeDesc | varchar | 1000 |
| tblCRSFinanceTermPay (Design View) | | | |
| | Column | Data Type | Length |
| 158 - Design | CRSPaymentTermID | uniqueidentifier | 16 |
| | CRSPaymentTermDesc | varchar | 50 |
| | CRSFinanceMasterID | uniqueidentifier | 16 |
| | ResellerID | int | 4 |
| | ResellerPeopleID | uniqueidentifier | 16 |
| | ConfigElementID | int | 4 |
| | Create_Date | datetime | 8 |
| | SysPaymentTermID | int | 4 |
| | SysPaymentTermDesc | varchar | 50 |
| | CRS_Custom_AttributeID | uniqueidentifier | 16 |
| tblCRSFinanceTermDiscount (Design View) | | | |
| | Column | Data Type | Length |
| 159 - Design | CRSDiscountTermID | uniqueidentifier | 16 |
| | CRSDiscountTermDesc | varchar | 50 |
| | CRSFinanceMasterID | uniqueidentifier | 16 |
| | ResellerID | int | 4 |
| | ResellerPeopleID | uniqueidentifier | 16 |
| | ConfigElementID | int | 4 |
| | Create_Date | datetime | 8 |
| | SysDiscountTermID | int | 4 |
| | SysRDiscountTermDesc | varchar | 50 |
| | CRS_Custom_AttributeID | uniqueidentifier | 16 |
| tblCRSFinanceTermRebate (Design View) | | | |
| | Column | Data Type | Length |
| 160 - Design | CRSRebateTermID | uniqueidentifier | 16 |
| | CRSRebateTermDesc | varchar | 50 |
| | CRSFinanceMasterID | uniqueidentifier | 16 |
| | ResellerID | int | 4 |
| | ResellerPeopleID | uniqueidentifier | 16 |
| | ConfigElementID | int | 4 |
| | Create_Date | datetime | 8 |
| | SysRebateTermID | int | 4 |
| | SysRebateTermDesc | varchar | 50 |
| | CRS_Custom_AttributeID | uniqueidentifier | 16 |

Table Key tblCRSFinanceAccrual (Design View)

| | Column | Data Type | Length |
|---|---|---|---|
| 161 - Design | CRSAccrualTypeID | uniqueidentifier | 16 |
| | CRSAccrualTypeDesc | varchar | 50 |
| | CRSFinanceMasterID | uniqueidentifier | 16 |
| | ConfigElementID | int | 4 |
| | Create_Date | datetime | 8 |
| | CRS_Custom_AttributeID | uniqueidentifier | 16 | tblCRSFinanceBillFile (Design View)

| | Column | Data Type | Length |
|---|---|---|---|
| 162 - Design | CRSBillFileID | uniqueidentifier | 16 |
| | CRSBillFileDesc | varchar | 50 |
| | CRSFinanceMasterID | uniqueidentifier | 16 |
| | ConfigElementID | int | 4 |
| | Create_Date | datetime | 8 |
| | CRS_Custom_AttributeID | uniqueidentifier | 16 | tblCRSFinanceEDI (Design View)

| | Column | Data Type | Length |
|---|---|---|---|
| 163 - Design | CRSEDIProtocolTypeID | uniqueidentifier | 16 |
| | CRSEDIProtocolTypeDesc | varchar | 50 |
| | CRSFinanceMasterID | uniqueidentifier | 16 |
| | ConfigElementID | int | 4 |
| | Create_Date | datetime | 8 |
| | CRS_Custom_AttributeID | uniqueidentifier | 16 | tblCRSCSFMaster (Design View)

| | Column | Data Type | Length |
|---|---|---|---|
| 164 - Design | CRSCSFMasterID | uniqueidentifier | 16 |
| | CRSCSFMasterName | varchar | 50 |
| | ResellerID | int | 4 |
| | ResellerPeopleID | uniqueidentifier | 16 |
| | ConfigElementID | int | 4 |
| | Create_Date | datetime | 8 | tblCRSCSFClass (Design View)

| | Column | Data Type | Length |
|---|---|---|---|
| 165 - Design | CRSCSFClassID | uniqueidentifier | 16 |
| | CRSCSFClassName | varchar | 50 |
| | CRSCSFClassDesc | varchar | 1000 |
| | CRSCSFMasterID | uniqueidentifier | 16 |
| | ConfigElementID | int | 4 |
| | Create_Date | datetime | 8 |
| | SysCSFClassID | int | 4 | cdzCSFClass (Design View)

| | Column | Data Type | Length |
|---|---|---|---|
| 166 - Design | SysCSFClassID | int | 4 |
| | SysCSFClassName | varchar | 50 |
| | SysCSFClassDesc | varchar | 1000 | tblCRSCSFMapClassRelationship (Design View)

| | Column | Data Type | Length |
|---|---|---|---|
| 167 - Design | CRSCSFClassID | uniqueidentifier | 16 |
| | AssociatedCRSCSFClassID | uniqueidentifier | 16 |
| | RelationshipTypeID | int | 4 |
| | Create_Date | datetime | 8 |
| | CRSClassMapID | uniqueidentifier | 16 |

-continued

| Table Key | | | |
|---|---|---|---|
| tblCRSCSFValue (Design View) | | | |
| | Column | Data Type | Length |
| 168 - Design | CRSCSFClassID | uniqueidentifier | 16 |
| | CRSCSFValueID | uniqueidentifier | 16 |
| | CRSCSFValueDesc | varchar | 100 |
| | CRSCSFDataTypeID | int | 4 |
| | Create_Date | datetime | 8 |
| tblCRSCSFMapClassToOrg (Design View) | | | |
| | Column | Data Type | Length |
| 169 - Design | CRSCSFClassID | uniqueidentifier | 16 |
| | CRSOrgLevelID | uniqueidentifier | 16 |
| | CRSMappingRecordID | uniqueidentifier | 16 |
| | Create_Date | datetime | 8 |
| tblCRSCSFMapClassToCommodity (Design View) | | | |
| | Column | Data Type | Length |
| 170 - Design | CRSCommodityItem | uniqueidentifier | 16 |
| | CRSCSFClassID | uniqueidentifier | 16 |
| | CRSMappingRecordID | uniqueidentifier | 16 |
| | Create_Date | datetime | 8 |
| tblCRSCSFMapClassToSpendType (Design View) | | | |
| | Column | Data Type | Length |
| 171 - Design | CRSPMSpendTypeID | uniqueidentifier | 16 |
| | CRSCSFClassID | uniqueidentifier | 16 |
| | CRSMappingRecordID | uniqueidentifier | 16 |
| | Create_Date | datetime | 8 |
| tblCRSCSFInputControl (Design View) | | | |
| | Column | Data Type | Length |
| 172 - Design | CRSSTMappingRecordID | uniqueidentifier | 16 |
| | CRSPositionID | uniqueidentifier | 16 |
| | Input_Enabled | bit | 1 |
| | Edit_Enabled | bit | 1 |
| | Variable_Entry_Input | bit | 1 |
| | CRSMappingRecordID | uniqueidentifier | 16 |
| | Create_Date | datetime | 8 |
| tblCRSCSFWFEMapCSF (Design View) | | | |
| | Column | Data Type | Length |
| 173 - Design | SysWorkflowEntityID | int | 4 |
| | CRSCSFClassID | uniqueidentifier | 16 |
| | WFEToCFSMappingRecordID | uniqueidentifier | 16 |
| tblConfigGroup (Design View) | | | |
| | Column | Data Type | Length |
| 7 - Design | ConfigGroupID | int | 4 |
| | ConfigGroupName | varchar | 50 |
| tblConfigElements (Design View) | | | |
| | Column | Data Type | Length |
| 8 - Design | ConfigElementID | int | 4 |
| | ConfigElementName | varchar | 50 |
| | ConfigGroupID | int | 4 |

-continued

| | Table Key | | |
|---|---|---|---|
| | tblConfigSubElements (Design View) | | |
| | Column | Data Type | Length |
| 174 - Design | ConfigSubElementID | uniqueidentifier | 16 |
| | MetaObjectID | uniqueidentifier | 16 |
| | MetaObjectType | int | 4 |
| | ConfigElementID | int | 4 |
| | TableID | int | 4 |
| | RecordID | int | 4 |
| | ColumnID | int | 4 |
| | [Value] | sql_variant | |
| | tblConfigElementBundle (Design View) | | |
| | Column | Data Type | Length |
| 175 - Design | ConfigElementID | int | 4 |
| | ConfigSubElementID | uniqueidentifier | 16 |
| | BundleID | int | 4 |
| | tblConfigElementMapElement (Design View) | | |
| | Column | Data Type | Length |
| 176 - Design | ConfigElementID | int | 4 |
| | RelationshipTypeID | int | 4 |
| | ConfigElementID1 | int | 4 |
| | RecordID | int | 4 |
| | lkpConfigElementRelations (Design view) | | |
| | Column | Data Type | Length |
| 177 - Design | RelationshipTypeID | int | 4 |
| | RelationshipTypeDesc | varchar | 50 |
| | tblConfigElementCRS (Design View) | | |
| | Column | Data Type | Length |
| 178 - Design | ConfigElementID | int | 4 |
| | ConfigElementName | varchar | 50 |
| | ConfigGroupID | int | 4 |
| | ResellerID | int | 4 |
| | ResellerPeopleID | uniqueidentifier | 16 |
| | tblConfigSubElementsCRS (Design View) | | |
| | Column | Data Type | Length |
| 179 - Design | ConfigSubElementID | uniqueidentifier | 16 |
| | MetaObjectID | uniqueidentifier | 16 |
| | MetaObjectType | int | 4 |
| | ConfigElementID | int | 4 |
| | TableID | int | 4 |
| | RecordID | int | 4 |
| | ColumnID | int | 4 |
| | [Value] | sql_variant | |
| | tblConfigElementBundleCRS (Design View) | | |
| | Column | Data Type | Length |
| 180 - Design | ConfigElementID | int | 4 |
| | ConfigSubElementID | uniqueidentifier | 16 |
| | CRSBundleID | uniqueidentifier | 16 |
| | tblReseller (Design View) | | |
| | Column | Data Type | Length |
| 217 - Design | ResellerID | int | 4 |
| | CompanyID | uniqueidentifier | 16 |
| | ParentResellerID | int | 4 |
| | ResellerStatusID | int | 4 |

Table Key tblResellerSUPeople (Design View)

| | Column | Data Type | Length |
|---|---|---|---|
| 228 - Design | ResellerID | int | 4 |
| | ResellerPeopleID | uniqueidentifier | 16 |
| | LastName | varchar | 50 |
| | FirstName | varchar | 50 |
| | MiddleName | varchar | 50 |
| | CityID | int | 4 |
| | RegionID | int | 4 |
| | CountryID | int | 4 |
| | CountryIdentifier | varchar | 50 |
| | BusinessPhone | varchar | 50 |
| | MobilePhone | varchar | 50 |
| | EMailAddress | varchar | 75 |
| | MailAddress1 | varchar | 75 |
| | MailAddress2 | varchar | 75 |
| | PostalCode | varchar | 25 | tblConfigInfoSettingCRS (Design View)

| | Column | Data Type | Length |
|---|---|---|---|
| 181 - Design | CRSSettingID | uniqueidentifier | 16 |
| | CRSInfoSettingName | varchar | 50 |
| | CRSInfoSettingDesc | varchar | 1000 |
| | ResellerID | int | 4 |
| | ResellerPeopleID | uniqueidentifier | 16 | tblConfigElementAssociationCRS (Design View)

| | Column | Data Type | Length |
|---|---|---|---|
| 182 - Design | CRSAssociationID | uniqueidentifier | 16 |
| | ConfigElementID | int | 4 |
| | ConfigElementID1 | int | 4 |
| | RelationshipTypeID | int | 4 |
| | CRSSettingID | uniqueidentifier | 16 | tblConfigSubElementAssociationsCRS (Design View)

| | Column | Data Type | Length |
|---|---|---|---|
| 183 - Design | ConfigSubElementID | uniqueidentifier | 16 |
| | MetaObjectID | uniqueidentifier | 16 |
| | MetaObjectType | int | 4 |
| | ConfigElementID | int | 4 |
| | TableID | int | 4 |
| | RecordID | int | 4 |
| | ColumnID | int | 4 |
| | [value] | sql_variant | |
| | CRSAssociationID | uniqueidentifier | 16 |
| | MappingRecordID | uniqueidentifier | 16 |
| | CRSSettingID | uniqueidentifier | 16 | cdzWFEMaster (Design View)

| | Column | Data Type | Length |
|---|---|---|---|
| 188 - Design | SysWorkflowEntityID | int | 4 |
| | SysWorkflowEntityName | varchar | 50 |
| | SysWorkflowEntityDesc | varchar | 1000 |
| | Module_ID | int | 4 | cdzWFESection (Design View)

| | Column | Data Type | Length |
|---|---|---|---|
| 189 - Design | SysWorkflowEntityID | int | 4 |
| | SysSectionID | int | 4 |
| | SysSectionName | varchar | 50 |

Table Key cdzWFESectionHeaderFooter (Design View)

| | Column | Data Type | Length |
|---|---|---|---|
| 190 - Design | SysSectionID | int | 4 |
| | SysHeaderID | int | 4 |
| | SysFooterID | int | 4 |
| | SysSectionHierarchy | numeric | 9 |
| | MappingRecordID | int | 4 | cdzWFESectionHeaderDetail (Design View)

| | Column | Data Type | Length |
|---|---|---|---|
| 191 - Design | HeaderMappingRecordID | int | 4 |
| | SysHeaderName | varchar | 50 |
| | SysHeaderUserDesc | varchar | 100 |
| | SysHeaderTextValue | varchar | 100 |
| | SectionHeaderDetailID | int | 4 | cdzWFESectionFooterDetail (Design View)

| | Column | Data Type | Length |
|---|---|---|---|
| 192 - Design | FooterMappingRecordID | int | 4 |
| | SysFooterName | varchar | 50 |
| | SysFooterUserDesc | varchar | 100 |
| | SysFooterTextValue | varchar | 100 |
| | SectionFooterDetailID | int | 4 | cdzWFESectionBody (Design View)

| | Column | Data Type | Length |
|---|---|---|---|
| 193 - Design | SysSectionID | int | 4 |
| | SectionColumnCount | numeric | 9 |
| | SectionRowCount | numeric | 9 |
| | SectionObjectCellCount | numeric | 9 |
| | WFEBodyRecordID | int | 4 | cdzWFECellMaster (Design View)

| | Column | Data Type | Length |
|---|---|---|---|
| 194 - Design | WFEBodyRecordID | int | 4 |
| | SectionObjectCellID | int | 4 |
| | WFECellTypeID | int | 4 | cdzWFECellType (Design View)

| | Column | Data Type | Length |
|---|---|---|---|
| 195 - Design | WFECellTypeID | int | 4 |
| | WFECellTypeDesc | varchar | 50 | cdzWFECellType (Data View)

| | WFECellTypeID | WFECellTypeDesc |
|---|---|---|
| 195 - Data | 1 | Label |
| | 2 | DataField |
| | 3 | InputField |
| | 4 | EmbeddedDataTable |
| | 5 | EmbeddedInputTable |
| | 6 | ViewParameter |
| | 7 | Date |
| | 8 | Control | cdzWFECellAttributeLabel (Design View)

| | Column | Data Type | Length |
|---|---|---|---|
| 196 - Design | SectionObjectCellID | int | 4 |
| | MetaLabelText | varchar | 500 |
| | LabelDataSource | varchar | 500 |
| | LabelAttributeID | int | 4 |

Table Key cdzWFECellAttributeDataField (Design View)

| | Column | Data Type | Length |
|---|---|---|---|
| 197 - Design | SectionObjectCellID | int | 4 |
| | SourceTableID | int | 4 |
| | Data_Element_ID | int | 4 |
| | ValueRangeStatic | bit | 1 |
| | ValueRangeSelect | sql_variant | |
| | DataFieldLabel | bit | 1 |
| | DataFieldLabelText | varchar | 50 |
| | DataFieldAttributeID | int | 4 | cdzWFECellAttributeInputField (Design View)

| | Column | Data Type | Length |
|---|---|---|---|
| 198 - Design | SectionObjectCellID | int | 4 |
| | TargetTableID | int | 4 |
| | Data_Element_ID | int | 4 |
| | ValueConstraint | bit | 1 |
| | ValueConstraintSelect | sql_variant | |
| | InputFieldLabel | bit | 1 |
| | InputFieldLabelText | varchar | 50 |
| | InputFieldAttributeID | int | 4 |
| | DisplayDataTypeConstraint | bit | 1 |
| | DataTypeConstraintLabel | varchar | 25 | cdModule (Design View)

| | Column | Data Type | Length |
|---|---|---|---|
| 2 - Design | ModuleID | int | 4 |
| | Module_Desc | varchar | 50 | cdzWFEMapConfigElement (Design View)

| | Column | Data Type | Length |
|---|---|---|---|
| 199 - Design | SysWorkflowEntityID | int | 4 |
| | ConfigElementID | int | 4 |
| | WFEMapCoinfigElementID | int | 4 | tblConfigInfoSettingCRS (Design View)

| | Column | Data Type | Length |
|---|---|---|---|
| 181 - Design | CRSSettingID | uniqueidentifier | 16 |
| | CRSInfoSettingName | varchar | 50 |
| | CRSInfoSettingDesc | varchar | 1000 |
| | ResellerID | int | 4 |
| | ResellerPeopleID | uniqueidentifier | 16 | tblCRSMetaProjectAttributeCustom (Design View)

| | Column | Data Type | Length |
|---|---|---|---|
| 15 - Design | ResellerID | int | 4 |
| | ResellerPeopleID | uniqueidentifier | 16 |
| | ConfigElementID | int | 4 |
| | CRS_Custom_AttributeID | uniqueidentifier | 16 |
| | CRS_Custom_AttributeName | varchar | 50 |
| | CRS_Custom_Attribute_Data_Type | int | 4 |
| | CRS_Custom_Attribute_Value | sql_variant | | cdzWFEMetaManager (Design View)

| | Column | Data Type | Length |
|---|---|---|---|
| 200 - Design | CRSSettingID | uniqueidentifier | 16 |
| | CRS_Custom_AttributeID | uniqueidentifier | 16 |
| | SectionObjectCellID | int | 4 |
| | WFEToISToAttributeMapID | uniqueidentifier | 16 |

-continued

| | Table Key | | |
|---|---|---|---|
| | cdzEPMaster(Design View) | | |
| | Column | Data Type | Length |
| 201 - Design | SysEngineeredProcessID | int | 4 |
| | SysEngineeredProcessName | varchar | 50 |
| | SysEngineeredProcessDesc | varchar | 1000 |
| | Reseller_ID | int | 4 |
| | ResellerPeopleID | uniqueidentifier | 16 |
| | Create_Date | date/time | 8 |
| | cdzWFEMaster (Design View) | | |
| | Column | Data Type | Length |
| 188 - Design | SysWorkflowEntityID | int | 4 |
| | SysWorkflowEntityName | varchar | 50 |
| | SysWorkflowEntityDesc | varchar | 1000 |
| | Module_ID | int | 4 |
| | cdzEPMapWFE (Design View) | | |
| | Column | Data Type | Length |
| 202 - Design | SysEngineeredProcessID | int | 4 |
| | SysWorkflowEntityID | int | 4 |
| | EPMapWFEID | int | 4 |
| | EPWFEParentID | int | 4 |
| | cdSysPositions (Design View) | | |
| | Column | Data Type | Length |
| 203 - Design | SysPositionID | int | 4 |
| | SysPositionName | varchar | 50 |
| | SysPositionDesc | varchar | 1000 |
| | cdzEPMapPosition (Design View) | | |
| | Column | Data Type | Length |
| 204 - Design | SysEngineeredProcessID | int | 4 |
| | SysPositionID | int | 4 |
| | EPMapPositionID | int | 4 |
| | cdzEPStage (Design View) | | |
| | Column | Data Type | Length |
| 205 - Design | SysEngineeredProcessID | int | 4 |
| | SysEPStageID | int | 4 |
| | EPStageName | varchar | 50 |
| | EPStageDesc | varchar | 1000 |
| | EPStageLeg | numeric | 9 |
| | cdzEPStageMapWFE (Design View) | | |
| | Column | Data Type | Length |
| 206 - Design | SysEPStageID | int | 4 |
| | SysWorkflowEntityID | int | 4 |
| | Status_ID | int | 4 |
| | SysEPStageMapWFEID | int | 4 |
| | cdzEPStageMapWFEChild (Design View) | | |
| | Column | Data Type | Length |
| 207 - Design | SysEPStageMapWFEID | int | 4 |
| | Status_ID | int | 4 |
| | SysEPStageMapChildWFEID | int | 4 |
| | Parent_Status_ID | int | 4 |

-continued

| | Table Key | | |
|---|---|---|---|
| | cdzEPWFEStatus (Design View) | | |
| | Column | Data Type | Length |
| 208 - Design | SysWFEStatusID | int | 4 |
| | SysWFEStatusName | varchar | 50 |
| | SysWFEStatusDesc | varchar | 1000 |
| | cdzEPWFEStatus (Data View) | | |
| | SysWFEStatusID | SysWFEStatusName | |
| 208 - Data | 1 | New | |
| | 2 | Open | |
| | 3 | Awaiting_Approval | |
| | 4 | Approved | |
| | 5 | Declined | |
| | 6 | Reviewed | |
| | 7 | Submitted | |
| | 8 | Cancelled | |
| | 9 | Expired | |
| | 10 | Failed | |
| | 11 | On_Hold | |
| | 12 | Withdrawn | |
| | 13 | Processed | |
| | 14 | Awaiting_Response | |
| | 15 | Data_Acquired | |
| | 16 | Billed | |
| | 17 | Paid | |
| | 18 | Accepted | |
| | 19 | Engaged | |
| | 20 | Purchased | |
| | 21 | Received | |
| | 22 | Executed | |
| | 23 | Waivered | |
| | 24 | Modified | |
| | cdzEPStagePositionAction (Design View) | | |
| | Column | Data Type | Length |
| 209 - Design | SysEPStageMapWFEID | int | 4 |
| | SysPositionID | int | 4 |
| | Action_ID | int | 4 |
| | WFE_Result_Status_ID | int | 4 |
| | EPWFETriggerID | int | 4 |
| | cdAction (Design View) | | |
| | Column | Data Type | Length |
| 210 - Design | ActionID | int | 4 |
| | Action_Desc | varchar | 50 |
| | cdAction (Data View) | | |
| | ActionID | Action_Desc | |
| 210 - Data | 1 | View | |
| | 2 | Edit | |
| | 3 | Hold | |
| | 4 | Cancel | |
| | 5 | Approve | |
| | 6 | Create | |
| | 7 | Delegate | |
| | 8 | Submit | |
| | 9 | Save | |
| | 10 | Decline | |
| | 11 | Attach | |
| | 12 | Run | |
| | tblCRSIPSettingMaster (Design View) | | |
| | Column | Data Type | Length |
| 211 - Design | CRSIPSettingID | uniqueidentifier | 16 |
| | CRSIPSettingName | varchar | 100 |

|  | Table Key | | |
|---|---|---|---|
| | CRSIPSettingDesc | varchar | 1000 |
| | Reseller__ID | int | 4 |
| | ResellerPeopleID | uniqueidentifier | 16 |
| | Create__Date | datetime | 8 |
| colspan="4" | tblCRSIPSettingMapEP (Design View) | | |
| | Column | Data Type | Length |
| 212 - Design | CRSIPSettingID | uniqueidentifier | 16 |
| | SysEngineeredProcessID | int | 4 |
| | CRSIPSettingMapEP | uniqueidentifier | 16 |
| 201 - Design | cdzEPMaster(Design View) | | |
| 202 - Design | cdzEPMapWFE (Design View) | | |
| 188 - Design | cdzWFEMaster (Design View) | | |
| 200 - Design | cdzWFEMetaManager (Design View) | | |
| 181 - Design | tblConfigInfoSettingCRS (Design View) | | |
| 15 - Design | tblCRSMetaProjectAttributeCustom (Design View) | | |
| 217 - Design | tblReseller (Design View) | | |
| 229 - Design | tblResellerSUPeople (Design View) | | |
| | tblResellerPricingConfigSvcsMap (Design View) | | |
| | Column | Data Type | Length |
| 254 - Design | rcsRecordID | int | 4 |
| | ClientAgreementDurationID | int | 4 |
| | PricingTypeID | int | 4 |
| | CRSListPrice | money | 9 |
| | ListPriceNegotiable | bit | 1 |
| | CommissionPercent | float | 8 |
| | PSRoyaltyPercent | float | 8 |
| | RecordID | int | 4 |
| | tblCRSIPSettingMapPrice (Design View) | | |
| | Column | Data Type | Length |
| 213 - Design | CRSIPSettingID | uniqueidentifier | 16 |
| | rpRecordID | int | 4 |
| | CRSIPSettingMapPrice | uniqueidentifier | 16 |
| | tblCompanyMaster (Design View) | | |
| | Column | Data Type | Length |
| 214 - Design | CompanyID | uniqueidentifier | 16 |
| | CompanyName | varchar | 100 |
| | ParentCompanyID | uniqueidentifier | 16 |
| | BusinessEntityTypeID | int | 4 |
| | FedIdentity | varchar | 50 |
| | YearCorp | int | 4 |
| | DandBNumber | varchar | 50 |
| | FTEmployees | numeric | 9 |
| | URL | varchar | 50 |
| | Phone | varchar | 50 |
| | Fax | varchar | 50 |
| | Email | varchar | 50 |
| | DBECertification | bit | 1 |
| | DBETypeId | int | 4 |
| | EDICapable | bit | 1 |
| | EFTCapable | bit | 1 |
| | ClientStatus | int | 4 |
| | CorpCountryID | int | 4 |
| | NetAssets | money | 8 |
| | BackgroundCheck | bit | 1 |
| | RecordedTaxFiling | bit | 1 |
| | cdMinorityType (Design View) | | |
| | Column | Data Type | Length |
| 215 - Design | MinorityTypeID | int | 4 |
| | MinoritCode | varchar | 10 |
| | Description | varchar | 200 |

| Table Key | | | |
|---|---|---|---|
| | colspan: cdBusinessEntityType (Design View) | | |
| | Column | Data Type | Length |
| 216 - Design | BusinessEntityTypeID | int | 4 |
| | Description | varchar | 50 |
| | tblReseller (Design View) | | |
| | Column | Data Type | Length |
| 217 - Design | ResellerID | int | 4 |
| | CompanyID | uniqueidentifier | 16 |
| | ParentResellerID | int | 4 |
| | ResellerStatusID | int | 4 |
| | tblResellerSULocations (Design View) | | |
| | Column | Data Type | Length |
| 218 - Design | ResellerLocationID | int | 4 |
| | rlResellerID | int | 4 |
| | rlLocationTypeID | int | 4 |
| | rlAddress1 | varchar | 100 |
| | rlAddress2 | varchar | 100 |
| | rlCity | varchar | 50 |
| | rlState | varchar | 50 |
| | rlPostalCode | varchar | 20 |
| | rlCountryID | int | 4 |
| | rlLocationName | varchar | 200 |
| | rlPhone | varchar | 50 |
| | rlFax | varchar | 50 |
| | rlEmail | varchar | 50 |
| | rLApprovalStatusID | int | 4 |
| | rLApprovalDate | datetime | 8 |
| | rLCurrentStatusID | int | 4 |
| | cdLocationType (Design View) | | |
| | Column | Data Type | Length |
| 219 - Design | LocationTypeID | int | 4 |
| | Description | varchar | 50 |
| | constname | varchar | 50 |
| | cdLocationType (Data View) | | |

| | | LocationTypeID | Description | constname |
|---|---|---|---|---|
| 219 - Data | Previous Filing | 1 | Corporate Location | psLocationPrimary |
| | | 2 | Secondary Location | psLocationSecondary |
| | | 3 | Remit Payment location | psLocationRemitPayment |
| | | 4 | Virtual Office | psVirtualOffice |
| | | 5 | Sales Office | psSalesOffice |
| | | 6 | Training Facility | psTrainingFacility |
| | | 7 | Off-Site Operations | psOffsiteOps |

| cdResellerAgreementTypes (Design View) | | |
|---|---|---|
| Column | Data Type | Length |

| | Column | Data Type | Length |
|---|---|---|---|
| 220 - Design | ResellerAgreementTypeID | int | 4 |
| | ResellerAgreementTypeDesc | varchar | 50 |
| | CertificationRequired | char | 1 |
| | TimeConstrained | char | 1 |

| cdResellerAgreementTypes (Data View) | | | |
|---|---|---|---|
| | ResellerAgreementTypeID | ResellerAgreementTypeDesc | CertificationRequired |
| 220 - Data | 1 | MasterAgreement | N |
| | 2 | ProductAmendment | Y |
| | 3 | ConfigurationServicesAmendment | Y |
| | 4 | OnSiteServicesAmendment | Y |
| | 5 | AggregationServicesAmendment | Y |

-continued

Table Key tblResellerAgreements (Design View)

| | | Column | Data Type | Length |
|---|---|---|---|---|
| 221 - Design | | ResellerID | int | 4 |
| | | ResellerAgreementTypeID | int | 4 |
| | | DateExecuted | datetime | 8 |
| | | DateExpires | datetime | 8 |
| | | AgreementStatusID | int | 4 |
| | | PStaffUserID | int | 4 |
| | | AgreementRecordID | int | 4 | tblResellerSUInsurance (Design View)

| | | Column | Data Type | Length |
|---|---|---|---|---|
| 222 - Design | | ResellerInsuranceID | int | 4 |
| | | riCarrierID | int | 4 |
| | | riCompanyName | varchar | 100 |
| | | riPolicyNumber | varchar | 50 |
| | | riPolicyExpDate | datetime | 8 |
| | | riPolicyAmount | money | 8 |
| | | riPolicyCurrencyID | int | 4 |
| | | riInsuranceTypeID | int | 4 |
| | | riInsuranceCoverageTypeID | int | 4 |
| | | riResellerID | int | 4 |
| | | riApprovalStatusID | int | 4 |
| | | riCurrentStatusID | int | 4 |
| | | riApprovalDate | datetime | 8 |
| | | riPstaffInsured | varchar | 50 |
| | | riPStaffWaiverGranted | varchar | 50 | cdInsuranceType (Design View)

| | | Column | Data Type | Length |
|---|---|---|---|---|
| 223 - Design | Previous Filing | InsuranceTypeID | int | 4 |
| | | Description | varchar | 50 |
| | | constname | varchar | 50 |
| | | CoverageTypeAllowed | int | 4 | cdInsuranceCoverageType (Design View)

| | | Column | Data Type | Length |
|---|---|---|---|---|
| 224 - Design | Previous Filing | InsuranceCoverageTypeID | int | 4 |
| | | InsuranceCoverageType | varchar | 50 |
| | | InsuranceTypeID | int | 4 | tblInsurance$Thresholds (Design View)

| | | Column | Data Type | Length |
|---|---|---|---|---|
| 225 - Design | Previous Filing | InsuranceTypeID | int | 4 |
| | | InsuranceCoverageTypeID | int | 4 |
| | | RequiredMinimumAmount | money | 8 |
| | | RecordID | int | 4 | tblInsuranceCarriers (Design View)

| | | Column | Data Type | Length |
|---|---|---|---|---|
| 226 - Design | | CarrierID | int | 4 |
| | | cCarrierCode | varchar | 50 |
| | | cCarrierName | nvarchar | 100 |
| | | cLicensingCountryID | int | 4 |
| | | cCarrierContact | varchar | 100 |
| | | cContactPhone | varchar | 50 |
| | | cContactEMail | varchar | 50 |
| | | cCurrentStatusID | int | 4 |
| | | cApprovalStatusID | int | 4 |

| Table Key | | | |
|---|---|---|---|
| \multicolumn{4}{c}{cdResellerStatusTyps (Design View)} | | | |
| | Column | Data Type | Length |
| 227 - Design | ResellerStatusID | int | 4 |
| | ResellerStatusDesc | varchar | 50 |
| \multicolumn{4}{c}{cdResellerStatusTypes (Data View)} | | | |
| | ResellerStatusID | ResellerStatusDesc | |
| 227 - Data | 1 | TemporarySave | |
| | 2 | Pending Approval | |
| | 3 | Approval Declined | |
| | 4 | Approved - Active | |
| | 5 | Approved - Expired | |
| | 6 | On Hold | |
| 217 - Design | | tblReseller (Design View) | |
| \multicolumn{4}{c}{tblResellerSUPeople (Design View)} | | | |
| | Column | Data Type | Length |
| 228 - Design | ResellerID | int | 4 |
| | ResellerPeopleID | uniqueidentifier | 16 |
| | LastName | varchar | 50 |
| | FirstName | varchar | 50 |
| | MiddleName | varchar | 50 |
| | CityID | int | 4 |
| | RegionID | int | 4 |
| | CountryID | int | 4 |
| | CountryIdentifier | varchar | 50 |
| | BusinessPhone | varchar | 50 |
| | MobilePhone | varchar | 50 |
| | EMailAddress | varchar | 75 |
| | MailAddress1 | varchar | 75 |
| | MailAddress2 | varchar | 75 |
| | PostalCode | varchar | 25 |
| \multicolumn{4}{c}{tblResellerResourceProfileMaster (Design View)} | | | |
| | Column | Data Type | Length |
| 229 - Design | rowid | int | 4 |
| | ResellerResourceProfileGUID | uniqueidentifier | 16 |
| | ResellerPeopleID | uniqueidentifier | 16 |
| | rpmUserTypeID | int | 4 |
| | rpmUserGUID | uniqueidentifier | 16 |
| | rpmResourceProfileName | varchar | 255 |
| | rpmBusinessSectorID | int | 4 |
| | rpmBusinessArenaID | int | 4 |
| | rpmBusinessFamilyID | int | 4 |
| | rpmUserNotes | varchar | 1000 |
| | rpmRecordDate | datetime | 8 |
| | rpmCurrentStatusID | int | 4 |
| | rpmCompletion | char | 10 |
| | rpmCreateDate | datetime | 8 |
| | rpmToBeStored | char | 1 |
| \multicolumn{4}{c}{tblResellerResourceProfileMasterGFs (Design View)} | | | |
| | Column | Data Type | Length |
| 230 - Design | Row_ID | int | 4 |
| | ResellerResourceProfileGUID | uniqueidentifier | 16 |
| | GeneralFunctionID | int | 4 |
| \multicolumn{4}{c}{tblResellerResourceProfileMasterSkills (Design View)} | | | |
| | Column | Data Type | Length |
| 231 - Design | ResellerResourceProfileGUID | uniqueidentifier | 16 |
| | rsSkill_ID | int | 4 |
| | rsSkillPriority | int | 4 |
| | Row_ID | int | 4 |

Table Key tblResellerResourceProfileGEOCountry (Design View)

| | Column | Data Type | Length |
|---|---|---|---|
| 232 - Design | RowID | int | 4 |
| | CountryID | int | 4 |
| | ApprovalStatusID | int | 4 |
| | CurrentStatusID | int | 4 |
| | CountryPartial | int | 4 |
| | AssignmentRowID | int | 4 |
| | ResellerResourceProfileGUID | uniqueidentifier | 16 |
| | ClientContactTypeID | string | 4 | tblResellerResourceProfileGEORegion (Design View)

| | Column | Data Type | Length |
|---|---|---|---|
| 233 - Design | RowID | int | 4 |
| | CountryID | int | 4 |
| | RegionID | int | 4 |
| | ApprovalStatusID | int | 4 |
| | CurrentStatusID | int | 4 |
| | RegionPartial | int | 4 |
| | AssignmentRowID | int | 4 |
| | ResellerResourceProfileGUID | uniqueidentifier | 16 |
| | ClientContactTypeID | string | 4 | tblResellerResourceProfileGEOCity (Design View)

| | Column | Data Type | Length |
|---|---|---|---|
| 234 - Design | RowID | int | 4 |
| | CityID | int | 4 |
| | CountryID | int | 4 |
| | RegionID | int | 4 |
| | ApprovalStatusID | int | 4 |
| | CurrentStatusID | int | 4 |
| | CityPartial | int | 4 |
| | ResellerResourceProfileGUID | uniqueidentifier | 16 |
| | ClientContactTypeID | string | 4 | cdResellerContactTypes (Design View)

| | Column | Data Type | Length |
|---|---|---|---|
| 235 - Design | Client_Contact_TypeID | int | 4 |
| | Client_Contact_TypeDesc | varchar | 25 | cdResellerContactTypes (Design View)

| | Client_Contact_TypeID | Client_Contact_TypeDesc | |
|---|---|---|---|
| 235 - Data | 1 | In Person | |
| | 2 | Via Phone | |
| | 3 | Via EMail | |
| | 4 | Via System | |
| | 5 | Via Web Conference | | cdSICDivisions (Design View)

| | Column | Data Type | Length |
|---|---|---|---|
| 236 - Design | SICDivisionID | int | 4 |
| | SICDivisionCode | varchar | 1 |
| | SICDivisionName | varchar | 255 | cdSICMajGroups (Design View)

| | Column | Data Type | Length |
|---|---|---|---|
| 237 - Design | SICMajorGroupCode | int | 4 |
| | SICMajorGroupName | varchar | 255 |
| | SICDivisionID | int | 4 |

-continued

| Table Key | | | |
|---|---|---|---|
| cdSICIndustryGroups (Design View) | | | |
| | Column | Data Type | Length |
| 238 - Design | SICIndustryGroupCode<br>SICIndustryGroupName<br>SICMajorGroupCode | int<br>varchar<br>int | 4<br>255<br>4 |
| cdSICIndustries (Design View) | | | |
| | Column | Data Type | Length |
| 239 - Design | SICCode<br>SICCodeDescription<br>SICIndustryGroupCode | varchar<br>varchar<br>int | 4<br>255<br>4 |
| tblResellerPeopleSICIndGroupMap (Design View) | | | |
| | Column | Data Type | Length |
| 240 - Design | ResellerPeopleID<br>SICIndustryGroupCode<br>RowID | uniqueidentifier<br>int<br>int | 16<br>4<br>4 |
| 1 - Design | cdProductTypes (Design View) | | |
| cdzResellerCertFeeMatrixProduct (Design View) | | | |
| | Column | Data Type | Length |
| 241 - Design | ProductTypeCertPriceID<br>ProductTypeID<br>ResellerCertificationFee<br>EffectiveDate<br>ExpirationDate<br>PStaffUserID<br>CertFeeStatusID | uniqueidentifier<br>int<br>money<br>datetime<br>datetime<br>int<br>int | 16<br>4<br>8<br>8<br>8<br>4<br>4 |
| tblResellerProductsPeopleCerts (Design View) | | | |
| | Column | Data Type | Length |
| 242 - Design | rpRecordID<br>ResellerPeopleID<br>CertificationID<br>CertificationDate<br>CertificationRealDate<br>CertificationStatusID<br>PStaffApproverID<br>ProductTypeCertPriceID<br>RowID<br>CertificationTestID<br>CertificationTestScore<br>CertificationTestModeratorID | int<br>uniqueidentifier<br>uniqueidentifier<br>datetime<br>datetime<br>int<br>int<br>uniqueidentifier<br>int<br>int<br>varchar<br>int | 4<br>16<br>16<br>8<br>8<br>4<br>4<br>16<br>4<br>4<br>50<br>4 |
| cdzConfigurationServicesTypes (Design View) | | | |
| | Column | Data Type | Length |
| 243 - Design | ConfigurationTypeID<br>ConfigurationTypeDesc | int<br>varchar | 4<br>50 |
| cdzResellerCertFeeMatrixConfigurationServices (Design View) | | | |
| | Column | Data Type | Length |
| 244 - Design | ConfigSvcsTypeCertPriceID<br>ConfigurationTypeID<br>ResellerCertificationFee<br>EffectiveDate<br>ExpirationDate<br>PStaffUserID<br>CertFeeStatusID | uniqueidentifier<br>int<br>money<br>datetime<br>datetime<br>int<br>int | 16<br>4<br>8<br>8<br>8<br>4<br>4 |

Table Key tblResellerConfigServicesPeopleCerts (Design View)

| | Column | Data Type | Length |
|---|---|---|---|
| 245 - Design | rcsRecordID | int | 4 |
| | ResellerPeopleID | uniqueidentifier | 16 |
| | CertificationID | uniqueidentifier | 16 |
| | CertificationDate | datetime | 8 |
| | CertificationRealDate | datetime | 8 |
| | CertificationStatusID | int | 4 |
| | PStaffApproverID | int | 4 |
| | ConfigSvcsTypeCertPriceID | uniqueidentifier | 16 |
| | RowID | int | 4 |
| | CertificationTestID | int | 4 |
| | CertificationTestScore | varchar | 50 |
| | CertificationTestModeratorID | int | 4 | cdzOnSiteServicesTypes (Design View)

10 - Design cdzResellerCertFeeMatrixOnsiteServices (Design View)

| | Column | Data Type | Length |
|---|---|---|---|
| 246 - Design | OnsiteSvcsTypeCertPriceID | uniqueidentifier | 16 |
| | OnSiteServicesTypeID | int | 4 |
| | ResellerCertificationFee | money | 8 |
| | EffectiveDate | datetime | 8 |
| | ExpirationDate | datetime | 8 |
| | PStaffUserID | int | 4 |
| | CertFeeStatusID | int | 4 | tblResellerOnSiteServicesPeopleCerts (Design View)

| | Column | Data Type | Length |
|---|---|---|---|
| 247 - Design | rosRecordID | int | 4 |
| | ResellerPeopleID | uniqueidentifier | 16 |
| | CertificationID | uniqueidentifier | 16 |
| | CertificationDate | datetime | 8 |
| | CertificationRealDate | datetime | 8 |
| | CertificationStatusID | int | 4 |
| | PStaffApproverID | int | 4 |
| | OnsiteSvcsTypeCertPriceID | uniqueidentifier | 16 |
| | RowID | int | 4 |
| | CertificationTestID | int | 4 |
| | CertificationTestScore | varchar | 50 |
| | CertificationTestModeratorID | int | 4 | cdzAggregationTypes (Design View)

13 - Design cdzResellerCertFeeMatrixAggregationServices (Design View)

| | Column | Data Type | Length |
|---|---|---|---|
| 248 - Design | AggregationSvcsTypeCertPriceID | uniqueidentifier | 16 |
| | AggregationServicesTypeID | int | 4 |
| | ResellerCertificationFee | money | 8 |
| | EffectiveDate | datetime | 8 |
| | ExpirationDate | datetime | 8 |
| | PStaffUserID | int | 4 |
| | CertFeeStatusID | int | 4 | tblResellerAggregationServicesPeopleCerts (Design View)

| | Column | Data Type | Length |
|---|---|---|---|
| 249 - Design | rasRecordID | int | 4 |
| | ResellerPeopleID | uniqueidentifier | 16 |
| | CertificationID | uniqueidentifier | 16 |
| | CertificationDate | datetime | 8 |
| | CertificationRealDate | datetime | 8 |
| | CertificationStatusID | int | 4 |
| | PStaffApproverID | int | 4 |
| | AggregationSvcsTypeCertPriceID | uniqueidentifier | 16 |
| | RowID | int | 4 |

| | Table Key | | |
|---|---|---|---|
| | CertificationTestID | int | 4 |
| | CertificationTestScore | varchar | 50 |
| | CertificationTestModeratorID | int | 4 |

| 228 - Design | | tblResellerSUPeople (Design View) | |
|---|---|---|---|

| | tblCertificationStatus (Design View) | | |
|---|---|---|---|
| | Column | Data Type | Length |
| 250 - Design | CertificationStatusID | int | 4 |
| | CertificationStatusDesc | varchar | 20 |

| | tblCertificationStatus (Design View) | |
|---|---|---|
| | CertificationStatusID | CertificationStatusDesc |
| 250 - Data | 1 | Active |
| | 2 | FailedTest |
| | 3 | ExpiredCertification |
| | 4 | Inactive CRS |
| | 5 | Pending Approval |
| | 6 | Approved Awaiting Fee |

| 227 - Design | cdResellerStatusTypes (Design View) |
|---|---|
| 214 - Design | tblCompanyMaster (Design View) |
| 217 - Design | tblReseller (Design View) |
| 220 - Design | cdResellerAgreementTypes (Design View) |
| 221 - Design | tblResellerAgreements (Design View) |
| 1 - Design | cdProductTypes (Design View) |

| | tblResellerProducts (Design View) | | |
|---|---|---|---|
| | Column | Data Type | Length |
| 251 - Design | ResellerID | int | 4 |
| | ProductTypeID | int | 4 |
| | DateExecuted | datetime | 8 |
| | DateExpires | datetime | 8 |
| | PStaffUserID | int | 4 |
| | ResellerStatusID | int | 4 |
| | RecordID | int | 4 |
| | AgreementRecordID | int | 4 |

| | tblResellerPricingProductMap (Design View) | | |
|---|---|---|---|
| | Column | Data Type | Length |
| 252 - Design | rpRecordID | int | 4 |
| | ClientAgreementDurationID | int | 4 |
| | PricingTypeID | int | 4 |
| | CommissionPercent | float | 8 |
| | RecordID | int | 4 |

| 244 - Design | | cdzConfigurationServicesTypes (Design View) | |
|---|---|---|---|

| | tblResellerConfigServices (Design View) | | |
|---|---|---|---|
| | Column | Data Type | Length |
| 253 - Design | ResellerID | int | 4 |
| | ConfigurationTypeID | int | 4 |
| | DateExecuted | datetime | 8 |
| | DateExpires | datetime | 8 |
| | PStaffUserID | int | 4 |
| | ResellerStatusID | int | 4 |
| | RecordID | int | 4 |
| | AgreementRecordID | int | 4 |

| | tblResellerPricingConfigSvcsMap (Design View) | | |
|---|---|---|---|
| | Column | Data Type | Length |
| 254 - Design | rcsRecordID | int | 4 |
| | ClientAgreementDurationID | int | 4 |
| | PricingTypeID | int | 4 |
| | CRSListPrice | money | 9 |

-continued

| | Table Key | | |
|---|---|---|---|
| | ListPriceNegotiable | bit | 1 |
| | CommissionPercent | float | 8 |
| | PSRoyaltyPercent | float | 8 |
| | RecordID | int | 4 |

| 10 - Design | cdzOnSiteServicesTypes (Design View) | | |
|---|---|---|---|

| | tblResellerOnSiteServices (Design View) | | |
|---|---|---|---|
| | Column | Data Type | Length |
| 255 - Design | ResellerID | int | 4 |
| | OnSiteServicesTypeID | int | 4 |
| | DateExecuted | datetime | 8 |
| | DateExpires | datetime | 8 |
| | PStaffUserID | int | 4 |
| | ResellerStatusID | int | 4 |
| | RecordID | int | 4 |
| | AgreementRecordID | int | 4 |

| | tblResellerPricingOnsiteSvcsMap (Design View) | | |
|---|---|---|---|
| | Column | Data Type | Length |
| 256 - Design | rosRecordID | int | 4 |
| | ClientAgreementDurationID | int | 4 |
| | PricingTypeID | int | 4 |
| | CRSListPrice | money | 9 |
| | ListPriceNegotiable | bit | 1 |
| | CommissionPercent | float | 8 |
| | PSRoyaltyPercent | float | 8 |
| | RecordID | int | 4 |

| 13 - Design | cdzAggregationTypes (Design View) | | |
|---|---|---|---|

| | tblResellerAggreationServices (Design View) | | |
|---|---|---|---|
| | Column | Data Type | Length |
| 257 - Design | ResellerID | int | 4 |
| | AggregationServicesTypeID | int | 4 |
| | DateExecuted | datetime | 8 |
| | DateExpires | datetime | 8 |
| | PStaffUserID | int | 4 |
| | ResellerStatusID | int | 4 |
| | RecordID | int | 4 |
| | AgreementRecordID | int | 4 |

| | tblResellerPricingAggSvcsMap (Design View) | | |
|---|---|---|---|
| | Column | Data Type | Length |
| 258 - Design | rasRecordID | int | 4 |
| | ClientAgreementDurationID | int | 4 |
| | PricingTypeID | int | 4 |
| | CRSListPrice | money | 9 |
| | ListPriceNegotiable | bit | 1 |
| | CommissionPercent | float | 8 |
| | PSRoyaltyPercent | float | 8 |
| | RecordID | int | 4 |

| | cdPricingTypes (Design View) | | |
|---|---|---|---|
| | Column | Data Type | Length |
| 259 - Design | PricingTypeID | int | 4 |
| | PricingTypeDesc | varchar | 50 |

| | cdPricingTypes (Data View) | |
|---|---|---|
| | PricingTypeID | PricingTypeDesc |
| 259 - Data | 1 | FlatLicenseFee |
| | 2 | UserBasedLicenseFee |
| | 3 | BillingCutLicenseFee |
| | 4 | TransactionalLicenseFee |
| | 5 | DiskSpaceBasedFee |

-continued

| Table Key | | |
|---|---|---|
| | 6 | FixedPriceDeliverableFee |
| | 7 | UnitBasedDeliverableFee |
| | 8 | HourlyFee |
| | 9 | RoyaltyFee |
| | 10 | Commission |
| | 11 | OneTimeCertificationFee |
| | 12 | RecurringCertificationFee |
| | 13 | Cost Plus Fixed Mark Up |
| | 14 | Management Fee | cdPricingAgreementDurations (Design View)

| | Column | Data Type | Length |
|---|---|---|---|
| 260 - Design | ClientAgreementDurationID | int | 4 |
| | ClientAgreementDurationDesc | varchar | 50 | cdPricingAgreementDurations (Data View)

| | ClientAgreementDurationID | ClientAgreementDurationDesc | |
|---|---|---|---|
| 260 - Data | 3 | Monthly | |
| | 4 | Quarterly | |
| | 5 | SemiAnnually | |
| | 6 | Annually | |
| | 7 | TwoYear | |
| | 8 | ThreeYear | |
| | 9 | Per Deliverable | |
| | 10 | Per Client PO Term | | tblRequestSalesCall (Design View)

| | Column | Data Type | Length |
|---|---|---|---|
| 261 - Design | ProgramID | int | 4 |
| | ProgramName | varchar | 50 |
| | pUserID | int | 4 |
| | pUserPhone | varchar | 20 |
| | ResellerID | int | 4 |
| | ResellerPeopleID | uniqueidentifier | 16 |
| | ClientContactTypeID | int | 4 |
| | RequestDate | datetime | 8 |
| | CallRequestID | int | 4 |
| | BuyerRequestStatusID | int | 4 |
| | MaxResponseDays | numeric | 9 |
| | BuyerNotes | varchar | 5000 |
| | ResellerResponseDate | datetime | 8 |
| | ResellerResponseStatusID | int | 4 |
| | ResellerNotes | varchar | 5000 | cdResellerContactTypes (Design View)

| | Column | Data Type | Length |
|---|---|---|---|
| 262 - Design | ClientContactTypeID | int | 4 |
| | ClientContactTypeDesc | varchar | 25 | cdResellerContactTypess (Data View)

| | ClientContactTypeID | ClientContactTypeDesc | |
|---|---|---|---|
| 262 - Data | 1 | In Person | |
| | 2 | Via Phone | |
| | 3 | Via EMail | |
| | 4 | Via System | |
| | 5 | Via Web Conference | | cdBuyerRequestStatus (Design View)

| | Column | Data Type | Length |
|---|---|---|---|
| 263 - Design | BuyerRequestStatusID | int | 4 |
| | BuyerRequestStatusDesc | varchar | 50 |

-continued

| Table Key | | | |
|---|---|---|---|
| cdBuyerRequestStatus (Data View) | | | |
| | BuyerRequestStatusID | BuyerRequestStatusDesc | |
| 263 - Data | 1 | TemporarySave | |
| | 2 | Active | |
| | 3 | Expired | |
| | 4 | OnHold | |
| | 5 | ActiveExtended | |
| | 6 | Cancelled | |
| cdResellerCallResponseStatus (Design View) | | | |
| | Column | Data Type | Length |
| 264 - Design | ResellerResponseStatusID | int | 4 |
| | ResellerResponseStatusDesc | varchar | 50 |
| cdResellerCallResponseStatus (Data View) | | | |
| | ResellerResponseStatusID | ResellerResponseStatusDesc | |
| 264 - Data | 1 | No_Response_Active | |
| | 2 | No_Response_Inactive | |
| | 3 | Timely_Response_Declination | |
| | 4 | Timely_Response_Accept | |
| | 5 | Request_Extension | |
| tblRequestService (Design View) | | | |
| | Column | Data Type | Length |
| 265 - Design | ProgramID | int | 4 |
| | ProgramName | varchar | 50 |
| | pUserID | int | 4 |
| | ResellerID | int | 4 |
| | ResellerPeopleID | uniqueidentifier | 16 |
| | RequestDate | datetime | 8 |
| | ServiceRequestID | int | 4 |
| | BuyerRequestStatusID | int | 4 |
| | MaxResponseDays | numeric | 9 |
| | BuyerNotes | varchar | 5000 |
| | ResellerResponseDate | datetime | 8 |
| | ResellerResponseStatusID | int | 4 |
| | ResellerNotes | varchar | 5000 |
| tblRequestServiceConfigDetail (Design View) | | | |
| | Column | Data Type | Length |
| 266 - Design | ServiceRequestID | int | 4 |
| | ConfigurationTypeID | int | 4 |
| | PricingTypeID | int | 4 |
| | CRSListPrice | money | 8 |
| | BuyerOtherOffer | money | 8 |
| | srConfigID | int | 4 |
| | rpRecordID | int | 4 |
| tblRequestServiceOnsiteDetail (Design View) | | | |
| | Column | Data Type | Length |
| 267 - Design | ServiceRequestID | int | 4 |
| | OnSiteServicesTypeID | int | 4 |
| | PricingTypeID | int | 4 |
| | CRSListPrice | money | 8 |
| | BuyerOtherOffer | money | 8 |
| | srOnsiteID | int | 4 |
| | rpRecordID | int | 4 |
| tblRequestServiceAggDetail (Design View) | | | |
| | Column | Data Type | Length |
| 268 - Design | ServiceRequestID | int | 4 |
| | AggregationServicesTypeID | int | 4 |
| | PricingTypeID | int | 4 |

| | Table Key | | |
|---|---|---|---|
| | CRSListPrice | money | 8 |
| | BuyerOtherOffer | money | 8 |
| | srAggID | int | 4 |
| | rpRecordID | int | 4 |

| | | | |
|---|---|---|---|
| 254 - Design | | tblResellerPricingConfigSvcsMap (Design View) | |
| 256 - Design | | tblResellerPricingOnsiteSvcsMap (Design View) | |
| 258 - Design | | tblResellerPricingAggSvcsMap (Design View) | |
| 259 - Design | | cdPricingTypes (Design View) | |
| 265 - Design | | tblRequestService (Design View) | |
| 266 - Design | | tblRequestServiceConfigDetail (Design View) | |
| 267 - Design | | tblRequestServiceOnsiteDetail (Design View) | |
| 268 - Design | | tblRequestServiceAggDetail (Design View) | |

| | tblPORequisitionMain (Design View) | | |
|---|---|---|---|
| | Column | Data Type | Length |
| 269 - Design | ProgramID | int | 4 |
| | ServiceRequestID | int | 4 |
| | POReqID | uniqueidentifier | 16 |
| | RecordDate | datetime | 8 |
| | preqStatusID | int | 4 |
| | pUserID | int | 4 |
| | ResellerID | int | 4 |
| | pRequisitionID | varchar | 50 |
| | pPurchaseOrderID | varchar | 50 |

| | tblPORequisitionHeader (Design View) | | |
|---|---|---|---|
| | Column | Data Type | Length |
| 270 - Design | POReqHeaderID | int | 4 |
| | POReqID | uniqueidentifier | 16 |
| | ProgramName | varchar | 50 |
| | pBillingAddress1 | varchar | 50 |
| | pBillingAddress2 | varchar | 50 |
| | pBillingCity | varchar | 50 |
| | pBillingRegion | varchar | 50 |
| | pBillingCountry | varchar | 50 |
| | pBillingMailCode | varchar | 50 |
| | PaymentTermsID | int | 4 |
| | pAuthorizationCode | varchar | 50 |

| | tblPORequisitionDetail (Design View) | | |
|---|---|---|---|
| | Column | Data Type | Length |
| 271 - Design | POReqID | uniqueidentifier | 16 |
| | PricingTypeID | int | 4 |
| | Quantity | float | 8 |
| | Price | money | 8 |
| | TaxPercent | float | 8 |
| | TaxAmount | money | 8 |
| | LineItemTotal | money | 8 |
| | POReqLineID | int | 4 |
| | srConfigID | int | 4 |
| | srOnsiteID | int | 4 |
| | srAggID | int | 4 |
| | PartialProcessing | bit | 1 |

| | cdRequisitionStatus (Design View) | | |
|---|---|---|---|
| | Column | Data Type | Length |
| 272 - Design | preqStatusID | int | 4 |
| | preqStatusDesc | varchar | 50 |

| | cdRequisitionStatus (Data View) | |
|---|---|---|
| | preqStatusID | preqStatusDesc |
| 272 - Data | 1 | TemporarySave |
| | 2 | SentToVendor |
| | 3 | VendorAccepted |
| | 4 | VendorDeclined |
| | 5 | OnHold |

| Table Key | | |
|---|---|---|
| | 6 | Cancelled |
| | 7 | Approved |

| | | | |
|---|---|---|---|
| 269 - Design | | tblPORequisitionMain (Design View) | |
| 270 - Design | | tblPORequisitionHeader (Design View) | |
| 271 - Design | | tblPORequisitionDetail (Design View) | |

| tblVoucherMain (Design View) | | | |
|---|---|---|---|
| | Column | Data Type | Length |
| 273 - Design | POReqID | uniqueidentifier | 16 |
| | VoucherID | int | 4 |
| | VoucherDate | datetime | 8 |
| | VoucherStatus | int | 4 |
| | UserID | int | 4 |

| tblVoucherDetail (Design View) | | | |
|---|---|---|---|
| | Column | Data Type | Length |
| 274 - Design | POReqID | uniqueidentifier | 16 |
| | VoucherID | int | 4 |
| | VoucherLineID | int | 4 |
| | PricingTypeID | int | 4 |
| | Price | money | 8 |
| | Quantity | float | 8 |
| | Sub-Cost | money | 8 |
| | TaxPercent | float | 8 |
| | TaxAmount | money | 8 |
| | LineItemTotalCost | money | 8 |
| | DispositionStatus | int | 4 |
| | DispositionDate | datetime | 8 |
| | pUserID | int | 4 |

| tblVoucherStatus (Design View) | | | |
|---|---|---|---|
| | Column | Data Type | Length |
| 275 - Design | VoucherStatusID | int | 4 |
| | VoucherStatusDesc | varchar | 50 |

| tblVoucherStatus (Data View) | | |
|---|---|---|
| | VoucherStatusID | VoucherStatusDesc |
| 275 - Data | 1 | TemporarySave |
| | 2 | SentToBuyer |
| | 3 | Cancelled |
| | 4 | Processed |

| tblVoucherDisposition (Design View) | | | |
|---|---|---|---|
| | Column | Data Type | Length |
| 276 - Design | VoucherDispositionID | int | 4 |
| | VoucherDispositionDesc | varchar | 50 |

| tblVoucherDisposition (Data View) | | |
|---|---|---|
| | VoucherDispositionID | VoucherDispositionDesc |
| 276- Data | 1 | LineRejected |
| | 2 | LineApproved |

| tblInvoice (Design View) | | | |
|---|---|---|---|
| 277 - Design | RecordID | int | 4 |
| | ProgramID | int | 4 |
| | POReqID | int | 4 |
| | pPurchaseOrderID | varchar | 50 |
| | ClientPOLineID | numeric | 9 |
| | ExtractDate | datetime | 8 |
| | ApprovalDate | datetime | 8 |
| | VoucherID | int | 4 |
| | VoucherLineID | int | 4 |
| | PricingTypeID | int | 4 |

| Table Key | | |
|---|---|---|
| Price | money | 8 |
| Quantity | numeric | 9 |
| [Sub-Cost] | money | 8 |
| TaxPercent | float | 8 |
| TaxAmount | money | 8 |
| LineItemTotalCost | money | 8 |
| InvoiceNumber | numeric | 9 |
| InvoiceDate | datetime | 8 |
| InvoiceDueDate | datetime | 8 |
| InvoiceFileID | varchar | 50 |
| InvoiceStatusID | int | 4 |
| InvoicePaymentDate | datetime | 8 |
| InvoicePaymentAmount | money | 8 |
| ResellerID | int | 4 |
| ResellerDisbursementDate | datetime | 8 |
| ResellerDisbursementAmount | money | 8 |

The previous Detailed Description is of embodiment(s) of the invention. The scope of the invention should not necessarily be limited by this Description. The scope of the invention is instead defined by the following claims and the equivalents thereof.

What is claimed is:

1. A computer system for storing of business information to be transferred from a consultant to a buyer, the computer system comprising:
a database system for maintaining configurable business information organized into a plurality of information components, the configurable business information being maintained in a consultant environment that is independent of any particular buyer environment;
wherein the configurable business information comprises the consultant's subject-matter expertise regarding how to optimize a particular business endeavor;
wherein the database system comprises:
an inherent data model operable to facilitate the particular business endeavor, the plurality of information components comprising system data structures of the inherent data model; and
a metadata component operable to create and store metadata mapped to the inherent data model;
a server connected to the database system and connectable to the buyer and the consultant; and
wherein the server is operable to:
receive a selection of an information component from the plurality of information components;
configure the information component in accordance with consultant instructions via the metadata component, the configuration comprising creation and storage of consultant metadata mapped to the information component;
wherein the consultant metadata comprises an information setting;
wherein the information setting customizes at least one of the system data structures so as to accommodate at least one functional nuance of the particular business endeavor not accommodated by the inherent data model;
integrate the information setting into at least one work flow entity; and
integrate the at least one work flow entity into a process design.

2. The computer system of claim 1, wherein the server is operable, in configuring the information component in accordance with consultant instructions, to:
create a new data object;
create a new value of an existing data object;
save the new object and the existing data object to the database system; and
create an information component association.

3. The computer system of claim 1, wherein the server is operable, in integrating the information setting into at least one work flow entity, to perform at least one of:
integrating the configured information setting into at least one unmodified pre-existing system-inherent work flow entity;
integrating the configured information setting into at least one modified system-inherent work flow entity; and
integrating the configured information setting into at least one added non-system-inherent work flow entity.

4. The computer system of claim 1, wherein the server is operable, in
integrating the at least one work flow entity into a process design, to:
receive a selection of at least one work flow entity;
receive a selection of at least one user role/permission;
receive specification of number of primary process legs;
receive process-leg specifications; and
store work flow process settings in the database system.

5. The computer system of claim 1, wherein the server is operable to:
establish the information setting for sale; and
in establishing the business information for sale, associate a stored business information setting with a price list entry.

6. The computer system of claim 1, wherein the plurality of information components comprise at least one of:
a configuration element; and
a configuration sub-element.

7. The computer system of claim 1, wherein the plurality of information components are organized into at least one configuration module, the at least one configuration module comprising at least one of:
a master data configuration module;
a commodity configuration module;
a supplier configuration module;
a human capital management configuration module;
a collateral data configuration module;
a work flow entity configuration module;
an RFx configuration module;
a requisition/purchase order configuration module;
a bill pay request voucher process configuration module;
a financial processing configuration module;

an information system configuration module; and
an aggregations/solutions configuration module.

8. The computer system of claim 1, wherein the server is operable, in integrating the information setting into at least one work flow entity, to put the information setting onto a user interface.

9. A method of storing of business information to be transferred from a consultant to a buyer, the method comprising:
on a database system, maintaining configurable business information organized into a plurality of information components, the configurable business information being maintained in a consultant environment that is independent of any particular buyer environment;
wherein the configurable business information comprises the consultant's subject-matter expertise regarding how to optimize a particular business endeavor;
wherein the database system comprises an inherent data model operable to be customized via metadata configuration, the plurality of information components comprising system data structures of the inherent data model;
on at least one server computer, receiving a selection of an information component from the plurality of information components;
configuring, by the at least one server computer, the information component in accordance with consultant instructions via metadata configuration, the configuration comprising creation and storage of consultant metadata mapped to the information component;
wherein the consultant metadata comprises an information setting;
wherein the information setting customizes at least one of the system data structures so as to accommodate at least one functional nuance of the particular business endeavor not accommodated by the inherent data model;
integrating, via the at least one server computer, the information setting into at least one work flow entity; and
integrating, via the at least one server computer, the at least one work flow entity into a process design.

10. The method of claim 9, wherein the step of configuring the information component in accordance with consultant instructions comprises:
creating a new data object;
creating a new value of an existing data object;
saving the new object and the existing data object to the database system; and
creating an information component association.

11. The method of claim 9, wherein the step of integrating the information setting into at least one work flow entity comprises putting the setting onto a user interface.

12. The method of claim 9, wherein the step of integrating the at least one work flow entity into a process design comprises:
receive a selection of at least one work flow entity;
receive a selection of at least one user role/permission;
receive specification of number of primary process legs;
receive process-leg specifications; and
store work flow process settings in the database system.

13. The method of claim 9, comprising:
establishing the information setting for sale; and
wherein the step of establishing the business information for sale comprises associating a stored business information setting with a price list entry.

14. The method of claim 9, wherein the plurality of information components comprise at least one of:
a configuration element; and
a configuration sub-element.

15. The method of claim 9, wherein the plurality of information components are organized into at least one configuration module, the at least one configuration module comprising at least one of:
a master data configuration module;
a commodity configuration module;
a supplier configuration module;
a human capital management configuration module;
a collateral data configuration module;
a work flow entity configuration module;
an RFx configuration module;
a requisition/purchase order configuration module;
a bill pay request voucher process configuration module;
a financial processing configuration module;
an information system configuration module; and
an aggregations/solutions configuration module.

16. A computer system for facilitating transfer of business information in the form of configuration settings from a consultant to a buyer, the computer system comprising:
a database system for storing the business information to be transferred, the business information being maintained in a consultant environment that is independent of a buyer environment;
wherein the business information comprises the consultant's subject-matter expertise regarding how to optimize a particular business endeavor;
wherein the database system comprises:
an inherent data model operable to facilitate the particular business endeavor, the inherent data model comprising system data structures; and
a metadata component operable to create and store metadata mapped to the inherent data model;
a server connected to the database system and connectable to the buyer and the consultant; and
wherein the server is operable to:
receive a buyer request for transfer of previously-defined consultant configuration settings;
wherein the previously-defined consultant configuration settings comprise consultant metadata mapped to the inherent data model via the metadata component;
wherein the consultant metadata customizes at least one of the system data structures via the metadata component, the customization comprising accommodation of at least one functional nuance of the particular business endeavor not accommodated by the inherent data model;
perform a component-framework comparison between the buyer environment and the consultant environment; and
responsive to a determination that the buyer environment supports the configuration settings, transfer at least one of a configuration-setting object and a configuration-setting value to the buyer environment.

17. The computer system of claim 16, wherein the server is operable to:
determine whether the transfer was successful; and
responsive to a determination that the transfer was successful, provide a message to the buyer indicating that the requested configuration settings have been transferred.

18. The computer system of claim 16, wherein the server is operable to:
determine whether the transfer was successful; and
responsive to a determination that the transfer was not successful:
provide a message to the buyer indicating that the requested configuration settings have not been transferred; and provide a message to an administrator regarding transfer failure.

19. The computer system of claim 16, wherein the server is operable to:
provide to the buyer a control enabling configuration-setting modification;
provide to the buyer a control to synchronize the transferred configuration settings with the buyer environment;
perform at least one of relationship, data integrity, and work flow analyses; and
provide to the buyer information relative to the performed analyses.

20. The computer system of claim 19, wherein the server is operable to:
receive input from the buyer indicating whether buyer intervention is necessary to the performed analyses; and
responsive to a determination that buyer intervention is necessary, provide an option to the buyer to complete settings configuration.

21. The computer system of claim 20, wherein the server is operable to, responsive to a determination that buyer intervention is necessary:
receive buyer inputs relative to reconciliation of settings conflicts; and
save buyer inputs.

22. The computer system of claim 21, wherein the server is operable to:
receive input from the buyer indicating whether buyer intervention is necessary to the performed analyses; and
responsive to a determination that buyer intervention is not necessary, provide an option to the buyer to activate the transferred configuration settings.

23. A method for facilitating transfer of business information in the form of configuration settings from a consultant to a buyer, the method comprising:
on a database system, storing the business information to be transferred, the business information being maintained in a consultant environment that is independent of a buyer environment;
wherein the business information comprises the consultant's subject-matter expertise regarding how to optimize a particular business endeavor;
wherein the database system comprises an inherent data model operable to facilitate the particular business endeavor and be customized via metadata configuration;
wherein the inherent data model comprises system data structures;
receiving a buyer request for transfer of previously-defined consultant configuration settings;
wherein the previously-defined consultant configuration settings comprise consultant metadata mapped to the inherent data model via the metadata configuration;
wherein the consultant metadata customizes at least one of the system data structures via the metadata configuration, the customization comprising accommodation of at least one functional nuance of the particular business endeavor not accommodated by the inherent data model;
performing a component-framework comparison between the buyer environment and the consultant environment;
responsive to a determination that the buyer environment supports the configuration settings, transferring at least one of configuration-setting object and a configuration-setting value to the buyer environment.

24. The method of claim 23, further comprising:
determining whether the transfer was successful; and
responsive to a determination that the transfer was successful, providing a message to the buyer indicating that the requested configuration settings have been transferred.

25. The method of claim 23, further comprising:
determining whether the transfer was successful; and
responsive to a determination that the transfer was not successful:
providing a message to the buyer indicating that the requested configuration settings have not been transferred; and
providing a message to an administrator regarding transfer failure.

26. The method of claim 23, further comprising:
providing to the buyer a control enabling configuration-setting modification;
providing to the buyer a control to synchronize the transferred configuration settings with the buyer environment;
performing at least one of relationship, data integrity, and work flow analyses; and
providing to the buyer information relative to the performed analyses.

27. The method of claim 26, further comprising:
receiving input from the buyer indicating whether buyer intervention is necessary to the performed analyses; and
responsive to a determination that buyer intervention is necessary, providing an option to the buyer to complete settings configuration.

28. The method of claim 27, further comprising, responsive to a determination that buyer intervention is necessary:
receiving buyer inputs relative to reconciliation of settings conflicts; and
saving buyer inputs.

29. The method of claim 28, further comprising:
receiving input from the buyer indicating whether buyer intervention is necessary to the performed analyses; and
responsive to a determination that buyer intervention is not necessary, providing an option to the buyer to activate the transferred configuration settings.

30. The computer system of claim 16, wherein the server is connected to the database system to execute instructions to:
permit the buyer to access business information;
permit the buyer to query business information to find applicable consultants;
permit the buyer to request a consultant call;
permit the buyer to request a services provision from the consultant in the form of an offer;
permit the consultant to make a disposition regarding the buyer's offer; and
provide the buyer disposition status of the offer.

31. A method of enabling transfer of business information from a consultant to a buyer, the method comprising:
permitting, by at least one server computer, access by a consultant to a transfer environment that facilitates transfer of database settings to a buyer environment;
wherein the database settings comprise consultant-created metadata, the consultant-created metadata customizing an inherent data model of a database system based on the consultant's subject-matter expertise;
wherein the inherent data model comprises system data structures, the consultant-created metadata customizing at least one of the system data structures so as to accommodate a functional nuance not accommodated by the inherent data model;

receiving, by the at least one server computer, business qualification information inputs from the consultant;

performing, by the at least one server computer, a consultant business qualification assessment;

executing, by the at least one server computer, a consultant agreement process; and on the at least one server computer, granting, to the consultant, of selective access to transfer-environment applications.

32. A computer system for enabling transfer of business information from a consultant to a buyer, the computer system comprising:

a database system;

a server connected to the database system and connectable to the buyer and the consultant; and wherein the server is operable to:

permit access by a consultant to a transfer environment that facilitates transfer of database settings to a buyer environment;

wherein the database settings comprise consultant-created metadata, the consultant-created metadata customizing an inherent data model of a database system based on the consultant's subject-matter expertise;

wherein the inherent data model comprises system data structures, the consultant-created metadata customizing at least one of the system data structures so as to accommodate a functional nuance not accommodated by the inherent data model;

receive business qualification information inputs from the consultant;

perform a consultant business qualification assessment;

execute a consultant agreement process; and grant, to the consultant, of selective access to transfer-environment applications.

33. The computer system of claim 32, wherein the server is connected to the database system to execute instructions to:

receive general data regarding consultant employees;

create a skill profile regarding consultant employees;

create a commodity profile regarding consultant employees;

create a geographic sales profile regarding consultant employees;

receive a request for professional services designation/qualification regarding consultant employees;

perform consultant professional services certification; and facilitate establishment of consultant professional services pricing.

34. The method of claim 31, further comprising:

receiving general data regarding consultant employees;

creating a skill profile regarding consultant employees;

creating a commodity profile regarding consultant employees;

creating a geographic sales profile regarding consultant employees;

receiving a request for professional services designation/qualification regarding consultant employees;

performing consultant professional services certification; and facilitating establishment of consultant professional services pricing.

35. The method of claim 34, wherein the step of creating the skill profile is performed via a standard skill profiling interface.

36. The method of claim 34, further comprising:

receiving a selection of a desired bundle of professional services;

saving settings relative to the desired bundle of professional services;

administering a consultant certification test; and notifying the consultant regarding certification-test results.

* * * * *